United States Patent
Ellis et al.

(10) Patent No.: US 11,108,482 B2
(45) Date of Patent: Aug. 31, 2021

(54) ENHANCED RADIO SYSTEMS AND METHODS

(71) Applicant: 3D RADIO LLC, Boulder, CO (US)

(72) Inventors: Michael D. Ellis, Boulder, CO (US);
Caron S. Schwartz, Boulder, CO (US)

(73) Assignee: 3D RADIO, LLC, Boulder, CO (US)

( * ) Notice: Subject to any disclaimer, the term of this patent is extended or adjusted under 35 U.S.C. 154(b) by 0 days.

(21) Appl. No.: 14/744,808

(22) Filed: Jun. 19, 2015

(65) Prior Publication Data

US 2015/0288472 A1    Oct. 8, 2015

Related U.S. Application Data

(63) Continuation of application No. 14/599,018, filed on Jan. 16, 2015, which is a continuation of application
(Continued)

(51) Int. Cl.
*H04H 60/46*    (2008.01)
*H04H 60/16*    (2008.01)
(Continued)

(52) U.S. Cl.
CPC .............. *H04H 60/46* (2013.01); *H04B 1/20* (2013.01); *H04H 40/18* (2013.01); *H04H 60/16* (2013.01);
(Continued)

(58) Field of Classification Search
CPC ........ H04H 60/46; H04H 60/37; H04H 60/82; H04H 40/18; H04H 60/16; H04H 60/27;
(Continued)

(56) References Cited

U.S. PATENT DOCUMENTS 2,097,901 A    11/1937   Thomas ..................... 455/172.1
4,031,334 A    6/1977    Kimura et al. .................. 369/7
(Continued)

FOREIGN PATENT DOCUMENTS

GB          2 313 216 A     11/1997
WO       WO 99/45700 A1     9/1999
(Continued)

OTHER PUBLICATIONS

Louderback, "Improve Your Commute with Audio on Demand," ZDTV, 'Online! (Nov. 10, 1999) (available at: http://www.zdnet.com/anchordesk/story/story_4066.html).
(Continued)

*Primary Examiner* — Ankur Jain
(74) *Attorney, Agent, or Firm* — Fox Rothschild LLP

(57) ABSTRACT

An enhanced radio system is disclosed that provides for the capture and playback of one or more radio stations. A user may tune to a station, scan through stations, rewind through missed content (even while the system is off), and fast-forward through undesired content, while downloading and uploading audio content, and sending content to another user. A user may rate content, and be notified when that content is played on any station, with undesirable content skipped and desirable content saved, or station recommendations made. Support for multiple sets of configuration information to allow use by multiple listeners and in multiple locations may be provided. Optionally provided are security features to prevent the unauthorized downloading, uploading, and saving of copies of content, other radio related and content related information, a karaoke mode, integration with a telephone with the radio, or reporting usage information to a collection facility.

34 Claims, 76 Drawing Sheets

Related U.S. Application Data

No. 12/033,616, filed on Feb. 19, 2008, now Pat. No. 8,965,313, which is a continuation of application No. 10/869,415, filed on Jun. 15, 2004, now Pat. No. 7,343,141, which is a continuation-in-part of application No. 10/645,928, filed on Aug. 20, 2003, now Pat. No. 7,171,174, which is a continuation of application No. PCT/US02/05039, filed on Feb. 20, 2002, application No. 14/744,808, which is a continuation of application No. 14/242,799, filed on Apr. 1, 2014, now Pat. No. 9,197,269, which is a continuation of application No. 12/348,765, filed on Jan. 5, 2009, now Pat. No. 8,706,023.

(60) Provisional application No. 60/270,463, filed on Feb. 20, 2001, provisional application No. 61/019,094, filed on Jan. 4, 2008.

(51) Int. Cl.

| | | |
|---|---|---|
| *H04B 1/20* | (2006.01) | |
| *H04H 60/27* | (2008.01) | |
| *H04H 60/33* | (2008.01) | |
| *H04M 1/60* | (2006.01) | |
| *H04H 60/37* | (2008.01) | |
| *H04M 1/72403* | (2021.01) | |
| *H04M 1/72442* | (2021.01) | |
| *H04H 60/80* | (2008.01) | |
| *H04H 40/18* | (2008.01) | |
| *H04H 60/82* | (2008.01) | |
| *H04H 60/72* | (2008.01) | |
| *H04H 60/51* | (2008.01) | |
| *H04H 60/63* | (2008.01) | |
| *H04H 20/34* | (2008.01) | |
| *H04H 60/43* | (2008.01) | |
| *H04H 60/58* | (2008.01) | |
| *H04H 60/74* | (2008.01) | |
| *H04H 60/85* | (2008.01) | |
| *H04H 60/91* | (2008.01) | |
| *H04H 60/17* | (2008.01) | |
| *H04H 60/65* | (2008.01) | |
| *H04H 60/40* | (2008.01) | |
| *H04H 60/47* | (2008.01) | |

(52) U.S. Cl.
CPC .......... *H04H 60/27* (2013.01); *H04H 60/33* (2013.01); *H04H 60/37* (2013.01); *H04H 60/80* (2013.01); *H04H 60/82* (2013.01); *H04M 1/6083* (2013.01); *H04M 1/72403* (2021.01); *H04M 1/72442* (2021.01); *H04H 20/34* (2013.01); *H04H 60/17* (2013.01); *H04H 60/40* (2013.01); *H04H 60/43* (2013.01); *H04H 60/47* (2013.01); *H04H 60/51* (2013.01); *H04H 60/58* (2013.01); *H04H 60/63* (2013.01); *H04H 60/65* (2013.01); *H04H 60/72* (2013.01); *H04H 60/74* (2013.01); *H04H 60/85* (2013.01); *H04H 60/91* (2013.01); *H04H 2201/40* (2013.01); *H04M 2250/74* (2013.01)

(58) Field of Classification Search
CPC ........ H04H 60/33; H04H 60/80; H04H 60/72; H04H 60/51; H04H 60/63; H04H 20/34; H04H 60/43; H04H 60/58; H04H 60/74; H04H 60/85; H04H 60/91; H04H 60/17; H04H 60/65; H04H 60/40; H04H 60/47; H04H 2201/40; H04M 1/72403; H04M 1/72442; H04M 1/6083; H04M 2250/74; H04B 1/20
USPC ........................................................ 455/2.01
See application file for complete search history.

(56) References Cited

U.S. PATENT DOCUMENTS

| | | | |
|---|---|---|---|
| 4,109,115 A | 8/1978 | Yamamoto | 369/7 |
| 4,268,724 A | 5/1981 | Hubbard | 369/7 |
| 4,591,661 A | 5/1986 | Benedetto et al. | 455/556.1 |
| 4,677,466 A | 6/1987 | Lert, Jr. et al. | 725/22 |
| 4,682,370 A | 7/1987 | Matthews | 455/166 |
| 4,787,063 A | 11/1988 | Muguet | 386/299 |
| 4,953,212 A | 8/1990 | Otsubo | 381/1 |
| 5,119,507 A | 6/1992 | Mankovitz | 455/154.1 |
| 5,187,589 A | 2/1993 | Kono et al. | 386/83 |
| 5,214,792 A | 5/1993 | Alwadish | 455/45 |
| 5,239,540 A | 8/1993 | Rovira et al. | 370/345 |
| 5,243,640 A | 9/1993 | Hadley et al. | 455/426.1 |
| 5,253,066 A | 10/1993 | Vogel | 725/28 |
| 5,345,430 A | 9/1994 | Moe | 369/7 |
| 5,371,551 A | 12/1994 | Logan et al. | 348/571 |
| 5,404,588 A | 4/1995 | Henze | 455/186.1 |
| 5,406,558 A | 4/1995 | Rovira et al. | 370/326 |
| 5,448,534 A | 9/1995 | Okada | 369/7 |
| 5,457,815 A | 10/1995 | Morewitz, II | 455/161.1 |
| 5,463,599 A | 10/1995 | Yifrach et al. | 369/7 |
| 5,513,385 A | 4/1996 | Tanaka | 455/228 |
| 5,612,729 A | 3/1997 | Ellis et al. | 725/22 |
| 5,671,195 A | 9/1997 | Lee | 269/7 |
| 5,742,893 A | 4/1998 | Frank | 455/66.1 |
| 5,774,798 A | 6/1998 | Gaskill | 455/186.1 |
| 5,778,137 A | 7/1998 | Nielsen et al. | 386/68 |
| 5,818,441 A | 10/1998 | Throckmorton et al. | 715/717 |
| 5,867,794 A | 2/1999 | Hayes et al. | 455/557 |
| 5,914,941 A | 6/1999 | Janky | 370/313 |
| 5,978,689 A | 11/1999 | Tuoriniemi et al. | 455/569.1 |
| 5,986,650 A | 11/1999 | Ellis et al. | 725/40 |
| 6,074,553 A | 6/2000 | Haski | 210/167.2 |
| 6,088,455 A | 7/2000 | Logan et al. | 380/200 |
| 6,134,426 A | 10/2000 | Volkel | 455/161.3 |
| 6,169,843 B1 | 1/2001 | Lenihan et al. | 386/46 |
| 6,209,787 B1 | 4/2001 | Iida | 235/381 |
| 6,212,359 B1 | 4/2001 | Knox | 725/135 |
| 6,233,389 B1 | 5/2001 | Barton et al. | 386/46 |
| 6,236,674 B1 | 5/2001 | Morelli et al. | 375/219 |
| 6,259,441 B1 | 7/2001 | Ahmad et al. | 345/720 |
| 6,275,268 B1 | 8/2001 | Ellis et al. | 348/564 |
| 6,282,464 B1 | 8/2001 | Obradovich | |
| 6,327,418 B1 | 12/2001 | Barton | 386/46 |
| 6,337,719 B1 | 1/2002 | Cuccia | 348/731 |
| 6,356,704 B1 | 3/2002 | Callway et al. | 386/94 |
| 6,400,996 B1 | 6/2002 | Hoffberg et al. | 700/83 |
| 6,407,750 B1 | 6/2002 | Gioscia et al. | 715/716 |
| 6,421,453 B1 | 7/2002 | Kanevsky et al. | 382/115 |
| 6,438,523 B1 | 8/2002 | Oberteuffer et al. | |
| 6,452,960 B1 | 9/2002 | Sato | 375/140 |
| 6,507,727 B1 | 1/2003 | Henrick | 455/3.06 |
| 6,564,003 B2 | 5/2003 | Marko et al. | 386/69 |
| 6,588,015 B1 | 7/2003 | Eyer et al. | 725/89 |
| 6,607,136 B1 | 8/2003 | Atsmon et al. | 235/492 |
| 6,630,963 B1 | 10/2003 | Billmaier | 348/515 |
| 6,658,247 B1 | 12/2003 | Saito | 455/412.1 |
| 6,710,815 B1 | 3/2004 | Billmaier et al. | 348/515 |
| 6,721,236 B1 | 4/2004 | Eschke et al. | 369/6 |
| 6,725,002 B2 | 4/2004 | Sakurai et al. | 399/111 |
| 6,725,022 B1 | 4/2004 | Clayton et al. | 455/154.1 |
| 6,769,028 B1 | 7/2004 | Sass et al. | 709/231 |
| 6,785,656 B2 | 8/2004 | Patsiokas et al. | 704/500 |
| 6,792,296 B1 | 9/2004 | Van Bosch | 455/569.2 |
| 6,829,475 B1 | 12/2004 | Lee et al. | 455/419 |
| 6,850,252 B1 | 2/2005 | Hoffberg | 715/9 |
| 6,895,165 B2 | 5/2005 | Boys | 386/241 |

(56) References Cited

U.S. PATENT DOCUMENTS

| | | | |
|---|---|---|---|
| 6,931,451 B1* | 8/2005 | Logan | G10H 1/0033 348/E7.075 |
| 6,944,430 B2 | 9/2005 | Berstis | 455/186.1 |
| 6,952,576 B2 | 10/2005 | Fish et al. | 455/414.1 |
| 6,961,585 B2 | 11/2005 | Minematsu | 455/556.1 |
| 6,990,312 B1 | 1/2006 | Gioscia et al. | 455/3.06 |
| 7,028,323 B2 | 4/2006 | Franken et al. | 725/9 |
| 7,058,376 B2 | 6/2006 | Logan et al. | 455/186.1 |
| 7,065,342 B1 | 6/2006 | Rolf | 455/412.1 |
| 7,095,688 B2 | 8/2006 | Kondo et al. | 369/47.33 |
| 7,107,063 B1 | 9/2006 | Bates et al. | 455/456.1 |
| 7,158,871 B1 | 1/2007 | Ilan et al. | |
| 7,171,174 B2 | 1/2007 | Ellis et al. | 455/132 |
| 7,177,608 B2 | 2/2007 | Herz et al. | 455/185.1 |
| 7,213,075 B2 | 5/2007 | Feig | 709/231 |
| 7,231,198 B2 | 6/2007 | Loughran | 455/343.2 |
| 7,277,562 B2 | 10/2007 | Zyzdryn | 382/124 |
| 7,295,904 B2 | 11/2007 | Kanevsky et al. | 701/36 |
| 7,313,375 B2 | 12/2007 | Lee et al. | 455/186.1 |
| 7,327,859 B1 | 2/2008 | Chau | 382/116 |
| 7,343,141 B2 | 3/2008 | Ellis et al. | 455/132 |
| 7,418,277 B2 | 8/2008 | Tsai | 455/569.2 |
| 7,474,773 B2 | 1/2009 | Chau | 382/124 |
| 7,627,560 B2 | 12/2009 | Watanabe et al. | |
| 7,668,576 B2 | 2/2010 | Ellenbogen et al. | 455/575.1 |
| 7,742,458 B2 | 6/2010 | Sharma et al. | 370/347 |
| 7,937,119 B2 | 5/2011 | Arai | 455/574 |
| 8,165,644 B2 | 4/2012 | Syed | 455/474 |
| 8,411,606 B2 | 4/2013 | Chen et al. | 370/311 |
| 8,700,262 B2 | 4/2014 | Boissonnier et al. | |
| 8,706,023 B2 | 4/2014 | Ellis | 455/3.01 |
| 8,706,169 B2 | 4/2014 | Cortright | 455/186.1 |
| 2001/0047379 A1 | 11/2001 | Jun et al. | 709/1 |
| 2002/0004543 A1 | 4/2002 | Tagawa et al. | 455/412 |
| 2002/0049037 A1 | 4/2002 | Christensen et al. | 455/3.06 |
| 2002/0057380 A1 | 5/2002 | Matey | 348/731 |
| 2002/0111703 A1 | 8/2002 | Cole | 700/94 |
| 2002/0174430 A1 | 11/2002 | Ellis et al. | 725/46 |
| 2002/0186957 A1 | 12/2002 | Yuen | 386/46 |
| 2003/0013425 A1 | 1/2003 | Nee | 455/186.1 |
| 2003/0095791 A1 | 5/2003 | Barton et al. | 386/83 |
| 2003/0163823 A1 | 8/2003 | Logan et al. | 725/89 |
| 2003/0208771 A1 | 11/2003 | Hensgen et al. | 725/100 |
| 2004/0029541 A1 | 2/2004 | Baranowski et al. | 455/130 |
| 2004/0128692 A1 | 7/2004 | Wolfe et al. | 725/89 |
| 2004/0158748 A1 | 8/2004 | Ishibashi et al. | 713/300 |
| 2004/0198282 A1 | 10/2004 | Heiderscheit et al. | 455/186.1 |
| 2005/0005298 A1 | 1/2005 | Tranchina | 725/81 |
| 2005/0014495 A1 | 1/2005 | Shanahan | 455/419 |
| 2005/0020223 A1 | 1/2005 | Ellis et al. | 455/186.1 |
| 2005/0049750 A1 | 3/2005 | Parker et al. | 700/258 |
| 2005/0064835 A1 | 3/2005 | Gusler et al. | 455/245.1 |
| 2005/0078562 A1 | 4/2005 | Morimoto et al. | |
| 2005/0085217 A1 | 4/2005 | Lim | 455/410 |
| 2005/0229213 A1 | 10/2005 | Ellis et al. | 725/58 |
| 2006/0008243 A1 | 1/2006 | Przybylek | 386/215 |
| 2006/0026637 A1 | 2/2006 | Gatto et al. | 725/37 |
| 2006/0047386 A1 | 3/2006 | Kanevsky et al. | |
| 2006/0082690 A1 | 4/2006 | Englert | 348/731 |
| 2006/0083253 A1 | 4/2006 | Park et al. | 370/401 |
| 2006/0085115 A1 | 4/2006 | Ilan et al. | 701/49 |
| 2006/0132382 A1 | 6/2006 | Jannard | |
| 2006/0149971 A1 | 7/2006 | Kozlay | 713/186 |
| 2007/0052686 A1 | 3/2007 | Nomura | |
| 2007/0064157 A1 | 3/2007 | Kasamatsu | 348/730 |
| 2007/0082716 A1 | 4/2007 | Behzad et al. | |
| 2007/0130280 A1 | 6/2007 | Park et al. | 709/208 |
| 2007/0273658 A1 | 11/2007 | Yli-Nokari et al. | |
| 2008/0027586 A1 | 1/2008 | Hern et al. | 700/284 |
| 2008/0045170 A1 | 2/2008 | Howley et al. | 455/186.1 |
| 2008/0111710 A1 | 5/2008 | Boillot | |
| 2008/0155616 A1* | 6/2008 | Logan | G06F 17/30053 725/93 |
| 2008/0165758 A1 | 7/2008 | Kato et al. | 370/347 |
| 2008/0192994 A1 | 8/2008 | Chau | 382/124 |
| 2008/0204604 A1 | 8/2008 | Campbell | 348/731 |
| 2008/0320523 A1 | 12/2008 | Morris et al. | 725/47 |
| 2009/0174822 A1 | 7/2009 | Pugel | 348/731 |
| 2009/0313660 A1 | 12/2009 | Ni et al. | 725/78 |
| 2010/0120366 A1 | 5/2010 | DeBiasio et al. | 455/41.3 |
| 2012/0237092 A1 | 9/2012 | Bechtel | 382/126 |
| 2013/0053007 A1 | 2/2013 | Cosman et al. | 455/414.3 |
| 2013/0242706 A1 | 9/2013 | Newsome, Jr. | |

FOREIGN PATENT DOCUMENTS

| | | |
|---|---|---|
| WO | WO 99/45701 A1 | 9/1999 |
| WO | WO 99/66725 A1 | 12/1999 |
| WO | WO 00/13415 A2 | 3/2000 |
| WO | WO 00/13416 A1 | 3/2000 |
| WO | WO 00/16548 A1 | 3/2000 |
| WO | WO 00/45511 A1 | 8/2000 |
| WO | WO 01/76248 A2 | 10/2001 |

OTHER PUBLICATIONS

International Search Report, Appl. No. PCT/US02/05039, dated Feb. 4, 2003.

"Federal Standard 1037C Telecommunications: Glossary of Telecommunication Terms," http://www.its.bldrdoc.gov/fs-1037, pp. 1-8, Aug. 7, 1996.

\* cited by examiner

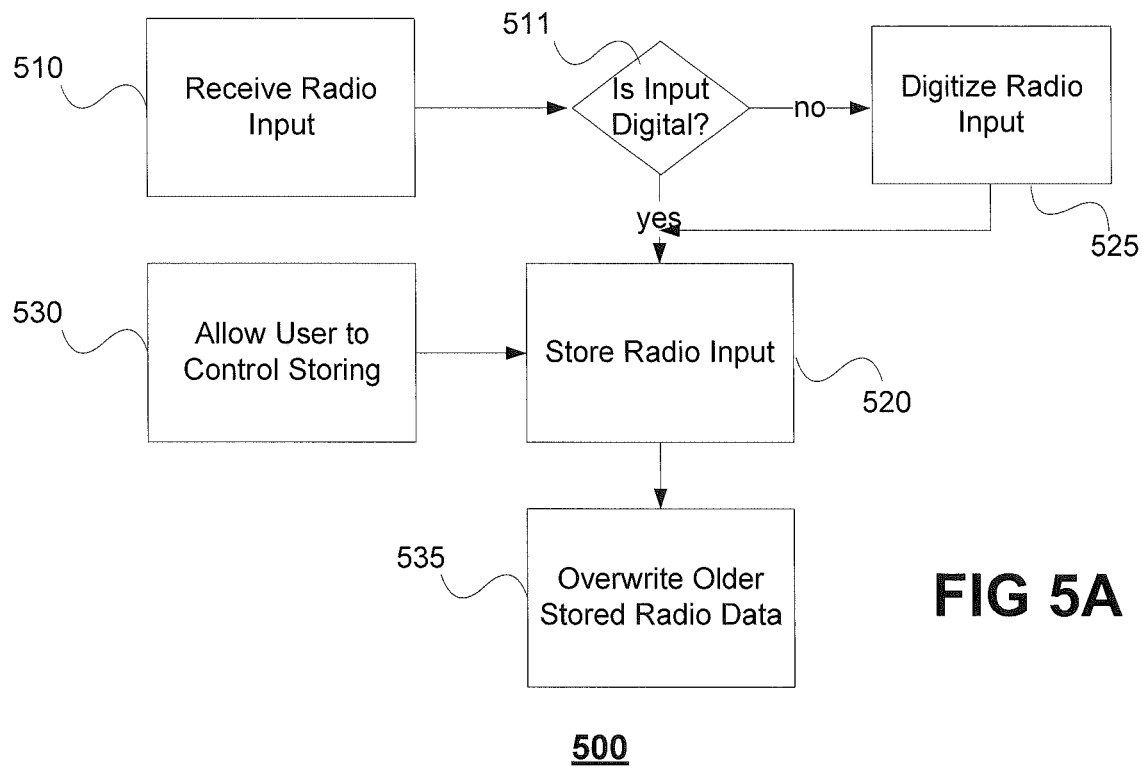

650

690

1200

1410

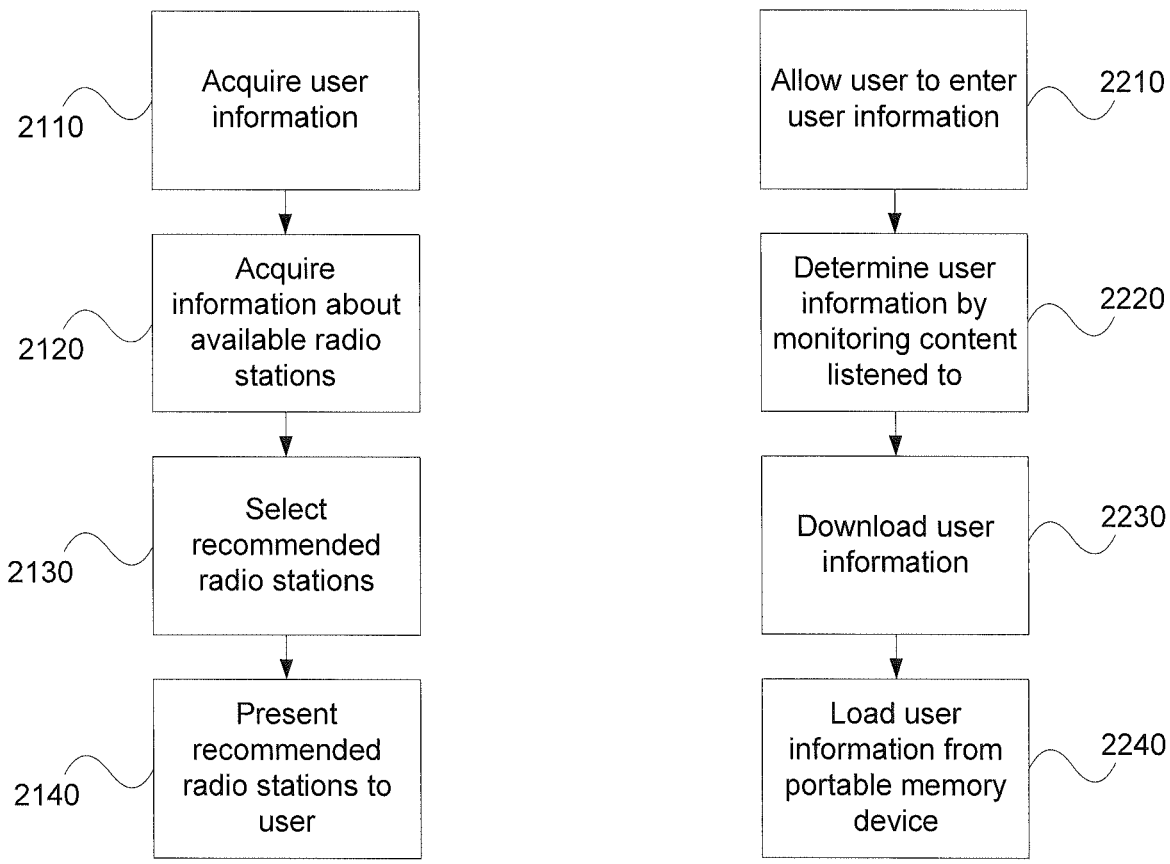

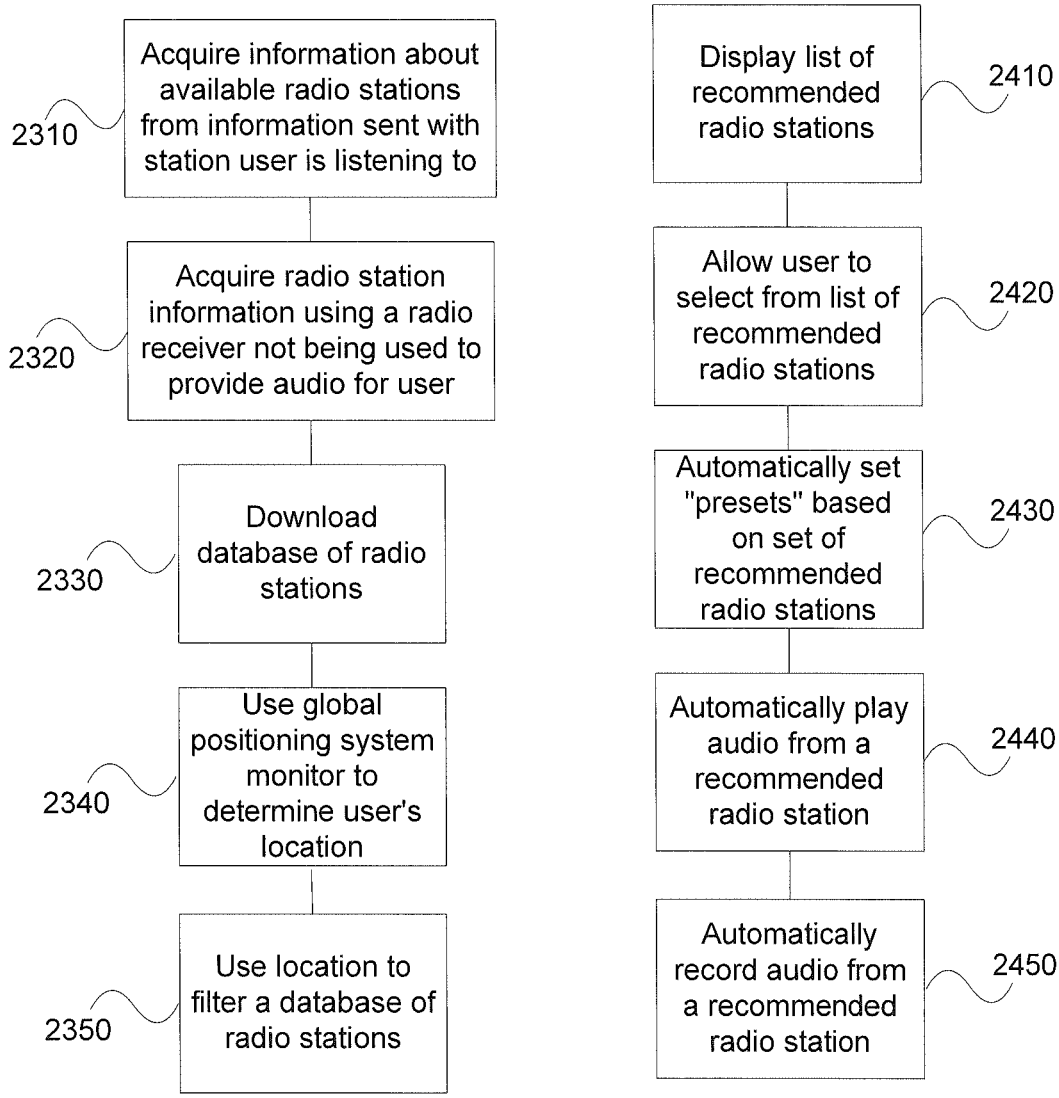

User Information:
Liked music formats ~ 2510
Disliked music formats ~ 2520
Liked talk formats ~ 2530
Disliked talk formats ~ 2540
Liked Artists ~ 2550
Disliked artists ~ 2560
Preferences based on day/time ~ 2570

Radio Station Information:
Call letters ~ 2610
Format ~ 2620
Artists ~ 2630
Schedule ~ 2640
Broadcast region ~ 2650
Broadcast frequency ~ 2660
Telephone number ~ 2670

Select one of the following suggested stations:

| Listen | | | View Schedule | Play List |
|---|---|---|---|---|
| ○ | 88.5 FM | KGNU Local Public Radio | ○ | ○ |
| ○ | 91.5 FM | KVOD Classical Public Radio | ○ | ○ |
| ○ | 97.3 FM | KBCO Varied Rock | ○ | ○ |
| ○ | 103.7 FM | KFOX Classic Rock | ○ | ○ |
| ○ | 1340 AM | KCFR All Talk Public Radio | ○ | ○ |

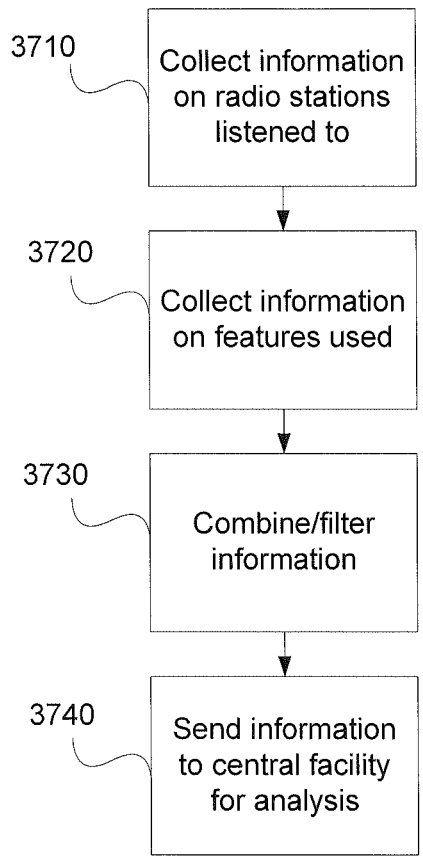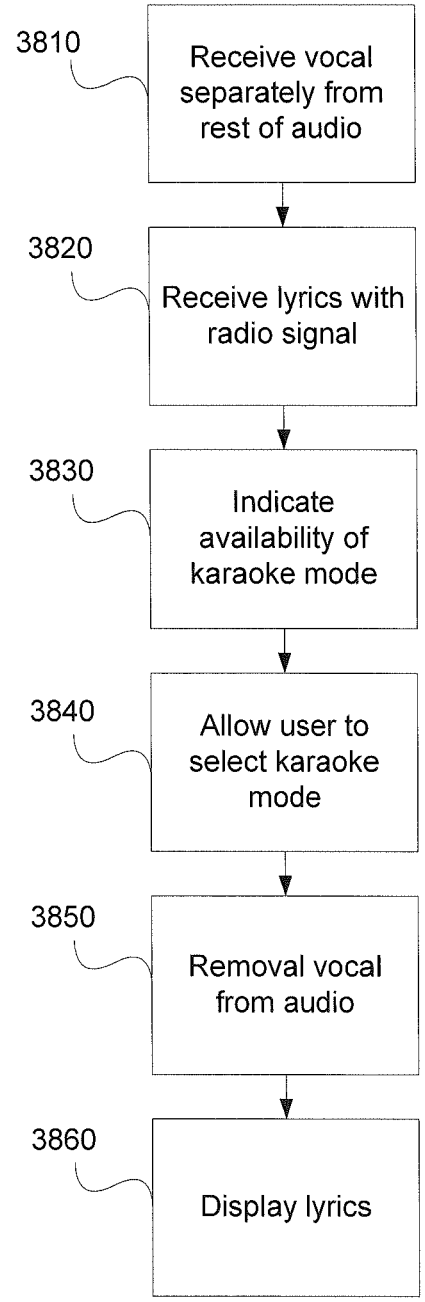
FIG 37  FIG 38

| | |
|---|---|
| Favorite Station Number | 4505 |
| Current Station Flag | 4510 |
| Previous Station Flag | 4515 |
| Tuner Number * | 4520 |
| Tuner Setup (e.g., band and frequency) | 4525 |
| Pointer to First Block of Compressed Audio Data | 4530 |
| Pointer to Last Block of Compressed Audio Data | 4535 |
| Time of First Block of Compressed Audio Data | 4540 |
| Playback Position | 4545 |
| Last Playback Time | 4550 |
| User Priority * | 4555 |
| Minimum Record Time * | 4560 |
| Pointer to Related Data | 4565 |
| Identifying Information | 4570 |
| Data Format Information | 4575 |
| Signature Pointer | 4580 |
| Cue Pointer * | 4585 |

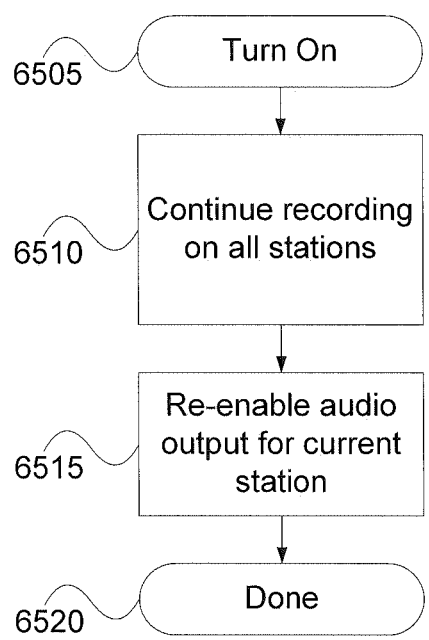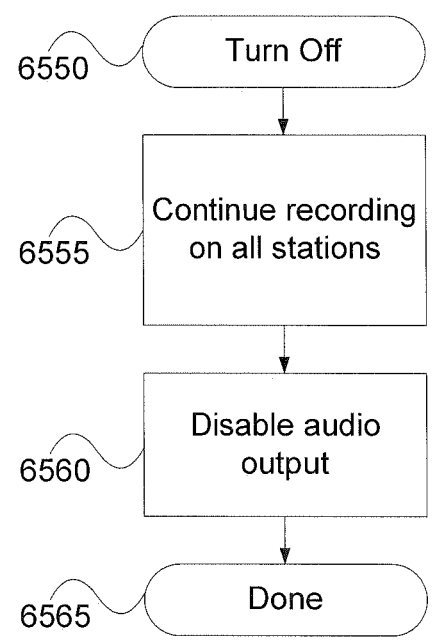
FIG. 65A
FIG. 65B

ENHANCED RADIO SYSTEMS AND METHODS

CROSS REFERENCE TO RELATED APPLICATION

This application is a continuation of U.S. application Ser. No. 14/599,018 filed Jan. 16, 2015, which is a continuation of U.S. application Ser. No. 12/033,616 filed Feb. 19, 2008, U.S. Pat. No. 8,965,313, which is a continuation of U.S. application Ser. No. 10/869,415, filed Jun. 15, 2004, U.S. Pat. No. 7,343,141, which is a continuation-in-part of U.S. application Ser. No. 10/645,928 filed Aug. 20, 2003, U.S. Pat. No. 7,171,174, which is a continuation application of International Application No. PCT/US02/05039, filed Feb. 20, 2002, which claims the benefit of U.S. Provisional Application No. 60/270,463, filed Feb. 20, 2001. This application is also a continuation of U.S. application Ser. No. 14/242,799 filed Apr. 1, 2014, which is a continuation of U.S. application Ser. No. 12/348,765 filed Jan. 5, 2009, U.S. Pat. No. 8,706,023, which claims the benefit of U.S. Provisional Application No. 61/019,094 filed Jan. 4, 2008. Each of the listed applications are hereby incorporated by reference herein in their entirety.

FIELD OF INVENTION

This invention relates to radio systems and methods. In particular this invention relates to enhanced radio reception and processing features, utilizing multiple radio receivers, digital storage of radio content, independent control of radio reception and playback, listener profiles, and two-way communication features.

BACKGROUND OF THE INVENTION

Radio is a very popular entertainment source today. It is used in many locations—in the home, in the automobile, at the office, and on the go. Sources available today include broadcast (AM and FM), Internet, and satellite. However, radio functions have been fairly constant for years.

New technologies have become available in recent years. These include less expensive tuners, less expensive memory, and better quality analog to digital conversion. These technologies make possible an enhanced radio system.

Some improvements have been made in television systems recently. Personal video recorders, such as those manufactured by TiVo, allow a user to easily record a television program, and also provide VCR-like controls for television programs. For example, see U.S. Pat. No. 6,259,441 (2001) to Ahmad et al., "Display pause with elastic playback," U.S. Pat. No. 6,327,418 (2001) to Barton, "Method and apparatus implementing random access and time-based functions on a continuous stream of formatted digital data," and U.S. Pat. No. 6,233,389 (2001) to Barton et al., "Multimedia time warping system". However, these types of improvements have been optimized for the needs of the television viewer. For instance, this prior art focuses on improving the viewing of specific television programs.

Radio listeners typically have different needs than television viewers. For example, television viewing typically happens in a fixed environment in a home, while radio listening often happens in varied, often mobile, environments. People may listen to the radio in a shower. People often listen to radio in a car, or carry a radio on their person as they pursue other activities. A television viewer may sit and watch a program through its completion. A radio listener more often listens casually while pursuing other activities, and may often switch between stations based on hearing a short duration item, such as a song, commercial, or traffic/weather report. Program schedules are quite important to television viewers, but are rarely used by radio listeners.

A system is needed that allows a radio listener to better control the audio content she hears. For example, a listener may need a way to easily back up and hear something again. This might include, for example, repeating a piece of information from a weather report or a traffic report, a phone number or other item in an advertisement, a favorite song, or information about a radio contest.

A radio listener may also need a way to pause the radio content while doing something else. For example, a listener in a car may wish to pause a song while concentrating on traffic or talking to someone else in the car. After resuming the song, the listener may listen to the remainder of the song and then may subsequently wish to fast-forward through commercials to catch up to the real-time broadcast.

A radio listener may also need a way to record in-progress radio content to listen to in the future. For example, a listener in a car may be listening to an interview but may need to exit the vehicle before the interview ends. U.S. Pat. No. 5,345,430 (1994) to Moe, "Recovery recorder system, particularly commercial radio/TV broadcast recovery recorder system," discloses continuously recording the last few minutes of a program being monitored to a short-term memory, and transferring it, on operator command, to a long-term storage media. U.S. Pat. No. 5,448,534 (1995) to Okada, "Radio with recording and reproducing function," discloses detecting a desired program and starting a recording device to record the program. However, this prior art requires a user to select a specific radio station or program to record.

Because digitized audio content requires much less memory than digitized video content, it is less expensive to store a significant amount of radio content. A radio tuner is also less costly than a television tuner, so a system that monitors multiple radio stations at once is quite feasible. Because a radio listener is quite likely to be interested in the programming on multiple radio stations at the same time, a system with multiple tuners and significant but inexpensive memory is also quite useful.

For example, a system is needed that would allow a user to switch between multiple favorite radio stations and rewind to the start of an interesting piece of content that may have been missed, such as a favorite song or a traffic report. Because detailed radio content schedules are not typically published in advance, it would also be useful to have a system that allows a user to identify items of interest, that informs the user when an item of interest is being broadcast on another station, and that allows the user to switch to that station and rewind back to the start of the item. It would also be desirable to have a system that allows a user to identify desirable content and automatically save a copy of that content as it is broadcast. A system is also needed that provides different sets of these preferences for different radio listeners, in a single radio.

Because a user often turns a radio on (or switches to the radio from another source such as a CD player) during undesirable content such as a commercial break, or after the start of desired content such as a favorite song, the user needs a system that allows listening to radio content that was broadcast before the radio was turned on.

Since radio listeners frequently sing along with favorite tunes in locations such as the shower and the car, a user may wish to sing along with a radio in a karaoke mode.

A system is also needed to recommend a set of radio stations to a user. This would be particularly useful for traveling users, or users new to an area. Such a system might allow a radio listener in a rental car or hotel to automatically search a database of radio stations and find one or more that matches his tastes. A driver on a long trip may need a system that automatically monitors available radio stations and compares the content with his likes. A user of a radio in a car also needs a system that provides different sets of favorite stations and other preferences when traveling in different locations.

Traveling listeners may also need a system to inform them of venues and events in an unfamiliar local area. For example, a listener may be interested in finding out about concerts, celebrity appearances, radio station events, concert venues, music stores, and the like.

Radio listeners often listen in multiple environments—in different rooms of the house, in the car, in the office, and using a portable system. These listeners need a system that allows them to use the advanced radio features in all of these environments. They need a way to transfer information, such as radio presets, favorite songs, and favorite artists, from one environment to another. They need a way to update the functionality of the radio without having to purchase a new system. They need a system that allows downloading of favorite songs into a radio.

Radio listeners also need an Internet environment to coordinate their enhanced radio listening activities. These activities might include finding out about music, shopping for music related products, and finding out about radio stations. They may also need a system that allows them to manage the information used in an enhanced radio system, such as favorite stations, artists, and songs.

A radio listener may also need a way to more easily respond to radio content. For example, a listener may wish to respond to an ad, enter a radio contest, call in to a radio talk show, or make a song request. The user may need a system that allows a telephone to be used with the radio system.

A radio listener also needs a way to more easily communicate with other radio listeners. A listener may wish to send information heard on the radio to another person. This information may include an invitation to or information about a concert or other event, a link to a radio station or radio show, a song heard on the radio, or other radio-related information.

In addition to radio listeners, radio service providers may also benefit from this invention. Radio service providers need a system that allows them to monitor the habits of their listeners' demographic profile such as which commercials they repeat, which artists they favor, etc., as well as what enhanced radio features their users may access.

SUMMARY

These and other advantages are provided by this enhanced radio system (ERS). A main aspect of this invention is simultaneously storing the content from multiple radio receivers. Another aspect of this invention is allowing the multiple receivers to be tuned to radio stations based on stations chosen as favorites by the listener, based on recently played stations, and based on scanning for new stations. Another aspect of this invention is allowing a listener to quickly select output from the stored content of any of the receivers. A further aspect is allowing a listener to pause, resume, or skip backwards or forwards in time within any of the stored content, including allowing a listener to hear radio content broadcast prior to switching to a station. Another aspect of this invention is allowing a listener to record radio content, or download other audio content, and quickly access it later. Yet another aspect of this invention relates to providing a karaoke feature, with the removal of vocal tracks and the display of lyrics for broadcast songs.

Other aspects of this invention relate to the collection and use of user preferences. A listener may be allowed to rate specific content or groups of content. The system may recognize and notify the listener of preferred content when it is broadcast on a station that the listener is not currently listening to. The system may recognize and automatically skip over disliked content when it is played on a station the user is listening to. The system may recommend radio stations to a listener. The system may recommend local events and facilities to a listener.

Still further aspects of this invention relate to communications. This invention may interact with a mobile or stationary telephone, using the radio's sound system, and may automatically pause or mute the radio during calls. This invention may allow a listener to send and receive messages with another listener, including recorded radio content. This invention may allow a listener to easily respond to radio content, such as contests, requests, call-in shows, pledge drives, etc. A listener may purchase CDs, concert tickets, and other products and services. This invention may include an Internet website, with additional radio features. And this invention may provide monitoring of listener usage and habits to provide a ratings service.

Other aspects of this invention relate to portability and configurability. This ERS may be used at home, at the office, in the shower, on the go, in the car, on the boat, or in any other environment. It may be used in multiple environments. And user preferences and profiles may follow the listener in any of these environments, from radio to radio.

This system may tune in one or more radio sources, such as broadcast radio, satellite radio, Internet radio, short-wave radio, and radio scanner. The system may employ multiple receivers (e.g., antennas, tuners, etc.), so that the system can monitor multiple radio stations at the same time. If any of the input signals is analog, it is digitized and compressed, and then the digital radio signal is stored in memory.

This invention also includes a controller, such as a microprocessor with program memory, to control the functions of the receivers, digitizers, and other parts of the system. A user may control the functions of the controller using an input device such as a remote control, a voice control, a front panel control, etc. There may also be a display to provide visual feedback to the user.

Digital audio signals are retrieved from the memory on command from the user, decompressed, converted to analog signals, and sent to an output device, which may include an amplifier, speakers, and the like.

This ERS may be operated in a home or office, in a shower, in a car, truck or boat, or as a portable system carried or worn by the user. The system may also be configurable so that it may operate in multiple environments by, for example, allowing the user to use different input controls and different audio output devices.

This invention may provide a number of features beyond what are provided by standard radios today. For example, the system may allow the user to stop, rewind, fast-forward, and resume playing the radio, while continuing to record the radio input. For example, the user may rewind to replay a segment of interest, and then fast-forward to continue playing the broadcast audio.

The system may allow the user to skip-back or forward a preset interval, such as 30 seconds. This may allow, for example, the user to skip over commercials in recorded audio.

The system may provide different speed playing. When playing at reduced or increased speeds, it may provide frequency compensation so that the sound is recognizable. The system may support fast or slow playing in either direction, forward or reverse.

This invention may allow the user to record a portion of the radio input in memory for later playback. Recording may be based on impulse/command, based on a published schedule of radio content, based on a specific time/station, or on other criteria. Recordings may also be stored or transferred to an external analog or digital storage device.

This invention may allow the user to record in-progress content for future listening. For example, a user who is interrupted in the middle of an interview segment may record the rest of the interview to listen to later, and may record the segment of the interview she heard prior to the interruption. The amount of time recorded may be default times before and after the current playback point, e.g., 5 minutes, 10 minutes, etc., or may be determined by the user.

The system may provide preset stations. Stored radio programs may be available as preset stations separate from the stations from which they were recorded.

The system may provide continued and continuous recording of all favorite stations while the radio is turned off, or while the user is listening to another audio source such as a CD player. When the radio is turned on or switched from the alternate source, the user may be allowed to replay content that was broadcast while the radio was not playing, from any of the favorite stations.

While the content from multiple radio stations is being simultaneously stored in memory, the system may employ a priority scheme to automatically determine how much memory to make available for each station, and therefore how far into the past the user may rewind while listening to content from that station. The priority may be based on a number of factors, such as whether the station is currently being played, how long in the past the user most recently listened to the station, a user-assigned priority or minimum storage time, the most recent playback point for the station within its assigned memory, and any number of other suitable factors.

This invention may allow identification of specific pieces of audio content, such as songs and commercials. The system may allow the user to indicate (e.g., by pressing a button or other control) that a piece of content has begun or ended. The system may also recognize the start or end of content based on silence, changes in audio characteristics, or other cues in the audio. For example, the system may measure the frequency and power content of the audio signal, and recognize new content based on changes in harmonic content, rhythmic content, etc.

The system may recognize a piece of content that has previously been identified. The user may be allowed, for example, to name a piece of content, and to identify the type of content (song, commercial, talk, etc.) The system may create a unique signature of the audio signal of a particular piece of content, and use that signature to recognize that content on future occasions. Signatures may be created separately in an external system and downloaded from the external system into an ERS. Also, information sent either in-band with the audio or in a separate channel (e.g., over the Internet) may identify the content currently being broadcast. The system may include a separate receiver to receive the separate information signal.

The system may allow the user to rate a piece of content. For example, the user may be able to specify a like or dislike for a particular song or commercial, or to indicate a level of interest. The user may also to be able to rate a specific musical artist, station, radio show, and other sets of content. The system may be configured to skip over undesirable content. The system may be configured to automatically save a copy of desirable content. The configurations of which content is desired or not desired, and whether to find, skip, or save such content may also be different for different users of the same enhanced radio. An ERS may allow multiple users to create sets of preferences and to save them and restore them.

This invention may include multiple radio inputs. The radio signals from each input may be simultaneously digitized and recorded. For example, the user may be allowed five favorite stations in a system with six tuners. In this way the system may always be recording the favorite stations and the most recently tuned station in addition to whatever station the user is currently listening to. The user may tune to any of the favorite stations at any time, and be able to rewind to content that may have been otherwise missed. For example, the user could tune to a station in the middle of a song and immediately rewind to the beginning of the song, as the audio from the song has previously been digitized and stored to memory. Similarly, the user could rewind to hear a traffic or weather report that was missed, clues and phone number for a radio contest, details in an ad of interest, or any other content of interest. This invention may also provide a scan feature, briefly playing audio from the available radio stations in sequence, allowing the user to stop when something of interest is heard, and allowing the user to skip-back to the start of the item of interest.

The system may provide an alert when content of interest is being played on a different station. For example, when a favorite song or artist is played on a station other than the current station, the system may notify the user, who could tune to that station and rewind to the beginning of the song. The system may provide a single button to tune to the station with the most recent content of interest notification. Alternatively, the system may automatically change to the station with the content of interest, and may automatically rewind to the start of the content. The system may automatically save a copy of the content of interest when it is recognized. For content that the user dislikes, the system may automatically skip over the content or recommend alternative content on another station.

The system may compare information about the user's likes and dislikes with information about radio stations to create recommendations. The user may enter information about her likes and dislikes, or this information may be obtained automatically by monitoring the content she listens to. For example, a recommendation may be provided in any of the following ways: there may be a list of stations that the user may choose from; the system may automatically set one or more presets based on the recommendations; or the system may automatically tune to the recommended stations.

This invention may obtain information about stations in a number of ways. For example, the information may be sent in-band with the radio signal or delivered concurrently but over a separate communications channel. Information may be downloaded into the system from a database of station characteristics using, for example, a wireless Internet connection. Such a database may include, for example, stations, format, geographical reach, program schedules, etc. The system may monitor the content of the prospective station and compare its content with the signatures of the content the user has rated.

Radio recommendations might be especially useful to a traveling user who is not familiar with local stations. For example, these features may be built into a portable ERS. A rental car radio may be equipped with an ERS including these features. A user may insert a smart card or other device into the radio to indicate preferences, and the system may automatically determine the best matching local stations. Such a system may, for example, set the presets, automatically tune, record, or otherwise make the recommended content available to the user. The system may include a global positioning system (GPS) unit to determine the user's current location as an index into a database of radio stations, and then scan the database for stations matching the user's criteria. The system may alternatively scan radio stations using a tuner other than the one the user is currently listening to, and compare the content on each station with signatures indicating the user's preferences. Prior to automatically changing the favorite station presets of the enhanced radio, the system may also allow the user to save the previous settings, so that they may be restored when returning to a familiar area.

The system may provide automatic notification of local concerts, performing artist appearances, signings, radio station events, weather, and other events of interest. This information may be of interest to all types of users, including those users who are traveling in an unfamiliar region. Similarly, the system may provide information about local music venues, stores, and other facilities and businesses.

This invention may include a communications device, such as a radio frequency transceiver, modem, portable memory device, or networking equipment. This device may be used to allow the system to download a user's profile, download radio station data, and synchronize information between a user's different ERSs in different locations. The device may be used to update the software in an ERS, to download songs into an ERS, and to report usage information to a ratings service. The system may, for example, use the user's telephone or mobile phone as a link to access remote data.

The communications device may be used to download audio content into an ERS from another system. This may include individual songs and other items, which may be selected for playback at a later time by the listener. The communications device may also be used as a "virtual tuner." In this mode, the communications device provides a continuous stream of audio data, which is stored by an ERS as if it were another input station. The listener may select this virtual station for output. While it is selected, the listener may perform any supported functions on the audio, such as pause, resume, fast/slow forward, fast/slow reverse, skip back, skip forward, search, etc.

The communications device may be used to upload audio content to another system. This may include the ability to upload individual songs and other content that were recorded within an ERS. It may also include the ability to use the communications device as a real-time output device. Audio data may be streamed to the communications device as it is received and digitized by an ERS. The system to which the streaming audio is sent may have the capability to play back the audio as it is received, or to otherwise process it.

The system may provide security features to prevent unauthorized copying when an item is uploaded, downloaded, or saved locally.

The user may have multiple ERSs, to be used in different environments. All of the user's various ERSs may be synchronized. For example, likes, dislikes, and presets may be exchanged between the systems. Synchronization may be Internet based, for example, by allowing the user to upload data from an ERS to a web site, and to download data from the web site to another ERS.

The user may access an enhanced radio web site using a web browser. The web site may provide features such as a shopping for CDs and other products, concert information and ticket buying, trivia questions, contests, music information databases, etc. The web site may provide a computer desktop radio feature, allowing the user to listen to radio on a personal computer while connected to the Internet. The Internet website may also have advertisements, which may be based on user preferences, either as determined by the web site, or as uploaded from an ERS.

The web site may also include access to radio station databases and schedules, which may be downloaded to an ERS. Data may be loaded into a mobile phone or personal digital assistant, which may be used to load information into an ERS in, for example, a rental car. Data may include such information as station names and frequencies, formats, play lists, signatures, schedules, geographical reach, etc.

A two-way communication feature may be included as part of an ERS and may provide a number of advantages. For example, the user may be able to respond directly to radio advertisements without having to telephone, or the system may auto-dial a mobile telephone to a phone number included in the advertisement. Similarly, the user may respond to contests and call-in shows, and make requests, either directly using the two-way communication feature, or the system may auto-dial the radio station to support these features. The auto-dialed phone number may be hand-entered by the user, part of the radio station database, or included in information sent as part of or separately from the radio signal. In addition, the user may buy CDs, buy concert tickets, participate in live chats, and other features. The user may select these features using a voice command or other types of controls.

The system may also incorporate telephone functions. The system may connect with a mobile telephone or a wired telephone service. The system may provide telephone audio using the enhanced radio's voice input and audio output. The system may automatically pause or mute the radio audio while a call is in progress.

The system may allow one enhanced radio user to send an instant message or other electronic message to another enhanced radio user. The message may, for example, be text, voice, or a combination. The message may include all or part of content from a radio station, such as a song. The message may be otherwise related to radio content, for example including a link allowing the recipient to easily tune to a specific station or show. It may include, for example, a signature of a specific song. The message may be, for example, an invitation to a concert or other event.

The system may also provide a karaoke mode. In this mode, it may remove the vocal component from the audio signal as it is being played. It may also display lyrics of a song as it is being played.

Information may be loaded into an ERS by any number of methods. For example, information may be received (and sent) over a wireless link, such as a wireless telephone or paging link. Information may be received (and sent) over a wired link, such as a USB (universal serial bus) port. Information may be loaded via prerecorded media, such as a compact disk or digital versatile disk. Information may be loaded from a smart card, PC Card, or other portable memory device. Information may be received and sent via a telephone link. Information may be exchanged over the Internet. Information may be entered by hand.

BRIEF DESCRIPTION OF THE DRAWINGS

Further features of this invention, its nature and various advantages will become more apparent upon consideration of the following detailed description, taken in conjunction with the accompanying drawings, in which like reference characters refer to like parts throughout, and in which:

FIG. 5A and FIG. 5B are illustrative flowcharts of one embodiment of the enhanced radio method in accordance with the present invention;

FIG. 21 through FIG. 24 are illustrative flowcharts showing steps related to recommending radio stations in an ERS in accordance with embodiments of the present invention;

FIG. 25 and FIG. 26 are illustrative data structures that may be used in an ERS in accordance with embodiments of the present invention;

FIG. 27 is an illustrative display screen that may be used in the recommending of radio stations in an ERS in accordance with one embodiment of the present invention;

FIG. 37 is an illustrative flowchart showing steps for reporting radio usage data in the ERS in accordance with one embodiment of the present invention;

FIG. 38 is an illustrative flowchart showing steps for providing a karaoke mode in the ERS in accordance with one embodiment of the present invention;

FIG. 45 is a block diagram of an illustrative data structure that may be used to track stations that are monitored in the ERS in accordance with one embodiment of the present invention;

FIG. 65A is an illustrative flowchart showing steps of a turn on process in the ERS in accordance with one embodiment of the present invention;

FIG. 65B is an illustrative flowchart showing steps of a turn off process in the ERS in accordance with one embodiment of the present invention;

DETAILED DESCRIPTION

Figure 42:
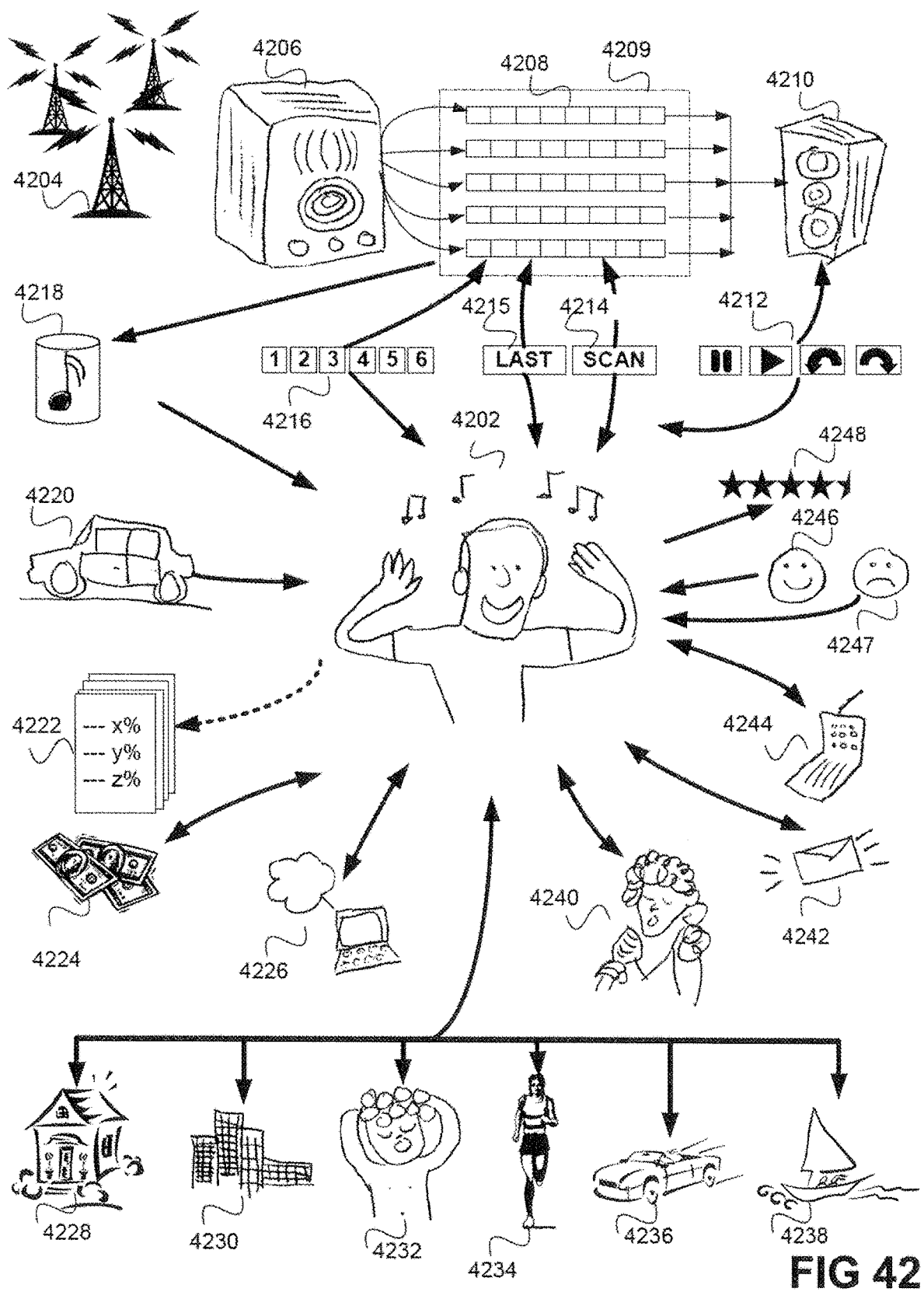
FIG. 42 is an overview of enhanced radio features in accordance with one embodiment the present invention.

The present invention is such an enhanced radio system (ERS). As described above, it can provide many functions not available in radios today. An overview of an embodiment of an ERS in accordance with the present invention is illustratively shown in FIG. 42.

Radio listener 4202 may have access to many new features. Multiple radio stations 4204 from one or more radio sources may be available. Multiple receivers 4206 may simultaneously receive the multiple radio stations 4204, and store them digitally into buffers 4208 in computer digital storage device 4209, storing the most recent several minutes of each. One of the buffers may be used to provide an audio output 4210 for the listener 4202. The listener may choose a subset of the available radio stations 4204 and assign them to presets 4216, and the system will continuously monitor those favorite stations, storing recent content from each into buffers 4206. The system may continuously monitor the most recently listened station or stations 4215, storing recent content from each into buffers 4206. And the system may allow the listener to scan through all available stations, while tuning ahead to each before it is played for the listener, and storing its content into the one of the buffers 4206. The listener may use audio controls 4212 on the audio from any station as it is played. The listener may pause and resume play. The listener may skip back to earlier content, even content that was broadcast prior to when the user started listening to the station. And the listener may skip forward over content that is not of interest.

The listener may record songs 4218 and other content from the radio and replay them later, or download songs from other sources. The listener may rate songs 4248. At a later time, the system may use the listener ratings to act on songs and other content that are broadcast. If a song that the listener likes 4246 is broadcast on a station that the user is not listening to, the system may notify the user or automatically switch to the song, and the listener may hear the song from the beginning. If a song that the listener does not like 4247 is broadcast, the system may automatically skip over it. The system may provide a karaoke mode 4240, allowing the listener to sing along with a song.

The system may interface with a telephone 4244. The telephone 4244 may use the radio's speakers and microphone. The radio broadcast may be automatically muted or paused when a call is in progress. The listener may send messages 4242 to other listeners and receive messages from other listeners, and the messages 4242 may include text, voice, and content recorded from the radio. The listener may respond to radio content, such as contests 4224, commercials, call-in shows, pledge drives, and other radio content. When traveling 4220, the system may recommend radio station, local events, and local facilities. The listener may be able to access features of this invention on the Internet 4226, including setting preferences, and downloading a listener profile.

The ERS may be accessed in any location where the listener wishes to listen to radio. This may include at home 4228, at the office 4230, in the shower 4232, on the go 4234, in the car 4236, or in the boat 4238. Listener preferences and profiles may follow the listener wherever he goes. Listener actions may be reported to a radio rating service 4222, to collect information on what radio content and features are most popular.

Figure 1:
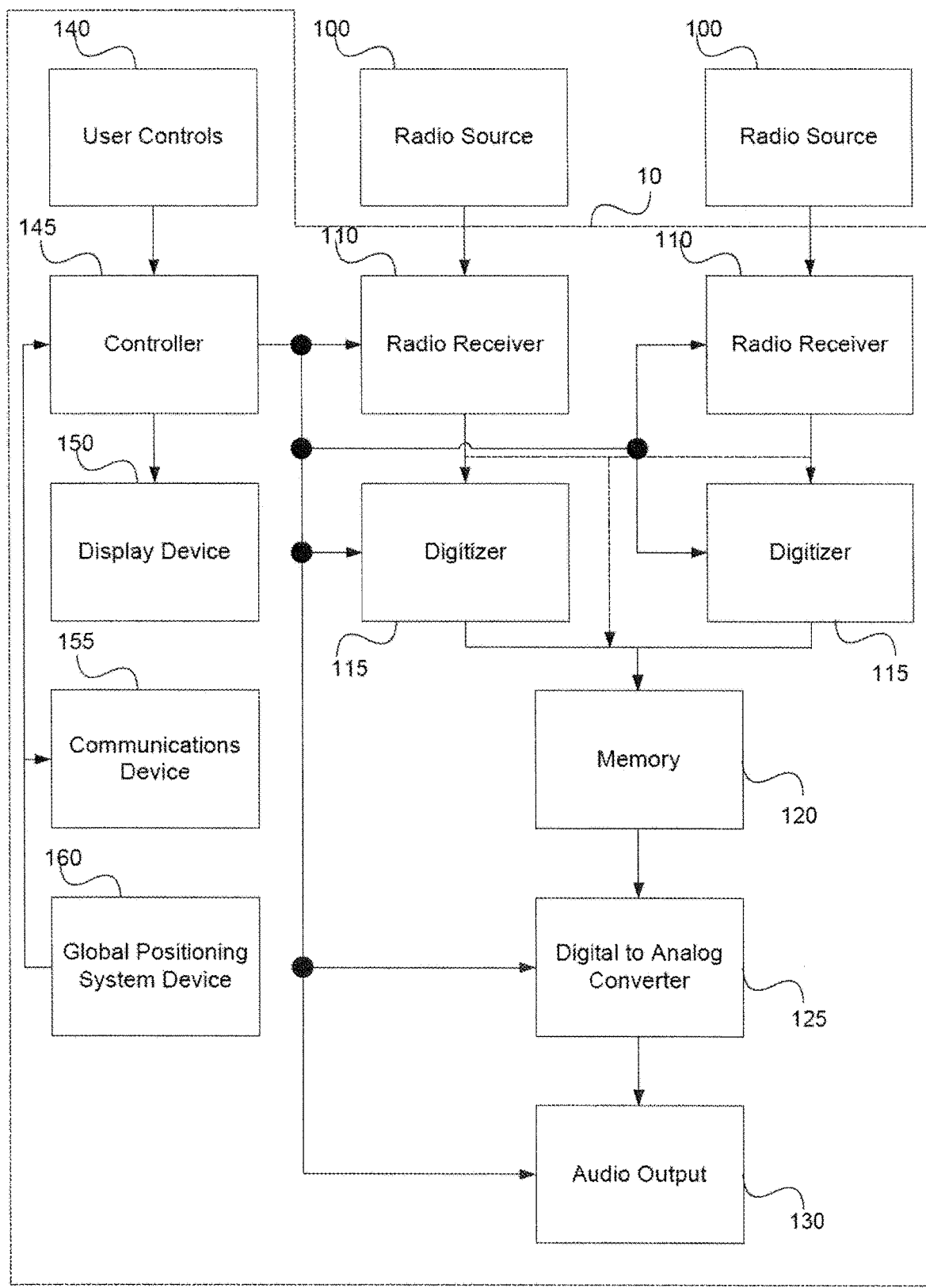
FIG. 1 is an illustrative block diagram of one embodiment of an enhanced radio system (ERS) in accordance with the present invention.

Turning to FIG. 1, an embodiment 10 of this ERS invention is shown. One or more radio sources 100 may be supported. These sources may be broadcast radio, satellite radio, Internet radio, or other such sources. A radio receiver 110 is provided to receive the input signals from each source. This may be, for example, an antenna and a tuner. It may also be equipment to receive audio data from the Internet, and may include a telephone, wireless, or cable modem, a computer, and software. Multiple radio receivers may be provided for a single radio source. For example, the system may include one antenna and several tuners.

One or more digitizers 115 may be provided for each analog input. These digitizers convert the received analog audio signal into a stream of digital data that may be stored in a memory device 120. A digitizer is not required for digital audio sources, such as Internet and digital satellite radio. Multiple radio receivers may share a single digitizer. The output of the digitizer 115, or the output of digital radio receivers 110, may be stored in memory 120. Memory 120 may be any suitable memory device, such as random access memory, static memory, disk drive, or other suitable electronic, magnetic, optical or other storage device.

The functions of the radio receivers 110 and digitizers 115 may be controlled by a controller 145. The controller 145 may have memory to store software and a processor to run software. The controller 145 may receive user commands from user controls 140 and display information for the user on optional display device 150. In embodiments in which the radio receiver 110 has a processor, such as to receive Internet radio, controller 145, user controls 140, and display device 150 may be included with radio receiver 110.

The user may also direct controller 145, using user controls 140, to send digital audio data from memory 120 to digital-to-analog converter 125, and to send audio signals from digital-to-analog converter 125 to audio output 130. Audio output 130 may include, for example, amplifiers, speakers, headphones, and the like. User controls 140 may include buttons, knobs, a remote control, a voice input device, or any combination of these and other types of inputs.

The system may also include optional communications device 155. This may include, for example, a modem (e.g., wireless, telephone, cable, digital subscriber line (DSL), etc.), a wireless transceiver such as a paging transceiver, computer networking equipment (e.g., a router, a hub, an Ethernet transceiver, etc.), a portable memory device (e.g., a flash memory card, a smart card, a personal digital assistant (PDA), etc.), or other communications devices. Controller 145 may send and receive information from one or more external systems using communications device 155, and store this information in local memory, such as memory within controller 145.

The system may include optional global positioning system device 160. This device may determine the geographic location of the ERS using the global positioning system satellites, and send that information to controller 145.

Figure 2:
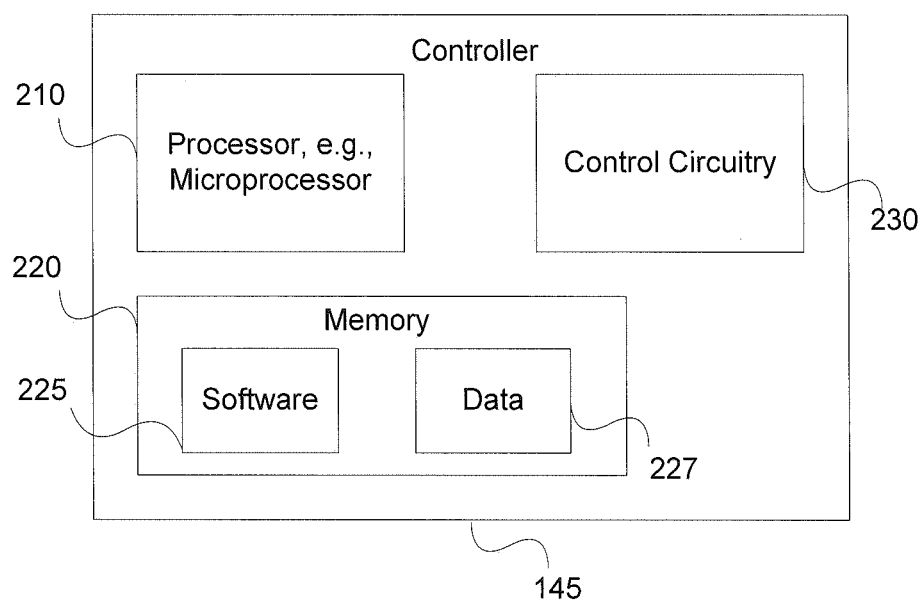
FIG. 2 is an illustrative block diagram of the controller of FIG. 1.

FIG. 2 shows an illustrative block diagram of controller 145 of FIG. 1. This subsystem may include processor 210, which may, for example be a microprocessor or other type of processing unit. Controller 145 may include local memory 220. Memory 220 may be used for storing software 225, which may run in processor 210. Memory 220 may also be used to store data 227, which may also be used by processor 210. Controller 145 may also include additional control circuitry 230, which may be used, for example, for communication with other subsystems in ERS 10 (FIG. 1) (ERS), and to process data sent to and received from the other subsystems.

Figure 3A:
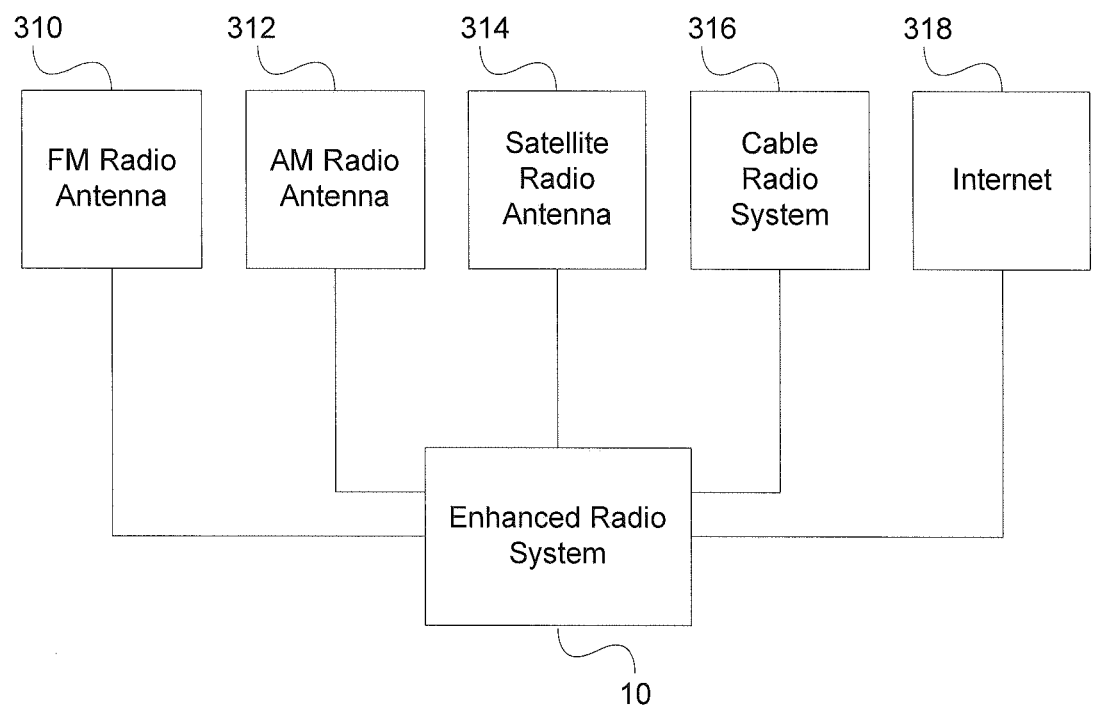
FIG. 3A is an illustrative block diagram of radio sources of FIG. 1.

FIG. 3A shows another illustrative block diagram of an ERS and multiple radio sources. This figure shows that a single system may have multiple radio sources 100 (FIG. 1) of multiple types. For example, the system may include FM radio antenna 310, AM radio antenna 312, satellite radio antenna 314, cable radio signal input 316, and Internet radio input 318. These types of radio sources are merely illustrative. An enhanced radio embodiment may include any combination of these and other types of radio sources.

Figure 3B:
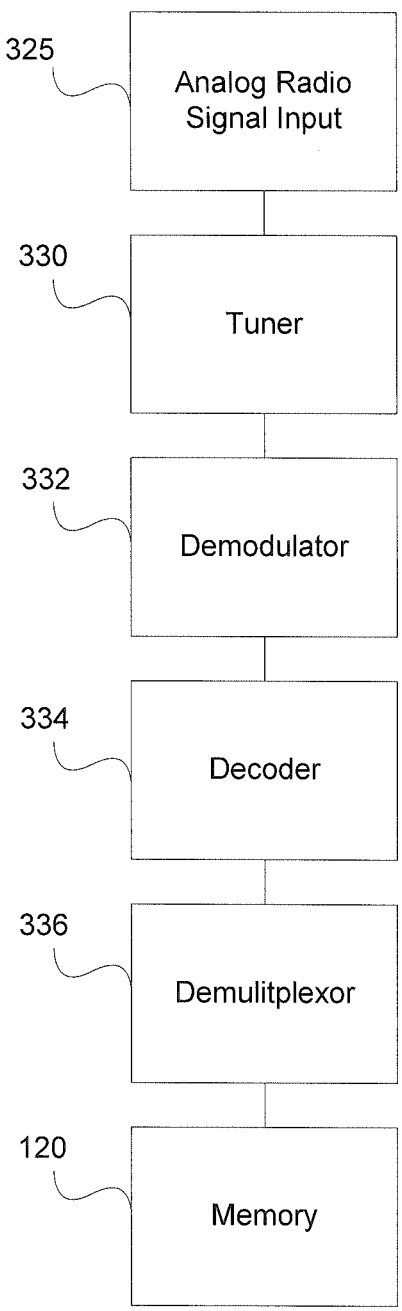
FIG. 3B and FIG. 3C are further illustrative block diagrams of alternative embodiments of a portion of FIG. 1.

FIG. 3B shows an illustrative block diagram of an embodiment 320 performing the function of a portion of an ERS of FIG. 1. In particular, an example of radio source 100 is embodied in analog radio signal input 325. Radio receiver 110 and digitizer 115 are embodied in tuner 330, demodulator 332, decoder 334, and demuliplexor 336. In this embodiment, digital radio content may be received in analog radio signal input 325. Tuner 330 may tune the carrier frequency for the digital radio content. Demodulator 332 may demodulate the signal from the format modulated when broadcast. Decoder 334 may decode the particular digital encoding scheme (e.g., MPEG-2) used to carry the digital data within the signal. Demultiplexor 336 may extract the digital radio data for a particular radio station from several digital radio stations that may be multiplexed within the single carrier signal. The digital data may then be stored into memory 120.

Figure 3C:
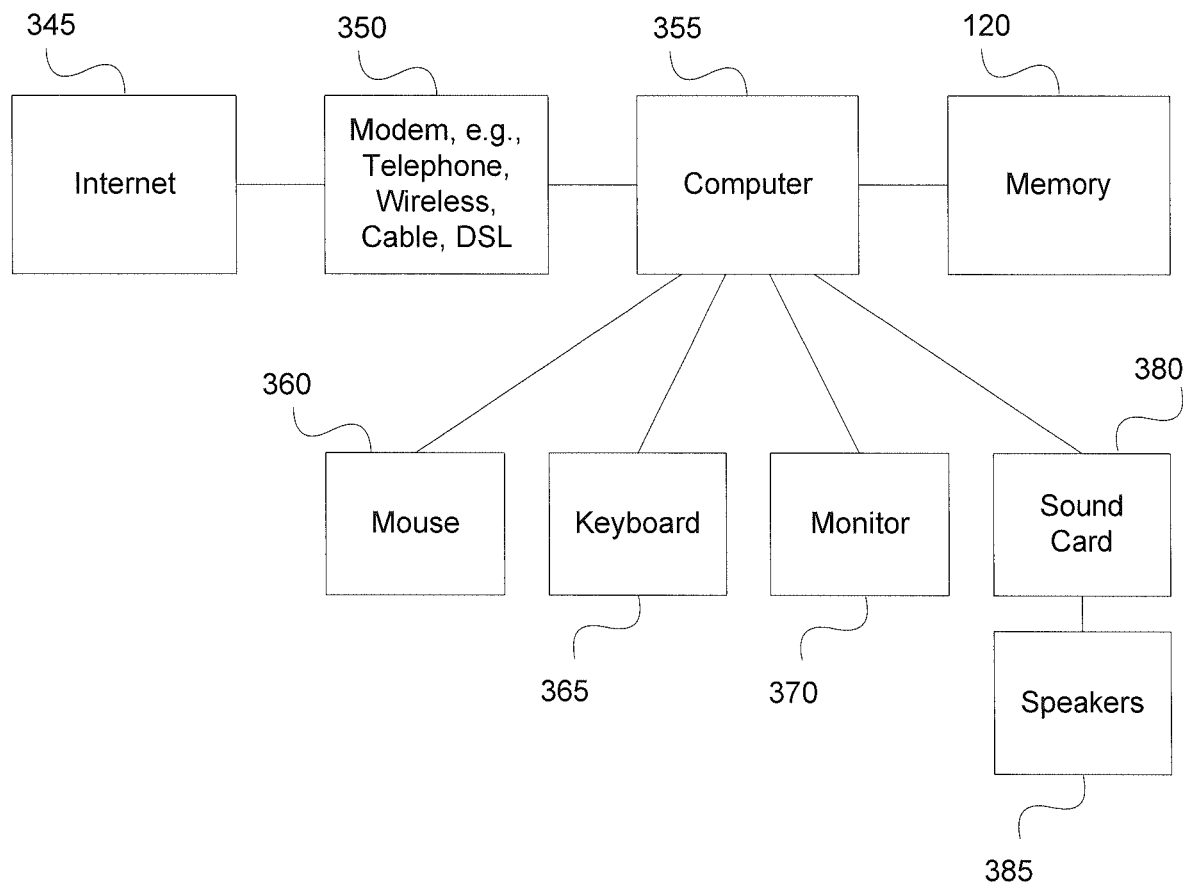

FIG. 3C shows an illustrative block diagram of another embodiment 340 performing the function of a portion of an ERS of FIG. 1. In this embodiment, radio source 100 is embodied in Internet 345, and radio receiver 110 and digitizer 115 are embodied in modem 350 and computer 355. Computer 355 may retrieve radio data from Internet 345 using modem 350. Modem 350 may be, for example, a wireless, telephone, DSL, or cable modem. Modem 350 may also be used as communications device 155. Computer 355 may store radio data in memory 120. User controls 140 may be embodied in mouse 360 and keyboard 365. Display device 150 may be embodied in monitor 370. Digital-to-analog converter 125 may be embodied in sound card 380, and audio output 130 may be embodied in speakers 385.

Figure 4:
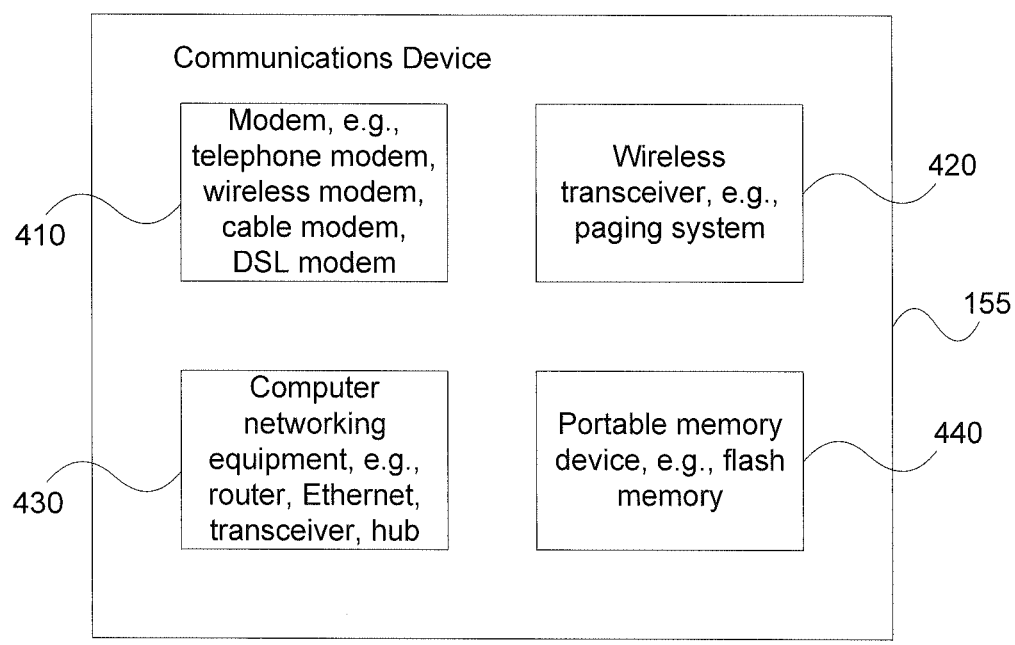
FIG. 4 is an illustrative block diagram of the communications device of FIG. 1.

FIG. 4 shows illustrative block diagram of communications device 155 of FIG. 1. Communications device 155 may be used by an ERS for receiving data from and sending data to external systems. Communications device 155 may include modem 410, which may be, for example, a telephone, wireless, cable, or DSL modem. Communications device 155 may include wireless transceiver 420, which may be, for example, a paging transceiver. Communications device 155 may include computer networking equipment 430, which may include, for example, appropriate Ethernet hubs, routers, Ethernet transceivers, wireless Ethernet transceivers, and the like. Computer networking equipment 430 may connect ERS to an in-home network, for example, which may in turn be used for accessing an external network, such as the Internet. Communications device 155 may include portable memory device 440, which may, for example, be a flash memory card, a smart card, a PDA, etc. Portable memory device 440 may be used for transferring data between an ERS and an eternal system.

In other embodiments (not shown), communications device 155 may be included as part of radio receiver 110 of FIG. 1. For example, in an ERS that accesses Internet radio, the same communications device may be used to acquire the radio data and to communicate data to and from an external system.

FIG. 5A and FIG. 5B show illustrative flowcharts 500 and 550, respectively, of a process used by an ERS (FIG. 1) to acquire and play radio signals. In step 510 of FIG. 5A, an ERS may receive radio input, for example using radio receiver 100. In step 520, the radio input may be stored in memory 120. If it is determined that the signal is analog in step 511, the signal may be digitized in step 525 prior to storing it. In step 530, a user may be allowed to control the storing of radio data, using, for example, user controls 140. In step 535, older stored radio data may be overwritten. For example, the radio data may be stored in a circular buffer, and the newest data may continuously overwrite the oldest data as the newest data is written. The size of the circular buffer may be fixed, it may be variable based on available memory, or it may be controlled by the user. The size of the circular buffer may be changed over time.

In step 560 of FIG. 5B, an ERS may convert the stored radio data to an analog signal, using digital-to-analog converter 125. The analog audio signal may be output in step 570 to audio output 130. The user may be allowed to control the outputting in step 580, using user controls 140.

Steps 510 through 535 of FIG. 5A may occur in parallel to and independently from steps 560 through 580 of FIG. 5B. In other words, referring to FIG. 1, while a radio signal is being stored in memory 120, a different radio signal may be extracted from memory 120, digitized and output. The different radio signal may have been stored at an earlier time, and may have been acquired from a different radio source, and/or using a different radio receiver. Controller 145 directs radio receiver(s) 110 to receive specific sources, and directs digital-to-analog converter 125 to output a different specific set of data, based on input received from user controls 140.

Figure 6A:
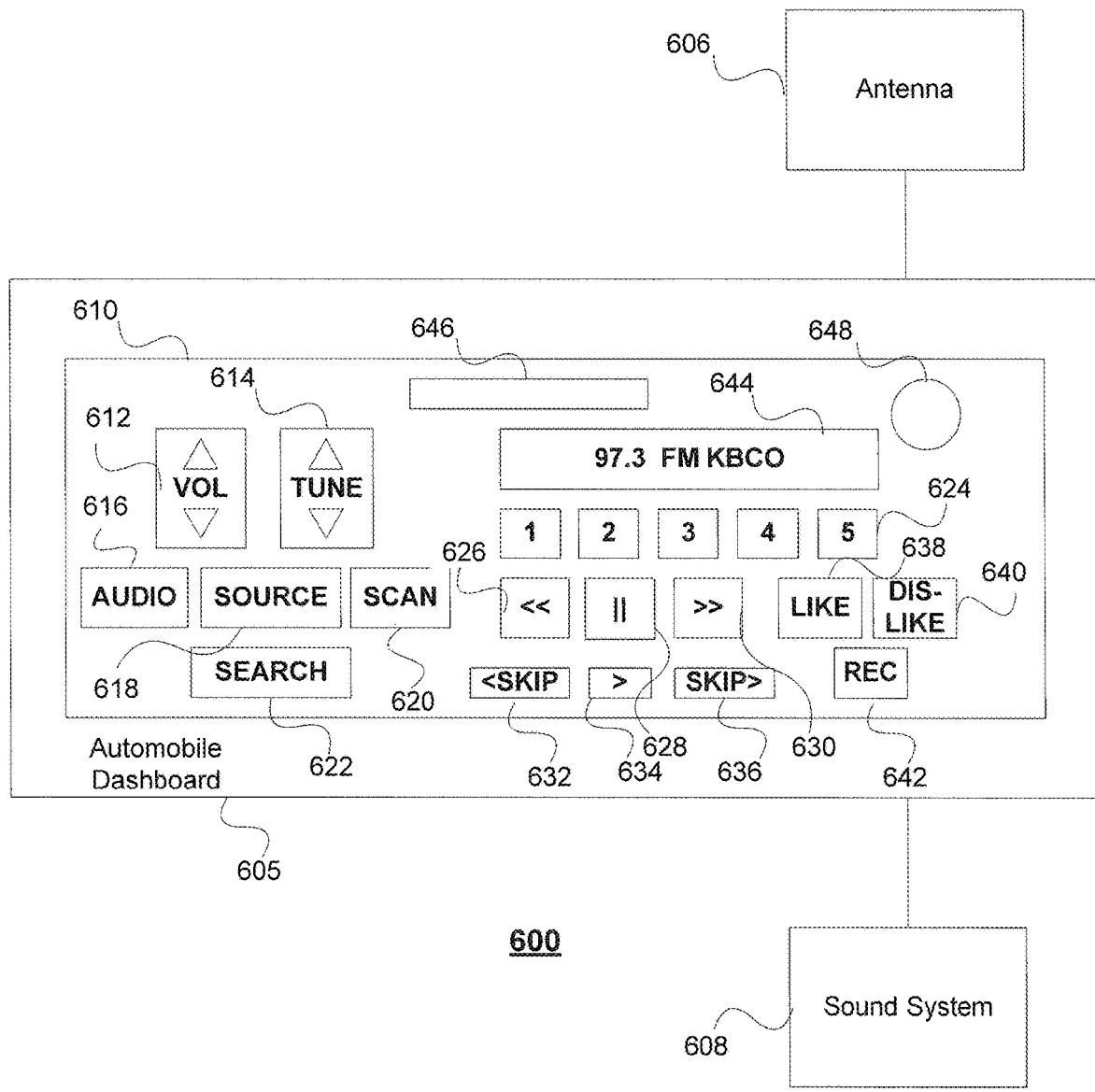
FIGS. 6A through 6D are illustrations of various embodiments of an ERS in accordance with the present invention.

FIGS. 6A, 6B, 6C and 6D show four specific embodiments of an ERS. FIG. 6A shows an enhanced radio embodiment 600 configured to be used in an automobile. Enhanced radio unit/front panel 610 may be mounted in the automobile dashboard 605 and connected to the automobile antenna 606 and sound system 608 (e.g., amplifiers and speakers). Front panel 610 may include a variety of buttons and other controls, such as volume controls 612, tuning controls 614, AUDIO button 616, SOURCE button 618, SCAN button 620, SEARCH button 622, and PRESET/NUMBER buttons 624. Front panel 610 may also include REWIND button 626 for rewinding radio content, PAUSE button 628 for pausing radio play, FAST-FORWARD button 630 for fast-forwarding through radio content, SKIP-BACK button 632 for skipping back to earlier radio content, PLAY button 634 for resuming radio play, SKIP-FORWARD button 636 for skipping forward to later radio content, LIKE button 638 for indicating preferred radio content, DISLIKE button 640 for indicating radio content that is not preferred, and RECORD button 642 for recording radio content. Front panel 610 may include display 644 and voice input 648. Any of these controls may also be available on a remote control (not shown). Front panel 610 may also include connector 646 for communications device 155 (FIG. 1). Connector 646 may be, for example, a connector for a mobile telephone, or a PC Card slot for a memory card.

Figure 6B:
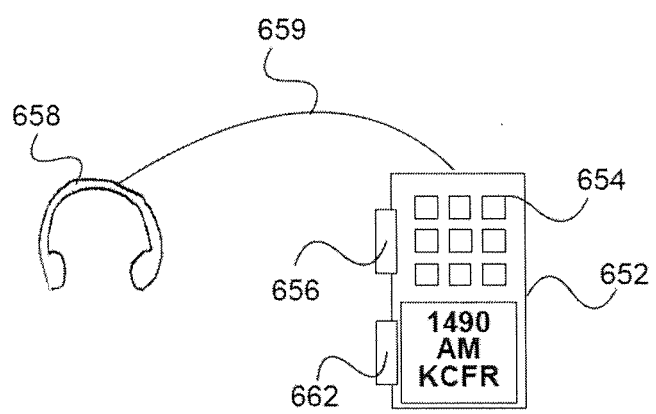

FIG. 6B shows an enhanced radio embodiment 650 configured to be used portably. It includes a main unit 652, which may include controls 654 and mounting means 656. Controls 654 may be substantially similar to controls shown in FIG. 6A. Mount may be configured, for example, to attach to a user's clothing. Embodiment 650 may also include speakers (e.g., headphones) 658, antenna (not shown), and connection 659 (e.g., wireless or wired) for sending audio signals from main device 652 to speakers 658. It may also include connector 662 for connecting to communications device 155 (FIG. 1). Connector 662 may be, for example, a telephone connector or an Ethernet connector, or a PC Card slot for a memory card. Embodiment 650 may alternatively contain communications device 155, which may be, for example, an infrared transceiver or a radio frequency transceiver.

Figure 6C:
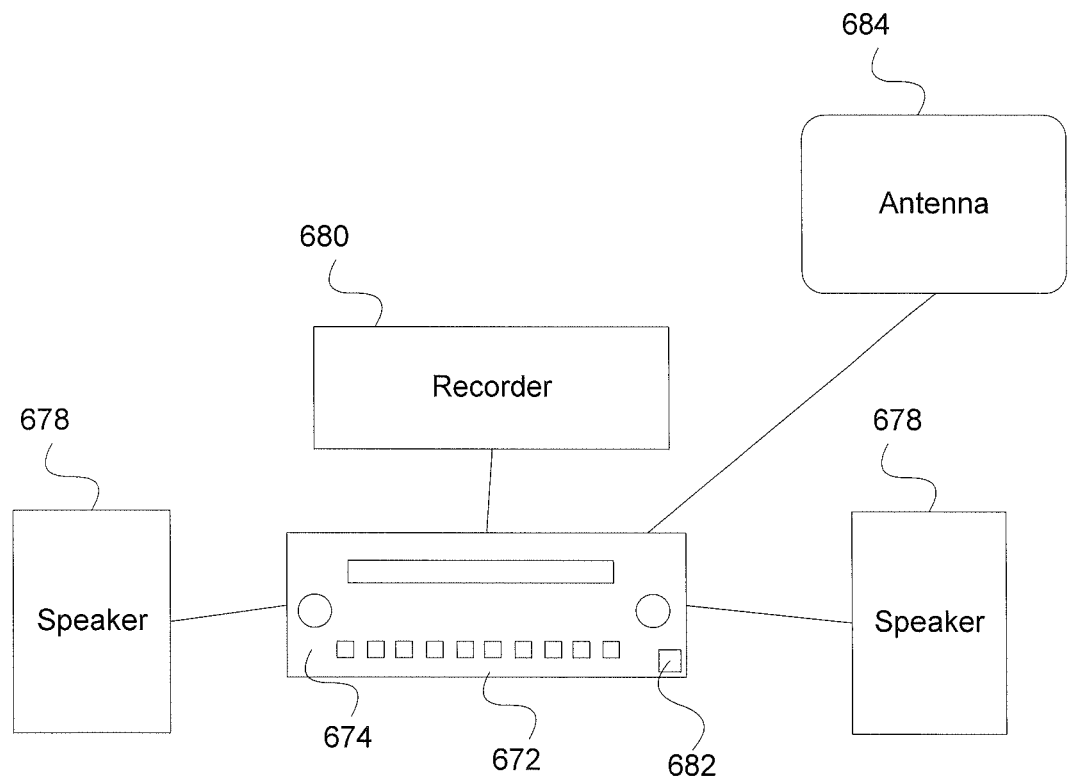

FIG. 6C shows an enhanced radio embodiment 670 configured to be used in an environment such as a home or office. Embodiment 670 may include main unit 672, which may include front panel 674. Remote control 676 may also be used. Main unit 672 may be connected to speakers 678, recording device 680, antenna 684, or other components of a home entertainment system. Subsystems such as amplifiers and speakers may be incorporated into the ERS main device, or they may be external to it, allowing a user to connect to existing equipment. Embodiment 670 may also include connector 682 for connecting to communications device 155 (FIG. 1). Connector 662 may be, for example, a telephone connector or an Ethernet connector, or a PC Card slot for a memory card. Embodiment 670 may alternatively contain communications device 155, which may be, for example, an infrared transceiver or a radio frequency transceiver.

Figure 6D:
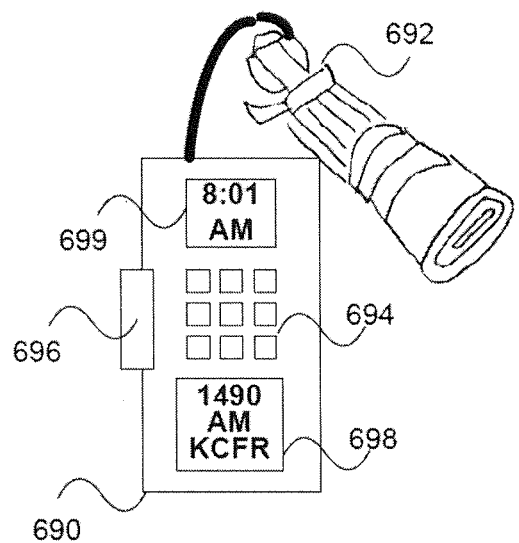

FIG. 6D shows an enhanced radio embodiment 690 configured to be used in a shower 692. Embodiment 690 may be designed to be resistant to the heat and moisture found in a shower. It may include keypad 694, display 698 and communications device 696. Other components may be sealed inside of the unit. For example, embodiment 690 may include a clock 699.

Figure 7:
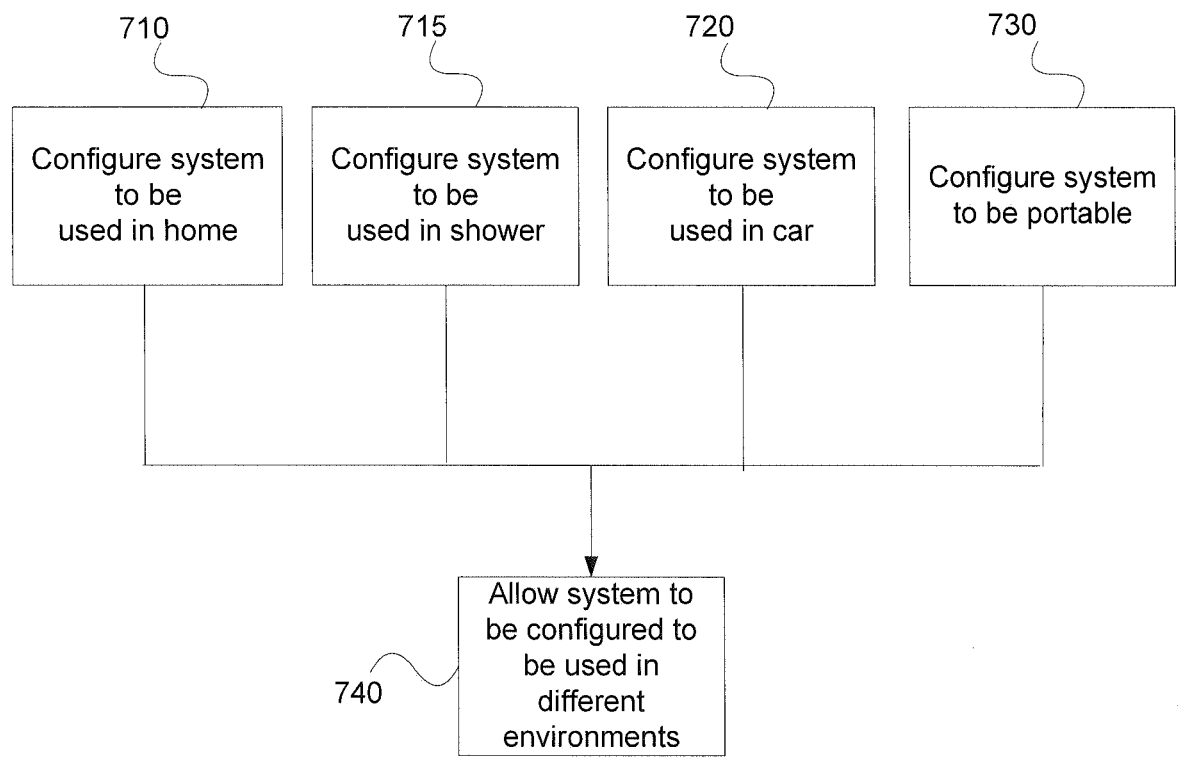
FIG. 7 is an illustrative flowchart showing configuration steps of one embodiment of the enhanced radio method in accordance with the present invention.

FIG. 7 shows process 700 for configuring the ERS for different environments. In step 710, the system may be configured to be used in a stationary environment, such as a home or office. This may include allowing the system to be connected to a user's home entertainment system. It may include higher quality sound components than might be used in a more mobile environment. It may also include a design that is suited for placement on a shelf, in a rack, in a home entertainment console, or the like. In step 715, the system may be configured to be used in a shower. This may include designing the system to be resistant to heat and moisture. In step 720, the system may be configured to be used in an automobile. This may include configuring the system to be mounted in a car's dashboard and to be connected to a car audio system. It may also include configuring the controls for the convenience of a driver, such as having buttons that are easy for a driver to see and activate, or including a voice control. In step 730, the system may be configured to be portable. This may include using light components and designing for durability. It may also include a mounting system that may be worn, and the ability to connect to headphones or other portable speaker systems.

In step 740, the user may configure the system to be used in multiple environments, so that, for example, a single ERS may be used both portably or in the car, or in the car or at home. The steps in this process may be performed in any order, and all steps are optional.

Figure 8:
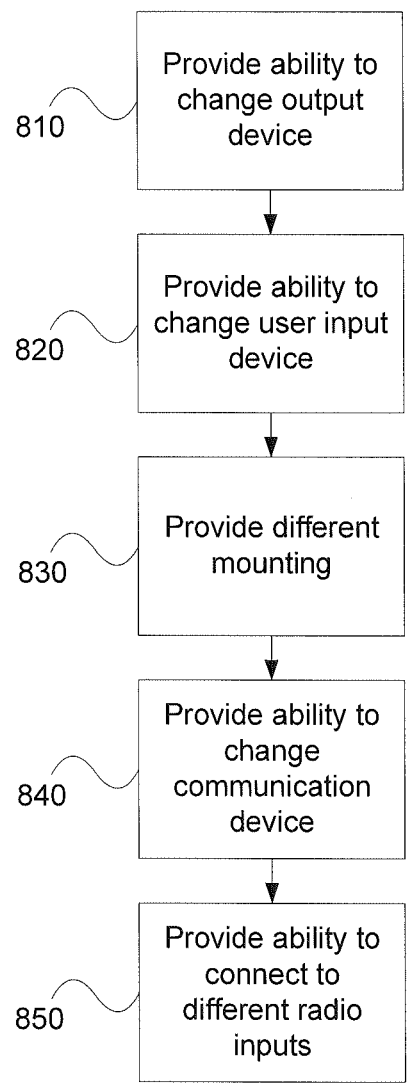
FIG. 8 is an illustrative flowchart showing additional configuration steps of the enhanced radio method in accordance with one embodiment of the present invention.

FIG. 8 shows more details of step 740 of FIG. 7. In step 810, the user may be given the ability to change the output device. For example, the user may be able to easily disconnect the headphones and connect a main device to a car audio system, to convert a system from a portable environment to the car environment. In step 820, the user may be given the ability to change the user input device. For example, the user may be able to use a front panel in one environment and a remote control in another. In step 830, different mounts may be provided. For example, the system may be mounted both in an automobile dashboard and on the user's clothing. In step 840, the user may be allowed to change the communications device. This may include, for example, connecting to a mobile telephone modem in an automobile and connecting to an in-home network at home. In step 850, the user may be given the ability to connect to different radio sources. For example, the user may connect the system to a car antenna when the system is mounted in a car, and may connect the system to a home network and a cable radio system when using the system at home. The steps in this process may be performed in any order, and all steps are optional.

The ERS may also be implemented as components in a modular personal network system, as disclosed in U.S. patent application Ser. No. 10/645,713 "Modular Personal Network Systems and Methods," by Michael D. Ellis and Caron S. Ellis, which is hereby incorporated by reference in its entirety. In that invention, multiple personal devices may be connected via a wireless network. Devices may be added or removed to change the functions of the system. For example, a radio receiver and digitizer may be one individual network component. The controller and memory may be another individual network component. Other individual network components may also include user controls, display device, and digital-to-analog converter/audio output. In such embodiments, the user may change individual network components to use the invention in different environments. For example, the user controls for a portable ERS may be worn on the person, while the user controls for a car ERS may be mounted in the car. Similarly, the audio output for the personal ERS may be portable headphones, while in the car the car's audio system may be used. In such embodiments, software, audio, and other data may be downloaded into the system from a base station or personal computer.

Figure 9:
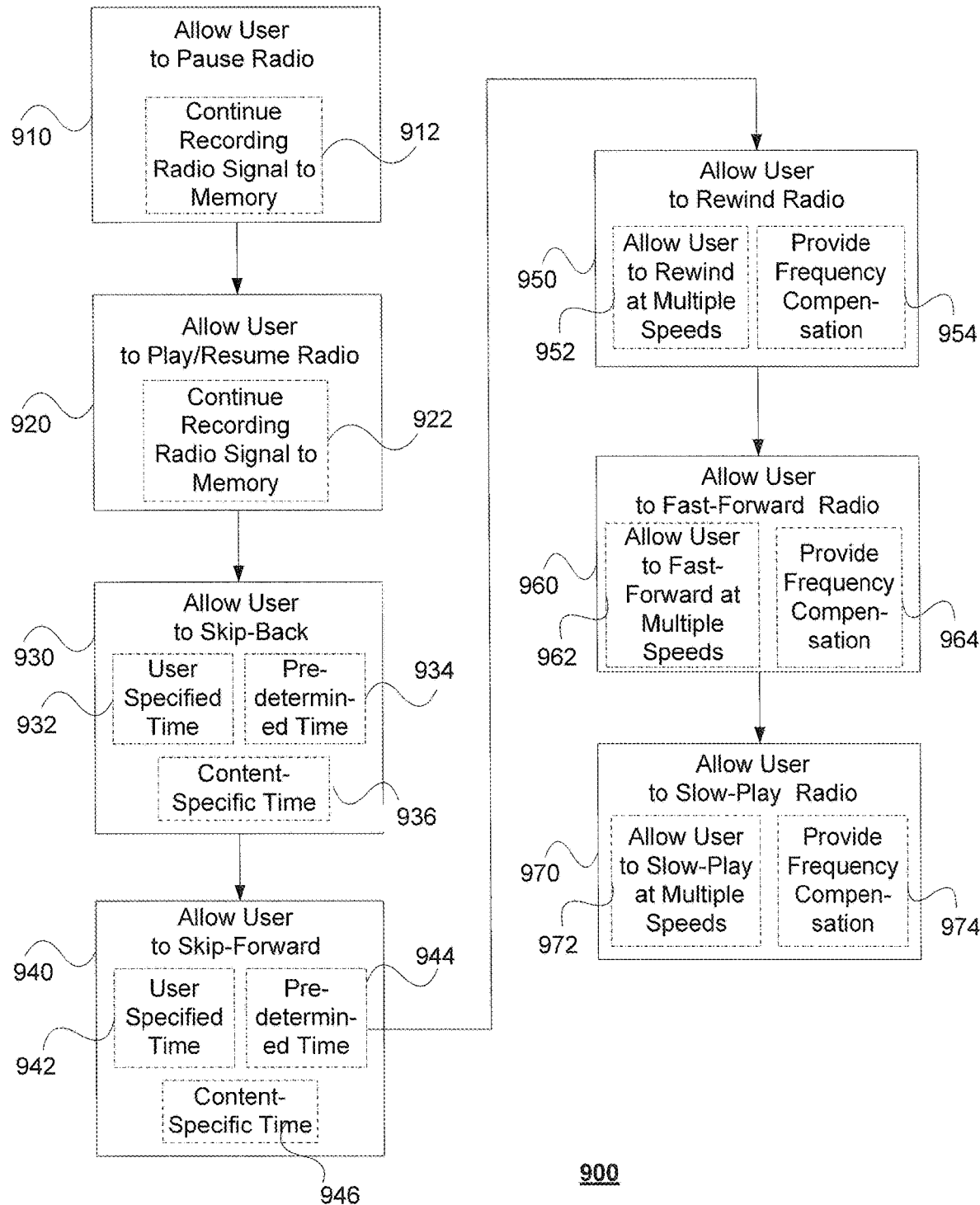
FIG. 9 is an illustrative flowchart showing audio control steps of the enhanced radio method in accordance with one embodiment of the present invention.

An ERS may allow a user to control the outputting of the radio signal. FIG. 9 shows process 900 for providing user control of the radio output, and is illustratively discussed in conjunction with the block diagram of FIG. 1 and the embodiment of FIG. 6A. The steps in this process may be performed in any order, and all steps are optional. In step 910, the user may be allowed to pause the radio output, for example by pressing PAUSE button 628. The system may temporarily cease sending an audio signal to audio output 130. In substep 912, the system may continue to store the incoming radio signal to memory 120. This may allow the user to listen to that radio content at a later time.

In step 920, the user may be allowed to play or resume the radio output, for example by pressing PLAY button 634. The system may resume sending an audio signal to audio output 130, and may resume from the same point at which the user earlier paused. In substep 922, the system may continue to store the incoming radio signal to memory 120. This may allow the user to "catch up" to the current radio content at a later time.

In step 930, the user may be allowed to skip-back to earlier radio content, for example by pressing SKIP-BACK button 632. This feature may allow the user to skip-back to the start of a song, traffic report, weather report, or other radio content of interest, to listen again to a phone number or clue for a radio contest, to hear public radio pledge information again, or to repeat any other content of interest. The system may immediately begin sending audio signal to audio output 130 corresponding to audio that was stored at a time earlier than the audio signal currently being sent to audio output 130. The amount of time to skip-back may be user-specified, as in substep 932. For example, the user may be able to choose between skipping back 5, 10, or 30 seconds. The amount of time to skip-back may be predetermined by the ERS, as in substep 934. For example, the ERS may always skip-back 10 seconds. The amount of time to skip-back may be content-specific, as in substep 936. For example, the ERS may always skip-back 15 seconds during commercials and 30 seconds during songs. Or, the ERS may always skip-back to the start of the currently playing content. The choice of which substep to perform may be user selected or factory defined.

In step 940, the user may be allowed to skip-forward to later stored radio content, for example by pressing SKIP-FORWARD button 636. This feature may allow the user to skip to the end of a commercial, public radio pledge drive solicitation, or other radio content not of interest. The system may immediately begin sending audio signal to audio output 130 corresponding to audio that was stored at a time later than the audio signal currently being sent to audio output 130. The amount of time to skip-forward may be user-specified, as in substep 942. For example, the user may be able to choose between skipping forward 5, 10, or 30 seconds. The amount of time to skip-forward may be predetermined by the ERS, as in substep 944. For example, the ERS may always skip-forward 30 seconds. The amount of time to skip-forward may be content-specific, as in substep 946. For example, the ERS may always skip-forward 15 seconds during commercials and 30 seconds during songs. Or, the ERS may always skip-forward to the end of the currently playing content. The choice of which substep to perform may be user selected or factory defined.

In step 950, the user may be allowed to rewind the radio content, for example by pressing REWIND button 626. This feature may allow the user to listen to a song or other radio content of interest again. The system may immediately begin sending audio signal samples in reverse order to audio output 130 corresponding to audio that was stored at a time earlier than the audio signal currently being sent to audio output 130. The user may be allowed to rewind at multiple speeds, as in substep 952. For example, if the user presses REWIND button 626 a second time, the system may change to a faster rewind speed, cycling through the available rewind speeds as the user repeatedly presses REWIND button 626. The audio signal samples may be chosen further apart and/or the audio signal samples may be shorter in duration if the user chooses a faster rewind speed. The system may provide frequency compensation in substep 954, so that the audio signal samples are recognizable by the user even if played at a different speed than they were recorded at. The system may stop rewinding when the user presses REWIND button 626 again after accessing all available rewind speeds. Alternatively, the system may stop rewinding when the user presses PLAY button 634 or PAUSE button 628.

In step 960, the user may be allowed to fast-forward the radio content, for example by pressing FAST-FORWARD button 630. This feature may allow the user to quickly get through a commercial or other radio content not of interest. The system may immediately begin sending audio signal samples at a higher rate in forward order to audio output 130 corresponding to audio that was stored at a time later than the audio signal currently being sent to audio output 130. The user may be allowed to fast-forward at multiple speeds, as in substep 962. For example, if the user presses FAST-FORWARD button 630 a second time, the system may change to a faster fast-forward speed, cycling through the available fast-forward speeds as the user repeatedly presses FAST-FORWARD button 630. The audio signal samples may be chosen further apart and/or the audio signal samples may be shorter in duration if the user chooses a faster fast-forward speed. The system may provide frequency compensation in substep 964, so that the audio signal samples are recognizable by the user even if played at a different speed than they were recorded at. The system may stop fast-forwarding when the user presses FAST-FORWARD button 630 again after accessing all available fast-forward speeds. Alternatively, the system may stop fast-forwarding when the user presses PLAY button 634 or PAUSE button 628.

In step 970, the user may be allowed to slow-play the radio content, for example by pressing PLAY button 634 while the system is playing radio content at normal speed. This feature may allow the user to listen more closely to radio content of interest, or to more precisely find a point of interest in the content. The system may immediately begin sending audio signal samples at a slower rate in forward order to audio output 130 corresponding to audio that was stored at a time later than the audio signal currently being sent to audio output 130. The user may be allowed to slow-play at multiple speeds, as in substep 972. For example, if the user presses PLAY button 634 again while already slow-playing, the system may change to a slower slow-play speed, cycling through the available slow-play speeds as the user repeatedly presses PLAY button 634. The audio signal samples may be chosen closer together and/or the audio signal samples may be longer in duration if the user chooses a slower slow-play speed. The system may provide frequency compensation in substep 974, so that the audio signal samples are recognizable by the user even if played at a different speed than they were recorded at. The system may stop slow-playing when the user presses PLAY button 634 again after accessing all available slow-play speeds. Alternatively, the system may stop slow-playing when the user presses PAUSE button 628. The system may also allow the user to slow-play in the reverse direction, for example, as one or more additional rewind speeds.

While the system is rewinding, fast-forwarding, or slow-playing, the system may continue to store new radio content to memory 120. This may allow the user to "catch up" to the current radio content at a later time.

Figure 10:
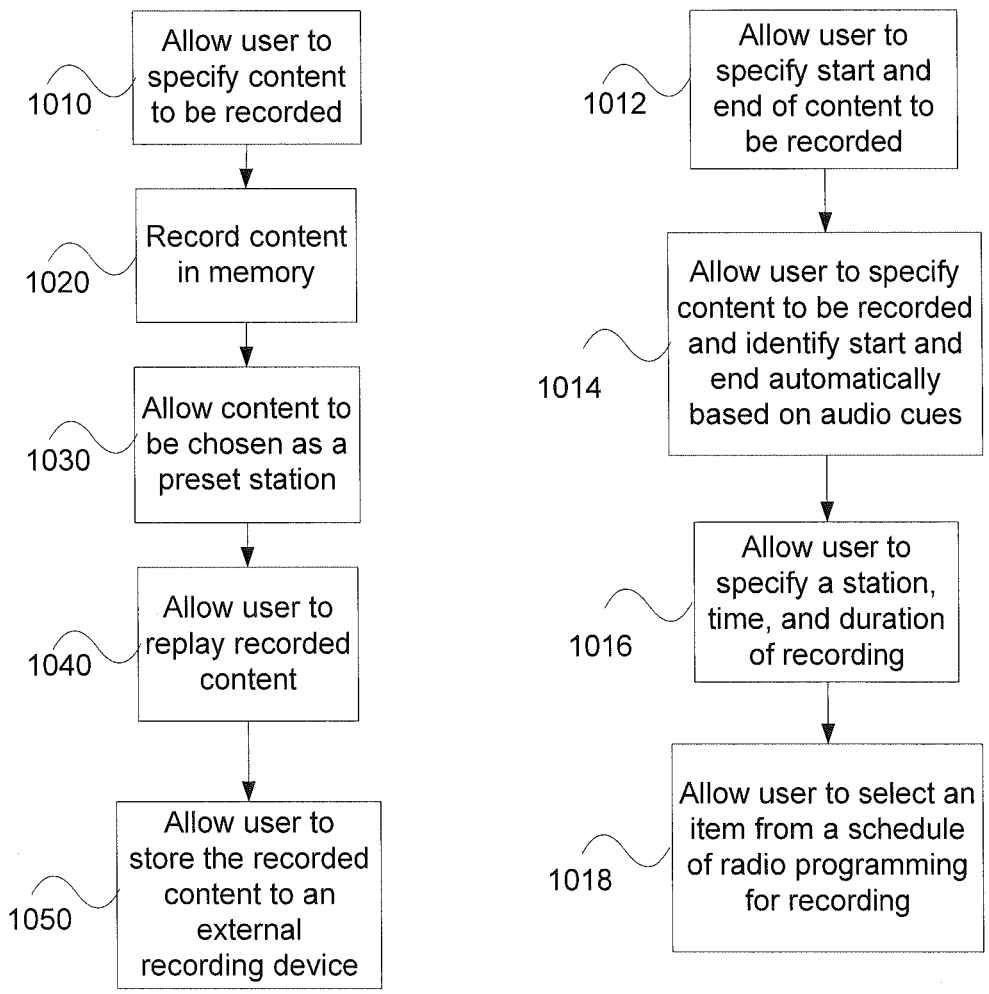
FIG. 10A and FIG. 10B are illustrative flowcharts showing steps relating to recording of radio content in accordance with embodiments of the present invention.

The system may allow the user to record a portion of the radio input in memory 120 (FIG. 1) for later playback. FIG. 10A shows process 1000 for recording radio content for the user, and is illustratively discussed in conjunction with the embodiment of FIG. 6A. The steps in this process may be performed in any suitable order, and steps may be omitted if desired. In step 1010, the user may be allowed to specify the content to be recorded. In step 1020, the system may record the content in memory 120. For example, the content may be copied from the circular buffer into a separate area of memory 120. This may involve copying more than one block of memory, if the content of interest spans the start and end of the buffer in memory, or if the circular buffer is implemented with multiple blocks of memory.

In step 1030, the user may be allowed to select the recorded content as a "preset" station. If an ERS includes a "preset station" feature, allowing a set number of radio stations to be quickly tuned, e.g., at the touch of a single PRESET button 624, the system may allow the recorded content to be saved as one of the presets. In other words, the content may later be replayed at the touch of a single PRESET button 624.

Even if recorded content is not saved as a preset, the system may allow the user to replay the recorded content at a later time in step 1040. For example, the system may present a list of previously recorded radio content items. If the user selects an item from the list and presses PLAY button 634, the system may begin playing the content item as if it were currently being broadcast. Controls such as pause, skip-back, skip-forward, etc., may be allowed while the content item is being played. Upon reaching the end of the recorded content item, the system may stop, may automatically begin playing the content item from the beginning, may return to the most recent radio station, or another appropriate action.

In step 1050, the user may be allowed to store the content item to an external recording device. This may include, for example, recording device 680 shown in embodiment 670 of FIG. 6C. The external recording device may be, for example, a cassette recorder, a CD recorder, or other device capable of storing analog or digital audio. This feature may allow the user to maximize use of the limited memory 120, while saving a more permanent copy of the desired radio content.

FIG. 10B shows more details of step 1010, allowing the user to specify the content to be recorded. The steps in this process may be performed in any order, and all steps are optional. In step 1012, the user may be allowed to specify the start and end of the content to be recorded. For example, the user may rewind to the start of the content of interest using REWIND button 626 or SKIP-BACK button 632, and then press RECORD button 642 to indicate the start of the content to be recorded. The user may then use the PLAY button, 634, FAST-FORWARD button 630 or SKIP-FORWARD button 636 to find the end of the content of interest, and then press RECORD button 642 again to indicate the end of the content to be recorded.

In step 1014, the user may be allowed to indicate any point during a radio item of interest, for example by pressing RECORD button 642. The system may automatically determine the start and end of the content of interest using audio cues. Audio cues may be algorithmically determined points in the audio content, based on, for example, silence in the audio, changed frequency content of the audio, changed power content of the audio, and changed rhythmic content of the audio, combined with the length of the audio segment. Refer to discussion of FIG. 15 below for more details on audio cues. Cues may have already occurred and may be extracted from radio data stored in memory 120. Cues may also occur at some time after the user indicates the item to be recorded. The system may also use a combination of steps 1012 and 1014, allowing the user to specify one end point of the content to be recorded and determining the other automatically.

In step 1016, the user may be allowed to specify a radio station, and start time, and an end time. Instead of an end time, the user may be allowed to specify duration. For example, if an ERS includes a computer monitor 370, keyboard 365, and mouse 360, as shown in embodiment 340 of FIG. 3C, the system may present a list of radio stations on monitor 370, allow the user to select a station with mouse 360, and then allow the user to type the start and end time using keyboard 365.

In step 1018, the user may be allowed to select an item from a schedule of radio programming to be recorded. For example, the system may display a list of stations on monitor 370 and allow the user to select one with mouse 360. The system may then display a list of programs scheduled on the selected station, and allow the user to select one of the programs for recording.

Figure 11:
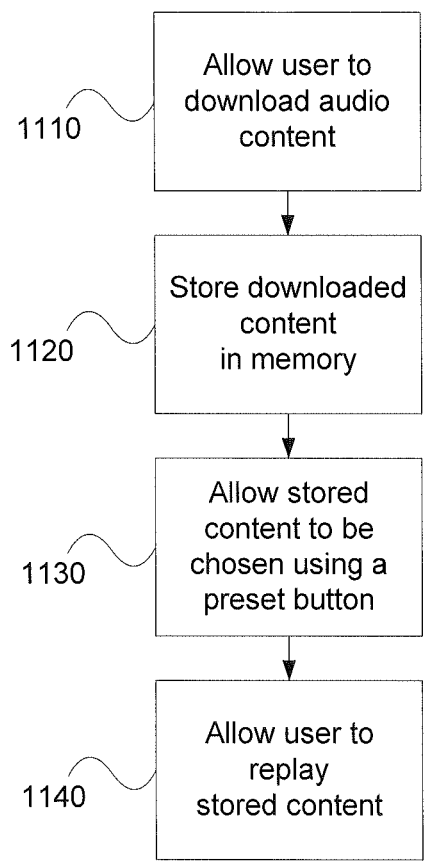
FIG. 11 is an illustrative flowchart showing steps related to allowing audio content to be downloaded into an ERS in accordance with one embodiment of the present invention.

In FIG. 11, flowchart 1100 shows an illustrative process for downloading audio content into an ERS, and is illustratively discussed in conjunction with the block diagram of FIG. 1 and the embodiment of FIG. 6A. This process may allow the user to incorporate some favorite songs into the system and play them instead of a radio station at any time, using the resources of the ERS. The user does not need to purchase a separate recorded music player. In step 1110, the user may be allowed to download audio content, such as a song, using communications device 155. In step 1120, the audio content may be stored into memory 120. In step 1130, the system may allow the user to assign the downloaded audio content to one of PRESET buttons 624. In step 1140, the system may allow the user to replay the downloaded content. If desired, any of these steps may be omitted or performed in an alternate order.

Figure 12:
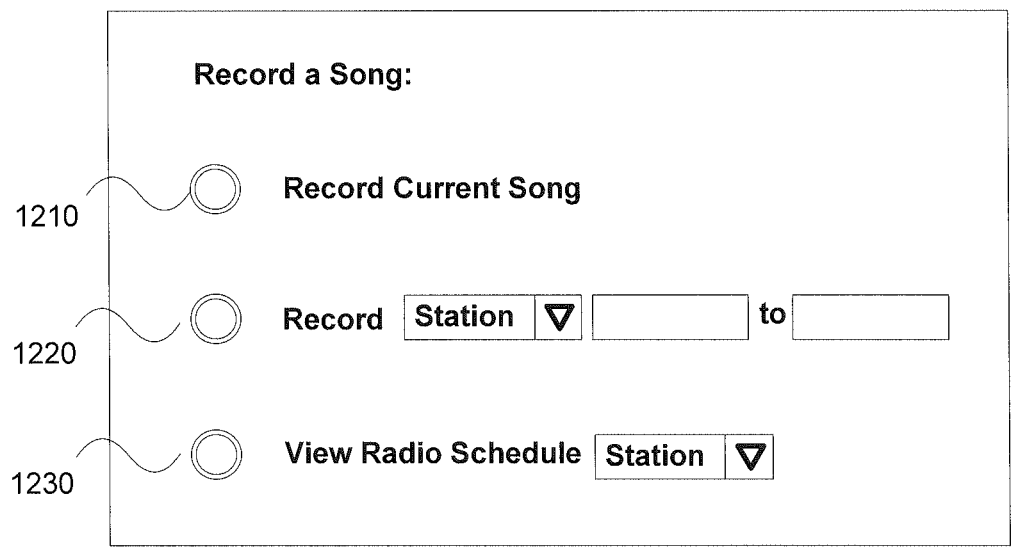
FIG. 12 shows an illustrative display screen that may be used for recording radio content in an ERS in accordance with one embodiment of the present invention.

FIG. 12 shows illustrative screen 1200 that may be displayed on monitor 370 (FIG. 3) to allow the user to select an item to be recorded. Selection 1210 may allow the user to instruct the system to record the current song, as disclosed with regard to steps 1110 and 1120 of FIG. 11 above. Selection 1220 may allow the user to instruct the system to record content based on station, start time, and end time, as disclosed with regard to step 1130 of FIG. 11 above. Selection 1230 may allow the user to instruct the system to record a specific radio program scheduled to air on a specific radio station at a specific time, as disclosed with regard to step 1140 of FIG. 11 above.

Figure 13:
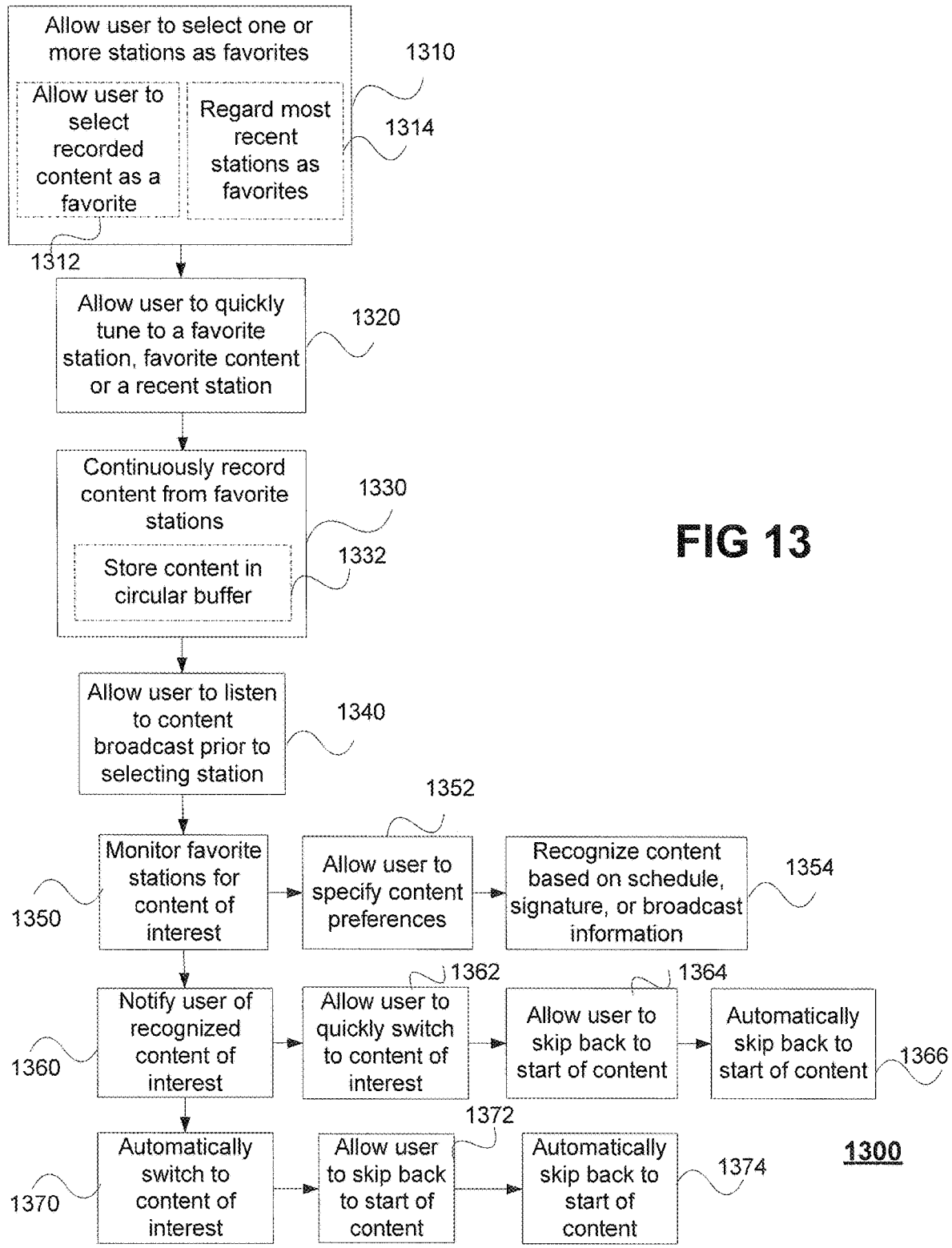
FIG. 13 is an illustrative flowchart showing steps related to selecting favorite radio stations in accordance with one embodiment of the present invention.

In FIG. 13 flowchart 1300 is presented, showing an illustrative process used by an ERS to support a preset station feature, illustratively discussed in conjunction with the block diagram of FIG. 1 and the embodiment of FIG. 6A. The steps in this process may be performed in any suitable order, and any steps may be omitted if desired. In step 1310, the system may allow a user to select one or more radio stations as favorites. The user may, for example, press and hold one of five PRESET buttons 624 to set the currently playing radio station as one of five favorites. In substep 1312, the user may be allowed to select recorded radio content as a favorite, as discussed previously in conjunction with flowchart 1000 of FIG. 10. In substep 1314, the system may treat one or more recently tuned stations as a favorite station. For example, the system may keep track of the most recently tuned one or two stations.

In step 1320, the user may be allowed to quickly tune to a favorite radio station. If a radio station was selected as a preset station in step 1310 above, the user may be allowed to quickly select that station by pressing the same PRESET button 624 that was used to select it as a favorite. If a user has selected recorded content, such as a song, as one of the favorites, then the user may be allowed to quickly access that content by pressing the corresponding one of PRESET buttons 624. The system may also have a button (not shown) to quickly access a recently tuned radio station.

In step 1330, an ERS may continuously store content from the favorite stations in memory 120. This may be, for example, in a circular buffer, as in substep 1332. The system may also use other data structures, such as linked lists of stored audio segments. An ERS may have one tuner allocated to each of the favorite stations, to continuously record the most recent content on that station, even while the user is listening to another station. For example, the system may include one tuner dedicated to the station that the user is currently listening to, one tuner dedicated to the most recently tuned station, and one tuner dedicated to each of six preset stations. Each of these tuners may be independently tuned to a different source and station. The input from each of these tuners may simultaneously be digitized and stored into independent areas of memory. The amount of audio data stored for each station may be the same, or it may be individually configured for each station. For example, the system may record the most recent five minutes of audio from each of six favorites, plus the most recent ten minutes of audio from the previously tuned channel, plus the most recent twenty minutes of audio from the radio station the user is currently listening to.

When the user selects a different radio station and that station is one of the user's favorites or a station the user has listened to recently, the system may have in memory 120 several minutes of content prior to when the user selected the new station. In step 1340, an ERS may allow the user to listen to content broadcast prior to the time the user selected the station. For example, the user may press one of PRESET buttons 624 to switch to a favorite station, recognize the middle of a favorite song, and use SKIP-BACK button 632 or REWIND button 626 to begin playing at the beginning of the song. The system will continue to record the input from the newly selected station into memory 120, and may also continue recording the input from the previous station.

The system may also keep track of user radio preferences, and may have the ability to recognize specific content items, such as songs, that the user may like. In step 1350, the system may monitor favorite stations (e.g., preset stations and recently tuned stations) for content of interest, i.e., content that matches the user's preferences. This may include step 1352 in which the user is allowed to specify content preferences. For example, a user may specify specific songs, artists, radio shows, types of content (e.g., traffic or weather reports), categories of music, or other content, and specify a level of like or dislike for that content. For example, the user may press LIKE button 638 or DISLIKE button 640 while a song is playing to indicate a preference for or against the song. In an embodiment with a personal computer, the system may present a screen such as screen 2000 of FIG. 20, discussed below, to enable the user to specify content preferences. User preferences may be loaded using communications device 155. The system may also determine user preferences automatically by monitoring what content the user listens to.

In substep 1354, the system may recognize content of interest on one of the monitored radio stations. This may be based on a number of factors including a schedule of events for the monitored station, identification information sent with the radio content, or matching a stored "audio signature" against the incoming content. An audio signature may be created, for example, by sampling the power level of 16 different frequencies at several different offsets from the start of the song. A method of creating and recognizing audio segments using an audio signature is disclosed in U.S. Pat. No. 5,612,729 (1997) to Ellis et al., "Method and system for producing a signature characterizing an audio broadcast signal," which is hereby incorporated by reference herein in its entirety.

At fixed intervals, e.g., thirty times per second, the system may calculate a 16-bit signature value representative of the audio at that point in time. Each of the 16 bits may represent whether the power level of a specific frequency band is increasing or decreasing at that point in time. The system may also generate a 16-bit mask value at each of the same times, with each bit in the mask value determining whether the corresponding bit in the signature word is considered reliable.

To create a signature for a song, the system may take a number of signature/mask pairs at various offsets from the start of the song. One of the signature words may be considered the "keyword," and may be selected based on providing the most likely correct match. The system may store the offset of the keyword from the start of the audio segment. Additional signature/mask pairs may be stored, along with their offsets relative to the keyword. Keywords and other signature words may be selected based on run length (how long the signature word is constant), how quickly the signature values change at the end of the run, number of mask bits set, similarity to other signatures, avoiding the start and end of the segment, and other factors.

To recognize incoming audio, the system may compare signature words from the incoming digitized audio against the keyword for all segments of interest. When a keyword match is found, the system may then compare the other signature words from the song of interest with the signature words in memory corresponding to the incoming audio signal, at the appropriate signature offsets from the matching keyword. If an acceptable level of matching of the complete signature is found, then a match is reported.

Assuming that the signature words are distributed fairly evenly throughout the song, the song cannot be recognized until after most of the song has been broadcast. However, because the audio for the past several minutes is stored in memory 120, the user will be able to listen to the song from the beginning after switching to it.

This method of using audio signatures to recognize incoming content is merely illustrative. Other methods may be used for audio signature creation and matching.

After the system recognizes an item of interest, the user may be notified in step 1360. The notification may include the name or other information about the content, or it may just indicate that something of interest has been found. For example, an audio notification may be sent to audio output 130. Alternatively or in addition, a message may be displayed on display device 150. The notification may also indicate that the user may quickly switch to the content of interest, for example by pressing a button, as in step 1362. After the user switches to the new station, the system may allow the user to skip-back to the start of the content of interest, as in step 1364, for example using SKIP-BACK button 632. Alternatively, the system may automatically skip-back to the start of the content of interest when the user selects it, as in step 1366.

After the system recognizes an item of interest, it may automatically switch the audio output to the station that broadcast the content in step 1370. In step 1372, the user may be allowed to skip-back to the start of the content of interest, for example using SKIP-BACK button 632. Alternatively, in substep 1374, the system may automatically skip-back to the start of the content of interest after automatically switching to the station that broadcast it.

Figure 14:
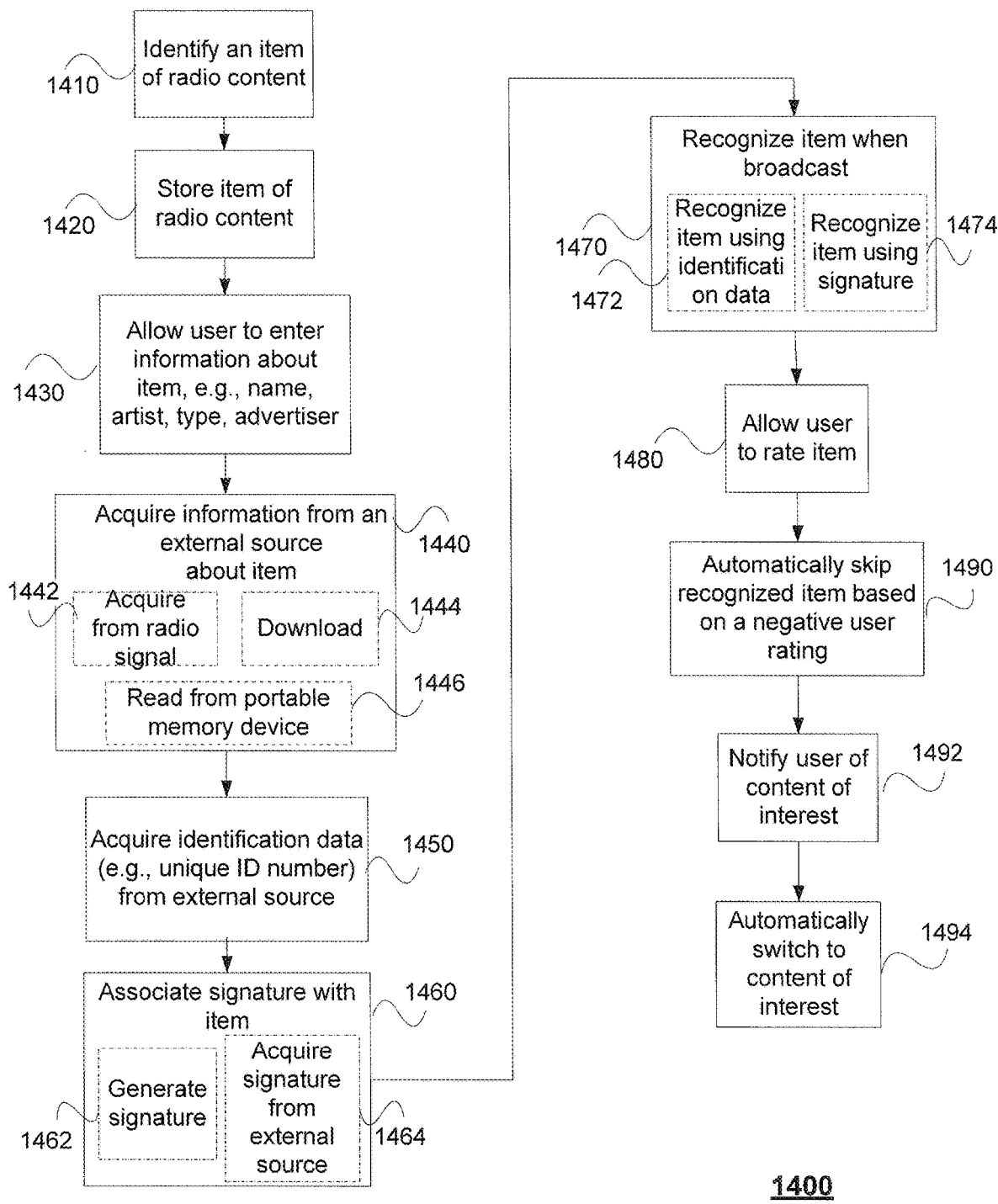
FIG. 14 and FIG. 15 are illustrative flowcharts showing steps related to identifying an item of radio content in an ERS in accordance with embodiments of the present invention.

The system may support identification of specific pieces of audio content, such as songs and commercials. FIG. 14 is a flowchart of process 1400 for identifying and tracking items of audio content. The steps in this process may be performed in any order, and all steps are each optional. In step 1410 an item of audio content is first identified. This identification may be based on user indication or on cues in the audio, as discussed in more detail with respect to FIG. 15 below. In step 1420, the item of audio content may be stored, as described in conjunction with FIG. 10 above.

In step 1430, the user may be allowed to enter information about the audio item. For example, this may include the type of content (song, commercial, weather report, etc.), the name of the item, the artist (for example, if the item is a song), and the advertiser (for example, if the item is a commercial). In step 1440, the system may acquire information about the item from an external source. The information acquired from an external source may be more extensive than that entered by the user, as it may be loaded from a database of detailed information about songs or other content. The information about the content may be acquired from the radio signal along with the content itself in substep 1442 (or from a separate radio signal using a separate radio receiver), it may be downloaded using a communications device 155 (FIG. 1) such as a modem in substep 1444, or it may be read from a removable portable memory device 440 (FIG. 4) in substep 1446. Whether entered by the user or acquired from an external source, the information about the content may be stored in memory 120 (FIG. 1) and associated with the stored content.

The information about the content item acquired from an external source may include a unique identifier, in step 1450. For example, every song that might be played might be assigned a unique number as an identifier. The identifier may be broadcast with the song. The system may then look up that identifier in a database of song information to retrieve other information about the song.

In step 1460, a unique audio signature may be associated with the content. The audio signature may be generated locally by the ERS in substep 1462, or the audio signature may be acquired from an external source in substep 1464. The audio signature may be stored with the other information about the item of content. In step 1470, the system may recognize the item of content when it is broadcast. The item may be recognized when it is broadcast on the station that the user is listening to, or it may be recognized when it is broadcast on another station that the system is monitoring. The item of content may be recognized using the previously stored audio signature, in substep 1474. Alternatively, in step 1472, the item of content may be recognized based on identification information broadcast with the item of content on the radio station or received via communications device 155 (FIG. 1). This identification information may, for example, be the previously stored unique identifier associated with the content.

In step 1480, the system may allow the user to rate an item of content. For example, the user may specify that he likes or dislikes a particular song or commercial. The system may also allow the user to specify levels of interest, such as a strong like or weak preference. In step 1490, when the system recognizes an item of content that the user does not like, it may automatically skip over that content. For example, if the user is listening to a radio station a significant amount of time prior to the radio data that is being stored for the same station, the system may skip the disliked content and immediately begin playing the content stored immediately following the disliked content. Alternatively, the system may switch to a radio station with more preferred content when disliked content is recognized. In steps 1492 and 1494, the system may notify the user or automatically switch when preferred content is recognized on a station the user is not currently listening to, as discussed above with regard to FIG. 13.

Figure 15:
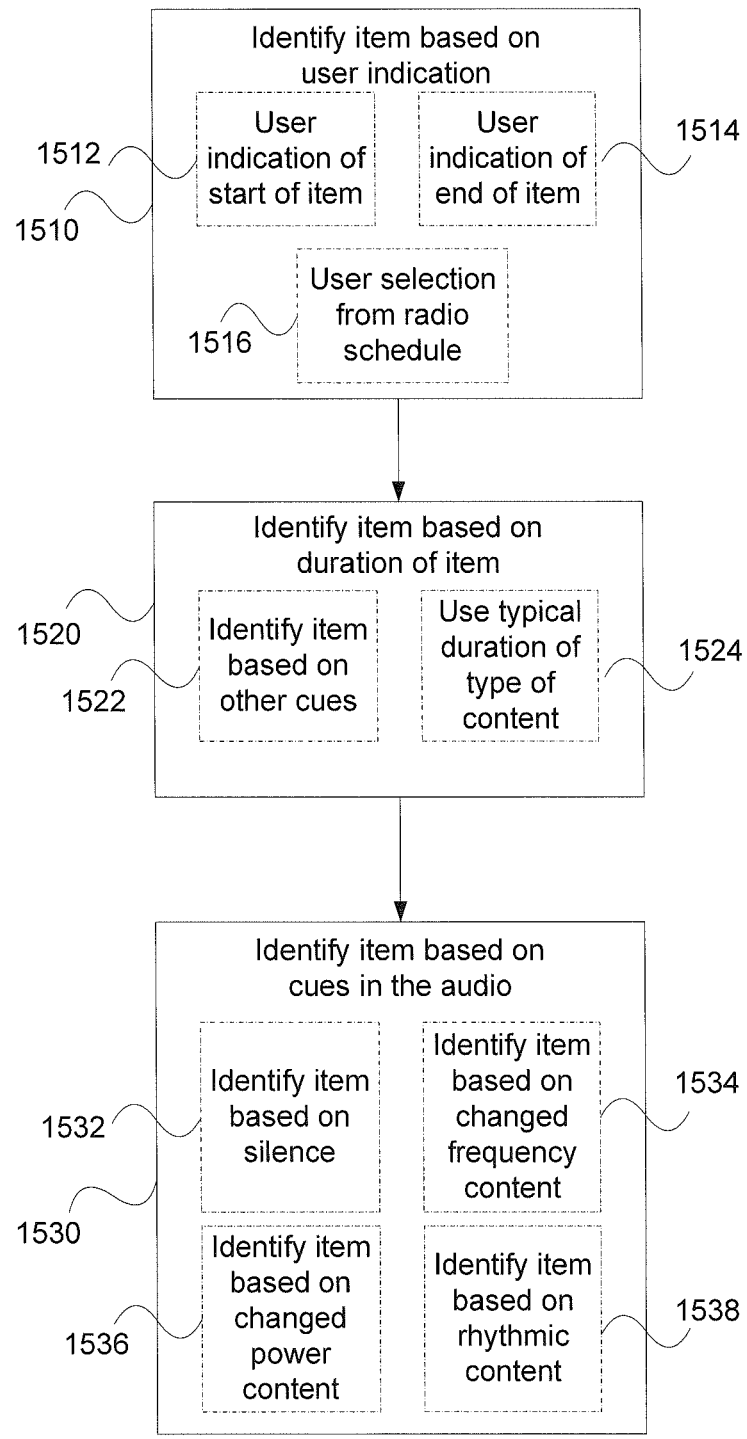

FIG. 15 shows more details of step 1410 of FIG. 14, identifying an item of radio content, and is illustratively discussed in conjunction with the block diagram of FIG. 3 and the embodiment of FIG. 6A. The steps in this process may be performed in any order, and all steps are optional. At 1510, the item may be identified based on a user indication. In substep 1512, the user may be allowed to indicate the start of the item, for example by pressing LIKE button 642 when listening to the start of the item. In substep 1514, the user may be allowed to indicate the end of the item, for example by pressing LIKE button 642 a second time when listening to the end of the item. The user may also be allowed to select the item from a radio schedule in substep 1516. The schedule may, for example, be displayed on monitor 370, and the user may click on a desired item in the schedule, using mouse 360.

In step 1520, the system may identify an item at least partially based on its duration. In substep 1522, identification based on duration may be combined with other cues. For example, a user may indicate a single point in time during the item, and the system may identify an item based on duration incorporating the indicated point. The system may use typical durations of items based on type of content in substep 1524. For example, the system may identify commercials that are 30 or 60 seconds long. The system may identify songs that are between three and six minutes long. The system may assign probabilities to different durations or ranges of durations, and pick a duration based on other cues and the highest probability duration.

In step 1530, the system may identify an item based on cues in the audio. Cues may indicate a specific short event in the audio, such as silence, in substep 1532. In some cases a brief silence may be indicative of a transition between two different content items. Alternatively, an audio cue may be determined by monitoring a characteristic of the audio for changes that may indicate different content.

For example, in substep 1534 the system may monitor frequency content of the audio. The frequency content may be determined, for example, by performing a Fourier transform on the input audio waveform. When transitioning from one item of content to another, such as two songs or a song and a commercial, the frequency content may exhibit significant changes that may not typically occur within a single item. One song may be in one musical key and the following song may be in a different musical key, or a song may be followed by a commercial that is mostly speaking.

In substep 1536, the system may monitor the power content of the audio. The power level, such as the peak power level or the average power level, may change from one item of content to another. For example, the average power level may be increased during a commercial.

In substep 1538, the system may monitor the rhythmic content of the audio. The rhythmic content may be determined using a Fourier transform, similar to the frequency content. One song may have a strong rhythmic content that varies from the rhythmic content of a following song. Or, a spoken commercial may not have a strong identifiable rhythmic content.

The different methods of identifying an item of audio content may be combined in various ways. For example, the system may identify several possible transition points between two songs, may pick the most likely based on common durations, and then may allow the user to fine tune the identification of the start and end point.

Figure 16:
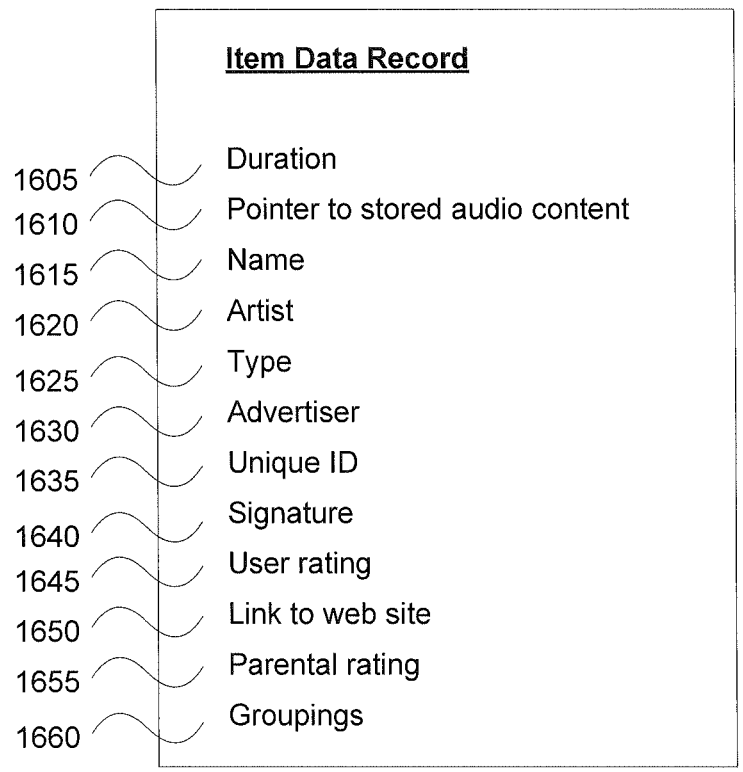
FIG. 16 is an illustrative data structure that may be used in the identification of an item of radio content in an ERS in accordance with one embodiment of the present invention.

FIG. 16 shows an illustrative data structure 1600 that may be used to store information about a content item. Field 1605 may store the duration (e.g., in seconds) of the item. The duration may also be measured in units of data storage required for the item, such as bytes. The record may also store a compression factor if necessary to determine how to decompress the audio data. Field 1610 may store a pointer to the stored audio content. This may be a pointer to the block of memory holding the audio data, a pointer to the first block of data if the audio data is stored in multiple blocks, a list of addresses of multiple memory blocks used to store the audio data, a file name of audio data stored on a disk drive, or other such pointer.

Field 1615 may store the name of the item. This may be, for example, the name of a song, the name of a product advertised, the name of a radio show or news/information segment, or a name assigned by the user. Field 1620 may store the name of the artist, for example if the item is a song. Field 1625 may store the type of content, such as whether the item is a song, commercial, news show, etc. Field 1630 may store the advertiser, if the content is a commercial.

Field 1635 may store a unique identifier for the item of content. Field 1640 may store an audio signature for the item. It may alternatively store a pointer to the signature, which may be stored in a separate part of memory 120 (FIG. 1) or other memory. Field 1645 may store a user rating for the item. For example, it may indicate whether the user likes or dislikes the item, and may indicate a level of user preference. Field 1650 may store a link to a web site related to the item. Field 1655 may store a parental rating for the item, such as a content advisory. Field 1660 may store the name or identifier of one or more groups that the item may be a member of, such as music of particular type. These fields are merely illustrative, and need not be present in all embodiments. Data structure 1600 may also include other fields if desired.

Figure 17A:
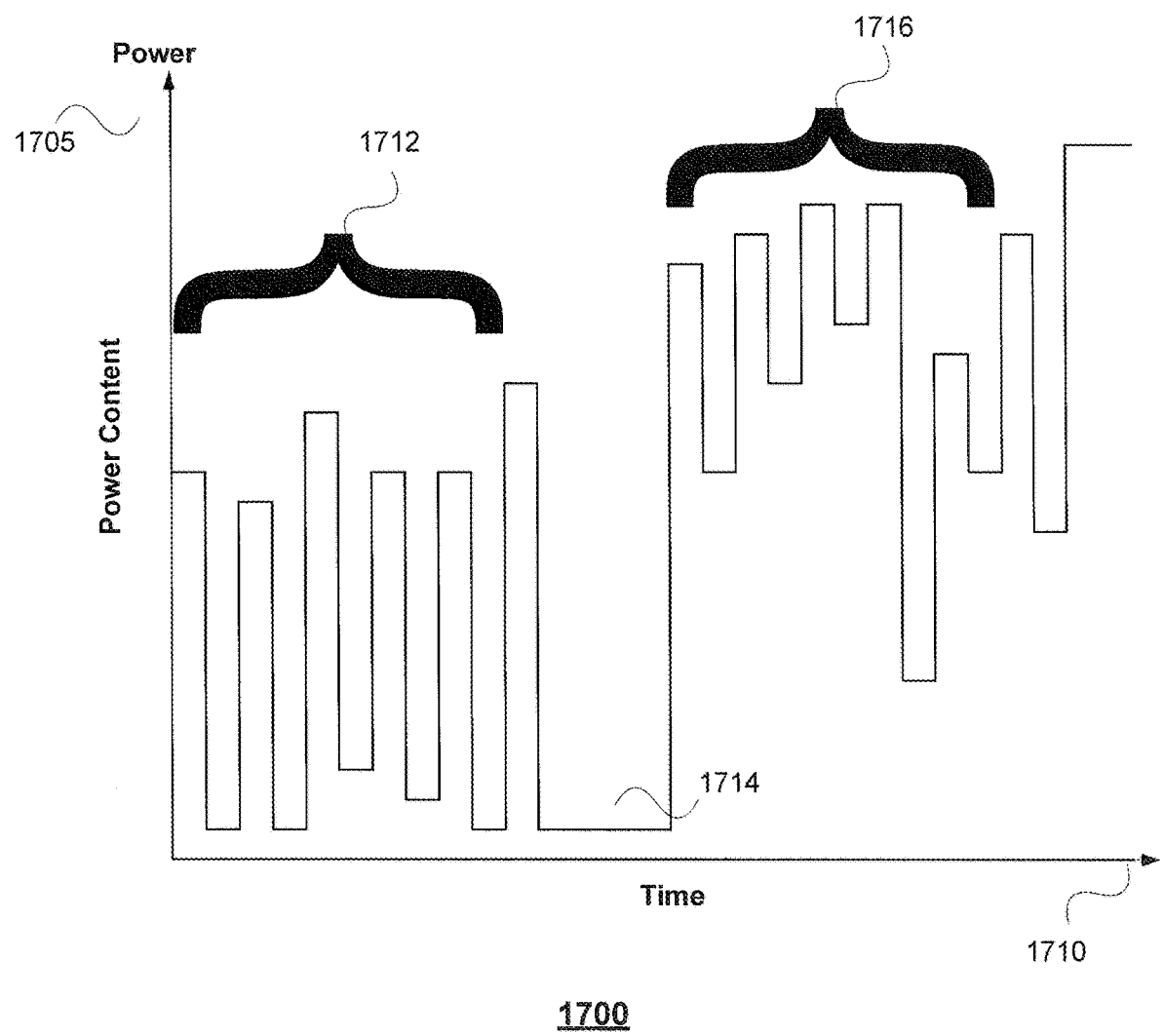
FIGS. 17A through 17C are illustrative graphs of data that may be used to identify items of radio content in an ERS in accordance with embodiments of the present invention.
Figure 17B:
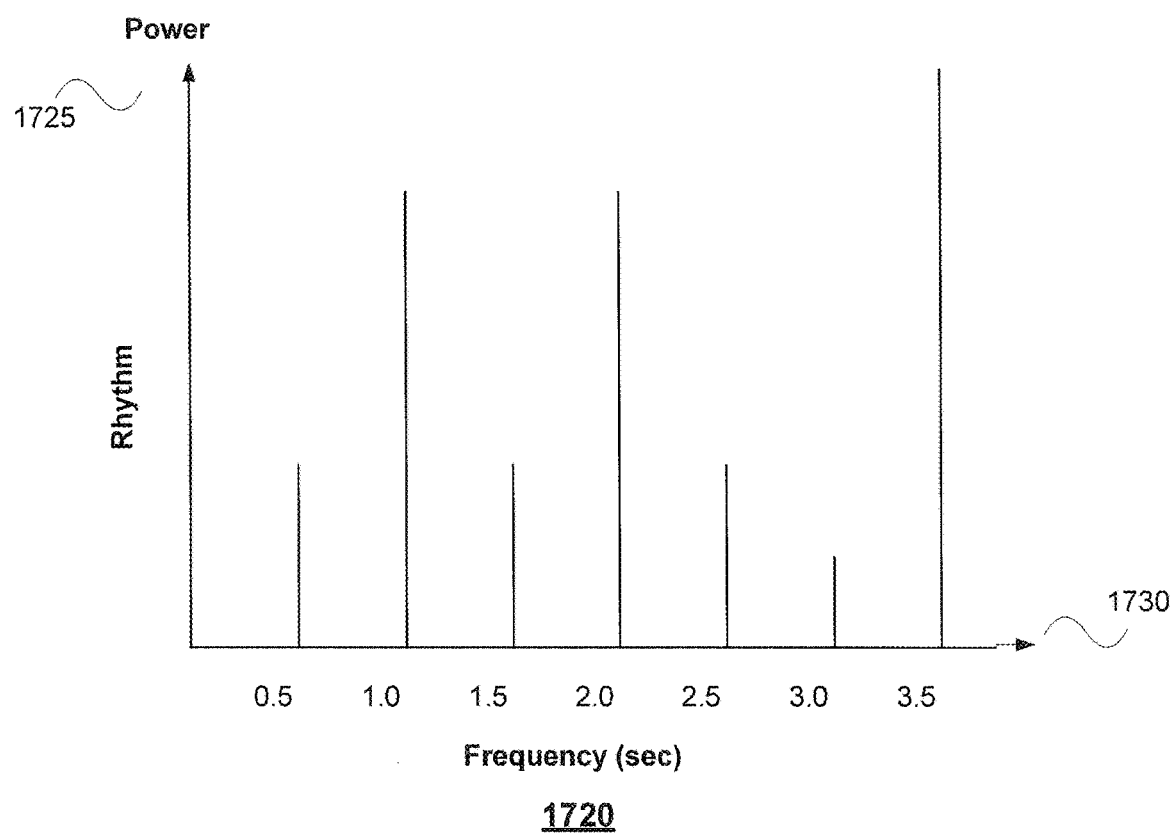
Figure 17C:
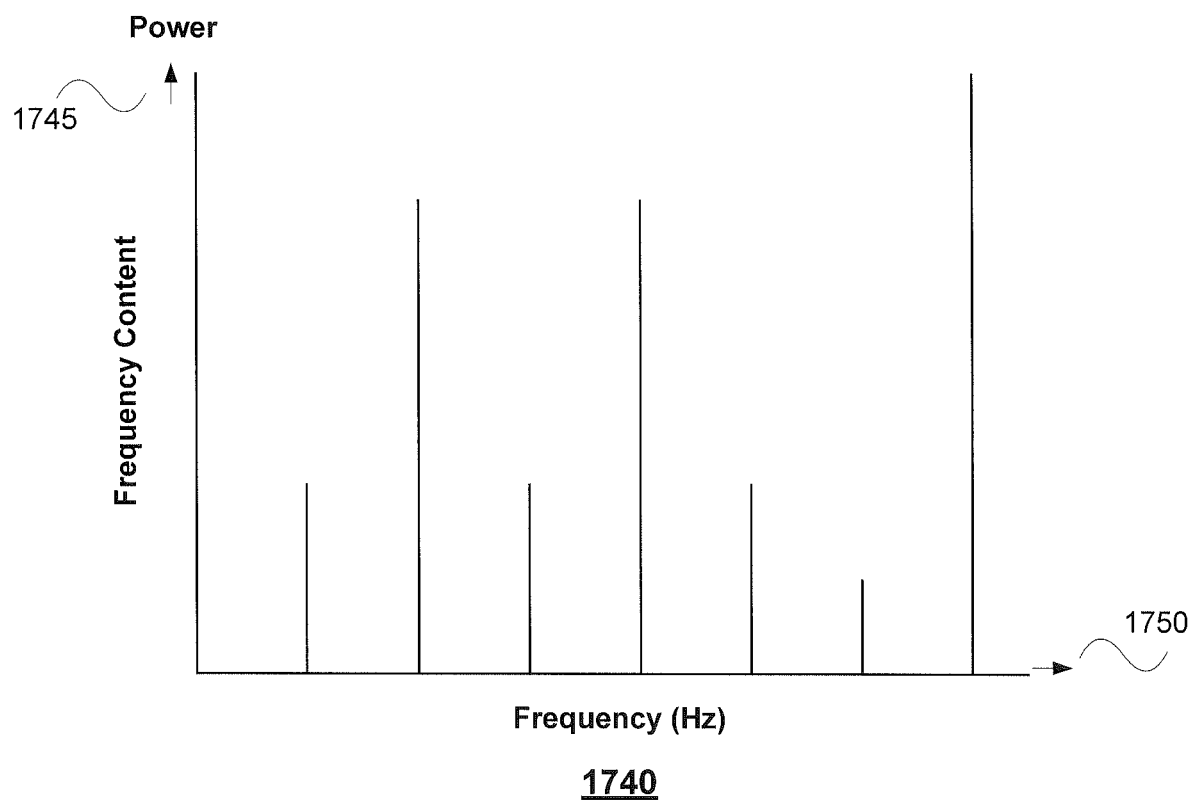

FIGS. 17A through 17C illustrate data related to the audio signal that may be used to identify an item and differentiate it from another adjacent item. Graph 1700 of FIG. 17A shows power 1705 vs. time 1710 for an incoming audio signal. This graph shows an initial portion 1712 of the audio with one power characteristic, a second portion 1714 of the audio with a second audio characteristic, and a third portion 1716 of the audio with a third characteristic. In this example, second portion 1714 corresponds to a period of silence, and third portion 1716 has a higher peak and average power than first portion 1712.

Graph 1720 of FIG. 17B shows power 1725 vs. frequency (time) 1730 for a sample from an audio signal. The time scale of this graph highlights the rhythmic content of the audio. From this graph it may be seen that the audio signal has a significant rhythmic content at about two beats per second. Aspects of the rhythmic content of the incoming audio may remain constant throughout a song, and may change when another song begins. An incoming period with no music may not have a strong rhythmic content.

Graph 1740 of FIG. 17C shows power 1745 vs. frequency 1750 for a sample from an audio signal. This graph is based on a shorter sample period and a faster frequency range than graph 1720. The range of frequencies sampled corresponds to the range of frequencies found in voice and music audible to human hearing. This graph shows the power present in the range of frequency bands for the audio sample. Aspects of frequency content of a song may be fairly constant during the song, and may subsequently change when another song or a commercial begins.

Figure 18:
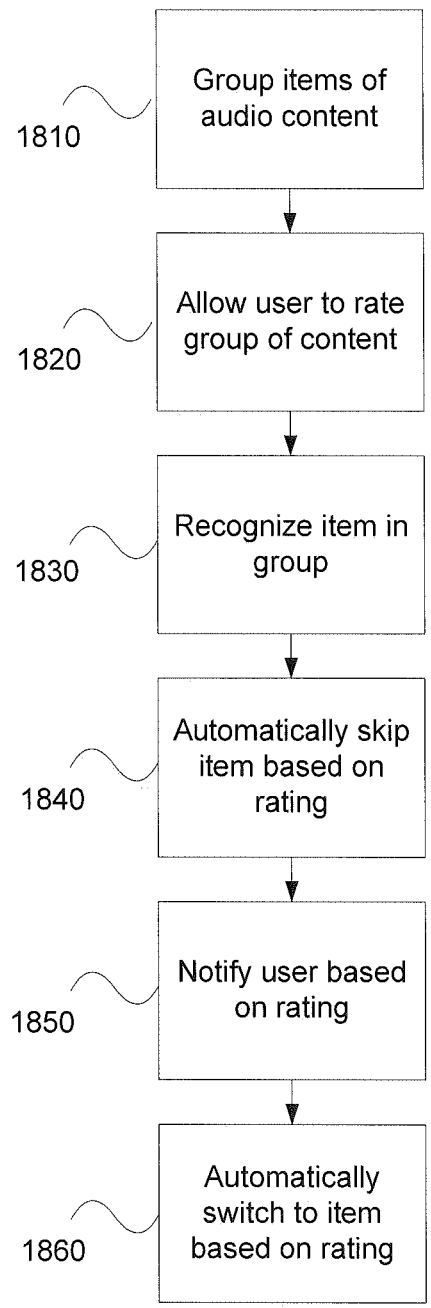
FIG. 18 and FIG. 19 are illustrative flowcharts showing steps related to grouping items of radio content in an ERS in accordance with embodiments of the present invention.

In FIG. 18, flowchart 1800 shows an illustrative process for supporting groups of items of audio content. All steps in this process are each optional, and may be performed in any suitable order. In step 1810, items of audio content may be grouped. Groups may be created by the user, programmer, or advertiser, based on a number of criteria. In step 1820, a user may be allowed to rate a group. The user may specify a like or dislike, or a level of like or dislike, for a specific group of content. The system may also monitor the content listened to by the user, and automatically determine the groups liked and disliked by the user. In step 1830, the system may automatically recognize an item in the group when it has been broadcast. For example, the system may recognize a specific item as described above, using an audio signature, unique identifier, information broadcast with the item in the radio signal, program schedule, or other means. The system may then determine the groups in which the recognized item is a member. Alternatively, the system may directly recognize the group itself, for example based on a published schedule or on information broadcast with the radio signal. In step 1840, the system may automatically skip over an item that is recognized to be a member of a group that the user dislikes, when it occurs on a radio station currently being listened to by the user. For example, a parent may define a group in a child's ERS based on an unacceptable parental advisory level, and the system may be configured to skip over all content in that group. In step 1850, the system may notify the user when it recognizes an item that is a member of a group liked by the user when it occurs on a station not being listened to by the user but that is being monitored by the system. If desired, this notification may occur even when the user is performing an activity other than listening to the radio, for example when the ERS is turned off, or when the user is listening to an audiotape or compact disk. In step 1860, the system may automatically switch to the radio station broadcasting an item of interest when it is recognized on a station not being listened to by the user but that is being monitored by the system, if that item is a member of a group liked by the user. Additionally, the system may automatically skip-back to the start of the recognized item so that the user may hear it in its entirety. If desired, the automatic switching may occur even when the user is performing an activity other than listening to the radio, for example when the ERS is turned off, or when the user is listening to an audiotape or compact disk.

Figure 19:
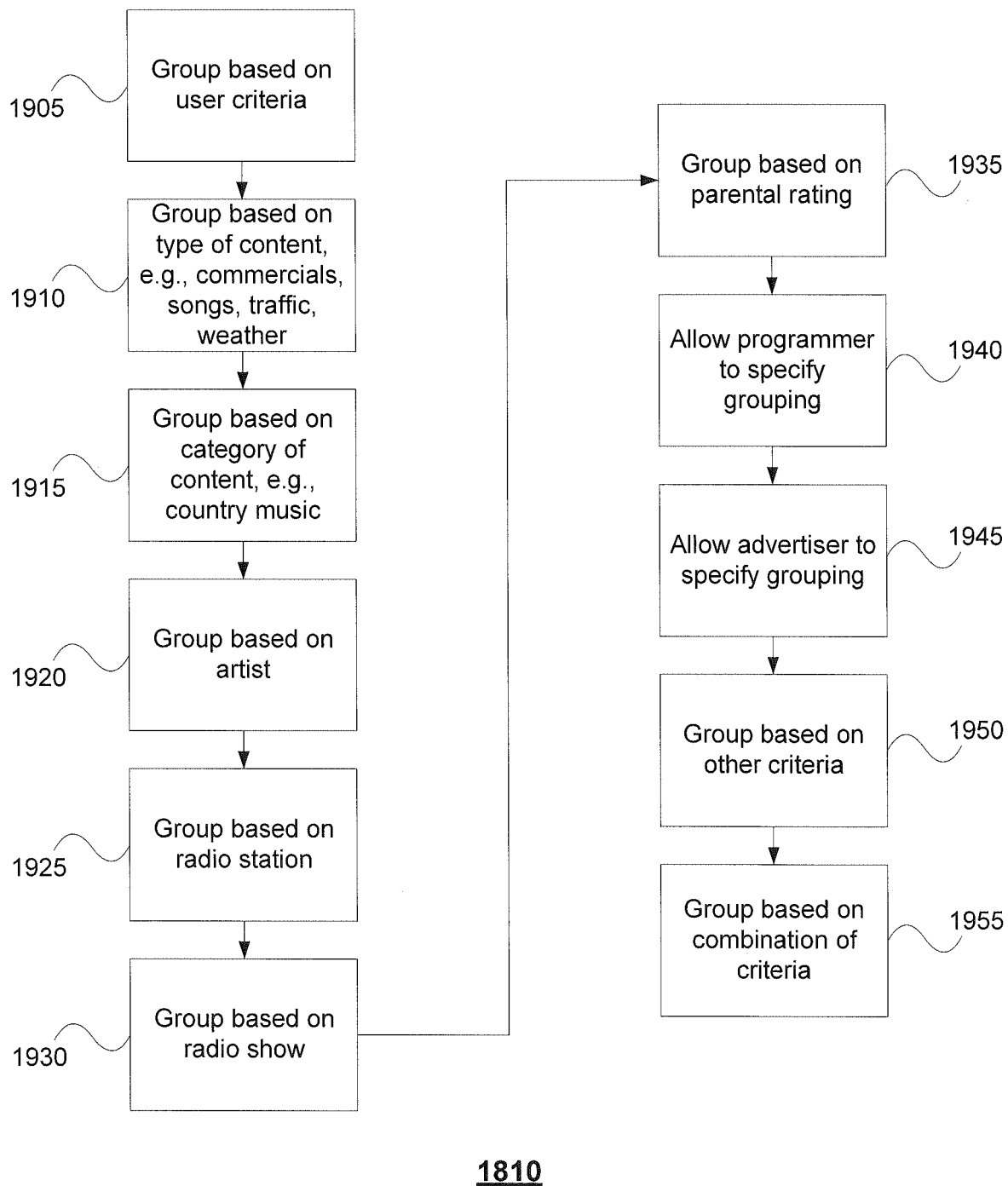

FIG. 19 shows more detail of step 1810, the grouping of items of audio content, and is illustratively discussed in conjunction with the block diagram of FIG. 3 and the embodiment of FIG. 6A. All steps in this process are optional, and may be performed in any suitable order. In step 1905, groups may be created based on user-specified criteria. For example, the user may enter criteria using keyboard 365, mouse 360, and monitor 370. In another embodiment, the user may specify criteria using buttons on front panel 610 and display 644. Criteria may be specified using voice input 648. Criteria may also be specified by allowing the user to indicate a specific item and creating a group based on a characteristic of the item.

In step 1910, a group may be based on type of content, such as grouping all commercials, all songs, etc. In step 1915, a group may be based on a category of content, such as bluegrass music, alternative rock, or other music genre. In step 1920, a group may be based on a specific performing artist, and may contain all songs performed by that artist. In step 1925, a group may be based a particular radio station, and may contain all content broadcast by that station. In step 1930, a group may be based on a specific radio show, and may contain all content broadcast in that show. In step 1935, a group may be based on a particular parental advisory level.

In step 1940, a programmer may be allowed to specify a grouping. For example, a radio station may decide to highlight and group a set of songs that may appeal to a subset of its listeners. In step 1945, an advertiser may be allowed to specify a grouping. For example, an advertiser may decide to group an ad with several songs that may appeal to a targeted subset of listeners.

In step 1950, other criteria may be used to specify a grouping. In step 1955, groups may be created based on multiple criteria. This may include excluding items that match a criteria, sets of items that meet specific criteria, and intersections of items that meet multiple criteria.

Figure 20:
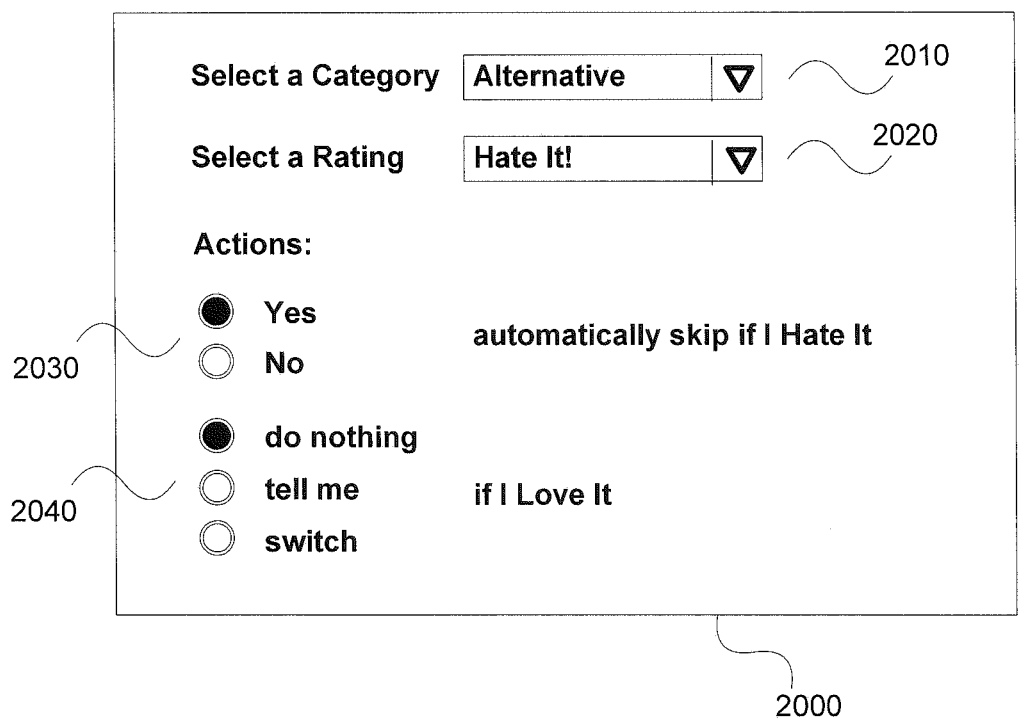
FIG. 20 is an illustrative display screen that may be used in the rating of groups of radio content in an ERS in accordance with one embodiment of the present invention.

FIG. 20 shows illustrative screen 2000 which may be displayed on monitor 370 (FIG. 3) to allow a user to configure a group. Pull-down list 2010 may allow the user to select a specific group, such as a genre of music. In this example, the user has selected alternative rock. Pull-down list 2020 may allow the user to enter a rating for the group. In this case, the user has specified that he or she hates alternative rock music. The system may allow the user to enter a preference for or against the group, as well level of interest. For example, the user may be allowed to specify a strong or weak like or dislike, or ambivalence toward the group.

Selections 2030 and 2040 may allow the user to specify what the system should do when it recognizes an item from the group. Specifically, selection 2030 allows the user to specify whether the system should automatically skip items in a group that the user does not like. Selection 2040 allows the user to specify whether the system should notify the user or automatically switch stations when it recognizes an item that the user likes.

FIG. 21 shows illustrative process 2100 for providing radio station recommendations to a user. All steps in this process are optional, and may be performed in any suitable order. For example, a user may be traveling in an unfamiliar region, and may be listening to the ERS in a personal or rental car. The user may wish to quickly and easily find stations that match her preferences.

In step 2110 of process 2100, the system may acquire information about the user's preferences. This step is explained in more detail in FIG. 22. In step 2120, the system may acquire information about available radio stations. This step is explained in more detail below, in conjunction with FIG. 23. In step 2130, the system may select one or more recommended stations from the set of available stations, based on the user preferences. This may be done, for example, correlating the play list from each station to the list of songs, artists, and genres selected as likes and dislikes by the user, and choosing the closest match or matches. For example, a score may be created for each station by adding a value for each match to a like and subtracting a value for each match to a dislike, with each value weighted by the level of like or dislike specified by the user. A higher value may be added for a music genre match, a lower value for an artist match, and a still lower value may be added for a song match. In step 2140, the system may present one or more of the recommended radio stations to the user. This step is explained in more detail below, in conjunction with FIG. 24.

FIG. 22 shows more detail of step 2110 of FIG. 21, acquiring user information. All steps in this sub-process are optional, and may be performed in any suitable order. In step 2210, the user may be allowed to enter user information. For example, a screen such as screen 2000 of FIG. 20 may be used by the user to specify likes and dislikes. In step 2220, the system may determine user information automatically by monitoring the content the user listens to. For example, the system may add points to a specific song, artist, genre, or other type of item or grouping, based on the user listening to an entire item. The system may assign additional points if the user rewinds or skips back to the start of an item to hear it in its entirety or to hear it again. The system may subtract points if the user skips over an item. In step 2230, the system may download user information. For example, the user may have entered preferences in a web site, and the system may access that web site using communications device 155 (FIG. 1) to obtain that information. The system may also download user information from another ERS that the user may have previously used. The system may alternatively load the user information from a portable memory device 440 (FIG. 4), such as a flash memory card, a smart card, a PDA, or the like, in step 2240. The user may have loaded the information into the portable memory device 440 from another ERS. Portable memory device 440 may be used to hold a user profile, and may be loaded into multiple ERSs as they are used by the user, so that the user preferences may be available in each location.

FIG. 23 shows more detail of step 2120, acquiring information about available radio stations, and is illustratively discussed in conjunction with the block diagram of FIG. 1. All steps in this sub-process are optional, and may be performed in any suitable order. In step 2310, the system may acquire information about available radio stations from information sent with the radio station the user is listening to. For example, information about the radio station may be embedded in the radio signal, and the system may extract that information and store it. The signal may also include information about other stations that the user is not listening to, but which may be available. The system may collect this information over time as it is sent to create a list of all available radio stations.

In step 2320, the system may acquire information about available radio stations using a radio receiver not currently being used to play the station the user is listening to. For example, the system may continuously scan the radio spectrum to find each receivable station. When a station is found, the system may read any information that may be embedded in the signal identifying the name of the station, the play list, the genres of music played, etc. Alternatively, the system may stay tuned to each station it finds for a period of time and check for any signatures that may match content the user's likes or dislikes.

In step 2330, the system may download a database of radio stations. The system may use communications device 155 (e.g., as shown in the block diagram of FIG. 4, modem 410, wireless transceiver 420, networking equipment 430, or portable memory 440). The system may download the database from a central server, a web site, another ERS, or other repository. The database may include, for example, a record for each radio station in the country. For each radio station, it may include the broadcast frequency, call letters, station format, list of artists and songs played (i.e., a play list), a schedule of programming, the geographical region served by the station, and any other relevant information.

In step 2340, the system may use global positioning system monitor 160 to determine the user's location. The location may also be determined by other means, such as by allowing a user to enter it, or by monitoring the radio stations that may be received and comparing them against the geographical region field in the radio station database.

In step 2350, the system may use the current location to filter the database of radio stations. For example, if the database includes a geographical region field for each station, the system may compare the current location with this field and exclude radio stations that do not serve the current location. If the ERS is used in a car, the system may also monitor the current route, or future routes that may be planned by the user, to determine if a radio station will be accessible for a significant period of time.

FIG. 24 shows more detail of step 2140, presenting the recommended radio stations to the user. All steps in this sub-process are optional, and may be performed in any suitable order. In step 2410, the system may display a list of recommended radio stations. For example, the list may be displayed on monitor 370 (FIG. 3) or display 644 (FIG. 6A). The user may be allowed to scroll or page through the list if it does not fit on a single display screen. In step 2420, the user may be allowed to select from the displayed list of radio stations, for example using mouse 360 (FIG. 3), keyboard 365 (FIG. 3), a button on front panel 610 (FIG. 6A), voice input 648 (FIG. 6A), or remote control 676 (FIG. 6C). When the user selects an item from the list, the system may immediately switch to that station, may display more information about the radio station, may assign the radio station to one of the enhanced radio presets, or may take other suitable action.

In step 2430, the system may automatically set one or more presets based on the set of recommended radio stations. For example, the system may set all available presets based on the stations which best match the user's preferences. The system may assign the single best station to a single preset. Or the system may allow the user to specify how many presets to assign automatically.

In step 2440, the system may automatically begin playing audio from one of the recommended radio stations. In step 2450, the system may automatically record content from one of the recommended stations. That may include continuously monitoring the station and storing its digitalized audio to a circular buffer.

FIG. 25 shows illustrative data structure 2500 for storing user preferences. It may include field 2510 for storing information about music formats the user likes. It may include field 2520 for storing information about music formats the user does not like. It may include field 2530 for storing information about talk formats the user likes. It may include field 2540 for storing information about talk formats the user does not like. It may include field 2550 for storing information about performing artists the user likes. It may include field 2560 for storing information about performing artists the user does not like. It may also include one or more fields 2570 for storing information about how the user's preferences change over time, for example if the user likes listening to different types of content on different days of the week or at different times of the day. All fields shown are optional, and other information relating to the user's preferences may be stored. If desired, the ERS may store the preferences for multiple users.

FIG. 26 shows illustrative data structure 2600 for storing information about a radio station, for example in a radio station database. Field 2610 may store the station call letters or other identifying name. Field 2620 may store the format of the radio station, for example as a text string, or as a selection from a table of known formats. Field 2630 may store a list of performing artists typically played by the station. Field 2640 may include a schedule of programs airing on the radio station. Field 2650 may include information about the geographical region served by the radio station. Field 2660 may store the broadcast frequency, or other information necessary for receiving the station. Field 2670 may include the telephone number of the radio station. All fields shown are optional, and other fields may be included in the radio station database as desired.

FIG. 27 shows illustrative display screen 2700 which may be used to present recommended radio stations to a user. Recommended station list 2790 may be presented to the user. If more stations are recommended than will fit onto a single screen, the system may allow the user to scroll or page to view additional selections. Each selection may include information such as broadcast frequency 2710, call letters 2720, and station format 2730. Each selection may also include on-screen buttons 2740 that may be selected by the user to immediately start listening to the station, buttons 2750 to view a schedule of programming on the station, and buttons 2760 to view a play list for the station. Other items may be shown on screen 2700 as well. This screen may be displayed in different formats depending on the characteristics of display device 150 and user controls 140 of FIG. 1.

Figure 28A:
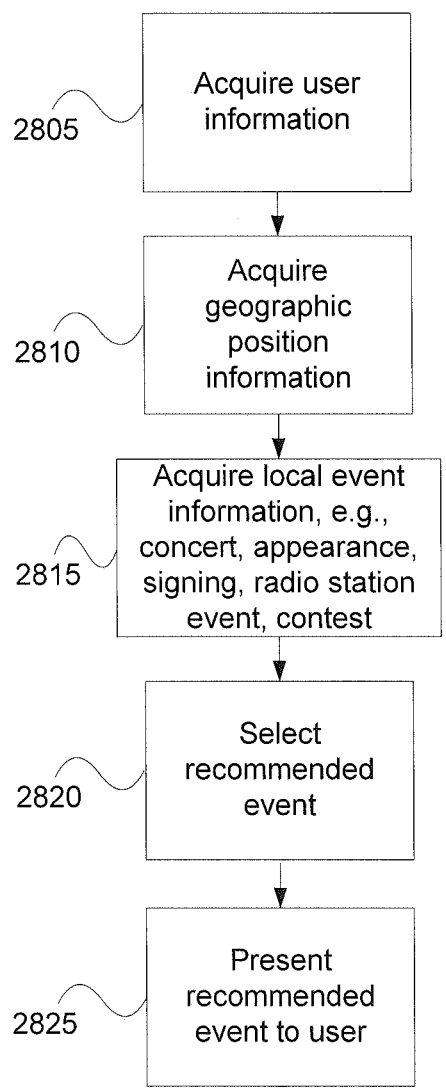
FIG. 28A and FIG. 28B are illustrative flowcharts showing steps related to recommending local events and facilities in an ERS in accordance with embodiments of the present invention.

FIG. 28A shows illustrative process 2800 for recommending local events to a user, and is illustratively discussed in conjunction with FIG. 1. The steps of this process may be performed in any suitable order, and any steps may be omitted if desired. In step 2805, the system may acquire user information, such as user preferences. Flowchart 2110 of FIG. 22, discussed above, shows an illustrative process for acquiring user preferences. In step 2810, the system may acquire geographic position information, for example using global positioning system monitor 160, or by monitoring which radio stations are available and comparing them with a database of radio stations and geographical regions served by them. In step 2815, the system may acquire information about local events. Events may include concerts, celebrity appearances, signings, radio station events, contests, etc. Event information may be acquired using communications device 155. In step 2820, the system may select one or more recommended events. Events may be selected by comparing information about each event with user information, and selecting events that most closely match user preferences. In step 2825, the system may present one or more recommended events to the user, for example on display device 150.

Figure 28B:
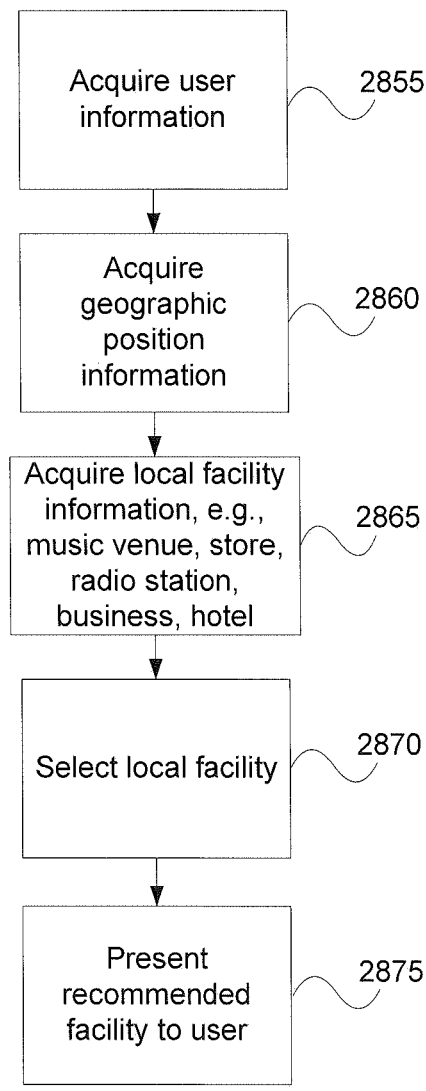

FIG. 28B shows illustrative process 2850 for recommending local facilities to a user, and is illustratively discussed in conjunction with FIG. 1. The steps of this process may be performed in any suitable order, and any steps may be omitted if desired. In step 2855, the system may acquire user information, such as user preferences. Flowchart 2110 of FIG. 22, discussed above, shows an illustrative process for acquiring user preferences. In step 2860, the system may acquire geographic position information, for example using global positioning system monitor 160, or by monitoring which radio stations are available and comparing them with a database of radio stations and geographical regions served by them. In step 2865, the system may acquire information about local facilities. Facilities may include concert venues, tourist attractions, radio stations, stores, hotels, restaurants, other local businesses, etc. Facility information may be acquired using communications device 155. In step 2870, the system may select one or more recommended facilities. Facilities may be selected by comparing information about each facility with user information, and selecting facilities that most closely match user preferences. In step 2875, the system may present one or more recommended facilities to the user, for example on display device 150.

Figure 29A:
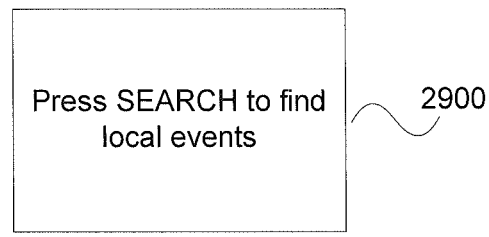
FIG. 29A and FIG. 29B are illustrative display screens that may be used in the recommending of local events in an ERS in accordance with embodiments of the present invention.
Figure 29B:
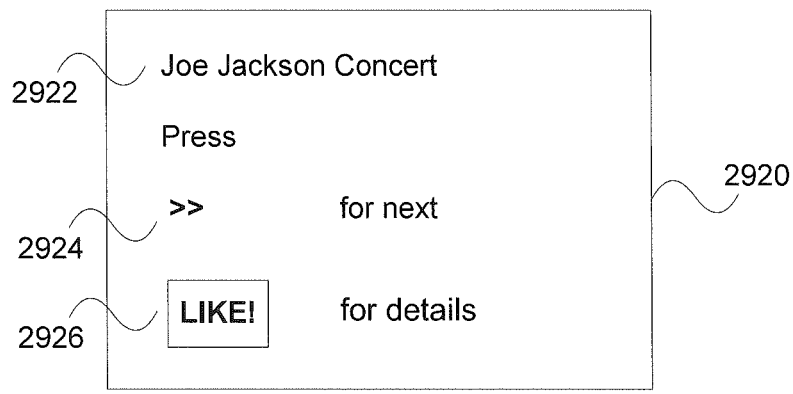

FIGS. 29A and 29B show illustrative display screens 2900 and 2920 for recommending local events to a user listening to an ERS in an automobile, and are discussed illustratively in conjunction with FIG. 6A. Screen 2900 may be shown on display 644 when the user indicates a desire to find local events. The user may be prompted to press a button, such as SEARCH button 622, to begin the search. In display screen 2920, the first search result may be displayed. The Joe Jackson concert 2922 may be recommended because the user has a preference for that performing artist. The system may also display prompt 2924 to press FAST-FORWARD button 630 to advance to the next search result, and display prompt 2926 to press LIKE button 638 to view information about the event. Displayed information may include date and time, location, price, where to buy tickets, a phone number to obtain additional information, directions to the concert venue, or other appropriate information. The system may also display a prompt allowing the user to buy one or more tickets interactively. Local facility information may be similarly shown on display 644.

Figure 30:
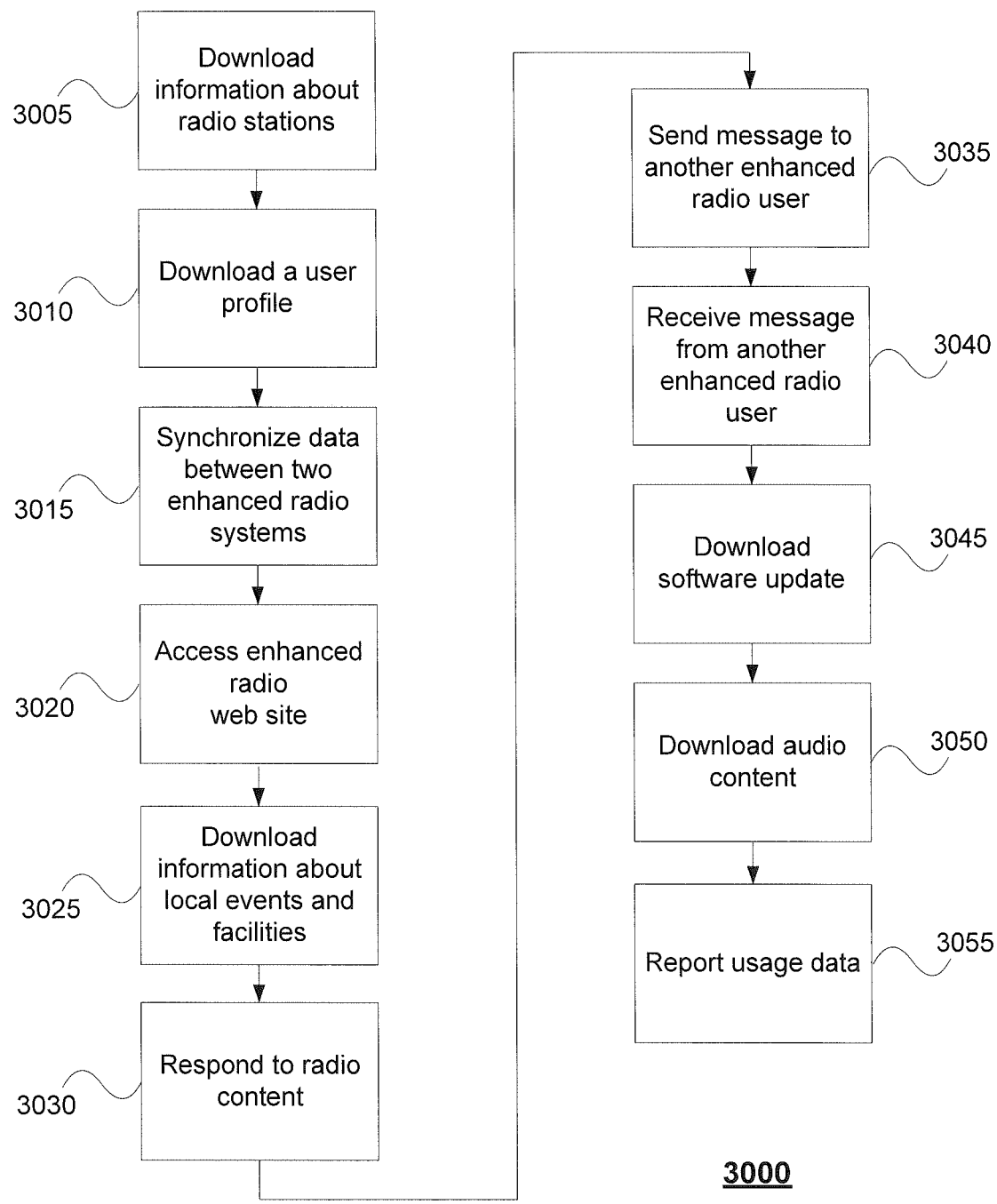
FIG. 30 is an illustrative flowchart showing steps related to communication features in an ERS in accordance with one embodiment of the present invention.

FIG. 30 shows flowchart 3000 of a process to provide communication features in an ERS, and is discussed illustratively in conjunction with FIG. 1. Any steps from this process may be performed in any suitable order if desired and any of the steps may be omitted. The system may use communications device 155 to provide these features. In step 3005, the system may download information about radio stations, such as a radio station database. In step 3010, the system may download a user profile, which may include user preferences and other user information. In step 3015, the system may synchronize data between two ERSs, for example by copying user preferences, station presets, and other information from one system to the other. In step 3020, the system may access an enhanced radio web site to perform functions such as retrieve data, upload data, or present a web page to the user. In step 3025, the system may download information about local events and local facilities. In step 3030, the system may allow a user to respond to radio content, such as automatically telephoning a radio station or advertiser. In step 3035, the system may allow the user to send a message to another enhanced radio user. In step 3040, the system may receive a message from another enhanced radio user and present the message to the user. In step 3045, the system may download a software update. In step 3050, the system may allow a user to download a song or other audio content to store in memory 120 and play back later. In step 3055, the system may report usage data to a central facility.

Figure 31:
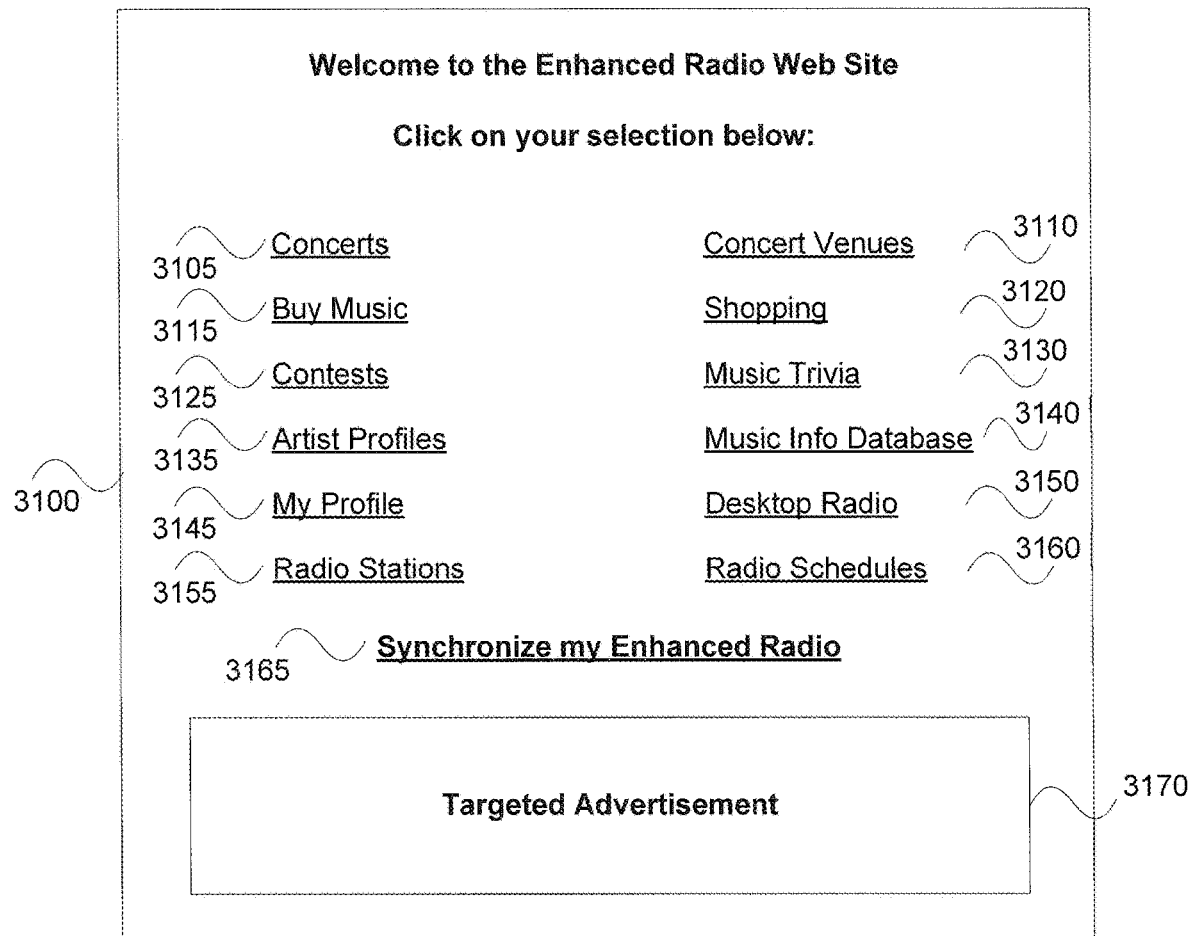
FIG. 31 is an illustrative display screen that may be used in an enhanced radio web site in an ERS in accordance with one embodiment of the present invention.

FIG. 31 shows illustrative enhanced radio web page 3100. A user may be able to access web page 3100 using a web browser running on computer 355, and it may be displayed on monitor 370 of FIG. 3. Web page 3100 may include link 3105 to view concert information and purchase concert tickets. Link 3110 may allow a user to view information about concert venues. Link 3115 may allow the user to purchase CDs or other music products. Link 3120 may allow the user purchase other products. Link 3125 may allow the user to enter a contest. Link 3130 may allow the user to play a music trivia game. Link 3135 may allow the user to view profiles of performing artists. Link 3140 may allow the user to access a music information database. Link 3145 may allow the user to define his profile, including songs, artists, genres, and radio stations that he likes and doesn't like. Link 3150 may allow the user to access a desktop radio feature, to listen to music on the computer. Link 3155 may allow the user to access a database of radio stations. Link 3160 may allow the user to view schedules of programs on radio stations. Link 3165 may allow the user to synchronize user information and other data with an ERS. Advertisement 3170 may be targeted based on user preferences and history. These links are merely illustrative. Other links may be provided if desired. Other web page designs are also possible.

Figure 32A:
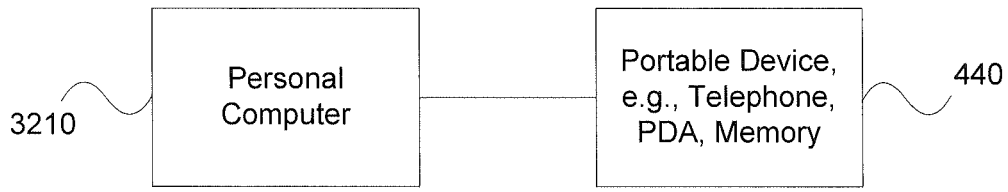
FIG. 32A and FIG. 32B are illustrative block diagrams showing how a portable device may be used with a computer and an ERS in accordance with embodiments of the present invention for downloading data.
Figure 32B:
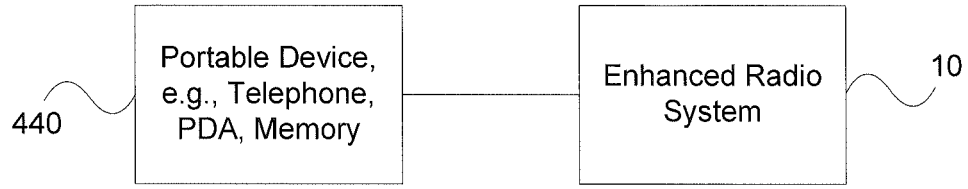

FIGS. 32A and 32B are block diagrams showing how an ERS may synchronize data with another ERS or with an enhanced radio web site. In FIG. 32A, personal computer 3210 may be connected to portable memory device 440 of FIG. 4. The memory device may be a flash memory card, a smart card, a mobile telephone, a PDA, or other such device. Personal computer 3210 may connect to memory device 440 via any appropriate connection, such as serial port, infrared, universal serial bus (USB), PC Card bus, or any other suitable connection. Information, such as a user profile, station presets, a radio database, radio station schedules, event information, facility information, music information (e.g., audio signatures, information about songs, artists, genres, etc.), or other such information, may be transferred over the connection from personal computer 3210 to portable memory device 440.

As shown in FIG. 32B, portable memory device 440 may subsequently connect to an ERS. The connection may be any appropriate connection, such as PC Card bus, serial port, USB, or infrared. The information previously loaded from personal computer 3210 into memory device 440 may be loaded into an ERS.

If desired, information may be loaded from an ERS to personal computer 3210 using portable memory device 440. If desired, information may be loaded from one ERS to another ERS using portable memory device 440.

Figure 33A:
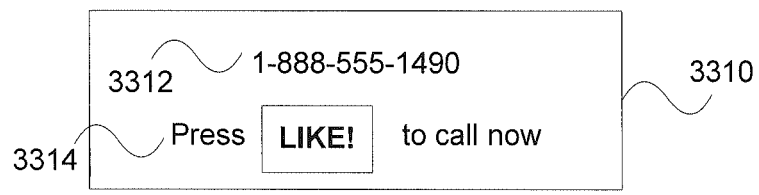
FIGS. 33A through 33C are illustrative display screens that may be used in a radio response feature in the ERS in accordance with embodiments of the present invention.
Figure 33B:
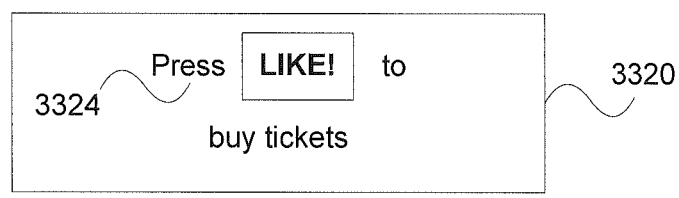
Figure 33C:
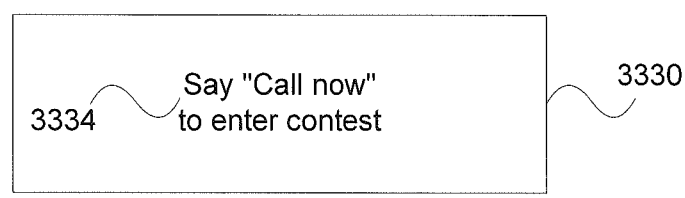

FIGS. 33A through 33C show illustrative screens that may be shown on display device 150 (FIG. 1) as part of a two-way response feature. Such a feature may assist a user in responding to radio content, such as a commercial, a contest, a call-in show, a concert promotion, or the like. This feature may use a mobile telephone connected to an ERS, or other communications device 155 (FIG. 1). In screen 3310 of FIG. 33A, the user may be provided a telephone number 3312 to respond to radio content. The user may also be prompted 3314 to press a button to initiate a direct connection. In the case that the user presses the prompted button, the system may automatically dial the telephone (e.g., the mobile phone in the user's car), and make the voice connection through voice input 648 and car speakers 608 of FIG. 6A. The radio content may be paused or muted while the connection is in progress.

In screen 3320 of FIG. 33B, the user may be prompted 3324 to press a button to purchase concert tickets, which may have been promoted on the radio. If the user presses the specified button, the system may transmit the request for tickets to a ticket vending service, and display the response on display device 150.

Screen 3330 of FIG. 33C shows a prompt 3334 for the user to speak a specific command to enter a contest that may have been promoted on the radio. If the user speaks the specified command, the contest entry may be transmitted to the contest facility, and a confirmation may be shown on display device 150.

Figure 34:
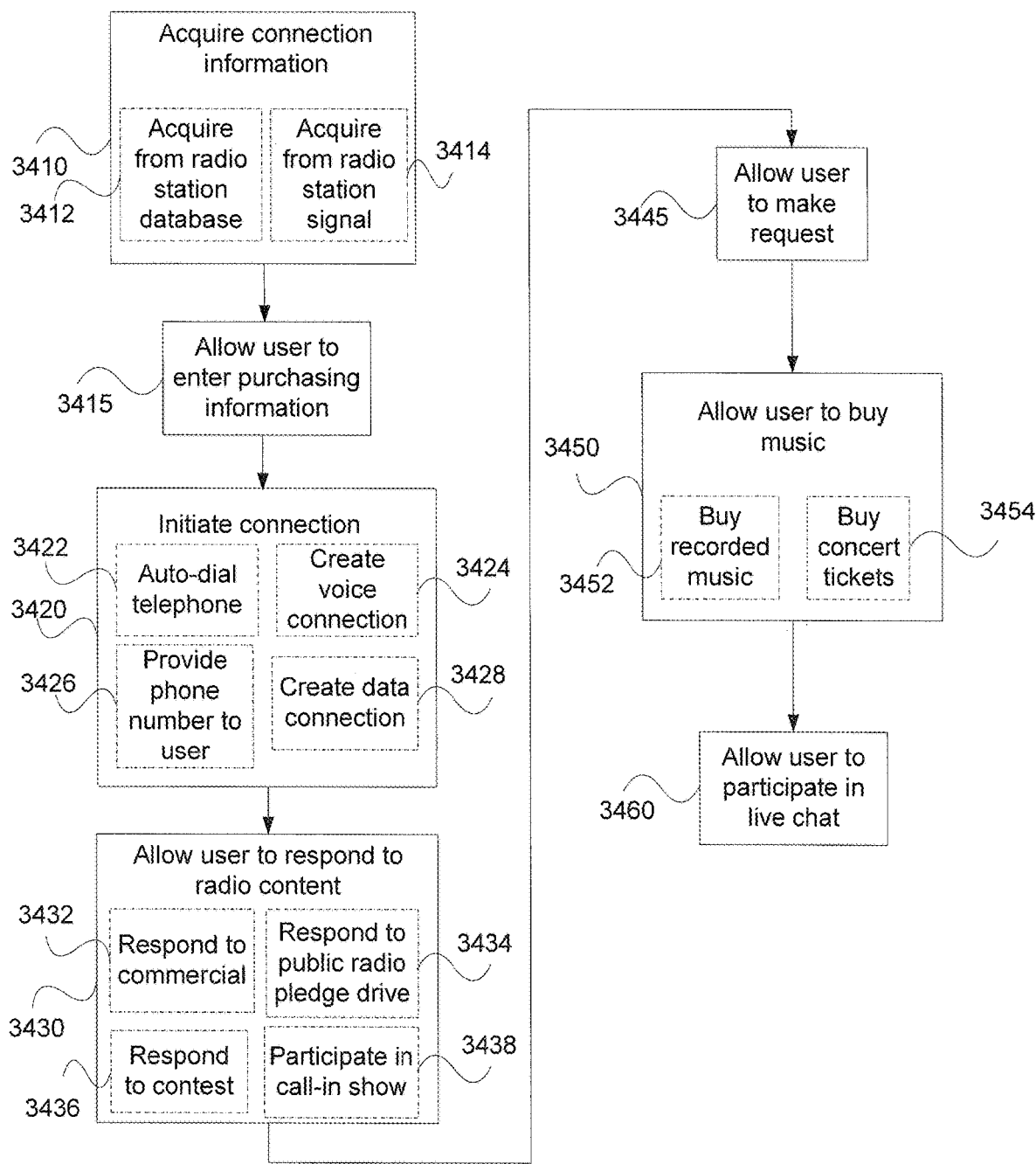
FIG. 34 is an illustrative flowchart showing steps related to providing a radio response feature in the ERS in accordance with one embodiment of the present invention.

Flowchart 3400 of FIG. 34 shows a process for providing a radio response feature in an ERS. If desired, any of the steps of this process may be omitted or performed in any suitable order. In step 3410, the system may acquire connection information, e.g., information on how to create a communications connection with an external service. The information may include, for example, a phone number, a web address, or other information needed to create a connection with the external service. In substep 3412, the information may be found in a radio station database. In substep 3414, the information may be acquired from the radio signal. The information may be acquired from a source other than the radio signal, such as communications device 155 (FIG. 1). Alternatively, the information may be hand entered by the user.

In step 3415, the user may be allowed to enter information to allow remote purchasing including payment information, shipping addresses, contact information, and any other information that may be requested or required. This information may be entered offline, for example at a web site or on a personal computer, and loaded into the ERS. Alternatively, the purchasing information may be entered directly into the ERS.

In step 3420, the system may initiate a connection with the external service. This may include auto-dialing a telephone in substep 3422, providing a telephone number to the user (e.g., on display device 150 (FIG. 1)) in substep 3426, creating a voice connection (e.g., using voice input 648 and speakers 608 of FIG. 6A) in substep 3424, or creating a data connection in substep 3428. Any of a number of features may be provided over the connection.

In step 3430, the system may allow the user to respond to radio content. In substep 3432, the system may allow the user to respond to a commercial. For example, an offer may be mentioned in the audio of the commercial, and listeners may be invited to call in. The phone number for the advertiser may be broadcast as part of the radio signal and received by the ERS. The system may auto-dial the advertiser and allow the user to respond to the offer.

In substep 3434, the system may allow the user to respond to a public radio pledge drive. For example, the user may wish to become a listener-member, to make a pledge, or to respond in another way to a pledge drive solicitation.

In substep 3436, the system may allow the user to respond to a contest. For example, a contest may be mentioned on the radio, and listeners may be invited to call in. The phone number to enter the contest may be broadcast as part of the radio signal and received by the ERS. The system may auto-dial the radio station and allow the user to enter the contest.

In substep 3438, the system may allow the user to participate in a call-in show. For example, listeners may be invited to call in to a radio show. The radio station phone number may be retrieved from a radio station database. The system may display the phone number for the radio station on display device 150 (FIG. 1). Similarly, the system may allow the user to make a song request to a radio station by auto-dialing the radio station or displaying the radio station phone number for the user.

In substep 3445, the system may allow the user to make a request. For example, the user may indicate a desire to make a song request using user controls 140 (FIG. 1). The system may automatically dial the telephone number for the radio station and make an audio connection between the user and the radio station.

In step 3450, the user may be allowed to purchase music. This may include buying recorded music in substep 3452 or buying concert tickets in substep 3454. The system may acquire a web address from the radio signal or radio station database, and create a data connection with a web site offering the music for sale. The system may translate input commands from user controls 140 into web commands (e.g., HTTP (Hypertext Transfer Protocol) messages) that may be sent to the web server. Confirmation may be displayed on display device 150.

In step 3460, the user may be allowed to participate in a live chat. The system may create a voice link by auto-dialing a radio station, and allow the user to participate in the chat using voice input 648 and speakers 608 (FIG. 6A).

While any voice response feature is active, the system may automatically mute or lower the volume of the radio signal. Alternatively, the system may automatically pause the incoming radio signal for the duration of the voice interaction.

Figure 35:
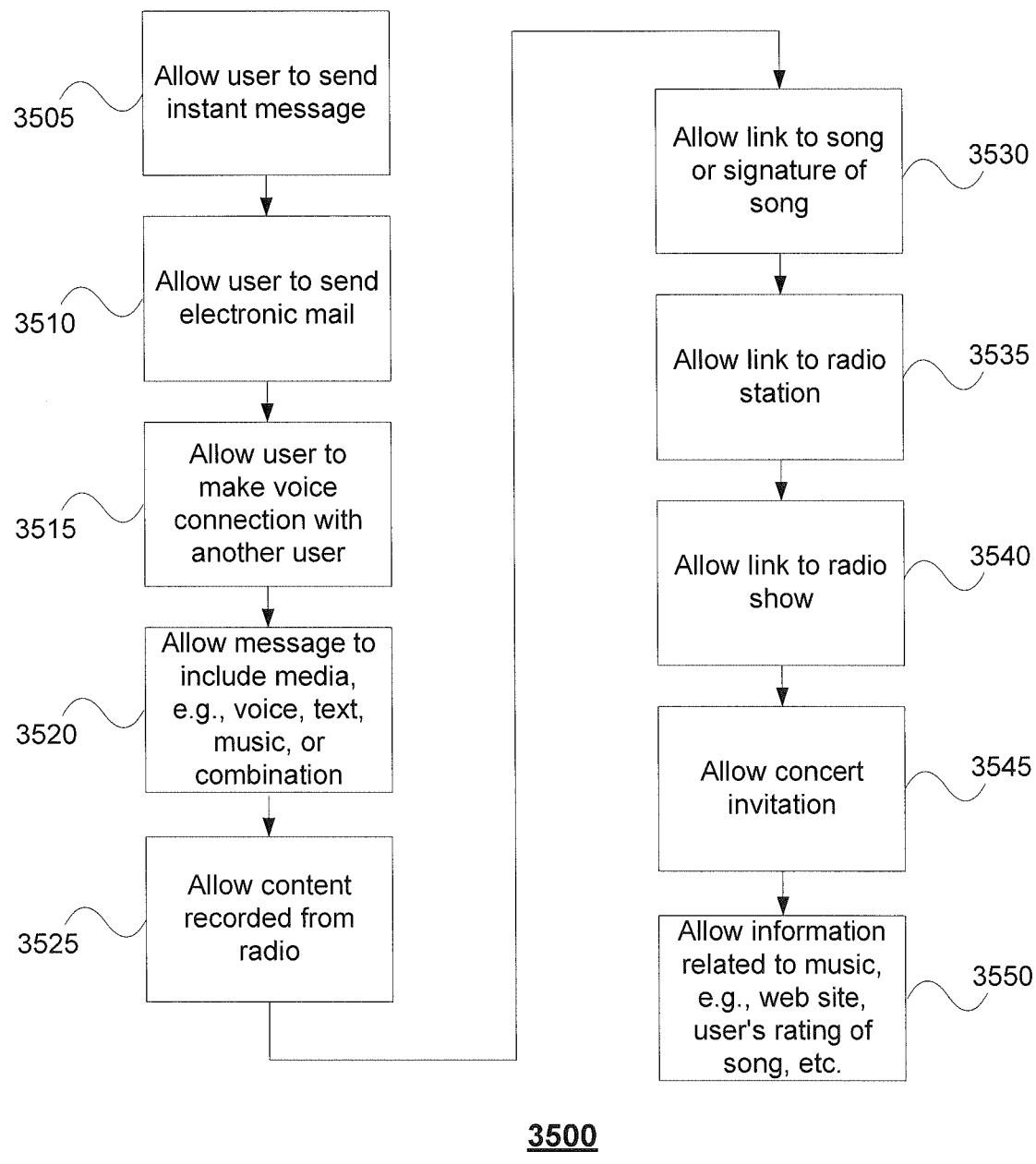
FIG. 35 is an illustrative flowchart showing steps related to providing a user message feature in the ERS in accordance with one embodiment of the present invention.

FIG. 35 shows flowchart 3500 of an illustrative process for allowing the user to send a message to a user of another ERS. Any suitable subset of these steps may be performed in any suitable order. In step 3505, the user may be allowed to send an instant message to another user, which the other user may receive and listen to or view immediately. In step 3510, the user may be allowed to send an electronic mail message to another user, which the other user may receive and listen to or view at a later time. In step 3515, the system may create a voice connection between the two users. In any of these cases, the system may allow the user to specify an electronic address or name for the other user. The system may also allow the user to maintain a list of other users to make sending messages simpler.

In step 3520, the user may be allowed to include media with the message. This may include text entered by the user, a music clip, a voice message recorded by the user, or any combination of these and other types of media. In step 3525, the system may allow the media to be content recorded from a radio station by the ERS. In step 3530, the system may allow the user to include a link to a song or other content. The link may be a name, a unique identifier, an audio signature, or other types of links or combinations of such links. In step 3535, the system may allow the user to include a link to a radio station, such as a broadcast frequency or set of call letters. In step 3540, the system may allow the user to include a link to a radio show, which may include a link to the station airing the show and the name or broadcast time of the show. When the other user receives a link to a song, station, show, or other item, the other user's ERS may allow him or her to easily access that item based on the information sent in the message. In step 3545, the system may allow the user to include a concert invitation. The invitation may include information about the concert automatically filled in by the system. The system may allow the user to purchase a concert ticket or other item for the other user and send a confirmation to the other user. In step 3550, the system may allow the user to attach any other information related to music or radio. This may include, for example, a web site, the user's rating for a song, information from a database about a song, artist, or radio station, or other suitable information.

Figure 36A:
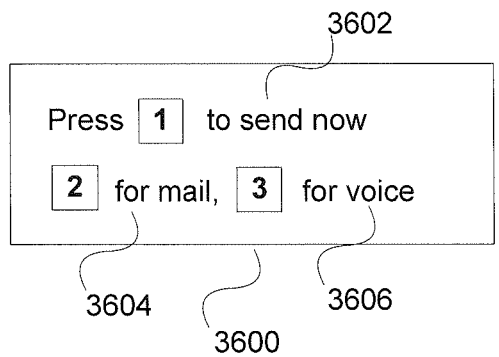
FIGS. 36A through 36F show illustrative display screens that may be used in providing a user message feature in the ERS in accordance with embodiments of the present invention.

FIGS. 36A though 36F show illustrative display screens for allowing a user to send a message to another user, and are illustratively discussed in conjunction with the embodiment of FIG. 6A. These display screens may be shown on display 644. Display screen 3600 of FIG. 36A may be shown when the user chooses to send a message. It may include option 3602 to send an instant message, option 3604 to send an electronic mail message, and option 3606 to create a voice connection. The user may select an option, for example, by pressing the indicated button on front panel 610 or remote control 676 (FIG. 6C), or by speaking a command using voice input 648.

Figure 36B:
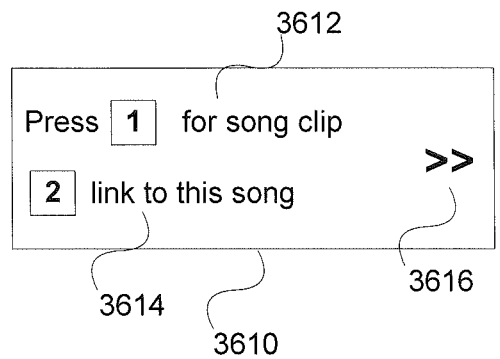

Once the user selects an option from screen 3600, for example option 3604 for an electronic mail message, the system may show display screen 3610 of FIG. 36B. This screen may include option 3612 for including a song clip with the message. It may include option 3614 for including a song link with the message. It may also include indicator 3616 instructing the user to press FAST-FORWARD button 630 to advance to the next screen.

Figure 36C:
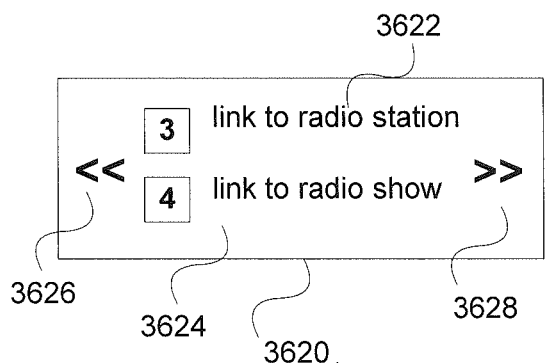

Display screen 3620 of FIG. 36C may include option 3622 for including a link to the current radio station. It may include option 3624 for including a link to the current radio show. And it may include indicators 3626 and 3628 instructing the user to press REWIND button 626 to return to the previous screen or FAST-FORWARD button 630 to advance to the next screen.

Figure 36D:
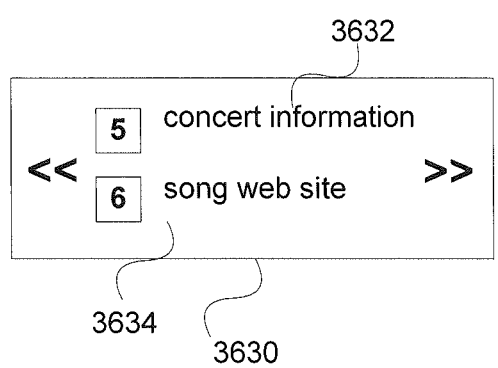
Figure 36E:
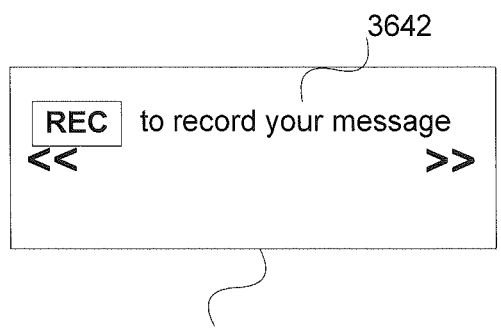

Display screen 3630 of FIG. 36D may show option 3632 for including concert information with the message. It may include option 3634 for including a song web site with the message. Display screen 3640 of FIG. 36E may include option 3642 for recording a voice segment to include with the message.

Figure 36F:
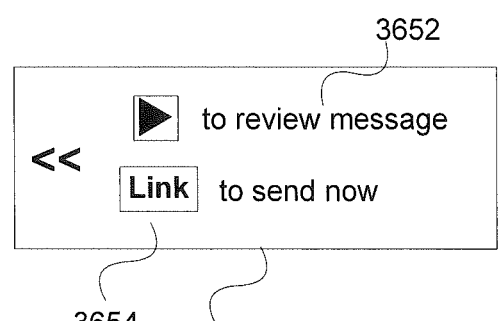

Display screen 3650 of FIG. 36F may include option 3652 allowing the user to review the message that has just been created. It may also include option 3654 to allow the user to send the message to the other user.

The display screens and options shown in these figures are merely illustrative. Other display screens and options may be shown.

FIG. 37 shows flowchart 3700 of an illustrative process to collect and report enhanced radio usage data. The steps of this process may be performed in any suitable order, and any steps may be omitted if desired. In step 3710, the system may collect information on radio stations that the user listens to. The information may include information on days and times that stations were listened to. It may also include information on particular songs, commercials, shows, and other content that the user may have actually heard, as well as indications of content the user may have skipped over.

In step 3720, the system may collect information on enhanced radio features accessed by the user. For example, the system may log each feature used, and the day and time the feature was selected.

In step 3730, the system may combine and filter the information to reduce the total amount of data. The information may be combined and summarized, and information may be filtered out based on the end purpose for the data. Personal data may be removed for privacy reasons. In step 3740, the information may be sent to a central facility for analysis, using communications device 155 (FIG. 1).

FIG. 38 shows illustrative flowchart 3800 of a process to provide a karaoke feature, and is discussed illustratively in conjunction with the block diagram of FIG. 1. The steps of this process may be performed in any suitable order, and any steps may be omitted if desired. In step 3810, the system may receive the vocal portion of the audio from a radio station separately from the rest of the audio signal. Alternatively, the radio station may transmit information indicating the frequencies used for the vocal portion of the audio. In step 3820, the system may receive the lyrics for a song. The lyrics may be received as part of the radio signal along with the audio signal for the song. Alternatively, the system may acquire the lyrics separately using communications device 155. In step 3830, the system may indicate the availability of the karaoke feature to the user when the incoming radio signal supports it, for example on display device 150. In step 3840, the system may allow the user to select karaoke mode, for example with user controls 140. In step 3850, the system may remove the vocal portion of the audio. It may simply ignore the portion of the incoming signal with the vocal, or it may perform a filter on the signal to remove the vocal frequencies. Preferably, the vocal should be removed as the audio is read from memory 120. This will allow the vocal (and lyrics) to be stored in memory, and accessed later. For example, the user may alternately listen to the audio both with and without lyrics. In step 3860, the lyrics may be displayed, for example on display 644 (FIG. 6A) or monitor 370 (FIG. 3).

Figure 39:
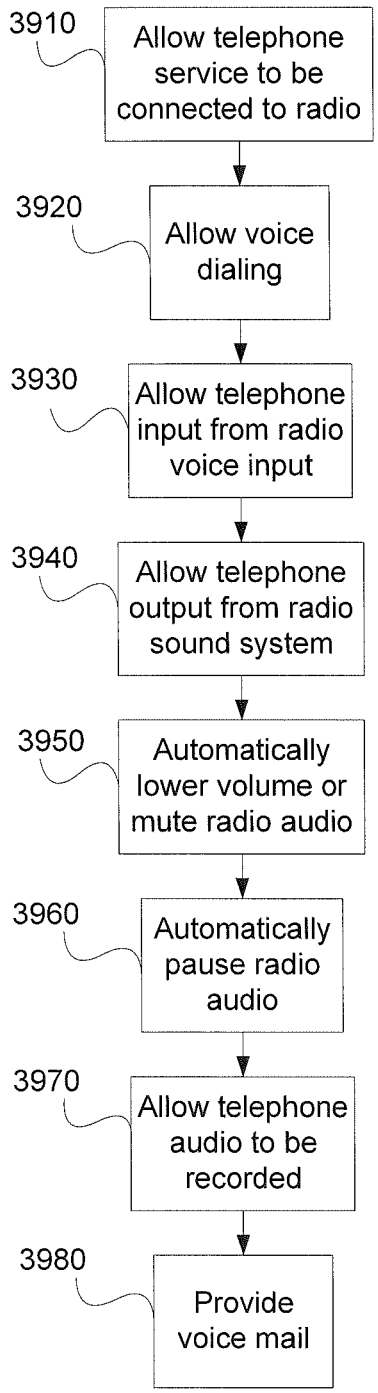
FIG. 39 is an illustrative flowchart showing steps for integrating radio and telephone functions in the ERS in accordance with one embodiment of the present invention.

FIG. 39 shows flowchart 3900 of an illustrative process for providing an integrated telephone feature, and is discussed illustratively in conjunction with the block diagram of FIG. 6A. The steps of this process may be performed in any suitable order, and any steps may be omitted if desired. In step 3910, the system may allow a telephone service to be connected to the ERS. For example, a mobile telephone may be connected to the system. Alternatively, the system may be connected to a wired telephone line.

In step 3920, the system may allow voice dialing. The user may be allowed to create a list of common telephone numbers. The user may be allowed to dial using a voice command using voice input 648. The user may also be allowed to dial using buttons on front panel 610, remote control 676 (FIG. 6C), or other user controls.

In step 3930, the system may accept telephone input from voice input 648. In step 3940, the system may send telephone output to audio output 130 (FIG. 1). The system may also perform signal canceling based on the telephone output to prevent audio feedback or echoes. In step 3950, the system may automatically lower the volume of the radio signal or mute the radio signal while a telephone call is in progress. In step 3960, the system may automatically pause the radio signal for the duration of the telephone call.

Other telephone features may also be supported. For example, in step 3970, the system may allow a telephone call to be recorded into memory 120 (FIG. 1). In step 3980, the system may provide a voice mail feature, using a recorded message from memory 120, and recording the incoming call into memory 120.

Figure 40:
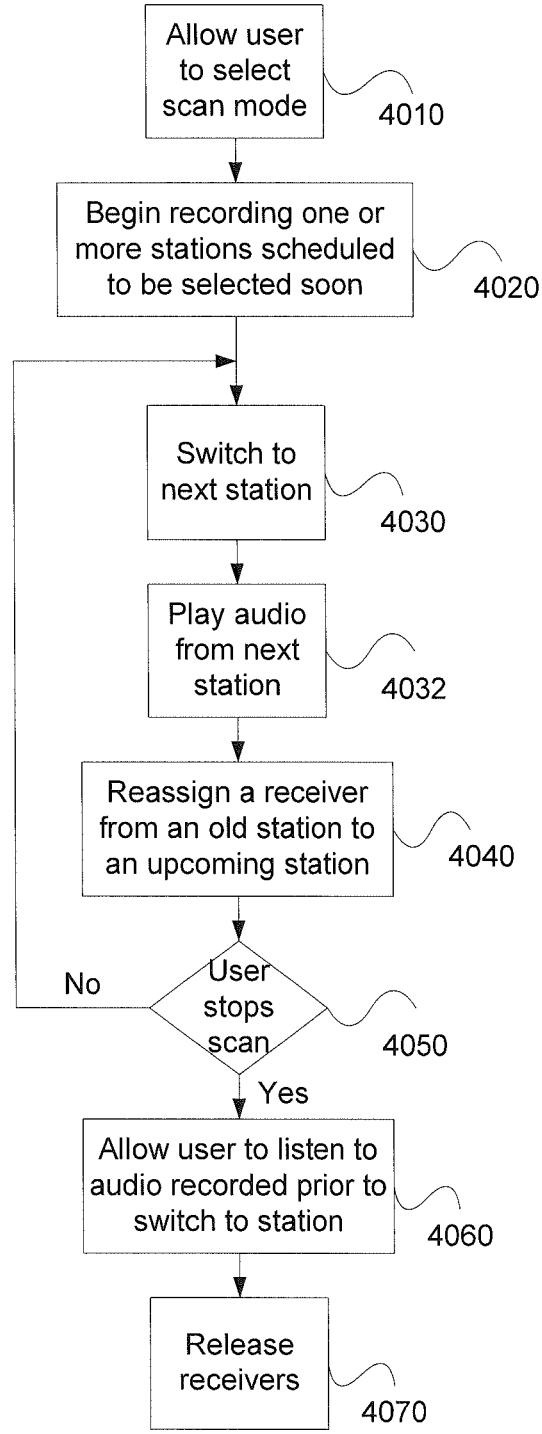
FIG. 40 is an illustrative flowchart showing steps for providing a scan feature in the ERS in accordance with one embodiment of the present invention.

FIG. 40 shows a flowchart 4000 of an illustrative process for providing an enhanced radio scan feature, and is illustratively discussed in conjunction with the embodiment of FIG. 6A. Any steps of this process may be omitted if desired, and may be performed in any suitable order. In step 4010, the user may be allowed to initiate scan mode. For example, the user may press SCAN button 620 on front panel 610 or remote control 676 (FIG. 6C). In step 4020, the system may begin recording one or more stations scheduled to be selected soon. For example, the system may assign five receivers to the scan feature. One receiver may be assigned to the currently selected station, and the other four receivers may be assigned to the four stations to be selected next. The system may use these four receivers to scan for stations in advance of when they will be played for the user.

In step 4030, the system may switch to the next radio station. This includes substep 4032 of playing audio from the next station. That may involved simply switching from the buffer being used to provide audio to the audio output device to the buffer being used to collect data from the second receiver. In step 4040, a receiver may be reassigned from an old station to an upcoming station. For example, the receiver being used to receive the most recent station may be used to scan and find the next available station. Alternatively, if the system is configured to record audio from the most recently listened radio station, the system may use the receiver that was being used for the second-most recent station.

In step 4050, the user may be given the opportunity to stop the scan, for example by pressing SCAN button 620 a second time. If the user does not stop the scan, the system may pause a short period of time (e.g., a second or two), and repeat step 4030, scanning to the next station. If the user does stop the scan, the system will not scan to the next station. The user may be given the opportunity to listen to audio that was broadcast prior to when the audio for the final station began playing, in step 4060. In step 4070, the system may reassign the receivers and buffers used to provide the scan feature to be used for other purposes. If desired, the system may wait a period of time in case the user decides to resume scanning.

If desired, the user may be allowed to scan in either direction (i.e., through higher radio frequencies or lower radio frequencies). The user may also be allowed to scan across multiple radio sources (e.g., both Internet and radio frequency broadcasts).

Figure 41:
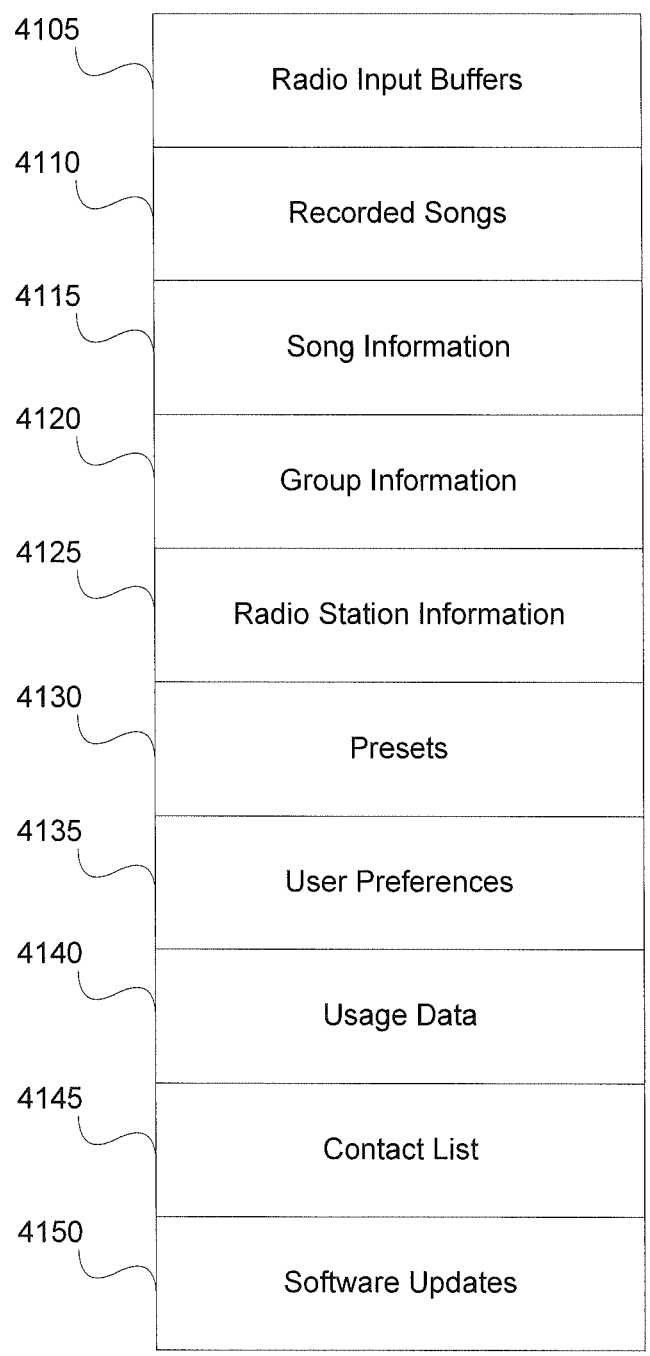
FIG. 41 is an illustrative memory map for one embodiment of the ERS in accordance with one embodiment of the present invention.

FIG. 41 shows illustrative memory map 4100 of data stored in memory 120 (FIG. 1). Radio input buffers 4105 may be used to store the most recent radio inputs received from one or more radio stations. This area of memory may be assigned dynamically, with different radio stations having buffers of different sizes. A new area of memory may be allocated when a radio receiver is tuned to a new station, and the area may be increased or decreased in size as the user selects or deselects the station or performs other functions.

Memory region 4110 may be used for stored songs and other content recorded from the radio or downloaded using communications device 155 (FIG. 1). Memory region 4115 may store information about songs and other audio segments, such as names, identifiers, audio signatures, etc. Memory region 4120 may be used to store information about different groups of content, such as artists or genres of music. Memory region 4125 may store information about radio stations. Memory region 4130 may store radio station presets. Memory region 4135 may store other user preferences. Memory region 4140 may store automatically collected usage information, such as stations the user has listened to and features the user has accessed. Memory region 4145 may store a user's contact list for a messaging or telephone feature. Memory region 4150 may be used to store software updates for the system. This memory map is merely illustrative. Other organizations of memory are possible.

Some of the memory may be volatile (subject to loss if the power is lost) and some may be nonvolatile (maintained when the power is lost). It may be desirable to store some information, such as radio input buffers, in volatile memory, and to store other information, such as user preferences, in nonvolatile memory. If desired, all memory may be nonvolatile.

Figure 43:
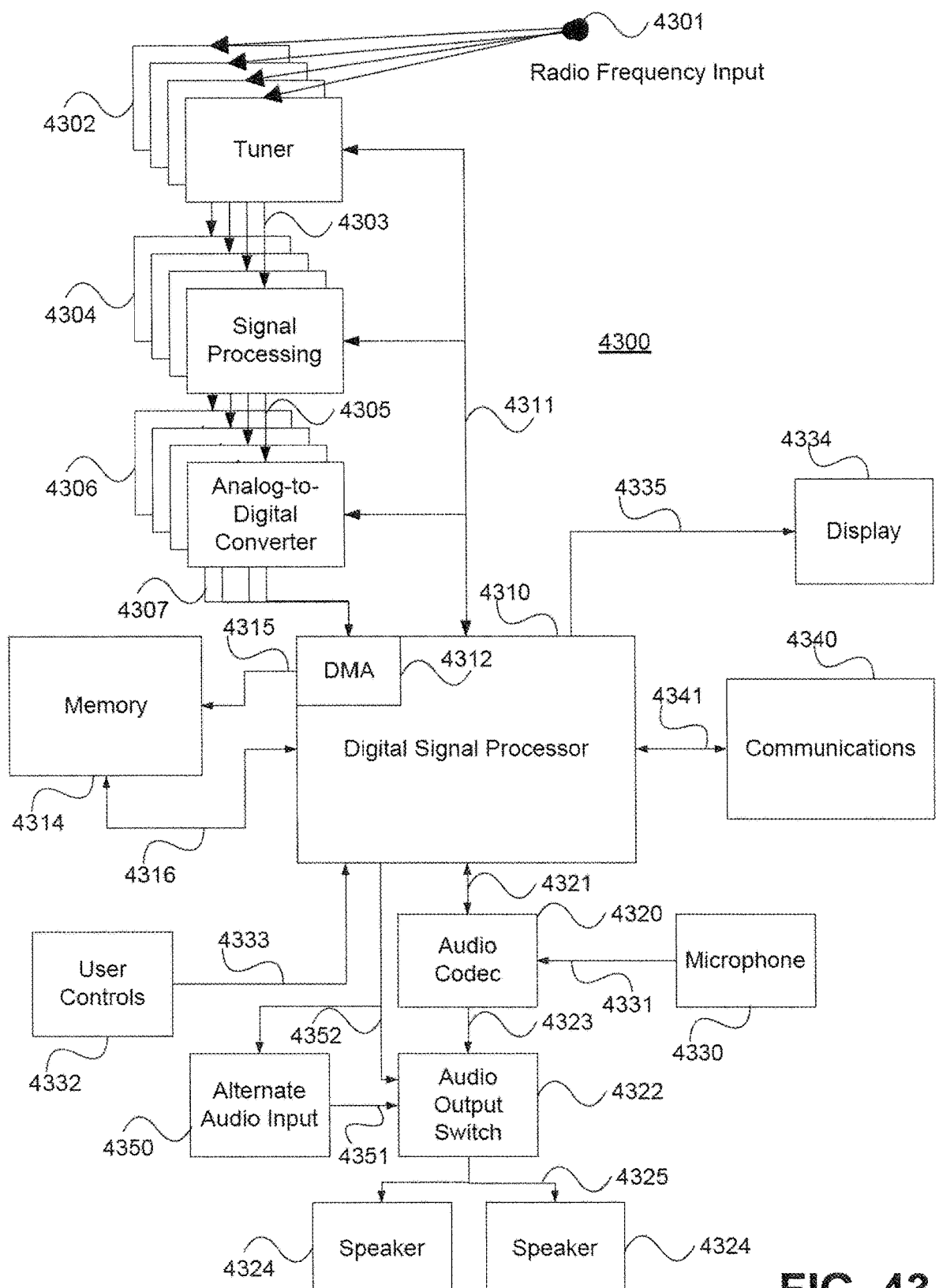
FIG. 43 is a block diagram of an embodiment of an ERS in accordance with the present invention.

FIG. 43 shows a block diagram of one embodiment of an ERS. Radio frequency (RF) input 4301 provides a radio signal to ERS 4300. This signal may be, for example from an FM antenna, an AM antenna, or any other suitable source or combination of sources.

Multiple RF tuners 4302 may acquire the signal from RF input 4301. This may be provided by, for example, the Motorola SDR510100 Radio Frequency Front-End integrated circuit. Another example of a part that may be used for tuner 4302 is Philips TEF6700 Car Radio Tuner Front-End for Digital RF. One instance of tuner 4302 may be provided for every desired simultaneous radio input in ERS 4300. For example, ERS 4300 may include eight instances of tuner 4302, to support six favorite stations, and a current and previous station, each of which may be used to select a different input source. This configuration can provide an ERS that is particularly suitable for consumer use. However, other configurations using a different number of tuners or favorite stations may also be implemented.

The tuned signal may be provided over path 4303 to signal-processing unit 4304. The tuned signal may be provided as a baseband audio signal, as an intermediate frequency (IF) signal (as with the Motorola SDR510100 in the example above), as a digital signal, or in any other suitable format. Signal-processing unit 4304 may be, for example, a combination of Motorola SDR530100 Intermediate Frequency Analog Interface Integrated Circuit and Motorola SDR540100 Baseband Audio Processor Integrated Circuit. Another example of a part that may be used for signal-processing unit 4304 is Philips TEF6892H Car Radio Integrated Signal Processor. In the case of the Motorola chipset, each signal-processing unit 4304 may process the signal from two tuners 4302. If there are eight tuners 4302, there may be four of the Motorola signal-processing units 4304.

The output from each signal-processing unit 4304 may be provided over path 4305 to analog-to-digital converter (ADC) 4306. There may be one ADC 4306 for each input signal. If desired, multiple ADCs 4306 may be provided in a single integrated circuit package, as, for example, in the Texas Instrument ADS8344 16-Bit, 8-Channel Serial Output Sampling Analog-to-Digital Converter. If desired, ADC 4306 may be integrated into signal-processing unit 4304.

The outputs from ADCs 4306 may be provided over path 4307 to digital signal processor (DSP) 4310. The data may be provided as a serial data stream or in any other suitable format. DSP 4310 may provide control signals to tuners 4302, signal-processing units 4304, and ADCs 4306 over path 4311. If desired, signal-processing unit 4304 may provide control signals to tuner 4302.

DSP 4310 may, for example, be the Texas Instrument TMS320C6713 Floating-Point Digital Signal Processor. DSP 4310 may have the ability to execute multiple threads of code in parallel, using technologies such as hardware interrupts, software interrupts, timers, and prioritized tasks. DSP 4310 may include direct memory access (DMA) 4312, which may transfer the audio data received on path 4307, over path 4315 to memory 4314. Memory 4314 may be, for example, 128 megabytes of dynamic random access memory (RAM). A removable memory device, such as a flash memory card, may also supplement memory 4314. If desired, such a removable memory device may be compatible with other types of devices, such as portable music players (e.g., MP3 players), or may be accessible using a personal computer.

The amount of memory provided may be determined based on the desired amount of recorded audio to be available for each monitored station, and the number of stations to be monitored. For example, if the audio were compressed at a rate of 128 kilobits per second, then 128 megabytes of memory would be adequate storage for six favorite stations at ten minutes per station, one previous station with ten minutes of recorded audio, and a current station with thirty minutes of recorded audio. A gigabyte of storage would allow for the same amount of storage per station, plus about fourteen hours of saved content, e.g., over 200 four-minute songs, plus a significant number of audio signatures.

DSP 4310 may also access memory 4314 without DMA 4312, over path 4316. This may include reading the stored audio data, storing the audio in a compressed format, retrieving the audio data for playback, and any other suitable data access functions.

ERS 4300 may include audio coder/decoder (codec) 4320. If desired, the coding and decoding functions may be provided separately. Codec 4320 may be, for example, the Texas Instrument AIC23 Low Power, Highly Integrated Audio Codec with Headphone Amplifier. DSP 4310 may interface with codec 4320 using path 4321, which may be a serial data path.

Microphone 4330 may provide an audio input to codec 4320, over path 4331. Codec 4320 may provide analog audio output to speakers 4324. Appropriate amplification and signal processing circuits may also be included. If desired, the audio signal may be sent via path 4323 to audio output switch 4322. Audio output switch 4322 may also receive audio over path 4351 from alternate audio input 4350, which may, for example, be a compact disk (CD) player. DSP 4310 may control audio output switch 4322 and alternate audio input 4350 over path 4352. The output from audio output switch 4322 may be sent via path 4325 to speakers 4324.

ERS 4300 may include user interface devices in addition to (or instead of) microphone 4330. For example, DSP 4310 may receive input commands from user controls 4332 over path 4333. User controls 4332 may be, for example, a pushbutton keyboard or a remote control device. If desired, user controls 432 may be physically located separately from the main unit of ERS 4300, for example as controls on a steering wheel of an automobile with a dashboard-mounted ERS. DSP 4310 may send user output information to display 4334 over path 4335, as well as or instead of to codec 4320.

DSP 4310 may also exchange data with external systems, using communications device 4340, accessed using path 4341. Communications device 4340 may be, for example, a serial port, a universal serial port (USB), an Ethernet port, an infrared (IR) data port, a telephone modem, a cable modem, a digital subscriber line (DSL) modem, a radio frequency transceiver, or any other suitable communication device. If desired, ERS 4300 may include multiple communications devices 4340.

Figure 44:
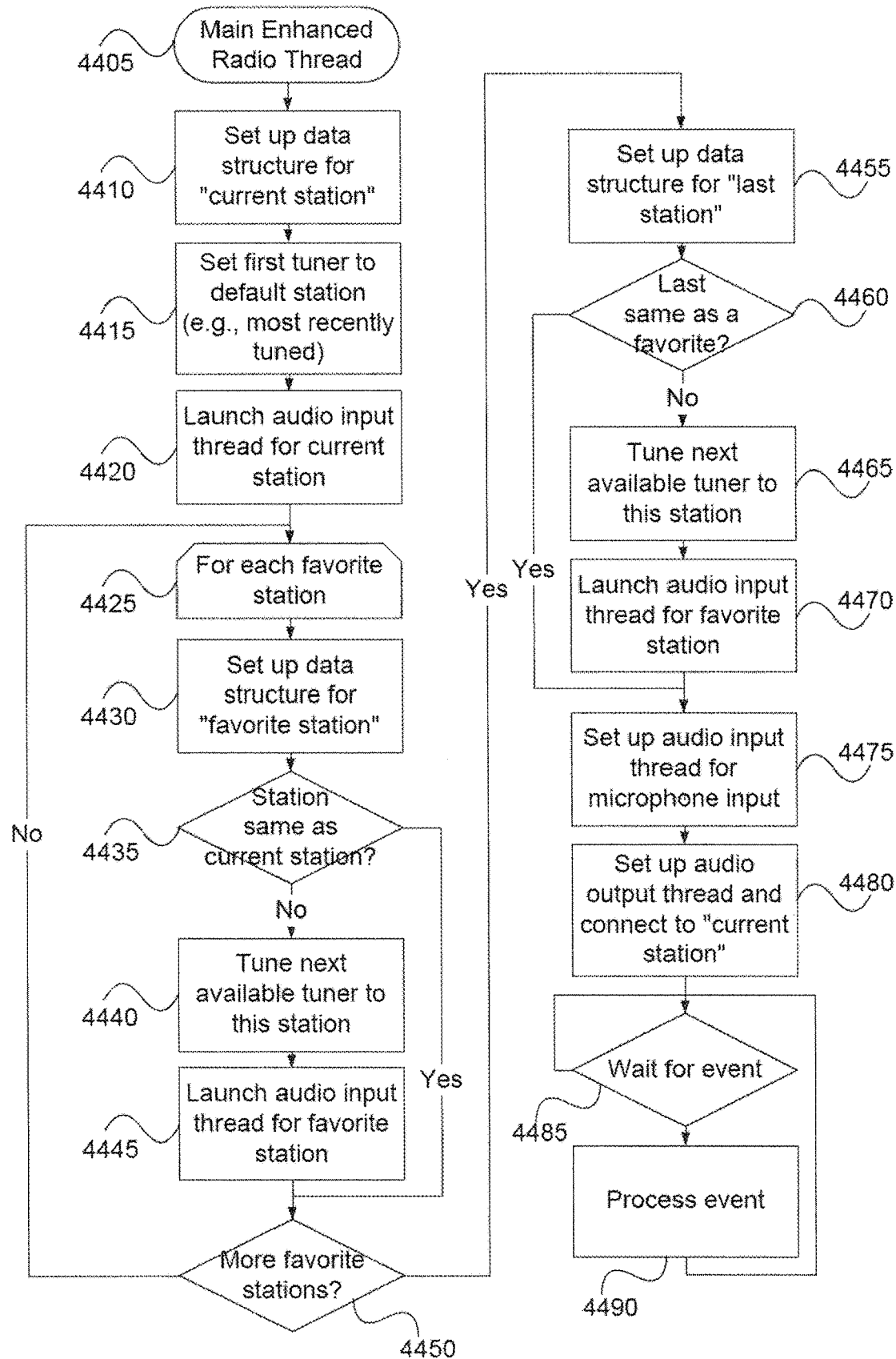
FIG. 44 is an illustrative flowchart showing steps of a main execution thread in the ERS in accordance with one embodiment of the present invention.

FIG. 44 shows a flowchart of a main enhanced radio thread 4405 that may be executed by DSP 4310 of FIG. 43. These actions may be performed, for example, when ERS 4300 first receives power after being powered off. All steps in this flowchart are each optional and may be performed in any suitable order.

In step 4410, a data structure may be created and initialized for the current station. The ERS may maintain a data structure for each radio station that is monitored. In step 4415, the first tuner may be set to a default station. This may be, for example, the station that was the current station prior to powering off the enhanced radio, one of the user's favorite stations, the lowest frequency station, a factory-selected station, or any other suitable default. In step 4420, an audio input thread may be initiated for the current station. An audio input thread is a set of operations that may be executed by DSP 4310 (FIG. 43) in parallel to main enhanced radio thread 4405, to process incoming audio data for a given radio station.

A similar set of operations may be executed for each favorite station that has been previously configured by the user, in loop 4425. In step 4430, a new data structure is set up for each of the favorite stations. In check 4435, the favorite station is compared with the current station. If they are not the same, a tuner is allocated and tuned to the frequency of the favorite station in step 4440, and a new audio input thread is launched for the favorite station in step 4445. This loop continues as long as there are more favorite stations to initialize, in step 4450.

Similarly, the last station (previous, or most recently listened to) is initialized. A data structure may be created for the last station, in step 4455. In check 4460, the last station is compared with each of the favorite stations. If there is no match, a tuner is allocated and tuned to the frequency of the last station in step 4465, and a new audio input thread is launched for the last station in step 4470.

In step 4475, an audio input thread is started for the microphone input. This thread will monitor the audio input from the user's spoken commands.

In step 4480, an audio output thread is initiated. This is a set of operations that may be executed by DSP 4310 in parallel to main enhanced radio thread 4305, and also in parallel to all of the audio input threads, and which processes the audio to be output by the ERS.

After the foregoing, and any other, initialization is complete, the enhanced radio application waits for any event, such as a user command, in step 4485. When an event occurs, the application processes the event in step 4490. More detail is shown in further figures.

FIG. 45 shows data structure 4500 that may be used to track stations that are being monitored. Data structure 4500 may also be used to track recorded content, such as songs, that may not be associated with input tuners. Fields marked with an asterisk in FIG. 45 may not be applicable for saved content, and may be omitted or left blank. These fields may be in any appropriate order. If desired, some fields may be omitted, and additional fields may be added as needed. If desired, multiple copies of data structure 4500 may be organized into an array or any other suitable structure.

Field 4505 may be a favorite station number. For example, if the ERS supports six favorite stations, this field may be a value from one to six. The ERS may support any suitable number of favorite stations. If the station is not a favorite station, this field may contain a special value, such as zero or negative one. If desired, previously recorded content, such as recorded songs, may be assigned as "favorite stations," so that they may easily be selected. If desired, this field may contain text, such as a station name, or any other suitable type of data.

Field 4510 is a current station flag. This flag is set if this station is the one that is currently being played back. The content from the station that is being played back may be different from the content that is currently being broadcast and recorded. If desired, previously saved content may be marked as the current station.

Field 4515 may be a previous station flag. This flag may be set for the station that was most recently played back, prior to the current station. This may include previously saved content. This field is used to enable the user to easily return to listening to the previous content. If desired, the ERS may track more than one previous station, enabling the user to return to more than one previous station. In this case, this field may contain a number indicating how many station have been listened to since this station was most recently played back.

Field 4520 may contain a tuner number, indicating which of the multiple tuners (such as tuners 3402 of FIG. 43) is being used to receive this station. This field may be left blank for previously recorded content. Alternatively, it may contain information on the tuner that was used to record the content. If desired, a communications device (such as communications device 4340 of FIG. 43) may be considered a tuner, and an identifier of that device may be used in this field.

Field 4525 may include tuner setup information. This may include information on the band (e.g., AM or FM), frequency, and any other information necessary to identify and acquire the signal. For previously recorded content, this may include information on the station used to receive the content. Alternatively, it may include information on the source of the content (e.g., an Internet Protocol (IP) address of the computer from which it was received.).

Field 4530 contains a pointer to the first block of compressed audio data, to allow access to the start of the content. Field 4535 may contain a pointer to the last block of compressed audio data, or the one that was most recently written for content that is currently being recorded. Field 4540 may contain the time at which the first block of compressed audio data (as reference by pointer 4530) was received, compressed, and stored. For previously saved content, this field may be blank, or it may be the time at which the content was created or downloaded.

Field 4545 may contain a pointer within the recorded compressed audio data to the current playback position. For content that is currently being played, this may be the block or position within a block that was most recently output or will next be output. For content that is not currently being played, this may be a pointer to the block or position within a block that was most recently output or will next be output when playback is resumed. If none of the recorded content for this station has been played back, this may be a pointer to the oldest content, a pointer to the newest content, or a special value indicating that the content has not been played.

Field 4550 may contain the time at which this station (or content) was most recently played. For the currently selected station, that may the current time, or this field may be left blank. There may be a special value for content and stations that have not been played.

Field 4555 may contain a user priority (or other priority) that has been assigned to the station. This priority may influence the memory allocation algorithm for recorded content. This field may be left blank for previously saved content. Alternatively, it may be used to hold a priority for the content that may be used to determine whether and when it may be discarded in favor of newly received or recorded content.

Field 4560 may contain a minimum record time for the station. This field may be determined by a user, or otherwise assigned. This value may influence the memory allocation algorithm to determine whether to discard old audio content for a station when new content is received or recorded for this or other stations. This field may be left blank for previously saved content.

Field 4565 may contain a pointer to related data. This data may have been received along with the audio. It may also include synchronization information so that the related data may be associated with the correct portion of the compressed audio data. If desired, there may be a pointer to both the newest and oldest related data. For previously saved content, this field may point to data that was received along with the audio data.

Field 4570 may include any other identifying data. For example, this may include radio station call letters that have been entered by the user or otherwise acquired. For saved content, it may also include a song title, artist name, or any other suitable information.

Field 4575 may include data format information. For example, this may include an indicator of the compression format used with the audio data (e.g., MP3 or AAC). It may include information on the compression rate (e.g., 128 kilobits of compressed data per second.) It may include information on the audio sampling rate (e.g., 48 kilohertz), number of channels (e.g., stereo), sample size (e.g., 16 bits per sample per channel), or any other suitable information about the audio format. It may also include information about the format of the related data. It may also include information about the format of data in data structure 4500, identification of which fields are valid, and any other suitable information.

Field 4580 may include a pointer to a station signature, which is signature information that corresponds to the compressed audio data for this station. The station signature may be collected and calculated as the audio is received and compressed. The oldest signature data for the station may be deleted as the oldest audio data is deleted. Field 4585 may contain a pointer to a list of audio cues that may have been detected on the station. These cues may include information such as silence, switch to talk, switch to music, significant change in maximum or average power level, significant change in power distribution among the monitored frequency bands, etc.

Multiple execution threads that may be running in parallel may access data structure 4500. One thread may be writing multiple fields in data structure 4500, while another thread may be reading multiple fields in data structure 4500. If this is unrestricted, it may lead to the thread that is reading the data seeing inconsistent data (i.e., reading some fields before they have been changed and reading other fields after they have been changed.) To prevent this, it may be necessary for one thread to temporarily disable the other while it is accessing multiple related items of data.

Figure 46:
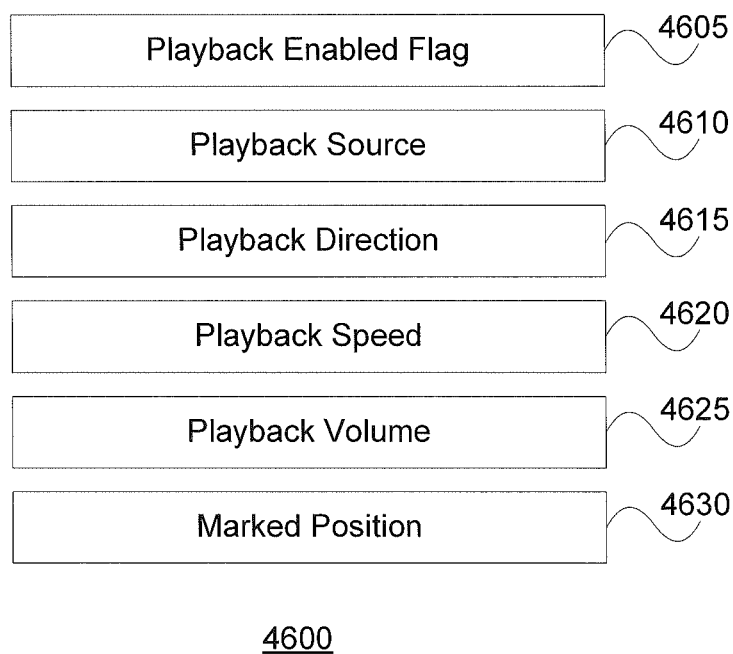
FIG. 46 is a block diagram of an illustrative data structure that may be used to track playback status in the ERS in accordance with one embodiment of the present invention.

FIG. 46 shows data structure 4600 that may be associated with the current playback. These fields may be stored separately or as part of one or more data structures. Some fields may be omitted if desired, and additional fields may be added.

Field 4605 is a flag indicating if playback is enabled. This flag is normally set if the user is listening to the radio. This flag may be cleared if the user has paused the radio or turned the radio off, or if the user is listening to an alternate source such as a CD player.

Field 4610 may indicate the playback source. For example, this field may be a pointer to an instance of data structure 4500 (FIG. 45). Alternatively, it may be a tuner number or an index into an array of data structures.

Field 4615 is the current playback direction. For example, this may be a flag that indicates whether the content is being played in the forward or reverse direction. Field 4620 is the current playback speed. This may be, for example, a percentage of real time at which the selected content is being played in the indicated direction. A number less than one may indicate that the content is being played at slower than real time, while a number greater than one may indicate that the content is being played faster than real time. Alternatively, this field may include a number that corresponds to the number of blocks or chunks of audio data to be played in a predefined period of time, such as every second.

Field 4625 may indicate the current playback volume. If desired, a separate volume value may be stored for each channel of a multi-channel (e.g., stereo) audio signal.

Field 4630 may contain a position in the currently playing content which the user has marked. If desired, multiple positions may be remembered.

Multiple execution threads that may be running in parallel may access data structure 4600. One thread may be writing multiple fields in data structure 4600, while another thread may be reading multiple fields in data structure 4600. If this is unrestricted, it may lead to the thread that is reading the data seeing inconsistent data (i.e., reading some fields before they have been changed and reading other fields after they have been changed.) To prevent this, it may be necessary for one thread to temporarily disable the other while it is accessing multiple related items of data.

Figure 47:
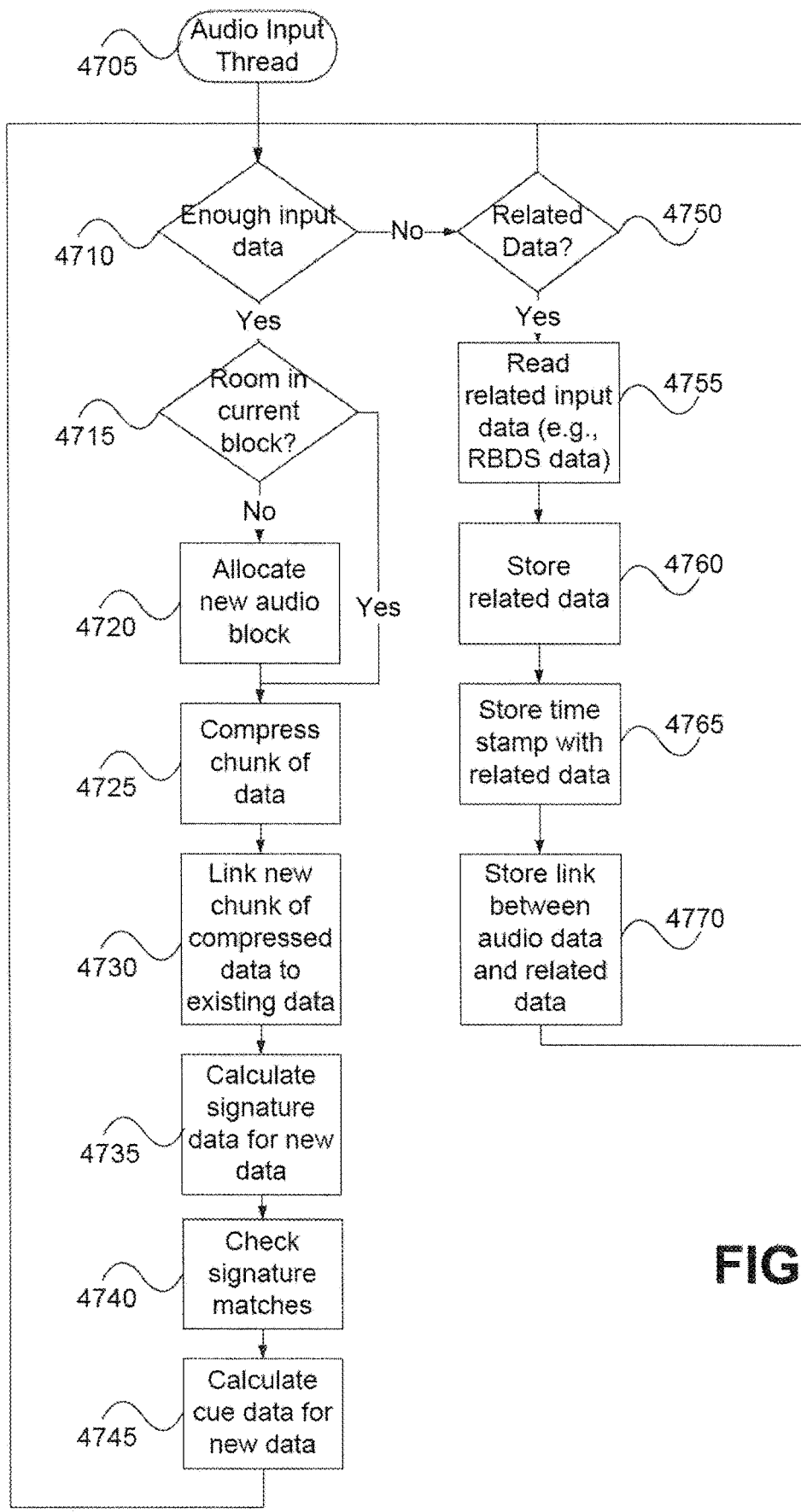
FIG. 47 is an illustrative flowchart showing steps of an audio input thread in the ERS in accordance with one embodiment of the present invention.

FIG. 47 shows audio input thread 4705. This thread may be executed in parallel by DSP 4310 (FIG. 43) for each input station that is currently being monitored. This thread may be launched, for example, when ERS 4300 (FIG. 43) configures each station to be monitored, either when it first starts execution or when the user selects an additional station (e.g., an additional favorite station). This is shown, for example, as steps 4420, 4445, and 4470 of the flowchart shown in FIG. 44. This thread may be implemented as a prioritized task, as a hardware interrupt (e.g., triggered by DMA 4315 of FIG. 43), as a software interrupt, as a routine launched by a timer interrupt, or as any other suitable type of thread. All steps in this flowchart are each optional and may be performed in any suitable order. If desired, the steps in this thread related to receiving audio data may be implemented in a separate thread from the steps related to receiving the related data.

Audio input thread 4705 may be implemented as a higher priority thread that may run in parallel (and possibly interrupt the execution of) other lower priority threads (such as main enhanced radio thread 4405). While a process in one of the other threads is accessing multiple fields of data that may also be accessed by audio input thread 4705, it may be desirable to temporarily disable audio input thread 4705, to ensure that data fields are consistent.

In check 4710, the thread checks for sufficient audio data to process. For example, the thread may wait for a fixed-sized memory block to be filled with uncompressed data from the tuner before processing it. If desired, this may include a check for adequate signal quality, and the incoming audio data may not be processed if the radio signal does not meet a predetermined acceptability standard. If desired, the thread may check for room in a data block for additional compressed audio data in step 4715 and allocate an additional data block if necessary in step 4720. In step 4725, the thread may process the uncompressed data using a compression algorithm. This may include any suitable algorithm, such as Motion Picture Experts Group Layer 3 (MP3) or Advanced Audio Coding (AAC).

In step 4730, compressed data may be generated by the compression algorithm. The compression algorithm may not generate data every time it is called with uncompressed data. It may also generate multiple chunks of compressed data some times that it is called. As each chunk of compressed data is generated, it may be linked into the existing data. The data structure that references the data from this source, such as data structure 4500 (FIG. 45), may be updated. The new chunk of data may be linked back to the chunk that was previously the last chunk, and the new chunk may be indicated as the new last chunk.

In step 4735 signature data may be generated for the newly compressed block of audio data, and may be stored in a data structure (such as a circular buffer) associated with the monitored station. The signature data may consist of a single signature word (e.g., 16 bits) and a single mask word (e.g., which may be the same size as the signature word). One signature/mask word pair may be generated for each block (e.g., frame) of audio data that is compressed. For example, the signature generation algorithm may have a set of 16 predefined frequency bands. The algorithm may determine the power level in each of these bands. The algorithm may compare the current power level in each of these bands with the power level in the same 16 bands from a predetermined number of frames prior. If the power level has increased or stayed the same, the corresponding bit in the signature word may be set to one; otherwise, the corresponding signature bit may be set to zero. If the difference between the two power levels is below a threshold, the corresponding bit in the mask word may be set to one, and otherwise the mask bit may be set to zero.

In some embodiments, the signature data may be generated taking advantage of characteristics of the compressed audio data. For example, if the audio data is compressed using the MP3 (Motion Picture Experts Group Layer 3) algorithm, the compressed data may include scale factors for each of up to 32 frequency subbands. These scale factor values may be used directly, or a signature value may be derived from them. As one suitable method, a 64-bit signature word may be generated, in which two bits correspond to each of the 32 frequency subbands. Each 2-bit field may be set to zero if the frequency band is not used, one if the scale factor for that frequency band is increasing significantly over the course of the audio frame, two if the scale factor is decreasing significantly over the course of the audio frame, and three if the scale factor is not increasing or decreasing significantly. Any other suitable method of generating signature data may be used. For example, the 64-bit signature word described here may be converted into a 16-bit signature word and a 16-bit mask word.

In some embodiments, the signature data may be generated using intermediate data that is generated during the audio compression algorithm. For example, if MP3 compression is used, frequency subband scale factors may be generated in multiple passes. During each compression pass, information may be removed from the audio that is imperceptible to the human ear and the scale factors may be regenerated. By using the scale factors from the first pass to generate the signature data, the signature data will be less sensitive to the effectiveness of different compression algorithms.

In step 4740, the thread may check for signature matches using the newly generated signature data. The process may loop through all available signatures for items of content that the user has marked as either liked or disliked. The process may then compare the item signature with the station signature ending with the most recently written signature word.

In step 4745 cue data may be generated for the newly compressed block of audio data, and may be stored in a data structure (such as a linked list or circular buffer) associated with the monitored station. The cue data may consist of a single word (e.g., 16 bits) in which each bit corresponds to a certain condition in the audio or to a certain type of change in the audio data. For example, one bit may correspond to silence, and may be set if the current audio power level is below a predefined threshold. Another bit may correspond to talk, and may be set if the frequency characteristics of the audio are those typical of human speech. Another bit may correspond to music, and may be set if the frequency characteristics of the audio are those typical of music. Another bit may correspond to a significant change in average power level in the audio, which may be compared over several blocks of audio data. Another bit may correspond to a significant change in the frequency components of the audio data. Another bit (or two bits) may correspond to the start or end of a recognized item of content. These cues are illustrative. Any suitable set of cues may be determined.

If desired, cues may be generated based on length of audio content. For example, a change in frequency characteristics may be marked as a cue if the time distance before (or after) another cue is the same as the probable length of an item of interest (such as 30 or 60 seconds for a commercial, or three to five minutes for a song.) If desired, the generation of the cues may be different for different stations. For example, on a country station, the algorithm may use an average song length of 2.5-4 minutes, while on a rock station the average may be 3-5 minutes. As another example, on a news and talk station, the presence of a short period of music may be considered a cue.

If desired, some cues may be generated taking advantage of the characteristics of the audio compression algorithm. For example, the content of the MP3 frequency subbands may be used to determine the difference between talk and music, or to detect a significant change in frequency content. If desired, intermediate values generated during audio compression may be used to determine some cues—for example the algorithm may use the content of the frequency subbands before data corresponding to imperceptible audio has been removed. If desired, some cues may be generated directly from the signature data, for example by counting the number of signature bits that change from one audio frame to the next.

In check 4750, the thread may check to see if there is related data available for this station. For example, signal-processing unit 4304 (FIG. 43) associated with this station may be polled to see if new data is available. The related data may be, for example, Radio Data Service (RDS) or Radio Broadcast Data System (RBDS) data. This data may include, for example, program type (e.g., rock, jazz, news, etc.), call sign, emergency alerts, station database information (e.g., information about this and other stations available in this area), song information such as artist and song title, supplemental information about advertisements (e.g., phone numbers, store hours, location, etc.), current time, traffic information, etc. Some of the data may not be related to the audio, such as the current time (which may be used to update a clock in the ERS). However, most of the data is likely to be related to the received audio content.

In step 4755, the related data is read, and in step 4760 it is stored. The thread may perform a transformation or other function on the data prior to storing it, and it may not store all of the related data. In step 4765, the current time may be stored with the related data. The time may be maintained by the ERS, or it may be transmitted with the related data. In step 4770, a link may be stored between the compressed audio data and the related data. In that manner, the appropriate related data may be retrieved as the audio data is being played back at a later time.

After storing any audio data and/or related data, the thread may wait for additional data to be available.

Figure 48:
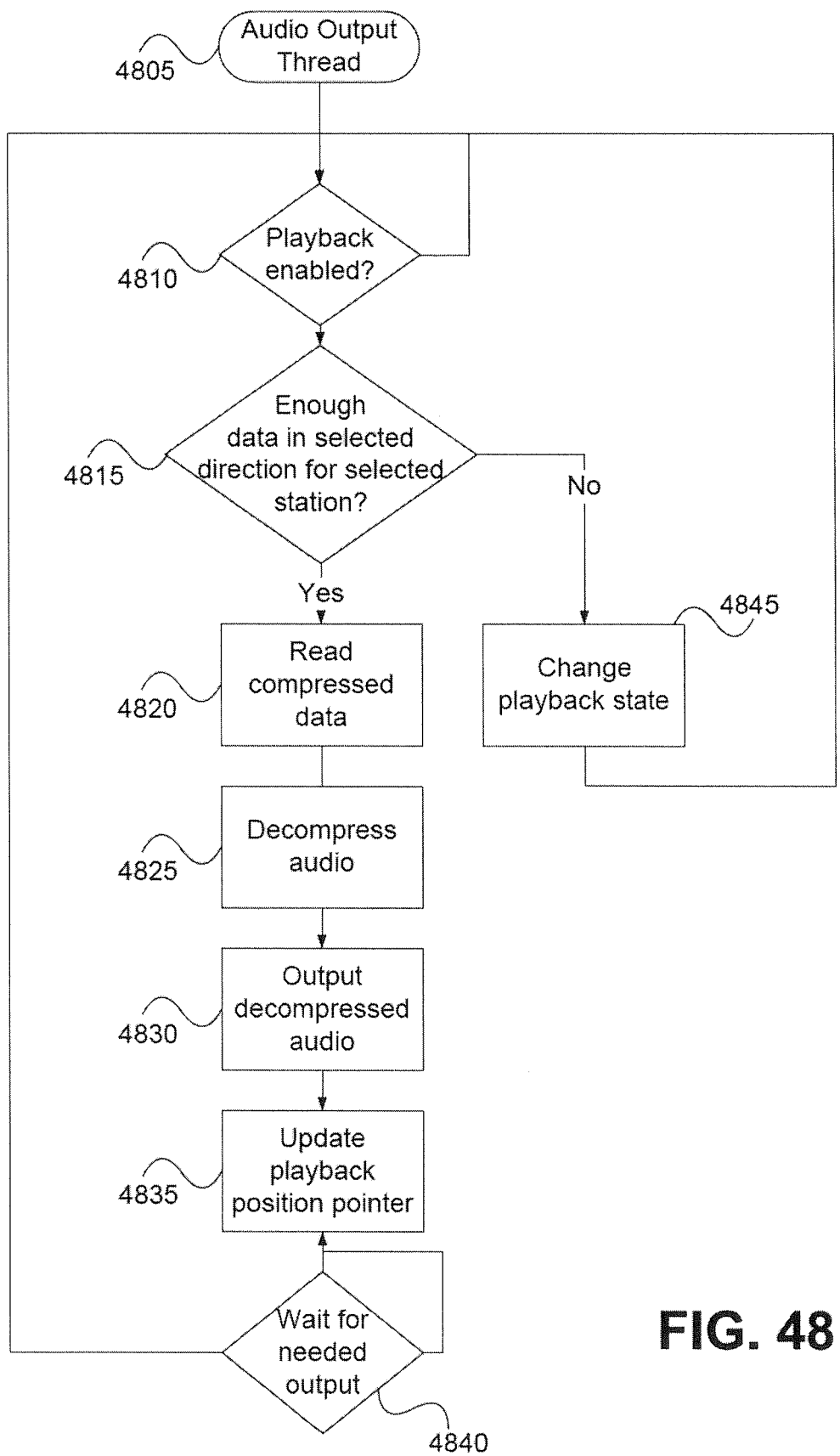
FIG. 48 is an illustrative flowchart showing steps of an audio output thread in the ERS in accordance with one embodiment of the present invention.

FIG. 48 shows audio output thread 4805. This thread may be executed in parallel by DSP 4310 (FIG. 43) to control the playback of the selected audio source. This thread may be launched, for example, when ERS 4300 (FIG. 43) first starts execution. This is shown, for example, as step 4480 of the flowchart shown in FIG. 44. This thread may be implemented as a prioritized task, as a hardware interrupt (e.g., triggered by codec 4320 or by a DMA (not shown) that interfaces with codec 4320 of FIG. 43), as a software interrupt, as a routine launched by a timer interrupt, or as any other suitable type of thread. All steps in this flowchart are each optional and may be performed in any suitable order.

Audio output thread 4805 may be implemented as a higher priority thread that may run in parallel (and possibly interrupt the execution of) other lower priority threads (such as main enhanced radio thread 4405). While a process in one of the other threads is accessing multiple fields of data that may also be accessed by audio output thread 4805, it may be desirable to temporarily disable audio output thread 4805, to ensure that data fields are consistent.

In check 4810, the thread tests to see if playback is enabled. If not, it waits for playback to become enabled. If playback is enabled, it determines the selected station and checks, in step 4815, to see if there is sufficient data in the selected direction to output.

If there is sufficient data, the compressed data is read in step 4820, and processed by a decompression routine in step 4825. The decompression algorithm may be determined by a format flag stored for the selected station.

Depending on the decompression algorithm and the direction and speed of playback, the thread might need to send multiple blocks of compressed data to the decompression algorithm. For example, a compression algorithm such as MP3 with variable bit-rate compression may incorporate information from prior audio blocks into the compression results of a given audio block. When playing that audio data back in reverse, it may be necessary to use multiple blocks to decompress a single block correctly.

Playing back at different speeds may be accomplished by any suitable technique. For example, the audio output thread may loop more or less often depending on the desired playback speed. For example, audio samples may be skipped when playing back at high speed. Audio samples may be played multiple times when playing back at low speed. If desired, audio sample values may be interpolated based on other sample data.

When processing a block of compressed data, the decompression algorithm may generate one block of decompressed audio, no blocks of decompressed audio, or multiple blocks of decompressed audio. As each block of decompressed audio is generated, it is output in step 4830. This may involve using a DMA device (which may be incorporated into DSP 4310 of FIG. 43) to transfer the data from memory 4314 to codec 4320, both of FIG. 43.

In step 4835, the playback pointer may be updated. This may include playback position 4545 (FIG. 45).

In step 4840 the thread may wait until additional output is needed. This may be triggered in any suitable manner. For example, an interrupt may be generated by a timer, by a DMA, by a codec, or in any other suitable manner, or any of these devices may be polled to determine their states.

In check 4815, if a determination was made that there was not enough data to play back, it may be handled in step 4845. If the playback direction was reverse, the thread may automatically change the playback direction to forward, or it may automatically pause the playback (e.g., clear the playback enabled flag). If the playback direction was forward and the content was previously recorded, the thread may clear the playback enabled flag, or may automatically change the playback to another source (e.g., the most recent channel). If the playback direction was forward and the content is currently being received from a tuner (or other source, such as a communications device), the thread may simply delay until additional data has been received.

Figure 49:
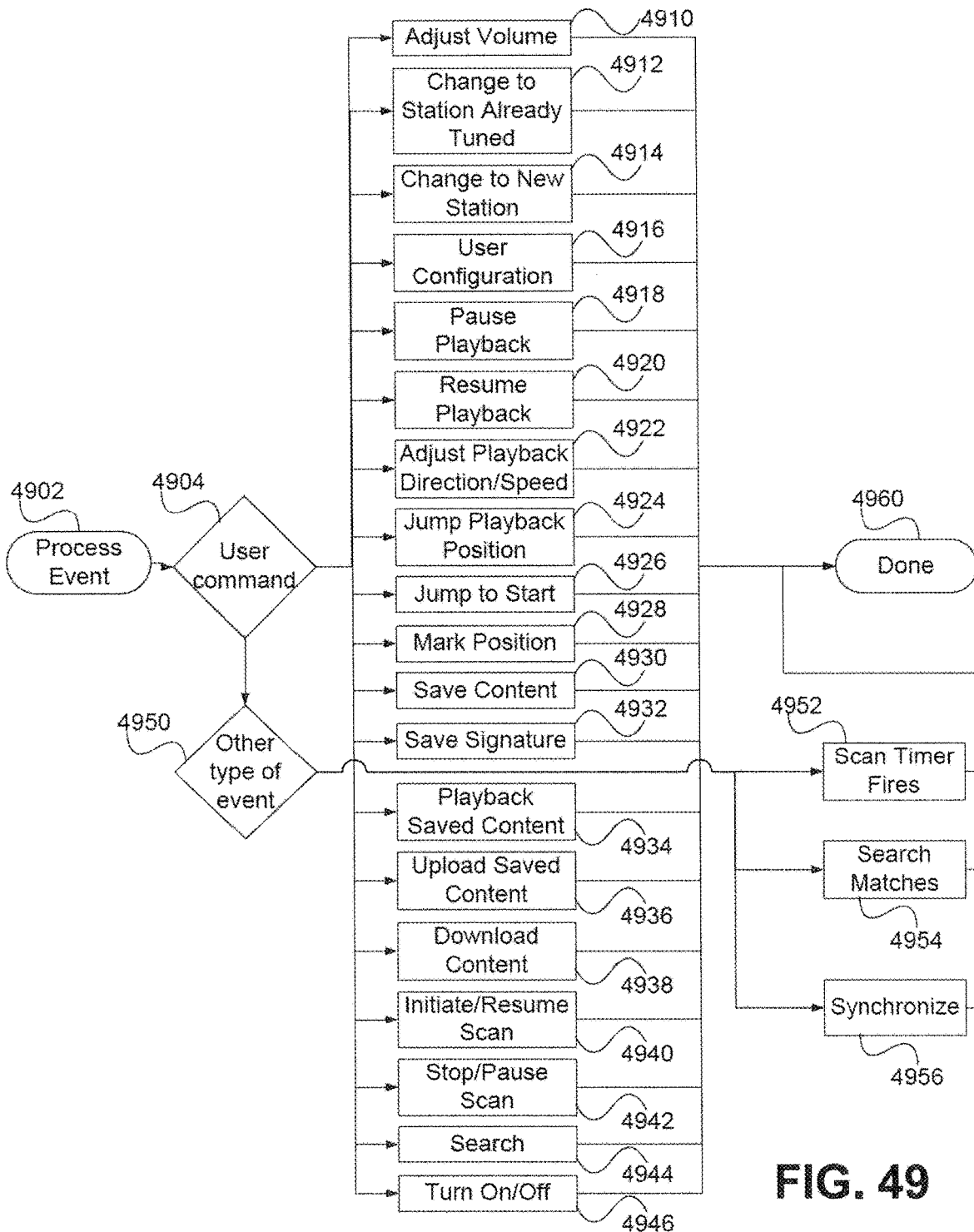
FIG. 49 is an illustrative flowchart showing steps of an event handling process in the ERS in accordance with one embodiment of the present invention.

FIG. 49 shows a flowchart of steps that may be executed in the processing of an event by the ERS, for example as shown in step 4490 of FIG. 44. All steps in this flowchart are each optional and may be performed in any suitable order. The steps may be executed as part of multiple functions, for example with one function to process user commands and another function to process other types of events.

In step 4902, the function is entered. It may be entered, for example, based on a device interrupt, or based on one or more devices being polled for input status. In check 4904, the function checks for a user command. The user command may have originated from any suitable input device. This may include a microphone and audio codec, such as microphone 4330 and audio codec 4320 of FIG. 43, which may be used to generate voice commands. It may also include any other suitable type of user controls, such as user controls 4332 of FIG. 43, for example, push buttons and knobs. Depending on the type of user command, the function executes additional functionality based on the command. Further details of the processing of each type of command are shown in further figures.

If the user has entered a command to change the volume, for example to increase or decrease the volume, the function adjusts the volume in step 4910. Not shown, the ERS may receive and act on other types of audio output commands, such as adjusting the balance, adjusting the relative level of frequency bands within the audio (such as bass or treble), or any other suitable types of audio output adjustment commands.

If the user enters a command to change the station, the ERS may change to a station already tuned by one of the tuners in step 4912, or change to a new station (i.e., a station that none of the tuners in the ERS is currently tuned to) in step 4914. In step 4916, the ERS may respond to a command to change one or more user configuration settings.

The ERS may pause the current playback, resume playback that has been paused, adjust the playback speed and/or direction, jump to a specific playback position, or jump to the start of content, in response to corresponding user commands, as shown in steps 4918, 4920, 4922, 4924, and 4926, respectively. In step 4928, the ERS may mark a position in the content to allow it to be easily referenced in other functions.

In step 4930, the ERS may allow the user to save content. In step 4932, the ERS may allow the user to save a signature for an item of content. In step 4934, the ERS may allow the user to play back saved content. In step 4936, the ERS may allow the user to upload saved content to another device, such as a computer. In step 4938, the ERS may allow the user to download content from another device, such as a computer.

In step 4940, the ERS may allow the user to initiate a scan of available radio stations, or resume a scan that was paused. In step 4942, the ERS may allow the user to pause or stop a scan that is in progress of available radio stations. In step 4944, the ERS may allow the user to initiate a search for a particular item of content or type of content. In step 4946, the ERS may allow the user to turn the ERS on or off.

Any other suitable user command may be processed. For example, the ERS may support a command to allow the user to switch between radio output and output from another audio source, such as a CD player. As another example, the ERS may allow the user to initiate a search for desirable radio stations and automatically set the favorites.

If the event to be processed is not a user command, the type of command may be determined in check 4950. If the event was a scan timer firing, the event may be handled in step 4952. If the event was a search matching, the event may be handled in step 4954. If the event to be processed was a synchronize command from another device, received over a communications device, the event may be handled in step 4956.

Any other suitable types of user commands and other events may be processed if desired. After the event has been processed, control returns to the main enhanced radio thread, in step 4960.

Figure 50:
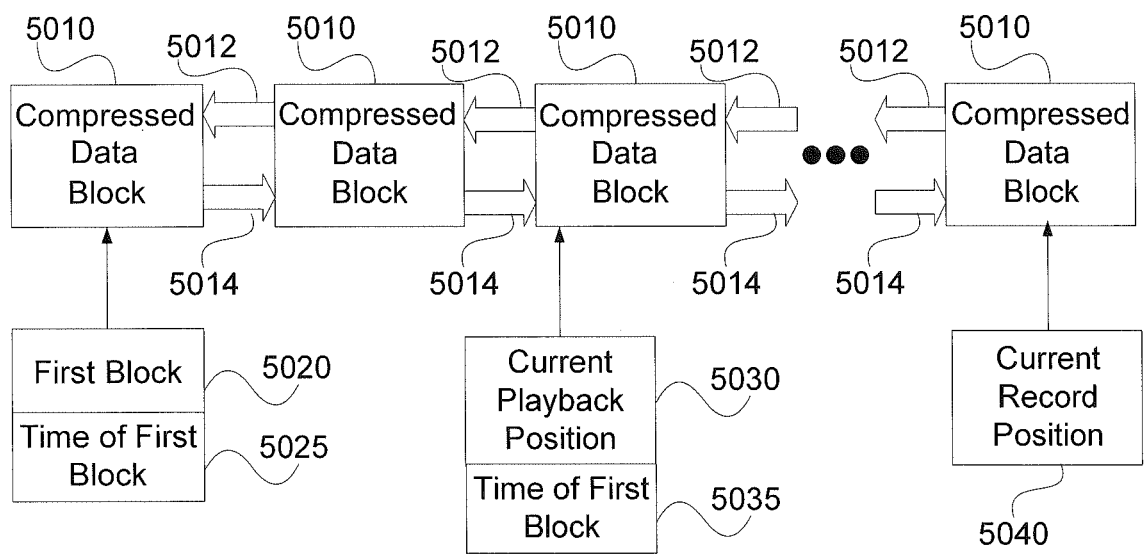
FIG. 50 is a block diagram of an illustrative data structure that may be used to maintain audio data in the ERS in accordance with one embodiment of the present invention.

FIG. 50 shows a block diagram of a data structure 5000 that may be used to maintain audio data. An instance of this data structure 5000 may be maintained for every input station being monitored, as well as for any item of audio content that is being stored. The compressed audio data is stored in one or more compressed data blocks 5010. Each compressed data block 5010 may contain a pointer 5012 to a previous data block and a pointer 5014 to a subsequent data block. These pointers may be used for ease of accessing the data for playback, as well as other functions, in either direction. The number of compressed data blocks varies depending on the length of the audio segment to be remembered. The size of the data block may be optimized based on the compression algorithm selected or on other factors.

The ERS maintains three pointers into this data structure 5000. These pointers may be part of another data structure, such as data structure 4500 of FIG. 45. These pointers may be to the start of a data block 5010, or to a point within a data block 5010. Pointer 5020 may point to the first block of data for this audio stream or content item. It may be implemented as pointer 4530 of FIG. 45. Pointer 5040 may point to the most recent data for this audio stream or content item. In the case of a currently monitored radio station, this may point to the most recently written audio block or position within that block. It may be implemented as pointer 4535 of FIG. 45. Pointer 5030 may point to the current playback position for this audio stream or content item. This may be the block or position in the block that has most recently been output or will next be output. It may be implemented as pointer 4545 of FIG. 45.

The ERS may retain the time 5025 at which the earliest data block was written. This may be implemented as field 4540 of FIG. 45. The ERS may retain the time 5035 at which the content was most recently played. This may be implemented as field 4550 of FIG. 45.

Figure 51:
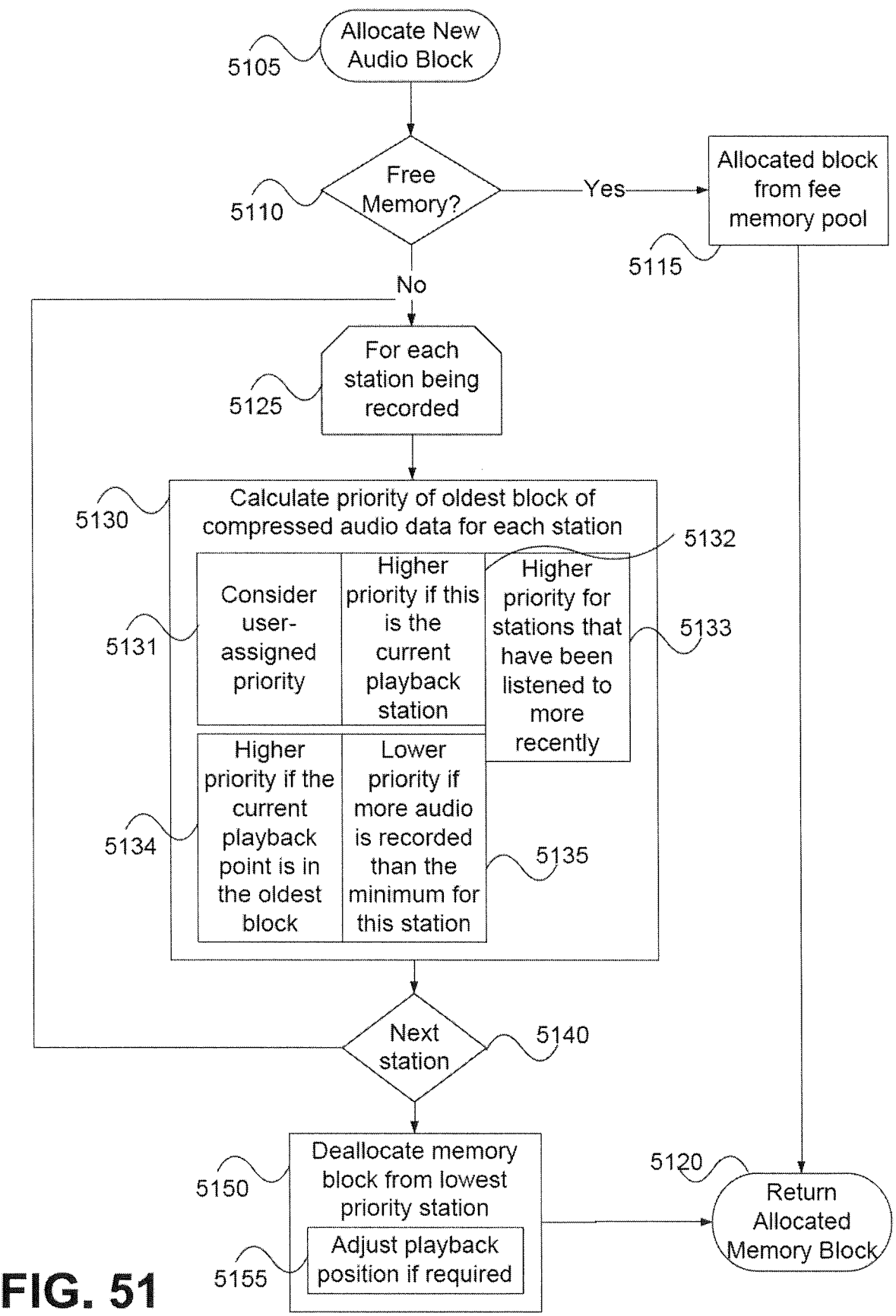
FIG. 51 is an illustrative flowchart showing steps of a memory allocation process in the ERS in accordance with one embodiment of the present invention.

FIG. 51 shows a flowchart of function 5105 for allocating a block of memory for audio content. This may be content that is being recorded from a tuner, content that is saved from a monitored tuner, or content that is downloaded from another device. All steps in this flowchart are each optional and may be performed in any suitable order. In check 5110, free memory is checked to see if there is adequate memory that has not been allocated for any other content. If there is memory available, the requested block of memory is allocated from the free memory pool in step 5115, and returned in step 5120.

If there is not enough free memory, the function loops 5125 through each station currently being recorded. The function calculates a priority value for each station in step 5130, specifically the priority of the oldest block of memory being used to store audio data for that station. The priority value may be calculated based on a user-assigned priority in sub-step 5131. The priority may be adjusted to a higher value if the station is the station that is currently being played back in sub-step 5132. In sub-step 5133, the priority may be adjusted based on the time that the station was most recently listened to, with a more recent station being given a higher priority and stations that have not been listened to for a longer time receiving a lower priority. In sub-step 5134, the priority may be increased if the current playback position for the station is in the oldest data block for that station. This decreases the likelihood that the content most recently listened will be lost when the user resumes playback of the station. In sub-step 5135, the priority may be decreased if the amount of audio recorded on the station exceeds the minimum for that station (which may have been user specified). Alternatively, the priority may be increased if the amount recorded for the station is less than the minimum. Any other suitable factors may be considered in assigning a priority to the memory block. The function continues looping through the remainder of the monitored stations in step 5140.

In step 5150, the function deallocates the oldest memory block from the lowest priority station. It may be required to deallocate more than one memory block to make sufficient memory available. In this case, multiple blocks may be deallocated from the same station, or the function may go through the station priority loop again to find the lowest priority station from which to take another memory block. When the memory block is deallocated, the pointers for the audio data for that station are adjusted to reflect that the oldest block is changed. In sub-step 5155, the playback pointer may also be updated if it was in the memory block that was deallocated. It may be adjusted to point to the start of the block that became the oldest block for the station. Any signature and cue data associated with the deallocated block may also be deallocated. The deallocated block is returned in step 5120.

If storage for monitored stations, saved content, and downloaded content is allocated from the same memory pool, the amount of storage available for each monitored station may vary. If more songs are saved or downloaded, for example, the amount of storage (number of minutes of recorded audio) for each monitored station will be reduced. Also, as the number of monitored stations increases (e.g., as the user defines more favorite stations), the amount of storage for each is reduced. The user may be able to influence this by setting a priority for each station, or a minimum number of minutes to save. If desired, storage for saved and downloaded content may be allocated from a different section of memory or a different memory device than the storage for monitored radio stations. If desired, storage of audio data may be temporarily disabled while the quality of the signal from the input station being monitored is below a predetermined threshold. This may have the effect of increasing the storage for each of the stations that does meet the signal quality standard. This may also have the effect of allowing the retention of older content on the stations that are not currently within the reception area of the ERS.

Figures 52A, 52B:
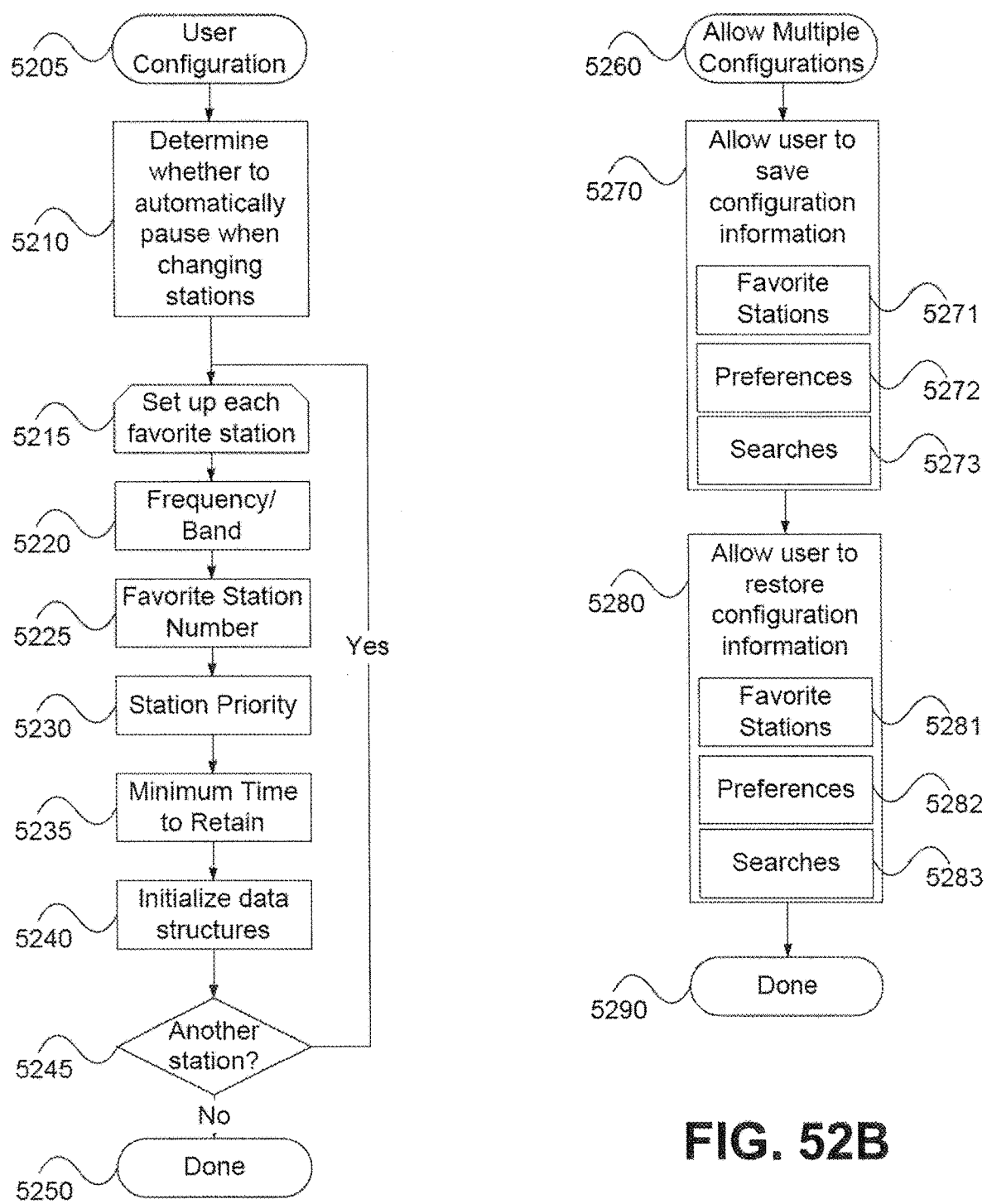
FIG. 52A is an illustrative flowchart showing steps of a configuration process in the ERS in accordance with one embodiment of the present invention.
FIG. 52B is an illustrative flowchart showing steps of a process allowing multiple sets of configuration data in the ERS in accordance with one embodiment of the present invention.

FIG. 52A shows a flowchart of process 5205 for allowing a user to configure various parameters associated with the ERS. All steps in this flowchart are each optional and may be performed in any suitable order. In particular, different parameters may be configured separately at different times, and in response to different user commands.

Preferably, configuration parameters will be stored in nonvolatile memory or in memory that is powered by a battery so that the parameters are retained if power is lost. For an ERS powered using standard household alternating current, a separate battery may be provided to back up this memory. For an ERS in an automobile, the system may be powered by the automobile battery, and may not require a separate battery. For portable battery-powered systems, the memory may be powered by the main battery, or there may be a separate battery to retain the configuration parameters when main battery power is lost. Alternatively, configuration parameters may be stored in nonvolatile memory, such as flash memory.

In step 5210, the user may be allowed to determine whether the ERS automatically pauses when changing stations. When this parameter is set, each station may be paused when the user changes stations. Then when the user returns to the station at a later time, it automatically resumes from the point at which the user left it. If this parameter is not set, when the user changes stations the old station is not paused and the new station is played from the current broadcast point, i.e., the user hears the new station content live.

In loop 5215, the user may be allowed to set up favorite stations for the ERS. Alternatively, the user may be allowed to set up each favorite station individually and at separate times. In step 5220, the user may be allowed to select the band (e.g., AM or FM) and the frequency. For example, the user may press a button to change between AM and FM, and may turn a knob or press a tuning button to adjust the frequency. In step 5225, the user may be allowed to select a favorite channel number. For example, the user may press a numeric key and hold the key for a period of time to indicate that a new favorite channel is to be set and assigned to that key. In step 5230, the user may be allowed to set a station priority. For example, the user may press a high-priority or low-priority key when setting favorite stations. Alternatively, the priority may be based on the assigned favorite channel number (e.g., favorite channel number one has a higher priority than favorite channel number two). As another example, the ERS may display a choice of priority on a display and the user may make a selection using "soft keys" (e.g., keys in which the function may change depending on context and for which labels are displayed on a display device.) In step 5235, the user may be allowed to select a minimum amount of time to retain content which was broadcast on the station. For example, the ERS may display time choices on the display, and the user may make a choice using a soft key or adjust the numbers using an input key or knob. In step 5240, the ERS may initialize the data structures associated with the newly configured favorite station, such as data structure 4500 of FIG. 45. While configuring the data structures, it may be necessary to temporarily disable one or more other execution threads that may be running in parallel and accessing the same data structures, such as audio input thread 4705 of FIG. 47 or audio output thread 4805 of FIG. 48. If desired, the ERS may use the same data structure that was already set up for the current station and merely update it with the favorite station information. In step 5245, the ERS may allow the user to configure additional favorite stations. The user may be allowed to have any number of favorite radio stations, up to a maximum determined by the number of tuners in the ERS.

Any additional configuration parameters may be set. In step 5250, this process may return.

FIG. 52B shows a flowchart of process 5260 for allowing a user or users to access multiple sets of configuration parameters associated with the ERS. If desired, the ERS may allow as many sets of configuration parameters as practical. This may be done in response to a "save" or "restore" command. Each saved set of parameters may be given an identifying name or number. A listener may wish to save the definitions of favorite stations when entering an unfamiliar location, for example, when the ERS is installed in an automobile, so that favorites may later be restored when returning to the original location. As another example, multiple listeners may use the same ERS, and they may each have a unique set of configuration parameters. Sets of parameters need not be associated with different users; even a single user may have different preferences at different times. All steps in this flowchart are each optional and may be performed in any suitable order. In particular, different parameters may be configured separately at different times, and in response to different user commands.

In step 5270, a user may be allowed to save configuration information. If the system supports saving multiple sets, the user may be allowed to provide a unique name (for example, by speaking the name) or number (for example, by pressing a numeric key) to identify the current set. In sub-step 5271, the ERS may save the definition of all current favorite stations. In sub-step 5272, the ERS may save any current preferences, such as songs, genres, likes, dislikes, etc. In sub-step 5273, the ERS may save any currently defined searches, such as searches for desired content and searches for content to skip. If desired, the user may instruct the ERS which configuration parameters to save. Alternatively, the ERS may have a predefined set of configuration parameters to save.

In step 5280, a user may be allowed to restore configuration information that was previously saved. If the system supports saving multiple sets, the user may be allowed to provide the unique name (for example, by speaking the name) or number (for example, by pressing a numeric key) to identify the set to be restored. In sub-step 5281, the ERS may restore the definition of the favorite stations. In sub-step 5272, the ERS may restore any listening preferences. In sub-step 5273, the ERS may restore any searches. The process completes in step 5290.

Figure 53:
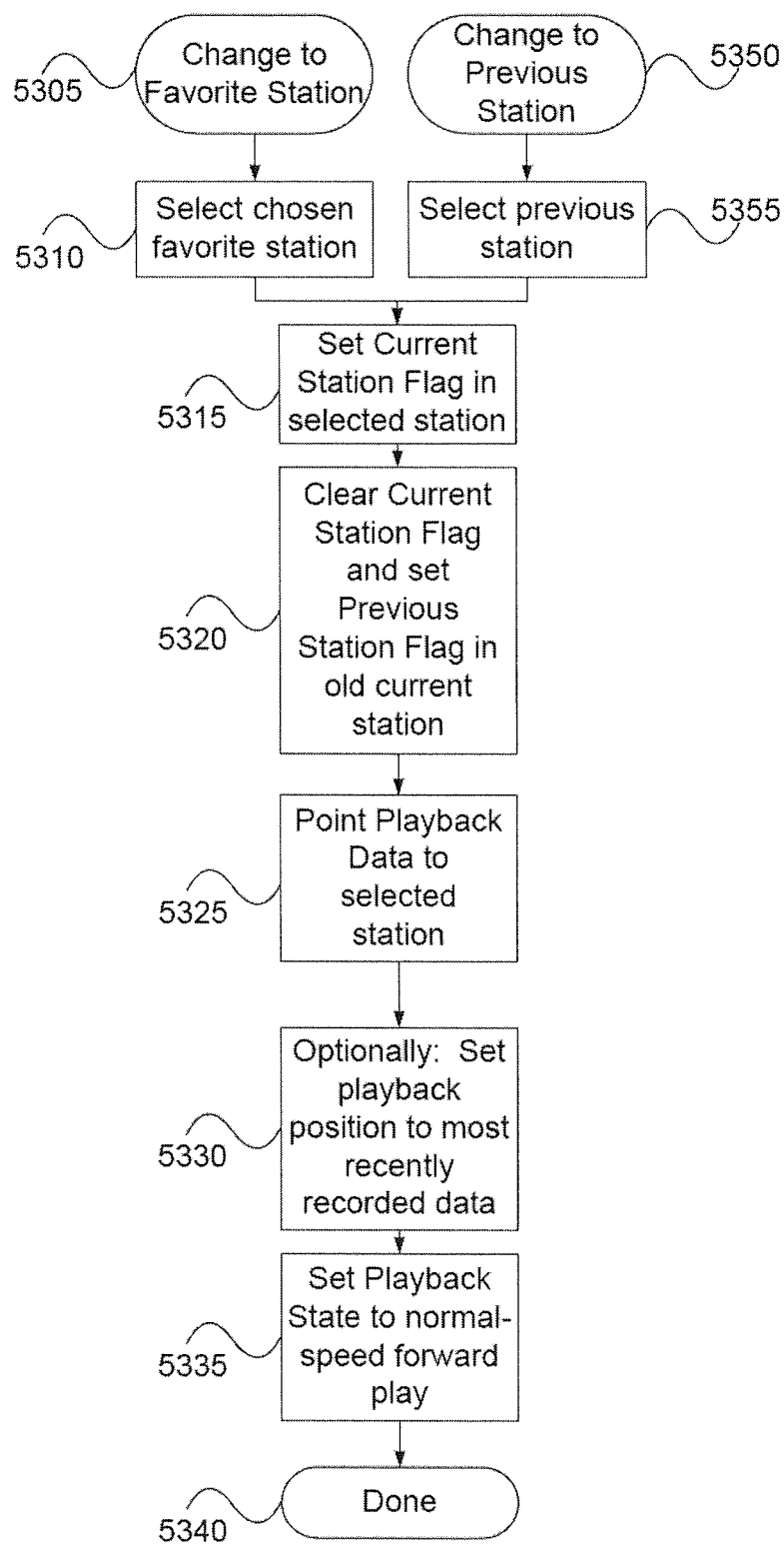
FIG. 53 is an illustrative flowchart showing steps of a station change process in the ERS in accordance with one embodiment of the present invention.

FIG. 53 shows a flowchart of a process for changing to a station that is currently being monitored. The steps in this flowchart are each optional and may be performed in any suitable order. The ERS may change to a favorite station in sub-process 5305 or to the previous station in sub-process 5350. The user may be allowed to select a favorite station in step 5310, for example by pressing a numeric key. The user may be allowed to select the previous station in step 5355, for example by pressing a "previous" key. The user may also be allowed to enter a desired band and frequency, and the ERS may automatically recognize that the selected station is being monitored as a favorite station or a previous station.

In any of these cases, the ERS determines which existing tuner is assigned to the selected station and references the data associated with the selected station, such as data structure 4500 of FIG. 45.

If the user selects a station that is currently monitored, no tuning needs to take place. The ERS merely switches the output to come from the selected tuner. In step 5315, the current station flag is set in the data associated with the selected station. In step 5320, the current station flag is cleared and the previous station flag is set in the old current station. The previous station flag may also be cleared in the old previous station. In step 5325, a playback pointer may be updated to reference the data associated with the selected station, for example playback source 4610 of FIG. 46. In step 5330, the playback position (e.g., field 4545 of data structure 4500 of FIG. 45) may optionally be set to the most recently recorded position. Whether the playback position is set to the current "live" position may be a user configuration option. If not set to the live position, playback may continue from the position at which the user most recently listened. In step 5335, the playback direction (e.g., field 4615 of FIG. 46) may be set to forward and the playback speed (e.g., field 4620 of FIG. 46) may be set to normal speed. If desired, a playback-enabled flag (e.g., field 4605 of FIG. 46) may also be set. The station change process may complete at step 5340.

While this process is updating the data structures associated with the current and previous stations, it may be necessary to temporarily disable one or more other execution threads that may be running in parallel and accessing the same data structures, such as audio output thread 4805 of FIG. 48.

Figure 54:
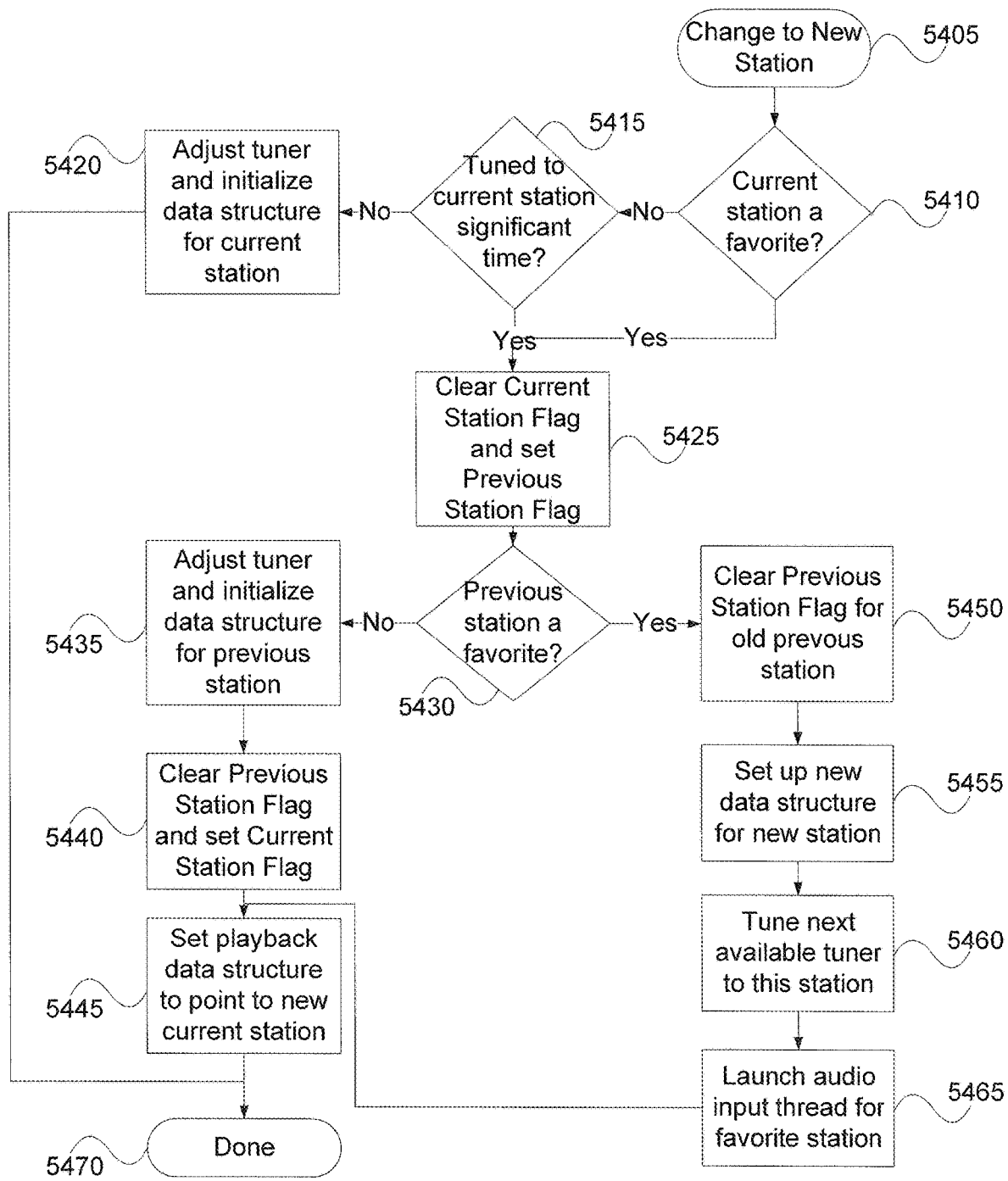
FIG. 54 is an illustrative flowchart showing steps of another station change process in the ERS in accordance with one embodiment of the present invention.

FIG. 54 shows a flowchart of process 5405 for changing to a station that is not currently being monitored, i.e., no tuner is tuned to the user-selected station. The steps in this flowchart are each optional and may be performed in any suitable order. This process may be executed when the user requests a tune to a new station, e.g., by pressing a tune key, by turning a tuning knob, by speaking a tune command, or any other suitable method.

In check 5410, the ERS may determine whether the currently tuned station is a favorite station. If so, its tuner cannot be reused, and another tuner must be allocated. In check 5415, if the current station is not a favorite station the ERS may determine how long the current station has been tuned. If the current station has been tuned for a significant, predetermined period of time, its tuner may be retained to allow the user to return to it as the previous station. If the current station has not been tuned for a significant period of time, its tuner may be reused for the new tune request.

In step 5420, if the current station is not a favorite and has not been tuned for a significant period of time, its tuner may be reused. In this case, the tuner associated with the current station is determined and adjusted to the band and frequency of the newly selected station. The data associated with the current station may then be updated to reflect the new station. For example, the audio data (as well as related data, signature data, and cue data) associated with the old band and frequency may be discarded. The pointers to the start and end of data (e.g., fields 4530 and 4535 of FIG. 45) may be cleared, and the time of first block and the playback position (e.g., fields 4540 and 4545 of FIG. 45) may be set to the current time. The new band and frequency may be stored, for example in field 4525 of FIG. 45. Any other data fields may be adjusted as desired. This process may then end at step 5470.

If the currently tuned station is a favorite or has been tuned for a significant period of time, then its tuner cannot be reused. In this case, the current station flag may be cleared and the previous station flag may be set for the old current station in step 5425. In check 5430, the ERS determines whether the old previous station was a favorite. If so, its tuner cannot be reused and a new tuner must be allocated. If not, its tuner may be reallocated.

If the tuner associated with the old previous station is to be reused, the process proceeds to step 5435. In this case, the tuner associated with the old previous station is determined and adjusted to the band and frequency of the newly selected station. The data associated with the old previous station may then be updated to reflect the new station. For example, the audio data (as well as related data, signature data, and cue data) associated with the old band and frequency may be discarded. The pointers to the start and end of data (e.g., fields 4530 and 4535 of FIG. 45) may be cleared, and the time of first block and the playback position (e.g., fields 4540 and 4545 of FIG. 45) may be set to the current time. The new band and frequency may be stored, for example in field 4525 of FIG. 45. In step 5440, the previous station flag may be cleared and the current station flag may be set.

If the tuner associated with the old previous station is not to be reused, the process proceeds from check 5430 to step 5450, in which the previous station flag is cleared for the old previous station. A new data structure, such as data structure 4500 of FIG. 45, may be created and initialized in step 5455. For example, current station flag 4510 may be set. Tuner number 4520 may be set to the next available tuner. Tuner setup information 4525 may be set to the selected band and frequency. Any other fields may be set as desired. In step 5460, the newly allocated tuner may be set to the selected band and frequency. In step 5465, a new audio input thread may be launched for the new station.

After the station has been tuned and its data updated, either in step 5440 or in step 5465, the ERS may set up the playback structure to reference the data structure of the selected station. This may be, for example, field 4610 of FIG. 46. This process may then complete at step 5470.

While this process is updating the data structures associated with the current and previous stations, it may be necessary to temporarily disable one or more other execution threads that may be running in parallel and accessing the same data structures, such as audio input thread 4705 of FIG. 47 or audio output thread 4805 of FIG. 48.

Figure 55:
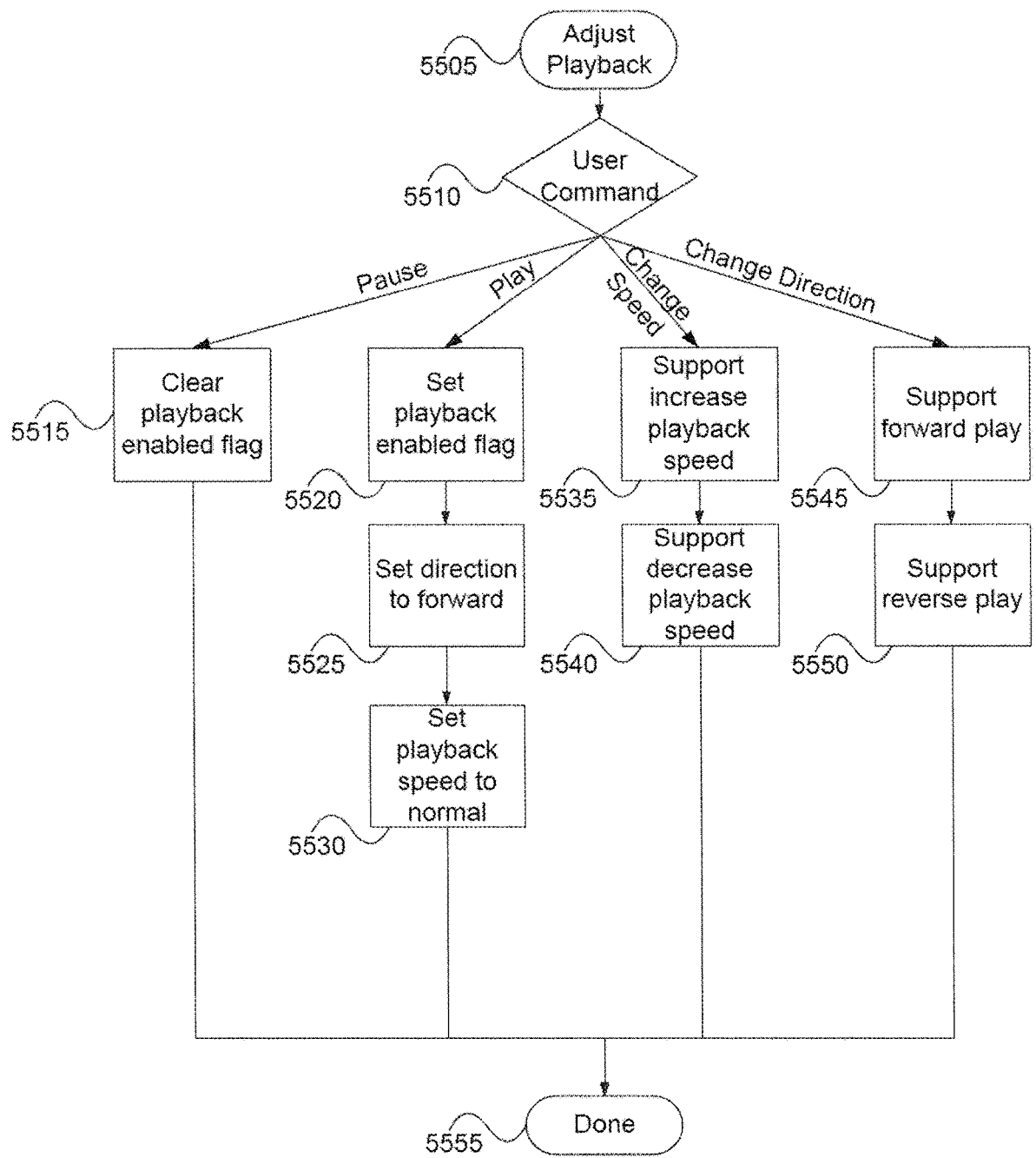
FIG. 55 is an illustrative flowchart showing steps of a playback adjust process in the ERS in accordance with one embodiment of the present invention.

FIG. 55 shows a flowchart for a process 5505 to allow a user to adjust various playback parameters. The steps shown in this flowchart are illustrative. Steps may be omitted or executed in an alternate order, and additional steps may be added. This process may be implemented, for example, as several independent functions to make different types of adjustments.

This process may be initiated, for example, when the user presses an associated key or speaks an appropriate command. In check 5510, the input command is tested to see what adjustment has been requested. In some cases, this process may be initiated based on conditions other than user commands. For example, the playback state may be changed automatically when the playback reaches the end of the available data. As another example, the playback state may be changed automatically when certain communication events occur.

Many changes to the playback state may be made with the change of a single flag or variable that is used by audio output thread 4805 to determine the audio playback mode.

In this case, it may not be necessary to disable audio output thread 4805 while the change is being made.

The system may support pausing the audio, in step 5515. For example, the user may have pressed a pause key or spoken a pause command. The audio output may be automatically paused when an incoming communication is received or an outgoing communication is initiated (e.g., using a telephone). The audio output may also be paused if the user selects an alternate audio source (such as a CD player). When a pause command is initiated, the playback-enabled flag may be cleared, indicating to audio output thread 4805 that no audio is to be processed and output.

The system may support playing the audio. For example, the user may press a key or speak a command to play or resume. The system may automatically resume playing when the earliest available audio data is played back in the reverse direction. The system may automatically resume playing when the system is turned on, at the conclusion of a communication (e.g., telephone) session, or when an alternate audio source is deselected. The system may automatically select normal play mode when the user jumps to new content on the same or a different station. When a play command is initiated, the process may set the playback-enabled flag in step 5520, set the playback direction to forward in step 5525, and set the playback speed to normal in step 5530. It may be necessary to temporarily disable audio output thread 4805 while making these changes so that it does not process inconsistent results.

The system may support variable playback speeds. For example, the user may press a key or speak a command to play back the audio at either faster than normal speed or slower than normal speed. This may include multiple speed choices for either or both fast and slow. The system may support, for example, four different fast forward speeds, normal play speeds, two slow play speeds, and the same number of speeds in the reverse direction. In step 5535, the playback speed variable may be increased from its current value. In step 5540, the playback speed variable may be decreased from its current value.

The system may support playback in both directions, forward and reverse. This may be in response to a user command such as fast-forward, rewind, slow play, slow reverse, etc. In step 5545, the playback may be changed to the forward direction. In step 5550, the playback may be changed to the reverse direction.

In step 5555, this process may exit when all requested changes have been made.

Figure 56:
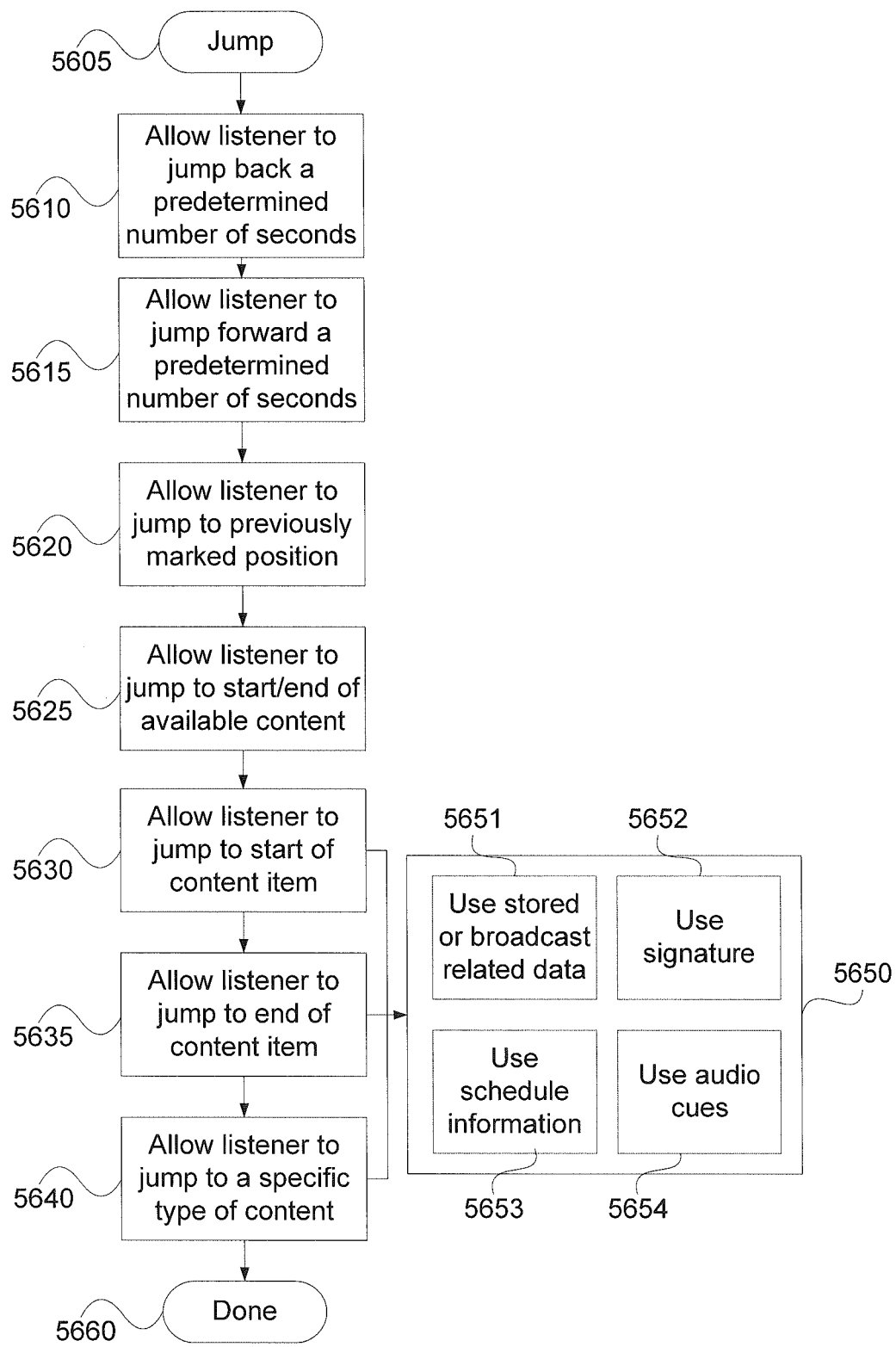
FIG. 56 is an illustrative flowchart showing steps of an audio jump process in the ERS in accordance with one embodiment of the present invention.

FIG. 56 shows a flowchart of a process 5605 to allow the user to jump to different audio content. The steps shown in this flowchart are illustrative. Steps may be omitted or executed in an alternate order, and additional steps may be added. This process may be implemented, for example, as several independent functions to make different types of jumps. Each of the types of jumps may be initiated, for example, by a user command, which may be the pressing of a key, the speaking of a command, or any other suitable type of input.

In step 5610, the listener is allowed to jump back a predetermined number of seconds in the current audio content. For example, the user may be allowed to jump back 15 seconds. If desired, the number of seconds may be user configurable. If desired, the number of seconds may vary from station to station, e.g., as a user configuration parameter. When this command is received, a playback position pointer may be updated by the specified amount. The amount of data to be skipped over may need to be calculated based on the compression ratio (number of bytes per second of content). In some cases, each of the intervening blocks of data may need to be read to determine the number of blocks to skip over. If the jump would be past the earliest available content for the current playback source, the process may jump to the earliest content. The process may automatically initiate normal-speed forward playback after the jump is complete.

In step 5615, the listener is allowed to jump forward a predetermined number of seconds in the current audio content. For example, the user may be allowed to jump forward 30 seconds. If desired, the number of seconds may be user configurable. If desired, the number of seconds may vary from station to station, e.g., as a user configuration parameter. When this command is received, a playback position pointer may be updated by the specified amount. The amount of data to be skipped over may need to be calculated based on the compression ratio (number of bytes per second of content). In some cases, each of the intervening blocks of data may need to be read to determine the number of blocks to skip over. If the jump would be past the latest available content for the current playback source, the process may jump to the currently broadcasting ("live") content. For previously saved content, if the jump would be past the end of the recorded content, the process may end playback of the content, and may automatically initiate normal playback of another source. The process may automatically initiate normal-speed forward playback after the jump is complete.

In step 5620, the listener is allowed to jump to a previously marked position. For example, the user may have previously marked a playback position for this content. When this command is received, a playback position pointer may be updated to the specified position. If no playback position has been marked, this command may be inactive. If the content including the marked playback position is no longer available (i.e., the memory that held that content has been reused for later content), the process may ignore the command, may notify the listener, or may jump to the beginning of the available content. If desired, the process may automatically initiate normal-speed forward playback after the jump is complete.

In step 5625, the listener may be allowed to jump to the start of available content on the current station or to the start of a previously recorded content item. The listener may also be allowed to jump to the end (currently broadcast, or "live" position) of the current station or to the end of a previously recorded content item. When jumping to the start of the content, whether associated with a currently monitored station or a previously saved content item, the enhanced radio may set the playback position to the start of the first audio data buffer for the content being played. The ERS may also automatically set the playback mode to normal speed in the forward direction, and may enable playback if it is disabled. When jumping to the live position, the ERS may set the playback pointer to the most recently written audio data for the current station. The ERS may also automatically set the playback mode to normal speed in the forward direction, and may enable playback if it is disabled. When jumping to the end of previously saved content, the ERS may disable playback or it may automatically start playing content from another source.

The ERS may allow the listener to jump to the start of an item of content in step 5630 or to the end of an item of content in step 5635. For example, the user may initiate a command to jump back to the start of a song, news story or traffic report, for example after changing stations in the middle of the content. As another example, the user may initiate a command to jump over the current song or commercial. As yet another example, the ERS may automatically jump to the start of an item of content when user-desired content has been found on another station. In order to complete the requested jump, the ERS may set a playback position pointer to the indicated content start or end position. After jumping to the start or end of an item of content, the ERS may also automatically set the playback mode to normal speed in the forward direction, and may enable playback if it is disabled.

In step 5640, the listener may be allowed to jump to a specific type of content, or to a specific item of content. For example, the ERS may allow the user to initiate a command to jump immediately to any traffic report that may be in progress or which may have broadcast recently on any station that is monitored. In order to complete the requested jump, the ERS may change the selected station for playback and set a playback position pointer to the start position of the indicated content. After jumping to a specific item or type of content, the ERS may also automatically set the playback mode to normal speed in the forward direction, and may enable playback if it is disabled. If the requested content is not found, the user command may be ignored, or the user may be notified (e.g., using the display or the speakers).

In order to jump to the start or end of an item of content, or to jump to a specific type of content, the ERS has to find the start and end of the content and/or the type of content. The ERS may use different techniques to find the desired content type and/or location, in step 5650. In one example, the system may use related data that may be broadcast with the radio signal or may have previously been stored when the signal was broadcast, in sub-step 5651. For example, the system may store RDS or RBDS information that is received with the audio signal. The RDS or RBDS data may change at certain content boundaries. Certain types of content, such as traffic reports, may be tagged as well. If the listener requests a jump to a traffic report, the ERS may search all stored related data for traffic report tags. The system may then jump to the start of the most recently broadcast traffic report (assuming that the most recent traffic report is of the most interest). An additional request to jump to a traffic report may then jump to the start of the next most recent traffic report, or to a new traffic report if one has been broadcast since the most recent jump.

In sub-step 5652, the system may use signature matching to identify a specific item of content, and the start and end of the item of content. This technique may be used, for example, if the user requests the ERS to jump to a specific song, or to jump to any of several favorite songs. Signatures may have been generated for certain desired content items. The signature may be generated based on characteristics of the audio signal at various positions within the content. The signature may also include information on the position of the start of the content item and the end of the content item relative to the various signature components (e.g., signature words). When the ERS is requested to jump to a specific item of content, it may compare the signature for the requested item with signature data associated with all recorded audio from all sources, including both live radio stations and previously recorded content items. If a signature matches any recorded content (e.g., similarity between the signature for the requested item and the signature data for the recorded content exceeds a predetermined threshold), the ERS may determine the station and may also determine the position in the recorded audio data for that station at which the matching content item begins. If the system is requested to jump to any favorite song, it may compare the signatures for all favorite songs with signature data for all recorded content, and similarly jump to any matching station and position. If there are multiple matches, the system may jump to the first match (e.g., the oldest recorded content, which is most likely to be overwritten soonest). A subsequent request to jump to any favorite song may jump to the next match.

In sub-step 5653, the ERS may use schedule information to identify specific content items and their start and end times. The schedule may be downloaded, for example, over a communications device, such as communications device 4340 of FIG. 43. The schedule may indicate specific items, or it may indicate types of content. The schedule may be to any suitable level of granularity. For example, it may identify start and end times of specific individual songs, shows, or news items. When jumping to an item based on a schedule, the ERS may use the start time information that is part of the schedule, and may determine a position in the recorded audio data for a specific station that corresponds to that start time.

In sub-step 5654, the ERS may use cues in the audio to determine content type and/or start and end times. A cue in the audio may be, for example, a brief period of silence, which may indicate the start of one content item and the end of another. Another example may be the abrupt change of frequency characteristics, which may similarly indicate the start of one content item and the end of another. As another example, the audio characteristics at one time may indicate that the content is speech, while at another time the audio characteristics may indicate that the content is music. As another example, the audio characteristics may indicate the "beat time" of the musical content, and this characteristic may change abruptly. As another example, the total power content or average power content of the audio signal may change significantly indicating a change of content. In any of these examples, or using any other suitable types of audio cues, the ERS may determine the most likely position to match the listener's request such as the start or end of a content item, based on the cues or changes in cues associated with the recorded content.

In step 5660, after completing the listener's requested jump, this process may complete. If desired, the user may be given feedback, for example to a display or via an audio output, as to the success of the request.

Figure 57:
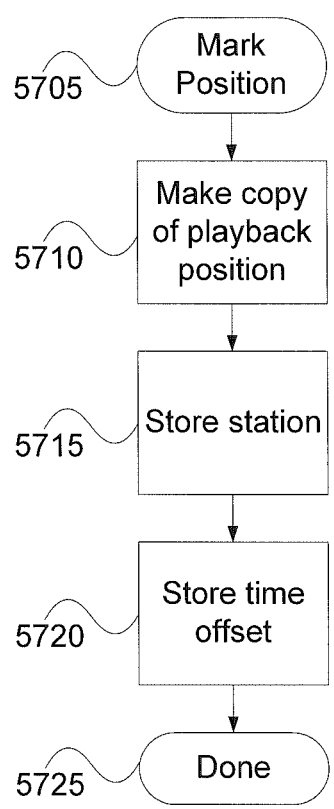
FIG. 57 is an illustrative flowchart showing steps of a mark position process in the ERS in accordance with one embodiment of the present invention.

FIG. 57 shows a flowchart of a process 5705 to allow a user to mark a position in the audio being played back. This may be in response, for example, to a user pressing a "Mark" key or speaking a "mark" command. The steps shown in this flowchart are illustrative. Steps may be omitted or executed in an alternate order, and additional steps may be added. In step 5710, a copy may be made of the current playback position. The position may be stored for later reference. If desired, the ERS may also store the current station in step 5715, and store the time or the time offset of the position in step 5720. If desired, the ERS may allow the user to mark a position for each monitored station, or to mark multiple positions for each station. In step 5725, the process completes.

Figure 58:
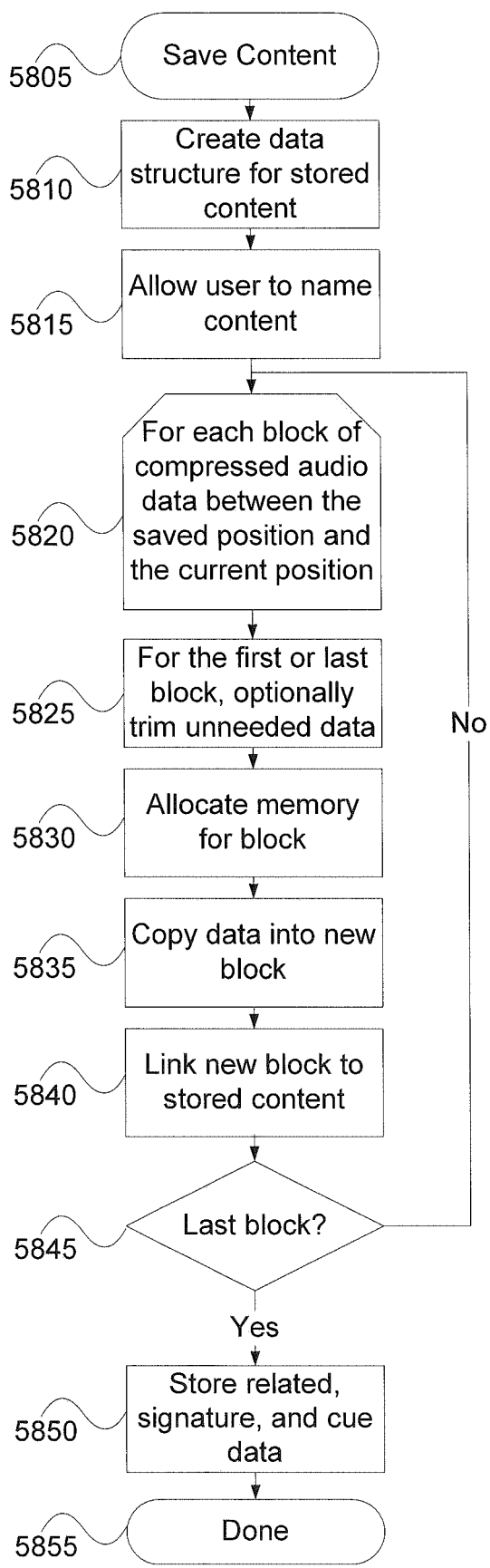
FIG. 58 is an illustrative flowchart showing steps of a save content process in the ERS in accordance with one embodiment of the present invention.

FIG. 58 shows a flowchart of process 5805 to save an item of content. This may be in response, for example, to a user pressing a "Save" key or speaking a "save" command. The steps shown in this flowchart are illustrative. Steps may be omitted or executed in an alternate order, and additional steps may be added.

In step 5810, a new data structure may be created for the saved content. For example a data structure similar to data structure 4500 of FIG. 45 may be allocated and initialized. In step 5815, the user may be allowed to name the content.

In some embodiments, the user may assign a number to the saved content. If desired, the saved content may then be accessed at a later time as a favorite station using that number. In some embodiments, the user may speak a name, and the user may able to access the content at a later time by speaking the name again. Any other suitable method for naming or identifying the content item may be used.

In loop 5820, the process may access each block of data between a marked position (which may have been marked using process 5705 of FIG. 57) and the current playback position. The marked position may be either before or after the current playback position, and this loop will operate starting with the earlier of the two positions. If there is no marked position (or if the audio containing the marked position has been discarded to make room for later audio), the ERS may indicate to the user that the save operation cannot be completed, or it may use the start of the first block of data for the current station instead of the marked position.

For the first and last block of audio to be saved, the ERS may optionally trim data from the block that may be outside the desired time range, in step 5825. For each block, the system may allocate a new block of memory of the appropriate size in step 5830, copy the compressed data from the radio station data structure to the newly allocated memory block in step 5835, and link the new block of compressed audio data into the new data structure for the newly created content item in step 5840. This loop proceeds through each block in step 5845. In step 5850, any related data, signature data, and cue data associated with the saved segment of audio data may also be copied and stored with the newly created content item. The process completes in step 5855.

Figure 59:
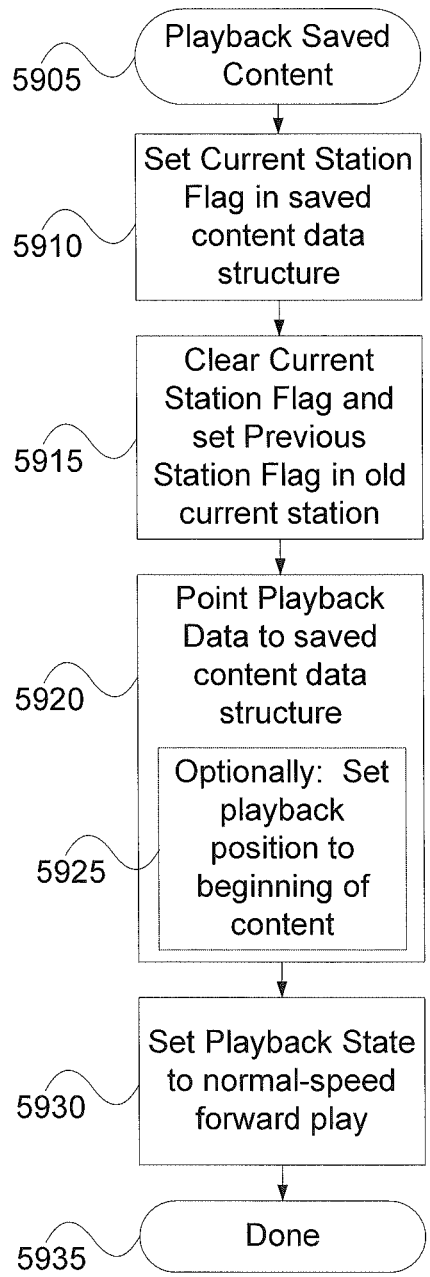
FIG. 59 is an illustrative flowchart showing steps of a playback saved content process in the ERS in accordance with one embodiment of the present invention.

FIG. 59 shows a flowchart of illustrative process 5905 for playing an item of saved content. This may be in response, for example, to a user pressing a numeric key corresponding to the content or speaking the name of the content. The steps shown in this flowchart are illustrative. Steps may be omitted or executed in an alternate order, and additional steps may be added. It may be necessary to temporarily disable an audio output thread while this process makes some of its data changes.

In step 5910, the current station flag may be set in the data associated with the saved content. In step 5915, the current station flag may be cleared and the previous station flag may be set in the content that may be playing when this process begins. Any older previous stations may also be changed. In step 5920, playback data fields may be set to reference the saved content. Optionally, in sub-step 5925, the playback position of the saved content may be changed to the start of the content. Alternatively, the playback position may not be changed, in which case playback will begin where it most recently left off. In step 5930, the playback direction may be set to forward, playback speed may be set to normal, and playback may be enabled. This process completes in step 5935.

Figure 60A:
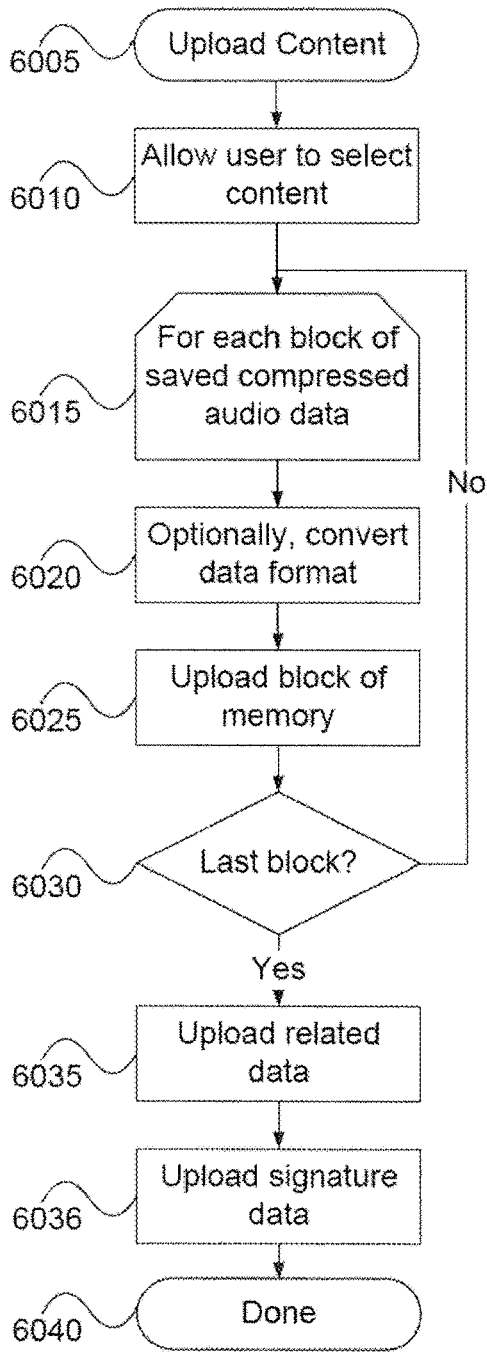
FIG. 60A is an illustrative flowchart showing steps of an upload content process in the ERS in accordance with one embodiment of the present invention.

FIG. 60A shows a flowchart of illustrative process 6005 for uploading content from the ERS. This may be in response, for example, to a user pressing an "Upload" key or speaking an "upload" command. It may also be in response to a command received over a communications device, such as communications device 4340 of FIG. 43. The steps shown in this flowchart are illustrative. Steps may be omitted or executed in an alternate order, and additional steps may be added.

The ERS may upload content to any suitable other device that may be accessed using a communications device (e.g., a USB port). This may be, for example, a personal computer or a portable music player. The system may allow the user to upload saved content. The system may allow the user to upload content from currently monitored radio station, for example by uploading the content between a marked position and a current playback position (similar to the way that saved content is created locally in process 5905 of FIG. 59). The system may also allow the user to specify the communications device as a virtual output device. In this case, the audio to be played back may be sent to the communications device instead of or in addition to the local speakers.

In step 6010, the user may be allowed to select content to be uploaded. If the content is saved content, the user may press a key or speak a command corresponding to the content's name or other identifier. In the case of uploading content from the current station, the ERS may automatically select the station based on the station selected for playback. If desired, the ERS may support uploading content from one station and playing back content from another.

In loop 6015, the ERS processes each block of compressed audio data in the selected content. If desired, the ERS may trim audio data from the start of the first block of data and or the end of the last block of data as it is processed. In step 6020, the ERS may optionally convert the data format of each block of data as it is processed. This may involve decompressing the data, recompressing it using a different algorithm, or any other suitable processing. In step 6025, each block of audio data may be uploaded. If desired, the audio data may be uploaded in a different number of blocks than is stored locally, so that zero, one, or more than one block of data may be uploaded on any given iteration through this loop. The loop continues at step 6030 until the last block of data has been processed.

In step 6035, any related data may also be uploaded. This may include any related data that was broadcast along with the audio data. It may also include any other data that may have been entered by the user, downloaded separately, or otherwise obtained. Any signature data associated with the item may also be uploaded, in step 6036. In step 6040, this process completes.

Figure 60B:
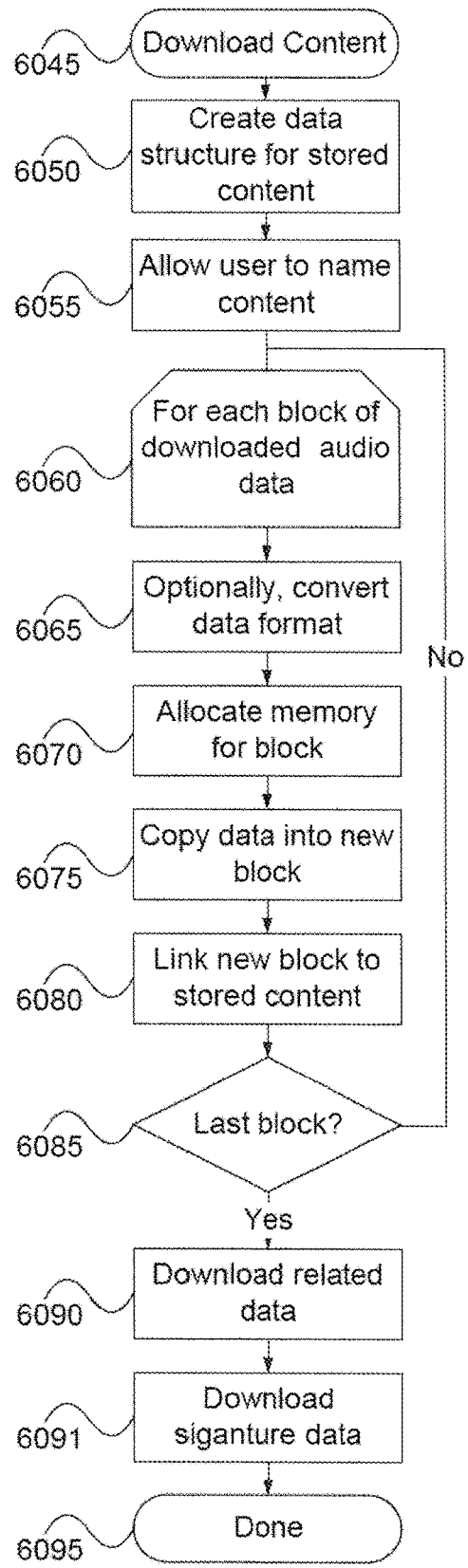
FIG. 60B is an illustrative flowchart showing steps of a download content process in the ERS in accordance with one embodiment of the present invention.

FIG. 60B shows a flowchart of illustrative process 6045 to download content into the ERS. This may be in response, for example, to a user pressing a "Download" key or speaking a "download" command. It may also be in response to a command received over a communications device, such as communications device 4340 of FIG. 43. The steps shown in this flowchart are illustrative. Steps may be omitted or executed in an alternate order, and additional steps may be added.

The ERS may download content from any suitable other device that may be accessed using a communications device (e.g., a USB port). This may be, for example, a personal computer or a portable music player. The system may allow the user to download and save content. The system may also allow the user to specify the communications device as a virtual input device. In this case, the communications device may be treated as a tuner. The data received may be stored as it is received, similarly to the way that data received from a tuner is stored. If desired, the content may be played back as it is received, and the user may be allowed to rewind, pause, fast-forward, and otherwise alter the playback. If desired, the content may be stored at the same time that content from a tuner is being played back.

In step 6050, a new data structure may be created for the downloaded content. For example a data structure similar to data structure 4500 of FIG. 45 may be allocated and initialized. In step 6055, the user may be allowed to name the content. In some embodiments, the user may assign a number to the downloaded content. If desired, the downloaded content may then be accessed at a later time as a favorite station using that number. In some embodiments, the user may speak a name, and the user may able to access the content at a later time by speaking the name again. If desired, a name or other identifier may be downloaded along with the content. Any other suitable method for naming or identifying the content item may be used. If the content is to be played back as it is received, it may not be given an identifier or name, as it may be discarded after the user has listened to it.

In loop 6060, the process may receive each block of data and process the block as it is received. The data format of the received data may optionally be modified in step 6065. This may involve decompressing the data, recompressing it using a different algorithm, or any other suitable processing. If desired, the audio data may be stored in a different number of blocks than it is received, so that zero, one, or more than one block of data may be stored on any given iteration through this loop. For each block of compressed audio data to be stored, the system may allocate a new block of memory of the appropriate size in step 6070, copy the received data to the newly allocated memory block in step 6075, and link the new block of compressed audio data into the new data structure for the newly created content item in step 6080. This loop proceeds through each block in step 6085.

In step 6090, any related data may be downloaded and stored. This may include information such as a title, artist, type of content, and any other suitable type of data. Signature data for the item may also be downloaded, in step 6091. The process completes in step 6095.

Figure 61:
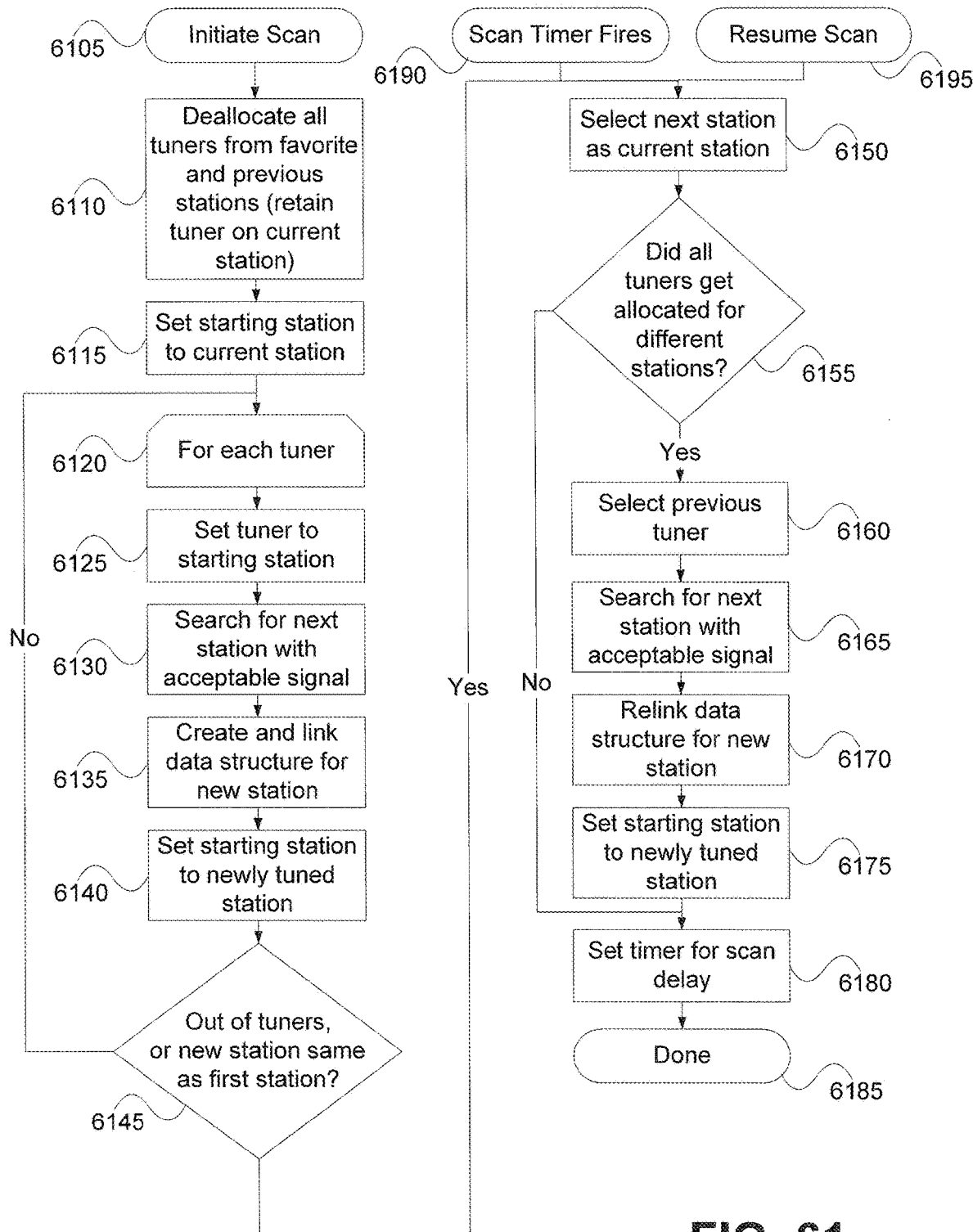
FIG. 61 is an illustrative flowchart showing steps of a scan process in the ERS in accordance with one embodiment of the present invention.

FIG. 61 shows a flowchart of process 6105 for initiating a scan of available stations. This may be in response, for example, to a user pressing a "Scan" key or speaking a "scan" command. The steps shown in this flowchart are illustrative. Steps may be omitted or executed in an alternate order, and additional steps may be added.

In step 6110, the tuners may be deallocated from any favorite stations and from the previous station. The tuner may remain allocated to the current station (the one being played back) if desired. If desired, the data for each of the stations, including compressed audio data and related data, may be discarded for the deallocated tuners. Alternatively, the data may be saved until after the scan. In this case, the data may be reassigned to the tuners made available after the scan, allowing the listener to rewind, for example, to content that was broadcast prior to the scan. The audio input thread for each station may also be disabled.

In step 6115, the starting station of the scan may be set to the current playback station. The ERS may then loop 6120 through each of the available tuners. In step 6125, the tuner may be set to the previously assigned starting station. In step 6130, the tuner may be used to search for the next station with an acceptable signal. The scan may be restricted to a single band (e.g., AM only or FM only), or it may jump to another band when the end of a band is reached. Once an acceptable signal is found, a data structure may be created for the station, and an audio input thread may be launched, in step 6135. In step 6140, the starting station may be updated to the station just tuned, for the next iteration through the loop.

When there are no more available tuners, the loop may terminate at step 6145. In addition, if the newly tuned station is the same as the first station, the loop may terminate as well. Then, in step 6150, the ERS may scan to the next station (the first station found at the beginning of the loop). Scanning to the next station may entail updating the playback data structures to reference the data for the next tuner.

In check 6155, the ERS determines whether all of the tuners have been allocated for stations in the scan. If all of the tuners have been allocated, then there are more stations to scan than there are tuners, and one of the tuners will have to be deallocated in order to scan to the next station. If not all of the tuners have been allocated, then there are more tuners than stations, and the scan may proceed without deallocating any tuners and without any more actual tuning.

If all of the tuners have been allocated, the previous tuner (e.g., the one most recently used for output prior to the current tuner) is selected in step 6160 and used to search for the next acceptable signal in step 6165. Then the data structure for the tuner is reinitialized (e.g., old data is discarded, identifying information is set) in step 6170 and the starting station value is updated to the station just tuned in step 6175.

After the playback has been updated to refer to the new station, and after the next tune has taken place if required, a timer may be set for the next scan. For example, the next scan may take place automatically in five seconds. At that time, the ERS will have recorded five seconds worth of audio data for all of the stations that have been pre-tuned. The process completes at step 6185.

When the scan timer fires (step 6190), this process may be reentered at step 6150, and may again update the playback to the next tuner and search for another station if required, and may then set another timer. This process may continue, repeating based on a timer, until terminated by the user.

Figure 62A:
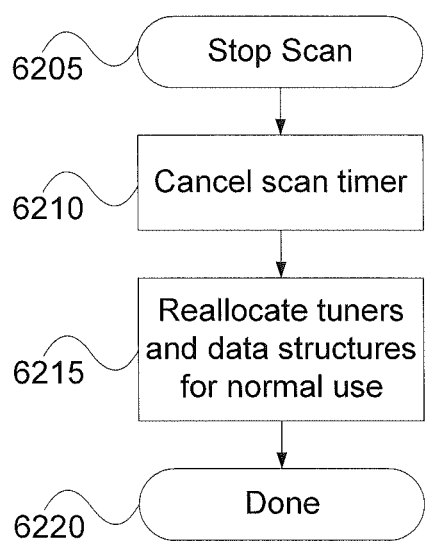
FIG. 62A is an illustrative flowchart showing steps of a stop scan process in the ERS in accordance with one embodiment of the present invention.

The user may stop the scan in process 6205, as shown in the flowchart of FIG. 62A. This may be in response, for example, to a user pressing a "Stop" key (or pressing the "Scan" key again) or speaking a "stop" command. The steps shown in this flowchart are illustrative. Steps may be omitted or executed in an alternate order, and additional steps may be added. In step 6210, the pending scan timer may be cancelled, preventing any further scans from occurring. In step 6215, the tuners and data structures used in the scan may be deallocated, and reallocated for normal use. The audio data and related data accumulated during the scan may be discarded. If the audio data and related data from prior to the scan were retained, they may be relinked. The tuners may be retuned to the favorite stations. The currently tuned station and the most recently scanned station may be flagged as the current station and the previous station. This process may complete in step 6220.

Figure 62B:
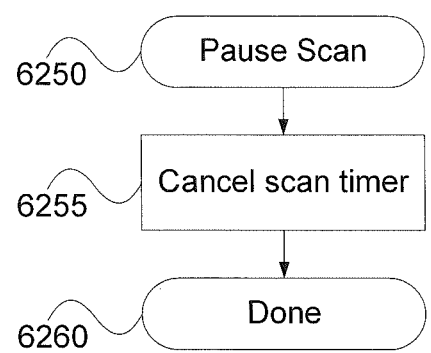
FIG. 62B is an illustrative flowchart showing steps of a pause scan process in the ERS in accordance with one embodiment of the present invention.

The user may pause the scan in process 6250, as shown in the flowchart of FIG. 62B. This may be in response, for example, to a user pressing a "Pause" key or speaking a "pause" command. The steps shown in this flowchart are illustrative. Steps may be omitted or executed in an alternate order, and additional steps may be added. In step 6255, the pending scan timer may be cancelled, preventing any further scans from occurring. This process may complete in step 6260. While the scan is paused, the user may continue listening to the current station. The user may rewind, jump backwards, and otherwise modify the playback of the station. The user may also set the current station as a favorite station while the scan is paused, and then resume the scan.

The scan may be resumed in process 6195, as shown in FIG. 61. In this case, the flowchart shown in FIG. 61 may be reentered at step 6150. The next station may be selected, the next tune may occur if required, and a new scan timer may be set.

Figure 63:
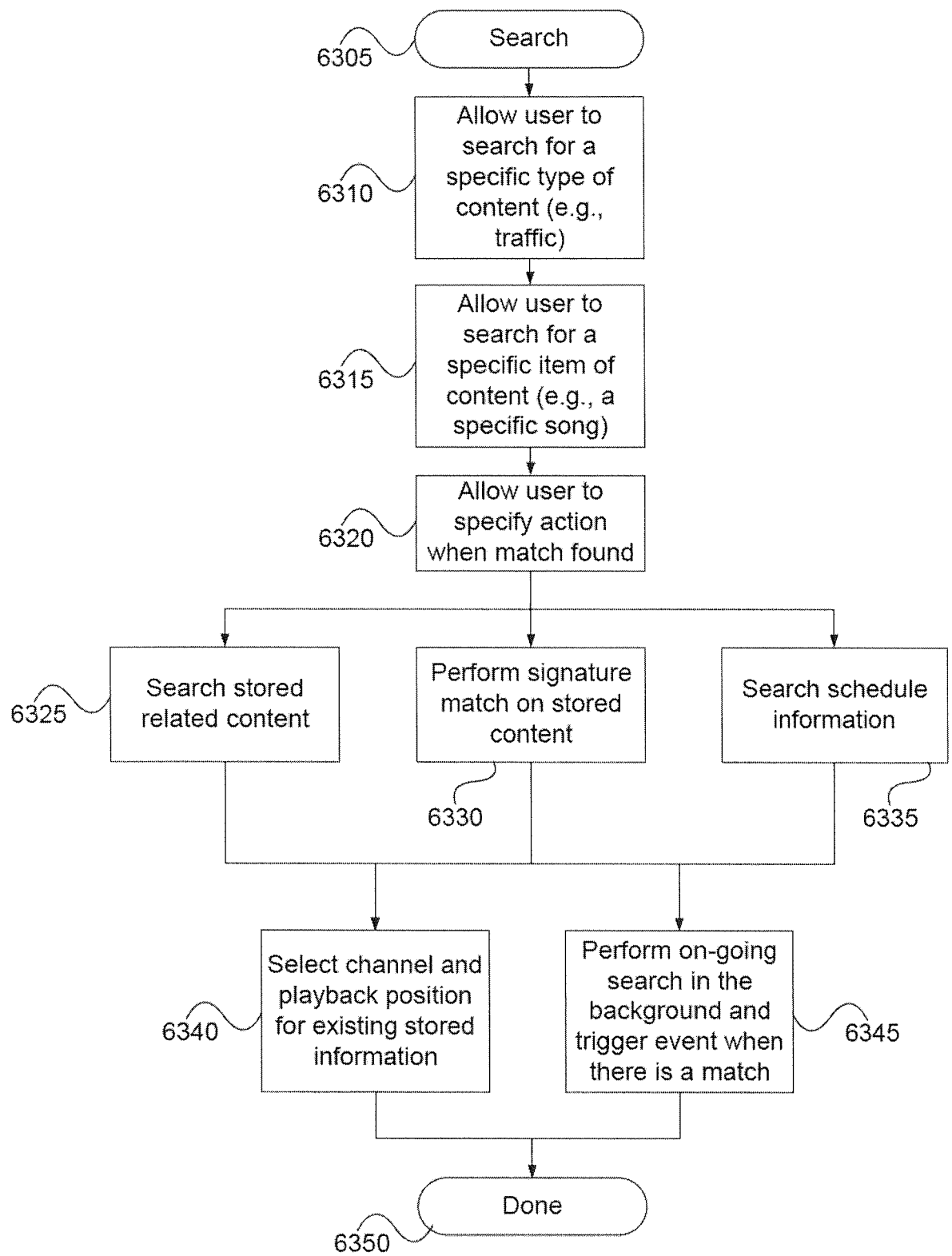
FIG. 63 is an illustrative flowchart showing steps of an initiate search process in the ERS in accordance with one embodiment of the present invention.

FIG. 63 shows an illustrative flowchart of a process 6305 for initiating a search. This may be in response, for example, to a user pressing a "Search" key or speaking a "search" command. The search command may be specific to the type of search being requested. The steps shown in this flowchart are illustrative. Steps may be omitted or executed in an alternate order, and additional steps may be added.

In step 6310, the user may be allowed to initiate a search for a specific type of content. For example, the user may be allowed to initiate a search for traffic reports by pressing a "Traffic" key or speaking a "traffic" command. Any other suitable type of search may be selected. This may include, for example, news, music, jazz, weather, baseball, talk, NPR, Howard Stern, etc.

In step 6315, the user may be allowed to initiate a search for a specific item of content. This could be, for example, a specific song. If desired, the user may be allowed to search for multiple items of content, in which case the ERS may search for any content that matches any of the requested items.

The user may also be allowed to specify the action to be taken when the search is successful, in step 6320. For example, the user may be allowed to specify that the ERS should immediately switch to the start of the matching content when it is found. The user may be allowed to specify that the ERS will not automatically switch to the content when matching content is found, but will provide a user notification. Alternatively, the user may be allowed to specify that the ERS should immediately select content other than the matching content when it is recognized on a station that is being played back. For example, the user may specify certain content items or types of items that are undesirable and others that are desirable, and may indicate that the ERS should automatically select content that is desirable when it determines that undesirable content is being played back. As another alternative, the user may be able to specify that the ERS should provide user notification when undesirable content is detected. As yet another alternative, the user may be able to specify that a copy of the content should be saved when it is recognized.

The search may be performed using any suitable technique. For example, in step 6325 the ERS may use related data that may have been stored with the audio data to determine the content, the type of content, or any other attribute of the content. In step 6330 the ERS may use signature matching to search for a requested item or list of items. In step 6335 the ERS may use previously downloaded schedule information to identify requested content or types of content.

In step 6340, the search may be performed immediately. In this case, the ERS may search through all currently stored audio data to find any matching content. If any such content is found, the ERS may jump to the station on which the content was broadcast and the playback position at which it began. FIG. 56 shows a flowchart for allowing a user to select content to which to jump.

If desired, upon receiving the search command from the user, the ERS may begin an on-going background search for matching content, in step 6345. The user may be allowed to continue to listen to the currently selected content while the search proceeds. The search may continue until matching content is found, until the user turns off the ERS, until the user deactivates the search, or any other suitable event or events. If desired, the ERS may allow the user to initiate multiple searches in parallel in the background. This process concludes at step 6350.

Figure 64:
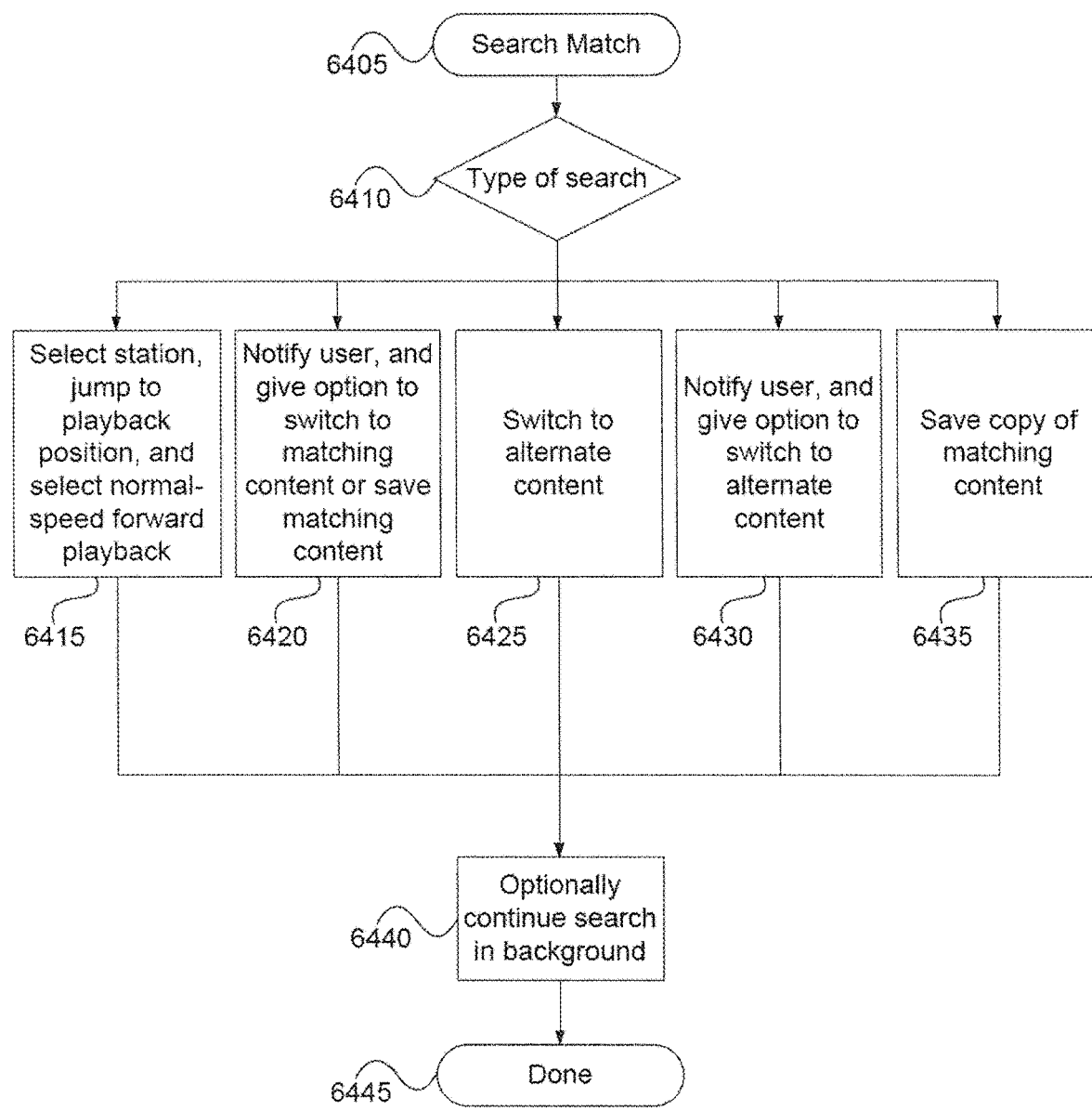
FIG. 64 is an illustrative flowchart showing steps of a search match process in the ERS in accordance with one embodiment of the present invention.

FIG. 64 shows an illustrative flowchart of a process 6405 that may occur when a previously initiated search finds an item of matching content. This may be in response to any type of search. The steps shown in this flowchart are illustrative. Steps may be omitted or executed in an alternate order, and additional steps may be added.

In check 6410, the ERS may determine the type of search that was matched. A search may be for desirable content or for undesirable content. A search for desirable content may be performed on all stations that are being monitored by the ERS. A search for undesirable content may be performed only on the station currently being played back. A search may be an automatic tune search or a user notification search. A search may be may be for desirable content to automatically save a copy of.

In step 6415, an automatic tune search for desirable content may have matched new content. In this case, the ERS may automatically select the matching station for playback, set the playback position to the start of the matched item, and enable normal-speed forward playback.

In step 6420, a notification search for desirable content may have matched new content. In this case, the ERS may notify the user about the matching content. For example, the name of the matching content may be displayed on a display device or output to the speakers. The user may be given an option to immediately tune to the matched content, for example by pressing a single key or with an audio prompt. If the user presses the key or speaks the tune command, the ERS may select the matching station for playback, set the playback position to the start of the matched item, and enable normal-speed forward playback. The prompt may also include a user option to save a copy of the matching content. If the user selects this option, the ERS may save a copy of the content. It may then automatically play the content, continue with the current playback, or give the user the option to play the saved content. If the user ignores the prompt, the ERS may continue with the current playback.

In step 6425, an automatic tune search for undesirable content may have matched new content on the station currently being played back. The ERS may have determined, for example, that the previously recorded audio that is about to be played is content that the user has indicated is undesirable. Alternatively, the ERS may determine that the undesirable content is being played after it has started. In this case, the ERS may determine whether there is preferable content on any other station (or at any other time on the current station). The system may then automatically select the preferable station for playback, set the playback position to the start of the preferable item, and enable normal-speed forward playback. In some embodiments, this may simply entail skipping over the playback of the undesirable content.

In step 6430, a notification search for undesirable content may have matched new content on the station currently being played back. The ERS may have determined, for example, that the previously recorded audio that is about to be played is content that the user has indicated is undesirable. Alternatively, the ERS may determine that the undesirable content is being played after it has started. In this case, the ERS may notify the user about the undesirable content. For example, the name of the undesirable content may be displayed on a display device or output to the speakers. In this case, the ERS may determine whether there is preferable content on any other station (or at any other time on the current station). The user may be given an option to immediately tune to the preferable content, for example by pressing a single key or with an audio prompt. If the user presses the key or speaks the tune command, the ERS may select the preferable station for playback, set the playback position to the start of the preferable item, and enable normal-speed forward playback. In some embodiments, this may simply entail skipping over the playback of the undesirable content. If the user ignores the prompt, the ERS may continue with the current playback.

In step 6435, a save-copy-type search may have matched new content on any station (whether the current station or any other station being monitored). In this case, the ERS may automatically save a copy of the identified content (for example, as shown in FIG. 58). If the content is recognized prior to the completion of its broadcast, the ERS may need to wait to save the copy until the broadcast is complete. If desired, the ERS may notify the user that the content has been saved, and may include an identification of the content. If desired, the system may automatically switch playback to the saved content or may give the listener the option to switch to the saved content.

In step 6440, the ERS may optionally continue the search in the background. For example, the user may wish to have the ERS continuously search for desirable and undesirable content, and automatically switch. Alternatively, the ERS may stop searching once it has found a first matching item of content. For example, if the search was configured to save a copy of the content, the search may not be continued after it is successful the first time. If desired, whether the search continues may be a user selection, made either when the search was initiated or when the matching content was found. In step 6445, this process completes.

FIG. 65A shows a flowchart of illustrative process 6505 that may be initiated when the user turns on the ERS. For example, the user may press an "On" button or speak an "on" command. The steps shown in this flowchart are illustrative. Steps may be omitted or executed in an alternate order, and additional steps may be added.

The ERS may have been continuously recording all monitored stations while it was turned off, as long as it had power and an incoming radio signal. In step 6510, recording may continue uninterrupted when the ERS is turned on. The display may be turned on, and user controls may be enabled. In step 6515, audio playback may be re-enabled for the station marked as currently selected. If desired, the user may be allowed to rewind, skip back, or search to listen to content that was broadcast while the ERS was turned off. This process completes in 6520.

FIG. 65B shows a flowchart of illustrative process 6550 that may be initiated when the user turns off the ERS. For example, the user may press an "Off" button or speak an "off" command. The steps shown in this flowchart are illustrative. Steps may be omitted or executed in an alternate order, and additional steps may be added.

In step 6555, recording may continue uninterrupted when the ERS is turned off. The display may be turned off, and user controls (except the "on" control) may be disabled. In step 6560, audio playback may be disabled. This process completes in 6565.

Figure 66:
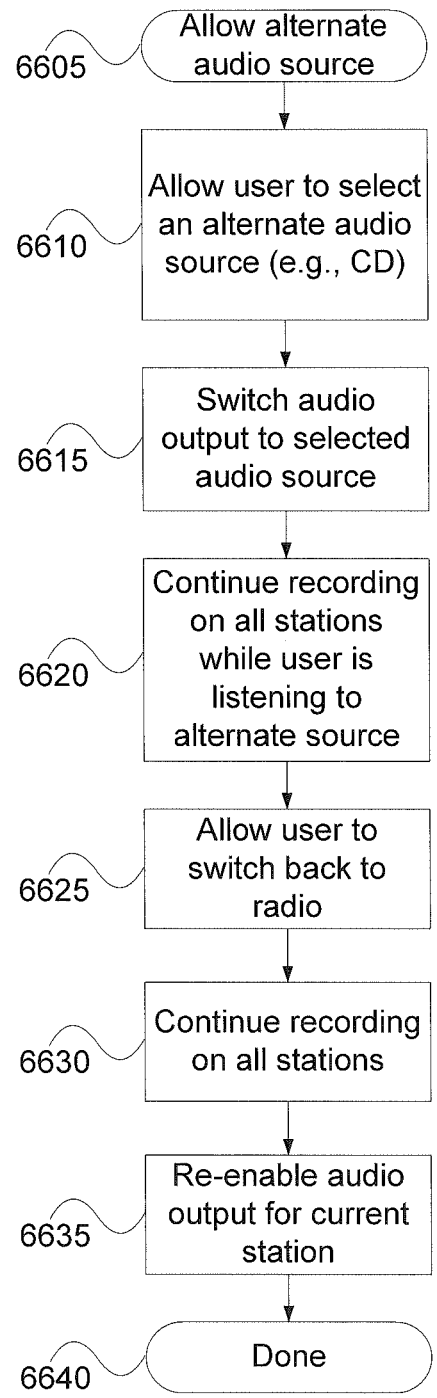
FIG. 66 is an illustrative flowchart showing steps of a listen to alternate audio source process in the ERS in accordance with one embodiment of the present invention.

FIG. 66 shows a flowchart of illustrative process 6605 for allowing a user to listen to an alternate audio source. For example, the ERS may have an integrated CD player. This process may be initiated, for example, when the user presses a "CD" key or speak a "CD" command. The steps shown in this flowchart are illustrative. Steps may be omitted or executed in an alternate order, and additional steps may be added.

In step 6610, the user may be allowed to select an alternate audio source. For example, the ERS may have a "CD" key, or recognize a "CD" spoken command. As another example, a CD player may automatically be selected when a CD is inserted. Any other suitable type of user selection may be used, and any suitable type of alternate audio input source may be supported. In step 6615, the ERS may switch the audio output to the selected source. For example, the playback-enabled flag may be cleared and an audio output switch, such as audio output switch 4322 of FIG. 43, may be toggled. In step 6620, recording may continue uninterrupted on all monitored stations while the alternate audio source is output. In step 6625, the user may be allowed to reselect the radio for playback. For example, the ERS may have a "Radio" key, or recognize a "radio" spoken command. When the user reselects the radio, recording may continue uninterrupted on all monitored stations in step 6630. In step 6635, the radio output may be enabled. For example, the playback-enabled flag may be set and an audio output switch, such as audio output switch 4322 of FIG. 43, may be toggled. This process completes in step 6640.

In some embodiments, the audio output from the alternate source may be received as an input to the ERS, digitized, and treated as another tuner input. In these embodiments, the listener may use any of the playback controls while listening to the alternate audio source. For example, the system may support variable playback speeds and direction, jumping, searching, signature creation, and saving of content.

Figure 67:
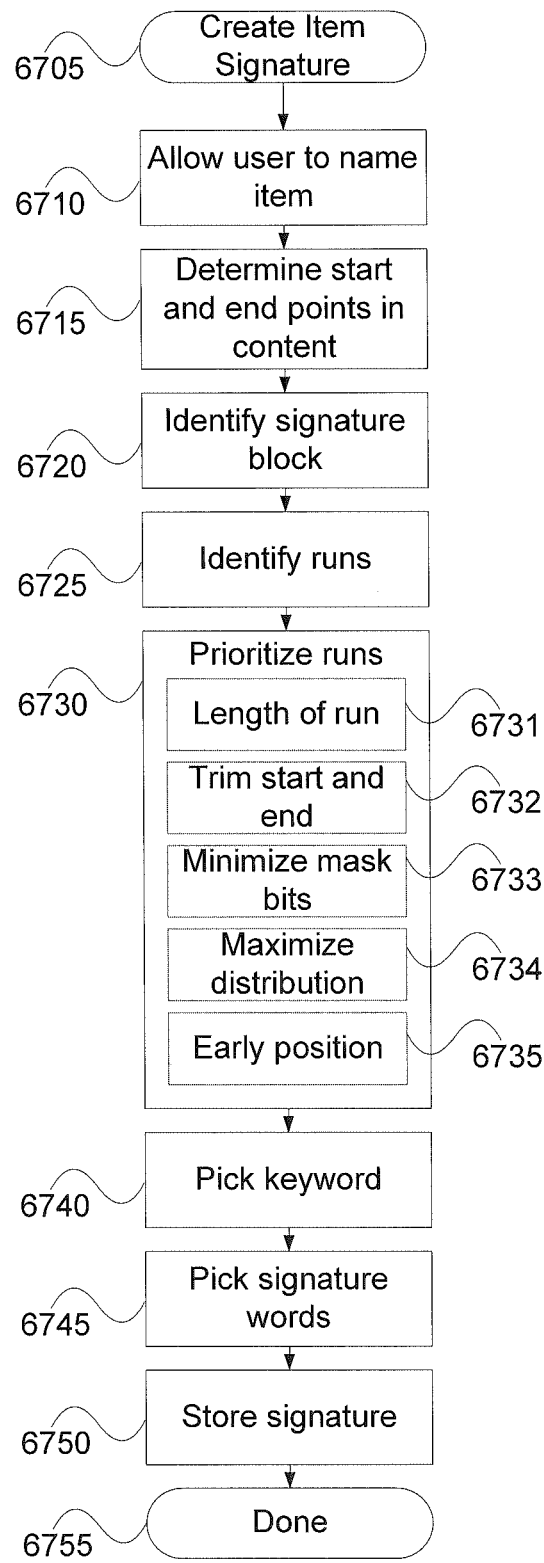
FIG. 67 is an illustrative flowchart showing steps of a process to create a signature for an item of audio content in the ERS in accordance with one embodiment of the present invention.

FIG. 67 shows a flowchart of illustrative process 6705 to create an item signature for an item of audio content. For example, the user may press a "Save Signature" button or speak a "save signature" command. The steps shown in this flowchart are illustrative. Steps may be omitted or executed in an alternate order, and additional steps may be added.

In step 6710, the user may be allowed to name the item. If the item has been previously saved, than the ERS may simply use the name and other information that are associated with the item. If the item is a segment of content from a currently monitored radio station, the user may be allowed to speak a name or otherwise enter an identifier for the item. If desired, any other identifying information may be entered. For example, the user may be allowed to enter a content type (e.g., song, commercial, etc.). The user may be allowed to enter a preference type for the content as well. For example, the user may press a "Like" or "Dislike" key.

In step 6715, the end points of the content may be determined. If the item has been previously saved, then the end points are the start and end of the item. If the item is a segment of content from a currently monitored radio station, the current playback position and the saved playback position may be used as the start and end point.

In step 6720, the start and end of the signature block are identified. If the item is a segment from a currently monitored radio station, the ERS may determine which signature word corresponds to the start time of the item, and which signature word corresponds to the end time of the item. The full set of signature words between these two points will then be considered in creating the item signature. If the signature words are stored in a circular buffer, the set may be accessed in two parts.

In step 6725, the process identifies signature runs. These are sets of consecutive signature words that are identical, or nearly identical. If desired, there may be a threshold of number of bits of variance among signature words in the run (e.g., all signature words must match at least 15 out of 16 bits of all of the other signature words in the run).

In step 6730, the runs may be prioritized. Any suitable factors may be considered in prioritizing the runs. For example, the length of the run (number of consecutive signature words) may be considered in sub-step 6731, providing that longer runs are higher priority. In sub-step 6732, runs close to the start or end of the segment block may be de-prioritized (or ignored). Because radio stations often overlap content with the start or end of a song, signature data from that part of the song is not reliable. Also, if the signatures are derived from a compression algorithm that may incorporate information from prior samples, the signature words at the start of an item of content may be influenced by whatever content happened to be played just prior. If desired, the number of signature words ignored at the start of the content item may be different from the number ignored at the end.

In sub-step 6733, runs may be prioritized based on the number of mask bits in the run. For example, the average number of mask bits may be calculated over the length of the run, and the priority may be decreased as the number increases. In sub-step 6734, the runs may be prioritized to maximize distribution throughout the content. Runs that are adjacent or otherwise near in time may be de-prioritized. In sub-step 6735, some runs that are early in the signature (i.e., correspond to the earlier broadcast audio) may be given a higher priority.

In step 6740, a keyword may be chosen. This is a single signature word that corresponds to the "best" run. The run should have few mask bits and should be a long run. Preferably, it should be closer to the start of the content to allow matches to be detected earlier. The keyword value may be determined by calculating the value that has the most bits in common with all of the signature words in the run. As part of choosing the keyword, the algorithm may determine a keyword threshold. This is a number of bits that any incoming signature word must have in common with the keyword before a preliminary match will be determined. This threshold may be based on the average number of mask bits for the run from which the keyword was taken, as well as the variation among the signature words in the keyword run. The algorithm may also calculate the keyword offset, which is the number of signature words from the start of the content to the middle of the keyword run.

After choosing the keyword, the algorithm may choose the individual item signature words, in step 6745. These are signature values taken from the "best" (highest priority) runs throughout the content item, excluding the keyword run. For example, the algorithm may choose an additional eight signature values. For each signature word, the algorithm calculates an offset. This offset may be calculated as the number of frames between the middle of the keyword run and the middle of the run for the particular signature word. The offset may be positive or negative, as the signature word may be either before or after the keyword. The algorithm may also calculate a match threshold for the item signature. This threshold may be calculated individually for each signature word based on variation among signature words in the run and average number of mask bits for the run, and then summed to create a single threshold for the entire item signature.

If desired, the item signature may be biased based on the user's level of interest in the item. Biasing the item signature may involve increasing the likelihood of a false match while decreasing the likelihood of a missed match, or it may involve decreasing the likelihood of a false match while increasing the likelihood of a missed match. For example, if the user has indicated that the item is disliked and is to be automatically skipped, the item signature may be biased to decrease the likelihood of a false match, so that incorrectly-matched content is less likely to be skipped. Conversely, if the user has indicated that the item is liked and the user is to be notified when the item is found, the item signature may be biased to decrease the likelihood of a missed match while increasing false matches. Biasing the item signature may be accomplished, for example, by increasing or decreasing the match threshold and/or the keyword threshold.

In step 6750, the item signature may be saved. This may include: a name or other identifier; category of the content (e.g., commercial, song, jazz, rock, etc.); the listener's preference level; the length of the content item (e.g., the number of audio samples, blocks, frames, seconds, or other measure from the start to the end); a keyword value, offset, and threshold; the individual signature values and offsets; and the signature match threshold. The item signatures may be stored in any suitable data structure, such as an array or a linked list. They may be sorted in any suitable manner. For example, all item signatures for content liked by the listener may be stored together, item signatures for content disliked by the listener may be stored in a separate list, and item signatures for content items to be saved may be stored in a third list. Because each individual item signature is small (e.g., 50 or 100 bytes), many of them may be stored in a limited amount of memory.

This process ends at step 6755.

Figure 68A:
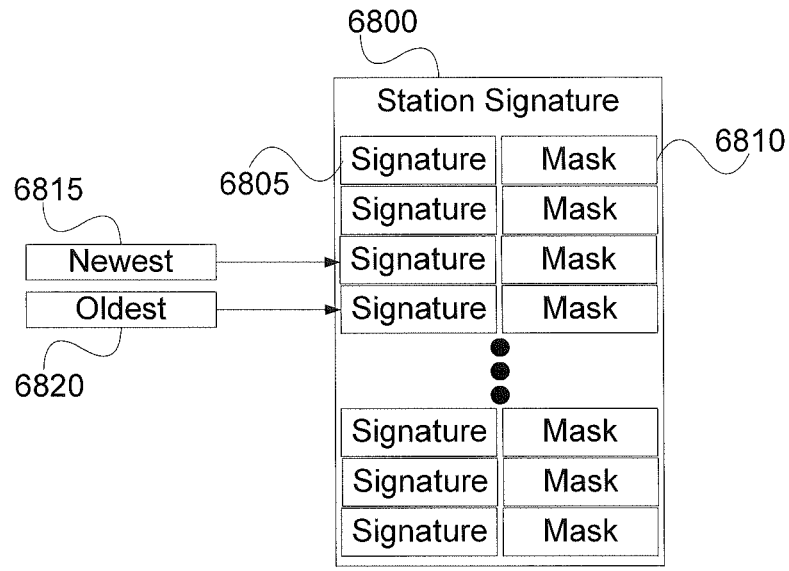
FIG. 68A is a block diagram of an illustrative data structure that may be used to hold signature data for a radio station in the ERS in accordance with one embodiment of the present invention.

FIG. 68A shows a block diagram of an illustrative data structure 6800 that may be used to hold a station signature—the accumulated signature data that corresponds to the audio data that has been recorded for a radio station. Data structure 6800 may be a circular buffer, and it may hold each of the individual signature words 6805 and mask words 6810 that correspond to each of the audio blocks or frames. Pointer or index 6815 may refer to the signature/mask word pair that has most recently been written (e.g., that corresponds to the most recently recorded audio on the station.) Pointer or index 6820 may refer to the oldest signature/mask word pair (e.g., that corresponds to the oldest audio data for the station that has not been overwritten.) As data structure 6800 may be a circular buffer, when each new signature/mask pair is written, if the buffer is full the oldest pair may be overwritten. If desired, other types of data structures such as a linked list may be used. If desired, the signature data may be incorporated directly into the compressed audio blocks—e.g., each audio block (such as compressed data block 5010 or FIG. 50) may include the signature and mask data that corresponds to the data in the block.

Figure 68B:
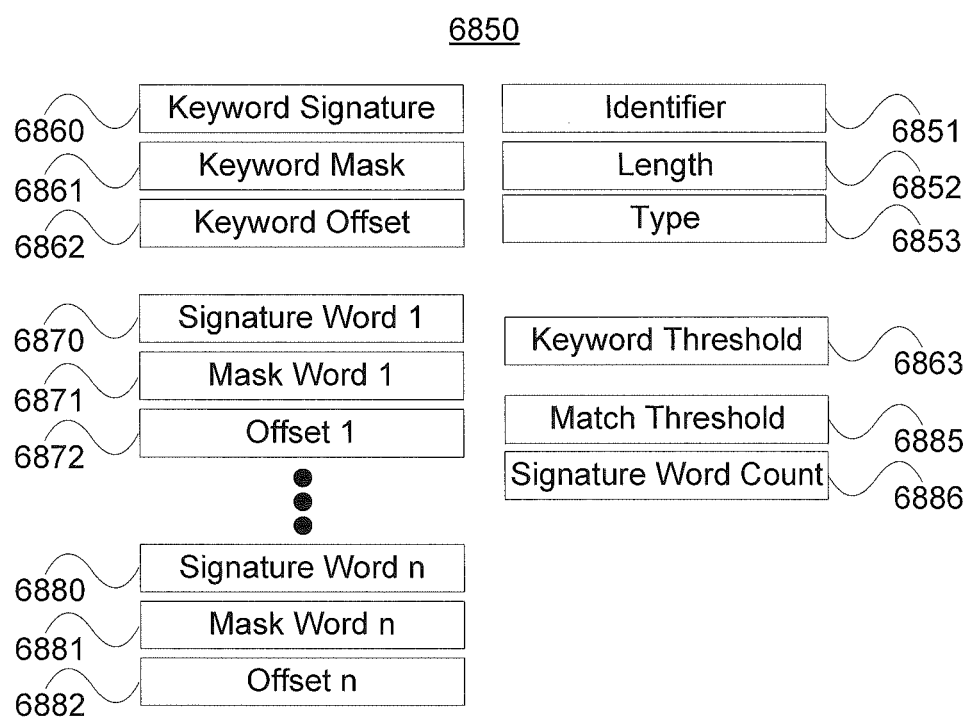
FIG. 68B is a block diagram of an illustrative data structure that may be used to hold signature data for an item of audio content in the ERS in accordance with one embodiment of the present invention.

FIG. 68B shows a block diagram of a data structure 6850 that may be used to hold an item signature—a relatively small representation of an item of content (e.g., a song or commercial) that may be used to recognize the item when it is broadcast. The elements of this structure are illustrative. Elements may be omitted and additional elements may be added if desired.

Field 6851 is an identifier. This may be an identifying number, a name, or any suitable combination of identifying attributes. Field 6852 is a length. It represents the length of the item of content. It may be expressed in any suitable units, such as seconds or milliseconds, number of signature words, number of frames or blocks of compressed data, or any other appropriate units. Field 6853 may include one or more type attributes of the item. For example, it may differentiate between songs, commercials, talk, etc. It may differentiate between genres of music, such as country, alternative, classical, etc. It may include a listener's preference level, such as like or dislike, or a level of liking or disliking. It may also indicate an action to be taken when the item is found, such as jumping to it, skipping it, or saving a copy.

Field 6860 may be a keyword signature word. This may be a single signature word that may be used to trigger a recognition process. Field 6861 may be a mask word corresponding to the keyword signature word. This mask word may be used to evaluate the quality of any match detected with the keyword. If desired, the keyword mask may be omitted. Field 6862 may be a keyword offset. It may represent, in any suitable units, the time offset from the start of the item of content to the point in the item represented by the keyword. Field 6863 may be a keyword threshold. This threshold may be used to determine whether any signature word is close enough to the keyword to proceed with the match process. If desired, keyword threshold 6863 may be omitted and a standard predetermined threshold value may be used for all signature keywords.

Item signature 6850 may include a number of individual signature words (e.g., signature word 1 6870 and signature word n 6880.) Each individual signature word may be taken from a full station signature, such as station signature 6800. The number of signature words in the item signature may be much fewer than the number of signature words in the corresponding segment of the station signature. For example, each item signature may include eight signature words in addition to the keyword signature. If desired, each item signature may have the same number of signature words. Alternatively, the number of signature words in the item signature may be variable, and item signature 6850 may include signature word count 6886 that defines the number of individual signature words present in the particular item signature.

If desired, there may be a mask word (e.g., mask word 1 6871 and mask word n 6881) corresponding to each signature word. Alternatively, the mask words may not be stored as part of the item signature. There may also be an offset value (such as offset 1 6872 and offset n 6882) corresponding to each signature word. The offset value may define the time offset of the signature word. The offset may be in any suitable units, and may be relative to the keyword or to the start of the item of content. Item signature 6850 may also include match threshold 6885, which may define the number of bits that must match across all of the signature words in order for a match to be declared. For example, if there are eight 16-bit signature words in the signature, match threshold 6885 may be defined as 123, in which case 123 matching bits out of 128 are required to declare a match. The match threshold may have been calculated based on the number of mask bits corresponding to the original signature words from the station signature used to create the item signature. If desired, match threshold 6885 may be omitted and a standard match threshold may be used for all item signatures.

Item signatures may be stored in any suitable data structure. For example, three linked lists may be created. The first linked list may include all item signatures for content that the listener likes. The second linked list may include all item signatures for content that the listener dislikes. The third linked list may contain all item signatures for content that the listener has asked to save.

Figure 69:
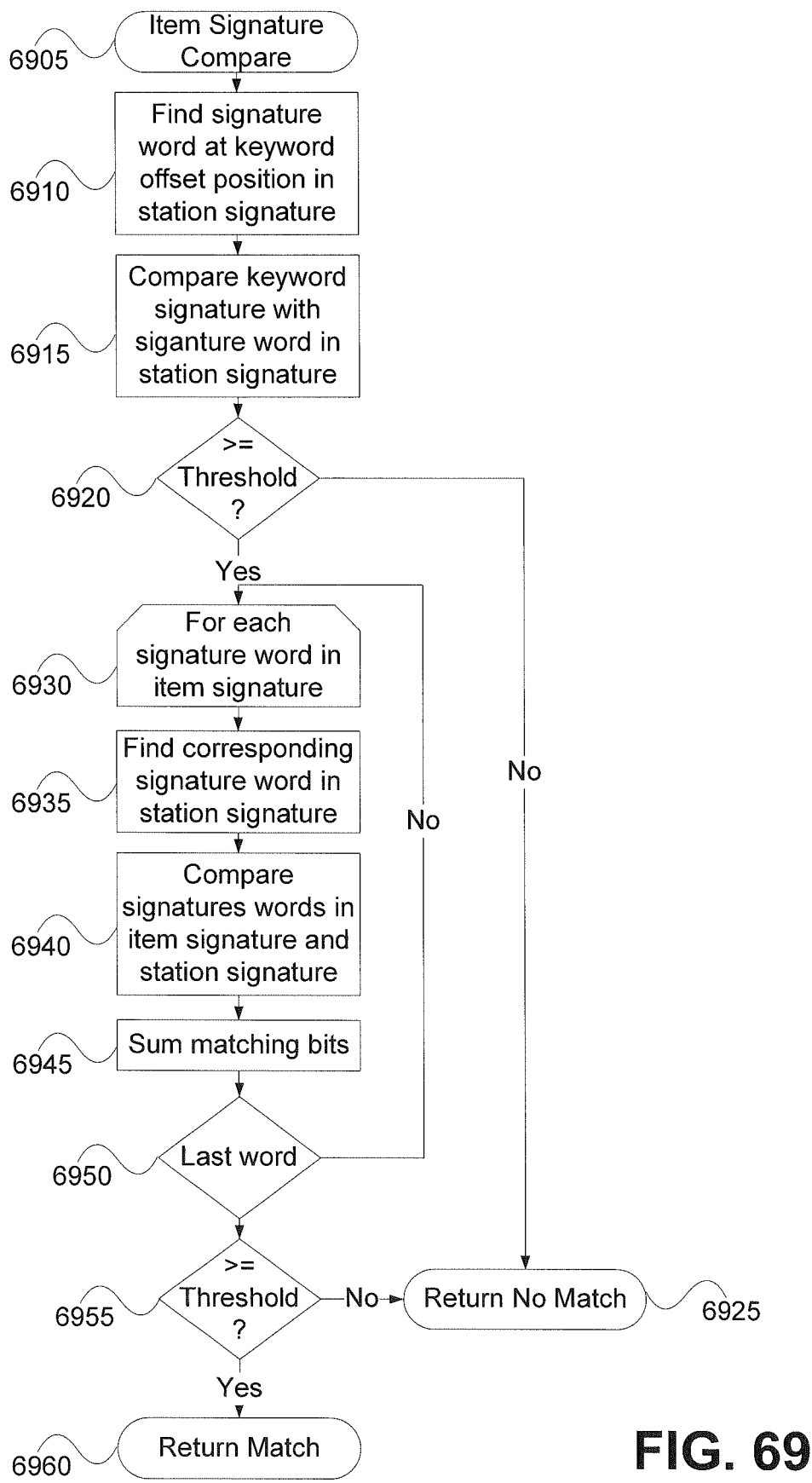
FIG. 69 is an illustrative flowchart showing steps of a process to compare a signature for an item of audio content with signature data stored for a radio station in the ERS in accordance with one embodiment of the present invention.

FIG. 69 shows a flowchart of illustrative process 6905 to compare an item signature with the audio content at a specific location in a station signature. This process may be executed, for example, as part of a process to find a specific item of content, as part of an on-going process to find content the listener likes, or as part of an on-going process to find content that the listener dislikes. The steps shown in this flowchart are illustrative. Steps may be omitted or executed in an alternate order, and additional steps may be added.

In step 6910, the process looks for the signature word in the station signature that corresponds with the keyword in the item signature. This may be accomplished using the keyword offset field in the item signature. If the station signature is stored in a circular buffer, the process may add the keyword offset value to the starting search position in the station signature to do this (with wrapping if the end of the buffer is found).

In step 6915, the signature word in the station signature at the keyword offset location is compared with the keyword signature. The number of bits matching between the two words may be calculated. In some embodiments, this is done by performing an exclusive-or function on the two values, counting the number of bits in the result, and subtracting the count from the total number of bits in the signature word. In some other embodiments, this may be done by comparing the individual bit fields. For example, if each signature word consists of 32 two-bit fields, the corresponding fields in the two words may be compared. For each comparison, depending on the two values, the number of matching fields may be incremented, the number of non-matching fields may be incremented, or the number of indeterminate fields may be incremented. In check 6920, the number of matching bits is compared with the keyword threshold value in the item signature. If the number of matching bits is less than the threshold, the process may return an invalid match indication in step 6925. If the number of matching bits is greater than or equal to the threshold, the process continues.

Loop 6930 processes each of the signature values in the item signature. The number of signature words may be determined by a signature word count stored with the item signature. In step 6935, the process looks for the signature word in the station signature that corresponds with signature word in the item signature. This may be accomplished using the corresponding signature offset field in the item signature, by adding the signature offset to the keyword offset (assuming the signature offset is specified relative to the keyword location). In step 6940, the signature word in the station signature at the signature offset location is compared with the signature word from the item signature. The number of bits matching between the two words may be calculated and accumulated over all of the signature words in the item signature in step 6945. The comparison of signature words may be accomplished using an algorithm similar to that used for the keyword signature, described above in conjunction with step 6915. In check 6950, the process checks for the last signature word in the item signature. It continues with the loop if the last signature word has not been processed.

In check 6955, the accumulated number of matching bits is compared with the signature match threshold value in the item signature. If the number of matching bits is less than the threshold, the process may return an invalid match indication in step 6925. If the number of matching bits is greater than or equal to the threshold, the process may return a valid match indication in step 6960.

Figure 70:
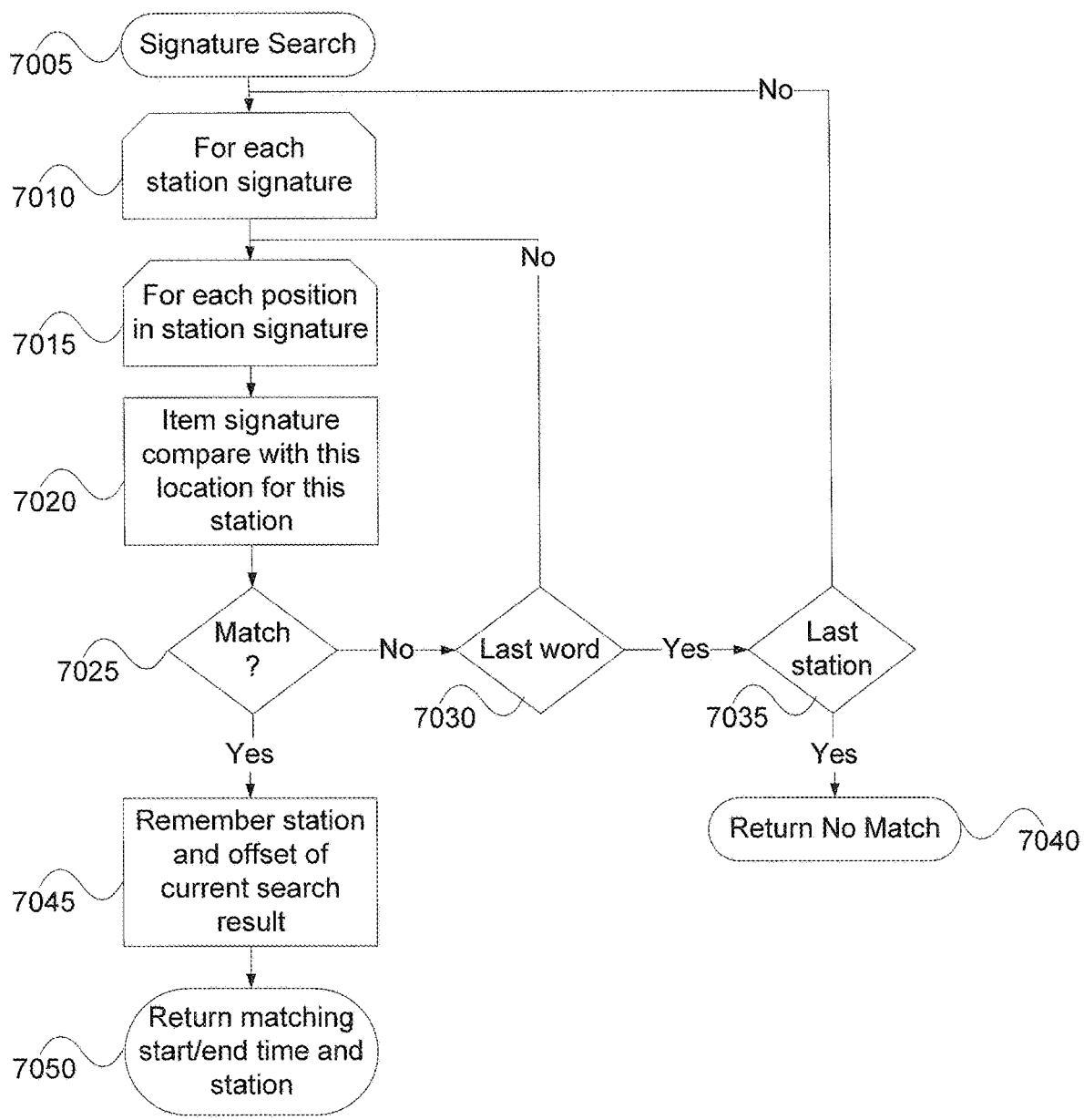
FIG. 70 is an illustrative flowchart showing steps of a process to search for an item of audio content based on signature data in the ERS in accordance with one embodiment of the present invention.

FIG. 70 shows a flowchart of illustrative process 7005 to search for an item of content based on its signature. This process may be executed, for example, as step 6325 of FIG. 63. The steps shown in this flowchart are illustrative. Steps may be omitted or executed in an alternate order, and additional steps may be added.

In loop 7010, the station signature for each station is searched in turn. The stations may be searched in any suitable order. For example, they may be searched in the order of their favorite station identifier, in the order corresponding to how recently they were listened to, by frequency, or based on any other suitable criteria or combination of criteria. In loop 7015, each location within the station signature for the station being processed is searched. The locations may be searched from oldest to newest or from newest to oldest. Locations in the station signature may not be searched if they are too new to have enough signature data after them to perform a complete match against the item signature. If desired, the order of these two loops may be reversed, searching all stations for each time offset before proceeding to the next time offset.

In step 7020, a signature comparison is performed on the selected station at the selected offset. This may be done using the process of FIG. 69. If no match is reported, the offset loop may proceed in step 7030, and the station loop may proceed in step 7035. If no match is found and both loops complete, a negative search result may be returned in step 7040.

If a match is found at any offset on any station, the process may remember the offset and station on which they were found in step 7045. These values may be remembered if the search is reentered at a later time, at which time the search may restart from this location. In step 7050, the process returns a positive match. This may include the start and/or end time at which the matching item was found and the station on which it was found.

Figure 71:
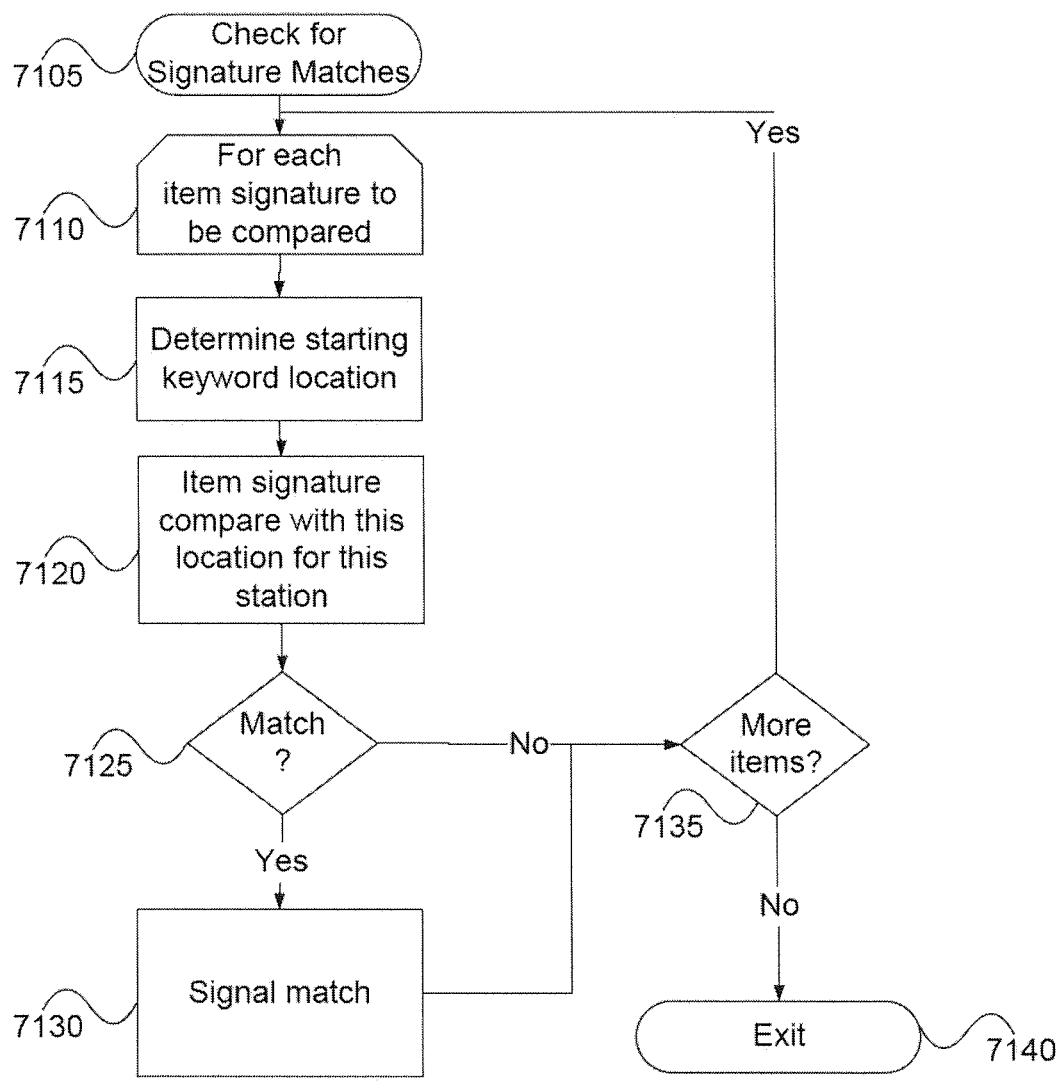
FIG. 71 is an illustrative flowchart showing steps of a process to check for matching audio content in incoming audio data based on signature data in the ERS in accordance with one embodiment of the present invention.

FIG. 71 shows a flowchart of illustrative process 7105 to check for signature matches on a station. This process may be executed, for example, as step 4740 of FIG. 47, as part of an audio input thread when new signature data is generated. Alternatively, it may be executed as part of a separate thread. The steps shown in this flowchart are illustrative. Steps may be omitted or executed in an alternate order, and additional steps may be added.

In loop 7110, the process selects each item signature to be compared in turn. If the station on which the comparison is taking place is the current station, this might include the list of all items that the listener has identified as disliked (e.g., so that they may be skipped over). If the station on which the comparison is taking place is not the current station, this might include the list of all items that the listener has identified as liked (e.g., so that the listener may be notified). If the listener has designated some content items to be saved when they are recognized, then this comparison may take place regardless of whether the station is the current station.

In step 7115, the process identifies the location in within the station signature at which to make the comparison. Preferably, this location is such that all of the signature words will have occurred, but as soon as possible after that so that the match will be detected as early as possibly (e.g., before the broadcast of the item has completed). For example, the process may subtract the maximum signature offset in the item signature (relative to the keyword offset) from the location of the most-recently-written signature word, add that to the keyword offset (relative to the start of the item), and check to see if the item starts at that location. Alternatively, if the search is configured to save a copy of the matched content, the comparison may be delayed until the full length of the content is available (subtracting the length of the item and adding the keyword offset). In step 7120, the comparison takes place between the item signature and the recent content of the station signature, for example using the process illustrated in FIG. 69.

If a match is found in check 7125, the match is signaled in step 7130. This may be accomplished using a flag or message or other type of signal to another process. If desired, this process may "debounce" the match result. This may consist of determining whether the same match occurs multiple times in a row, or within a short time of a previous match of the same item signature. In this case, only a single match may be signaled to the other process.

In check 7135, the process checks to see if more item signatures are to be compared. If so, the loop continues. If not, the process exits at step 7140.

Figure 72:
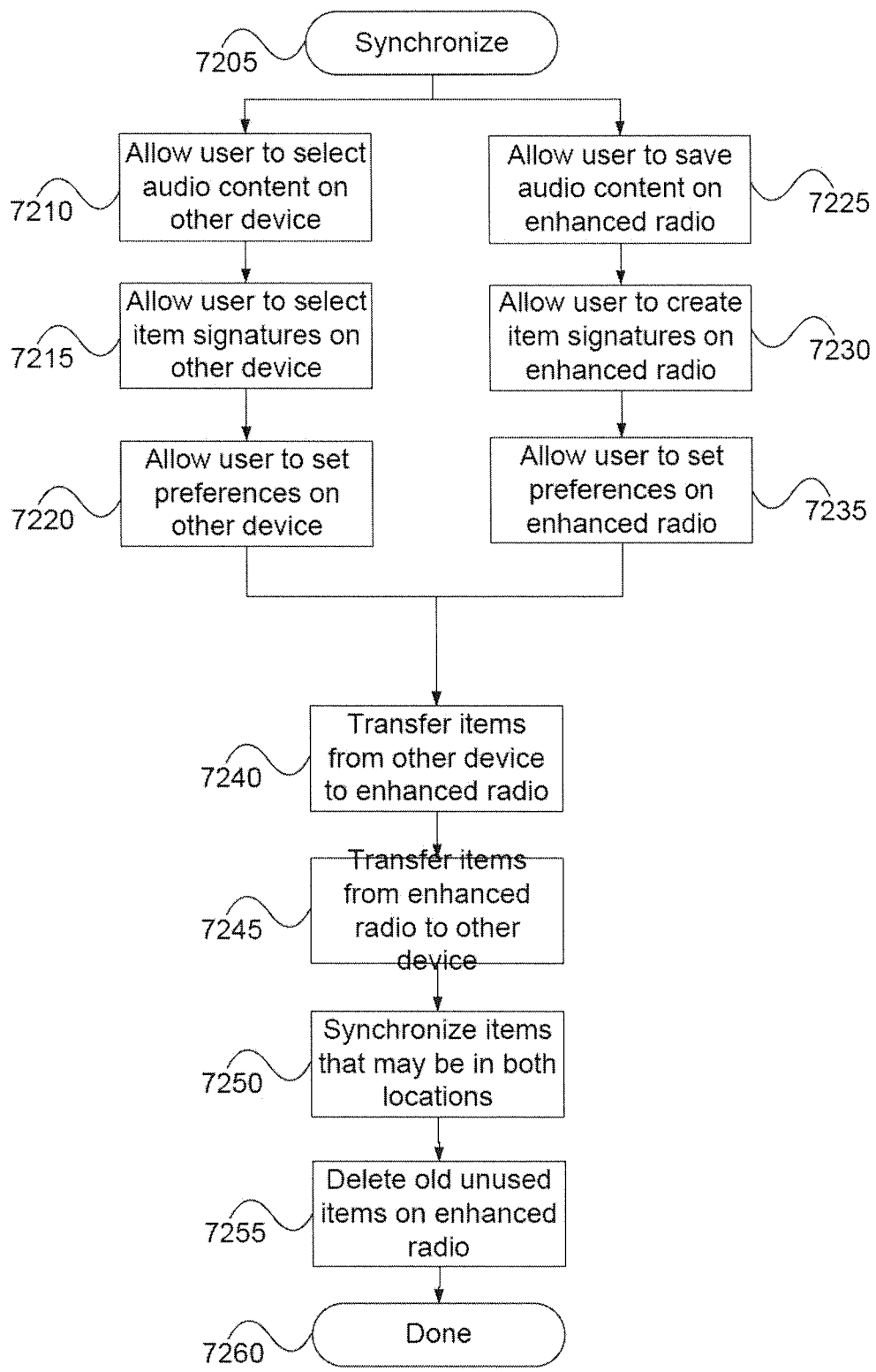
FIG. 72 is an illustrative flowchart showing steps of a process to synchronize data between another device and the ERS in accordance with one embodiment of the present invention.

FIG. 72 shows a flowchart of illustrative process 7205 for synchronizing an ERS with another device. The other device may be, for example, a personal computer or a portable audio player. This process may be initiated when the user initiates a synchronize command from either the ERS or from the other device. The steps shown in this flowchart are illustrative. Steps may be omitted or executed in an alternate order, and additional steps may be added.

If desired, this process may be executed in real-time over a communications link. For example, this may be done using communications device 4340 of FIG. 43. Alternatively, this may be done using a memory device that may be accessed by both the ERS and the other device. For example, both the ERS and the other device may have hardware and software to read and write a removable flash memory card in the same format.

This process may be used to backup data on the ERS to a personal computer. It may be used to restore previously backed up items to the ERS. It may be used to send new items to the ERS. It may be used to allow the user to use more capable input and output devices (such as a keyboard, mouse, and CRT monitor) to enter information for the ERS. It may be used to allow an ERS listener to share preferences and data between multiple ERSs (e.g., one at home, one in the car, etc.) It may also be used to allow multiple users of ERSs to share information, such as songs and item signatures.

The other system may allow the user to identify audio content items to download in step 7210. For example, a user of a personal computer may be allowed to select compressed audio files, such as MP3 files, that are stored on a local hard drive or other storage. The user may also be allowed to select compressed audio files over the Internet, which may require the payment of a fee. Software on the personal computer may keep track of how much unused memory is available in the ERS or on the removable memory device, and constrain the number of audio files that may be selected.

The other system may allow the user to identify item signatures to download in step 7215. For example, a personal computer may have software to generate item signatures from compressed audio files stored on a storage device in the computer. The user may also be allowed to subscribe to a signature service over the Internet. This may allow the user to specify categories of content or specific items, and to download signatures for these items over the Internet, for downloading into the ERS. For example, the user may specify a performing artist, and for a fee download signatures for all songs by that performing artist. The user may also be able to download item signatures for the set of commercials currently being aired in a local radio market, which may also be for a fee, so that they may easily be skipped by the ERS. As another example, the user may be able to subscribe to a service to download signatures for a particular radio station. This might include signatures for songs on the station's play list, signatures for commercials that are being aired by the station, signatures for station promotions, etc. Each of the signatures may be associated with information, such as the type of item (commercial, song, promotion, etc.), title, artist, etc. When downloading the set of commercial signatures, the system may also provide a list of signatures for commercials that are no longer being broadcast, so that they may be deleted from the ERS. When the user specifies item signatures to download, the user may also be able to specify how each item signature is to be used by the ERS. For example, the user may be allowed to specify that the ERS should search out and notify the user when matching content is found. The user may be allowed to specify that matching content be skipped by the ERS. The user may be allowed to specify that a copy of the matching content should be saved by the ERS when it is broadcast. The user may be allowed to specify that the ERS should display information about the item when it is detected. Any other suitable handling may be specified.

The other system may allow the user to set preferences for use in the ERS in step 7220. For example, a software application on the personal computer may allow the user to change favorite station settings for the ERS. The application may access a database of available radio stations over the Internet, and provide detailed information to the user of formats, play lists, etc. The software application may also allow the user to set other types of preferences. For example, the user may be allowed to define genres of music that are preferred or are disliked. The user may be allowed to set or change configuration options for use in the ERS. For example the user may be allowed to specify whether the ERS should jump to the current broadcast position ("live") when changing channels, or whether the ERS should resume from where it left off. As another example, the user may be allowed to specify priorities for favorite stations, and to specify a minimum time to retain for each. Any other suitable types of configuration information may be supported.

The other system may allow the user to specify any other suitable types of data for downloading during synchronization. For example, the user may be allowed to specify a software upgrade, which may be obtained over the Internet, to be downloaded during the next synchronization.

In step 7225, the user may be allowed to save audio content on the ERS, for example as shown in FIG. 58. In step 7230, the user may be allowed to create item signatures for audio content received by the ERS, for example as shown in FIG. 67. In step 7235, the user may be allowed to modify configuration settings on the ERS, for example as shown in FIG. 52A. If desired, the ERS or the other system may allow the user to specify which of the saved content items, item signatures, and configuration settings to upload. Alternatively, the system may upload all of these items when synchronization takes place. Any other suitable types of data may be uploaded during synchronization. For example, the ERS may upload usage information to be used by a ratings service.

In step 7240, the identified items are transferred from the other device to the ERS. For example, they may be sent using a device such as communications device 4340 of FIG. 43. Alternatively, the data may be written to a removable memory device that is shared with the ERS. When data is downloaded, it is converted into the data structures used by the ERS. For example, compressed audio content items may be converted into a linked list format similar to that shown in FIG. 50. Item signatures may be added to linked lists depending on the type (e.g., content to be skipped, content that the listener likes, content to be automatically saved).

In step 7245, the items on the ERS are uploaded to the other device. For example, they may be sent using a device such as communications device 4340 of FIG. 43. Alternatively, the data may be written to a removable memory device that is shared with the other device. As data is uploaded, it may be converted into a format suitable for the other device. For example, the compressed audio data may be stored into files on the personal computer, and item signatures may be stored in a database on the personal computer.

In step 7250, the items may be synchronized. If similar items are available in both places, the two may be reconciled. For example, if the user has changed configuration settings in one or both locations, the most recent changes may be retained. If there are two copies of a compressed audio item or an item signature, only one copy needs to be retained in either location.

In step 7255, any old, unused items may be automatically deleted on the ERS. For example, if an item signature from the other device contains an indication that it is for a commercial that is no longer being broadcast, that signature may be deleted. If the user has deleted an item (e.g., a song or an item signature) on the personal computer, the corresponding item may be deleted from the ERS's memory. The ERS may also track the last time any item signature successfully matched an incoming broadcast, and certain item signatures (e.g., item signatures for commercials) may be automatically deleted from the ERS if they have not been seen for a predetermined number of days.

In step 7260, this process completes.

Figure 73:
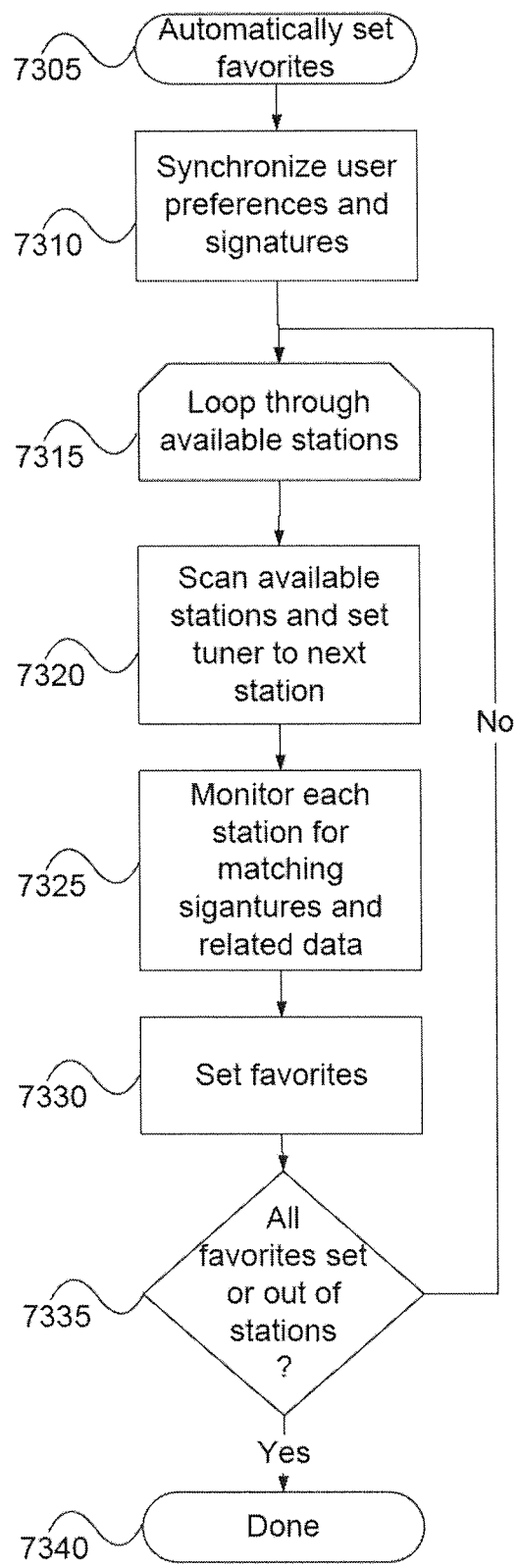
FIG. 73 is an illustrative flowchart showing steps of a process to automatically set favorite stations in the ERS in accordance with one embodiment of the present invention.

FIG. 73 shows a flowchart of illustrative process 7305 to automatically set the favorite stations in the ERS. This process may be executed in response to a user command to "set all". Prior to executing this process, the user may be given the opportunity to save the definitions of the current favorite stations, as shown in FIG. 52B. The steps shown in this flowchart are illustrative. Steps may be omitted or executed in an alternate order, and additional steps may be added.

In step 7310, the user may be allowed to synchronize information between the ERS and a personal computer, for example as shown in FIG. 72. This may include the synchronization of user preferences (e.g., preferred music genres and station formats) and item signatures for liked and disliked content. For example, this information may be stored onto a removable memory card by the personal computer, and the removable memory card may be inserted into an ERS in a car, such as a rental car, that is being driven in an unfamiliar area.

In loop 7315, the ERS processes all available radio stations. In step 7320, the ERS searches through all available radio stations. One or more of the tuners in the ERS is used to scan through the stations that may be received in the current location. This may be done in the background while the user listens to other content, or it may be done in the foreground so that the user may hear each station in turn. It may be done using a single tuner, or using multiple tuners to find desirable stations more quickly. In step 7325, each of the stations is monitored for a period of time. This may be a predetermined period of time, until suitable related data is received, until a certain number of signature matches are detected, or any other suitable criteria or combination of criteria. In step 7330, some of the monitored stations may be set as favorites. This may be based on the criteria such as matching between related data and the user's preferences, matching of item signatures for liked content, matching of signatures for disliked content, and any other suitable criteria. If appropriate, none of the monitored stations may be set as a favorite station. In check 7335, if there are still stations left to check and not all of the tuners are being used for favorite station, the loop may continue. Any tuners set to newly-defined favorite stations may be removed from the set used to monitor new stations in subsequent loop iterations. In step 7340, this process completes.

Figure 74:
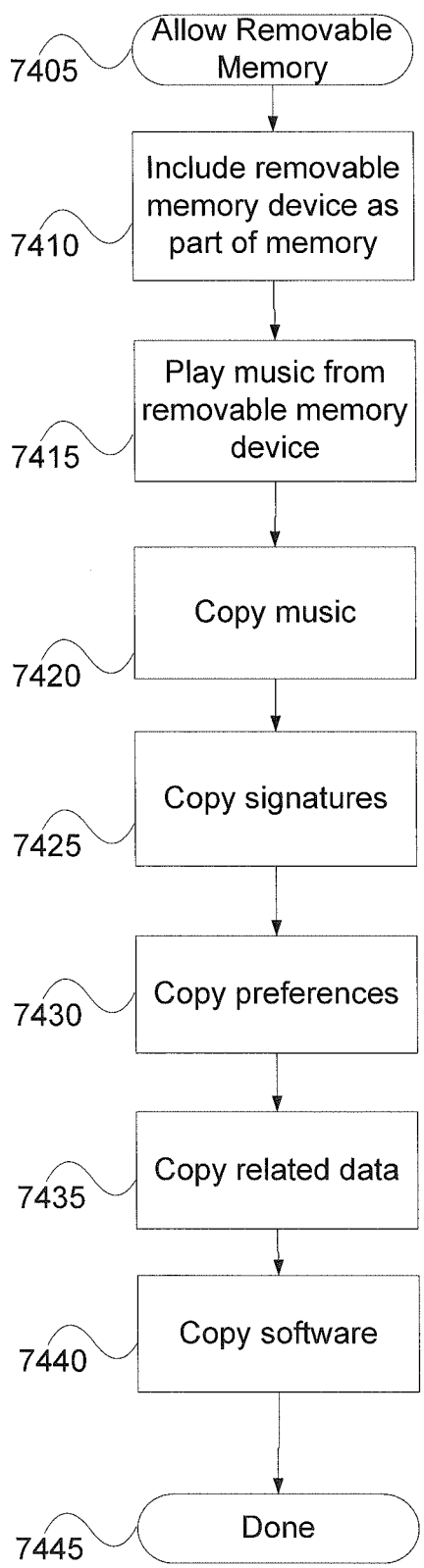
FIG. 74 is an illustrative flowchart showing steps of a process to include a removable memory device in the ERS in accordance with one embodiment of the present invention.

FIG. 74 shows a flowchart of illustrative process 7405 of allowing removable memory in the ERS. The steps shown in this flowchart are illustrative. Steps may be omitted or executed in an alternate order, and additional steps may be added.

In step 7410, a removable memory device may be included as part of memory in the system, for example as part of memory 4314 of FIG. 43. The removable memory device may be configured to use (i.e., read and/or write) removable memory media. As one example, this may be a flash memory card that may also be configured to be accessible by one or more other system. As another example, this may include a CD-ROM drive. If desired, any other suitable type of removable memory device may be supported. If desired, multiple removable memory devices may be supported.

In step 7415, the ERS may play music from the removable memory device. For example, the removable memory device may be a CD-ROM drive, and the ERS may play music that is stored on a music CD or on a CD-ROM that is inserted into the CD-ROM drive.

In step 7420, music may be copied using the removable memory device. For example, songs that are stored on a music CD or on a CD-ROM may be copied into memory that is built into the ERS, and may be made accessible for later playback. If desired, the music may be converted in format as it is copied. This may include, for example, changing compression formats and putting it into the linked list structure used within the ERS. If desired, the music may be copied automatically when the removable memory media is inserted into the removable memory device. Alternatively, it may be copied when the user executes a command, for example pressing a "Load Music" key or speaking a "load music" command. As another example, music may be copied from the ERS's built-in memory to the removable memory media (e.g., flash memory device) when the user gives a command to do so.

Other types of information may be copied from the removable memory media to the ERS's built-in memory, or from the ERS's built-in memory to the removable memory media. This may include copying signature data in step 7425, copying user preferences in step 7430, and copying related data in step 7435. This may include automatic copying when the media is inserted, or copying on user command.

In step 7440, software may be copied from the removable memory media to the built-in memory. This may be, for example, a software upgrade for the ERS. The software upgrade may be loaded automatically when the removable memory media (e.g., CD-ROM) is inserted. If desired, the removable memory media may include a security code or other feature to prevent unauthorized software form being loaded. If desired, software on the removable memory media may be executed directly from the removable media.

Any other suitable types of data may be copied to or from the removable memory media. The ERS may also use any other suitable types of data directly from the removable memory media. This process completes at step 7445.

Figure 75:
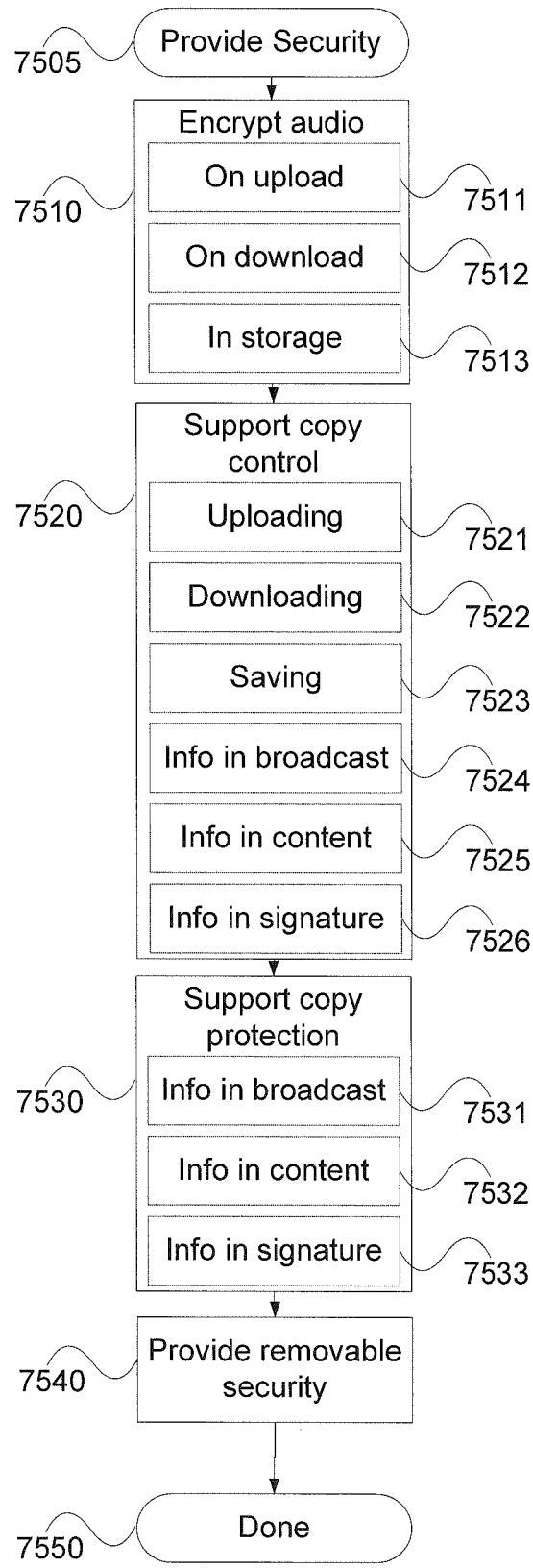
FIG. 75 is an illustrative flowchart showing steps of a process to provide security features in an ERS in accordance with one embodiment of the present invention.

FIG. 75 shows a flowchart of illustrative process 7505 of supporting security in the ERS. The steps shown in this flowchart are illustrative. Steps may be omitted or executed in an alternate order, and additional steps may be added.

In step 7510, the audio data may be encrypted. Any suitable encryption algorithm may be used. The audio may be received in an encrypted format, or it may be encrypted after it is received by the ERS. The encrypted audio may be decrypted when it is played back. In sub-step 7511, the audio data may be encrypted when it is uploaded, to provide secure copying or to prevent unauthorized access of the uploaded copy. In sub-step 7512, the audio data may be encrypted when it is downloaded, to provide secure copying, or to provide a secure version to the ERS. In sub-step 7513, the audio data may be encrypted when it is stored in memory in the ERS, to provide a secure local copy.

In step 7520, the ERS may support copy control, in which information related to the content indicates whether copying is authorized, and if so whether the number of copies is limited. For example, an item of content may carry a flag that indicates that the content may be copied an unlimited number of times, that only a single copy may be made, or that no copying is authorized. When the user attempts to make a copy of a content item that is marked for no copying, the ERS may deny the user's request, and may notify the user that the item may not be copied. When the user attempts to make a copy of a content item that is marked for only a single copy, the ERS may allow the copy, but may mark the copy as not permitting any additional copies. When the user attempts to make a copy of a content item that is marked for unlimited copying, or which is not marked with copy control information, the ERS may allow the copying with no restrictions. Copy control may be enforced when uploading an item of content to another device in sub-step 7521, when downloading an item of content into the ERS from another device in sub-step 7522, or when saving a copy of an item of content within the ERS, in sub-step 7523. Copy control information may be received with the radio broadcast in sub-step 7524. In sub-step 7525, the copy control information may be stored with an item of content. In sub-step 7526, the copy control information may be stored with an item signature. In this latter case, the copy control information may indicate to the ERS whether a copy of the item is permitted when a matching item is detected in the incoming radio broadcast.

In step 7530, the ERS may support copy protection. When copy protection is enabled, the ERS may modify the output audio signal to prevent copying. Copy protection information may be received as part of the broadcast radio signal in sub-step 7531, stored with an item of content in sub-step 7532, or stored with an item signature in sub-step 7533.

In sub-step 7540, the ERS may support a removable security feature. For example, the ERS may have a slot for a smart card. The smart card may provide encryption keys, decryption keys, or any other security information. The ERS may prevent access to any content with security controls if the smart card is not present. If desired, different users may have different smart cards, which may provide access to different levels of security. If desired, a password or PIN may be required in conjunction with the smart card. If desired, the security algorithms may be implemented on the smart card, so that they may easily be replaced in the event that security is compromised.

This process completes at step 7550.

Figure 76:
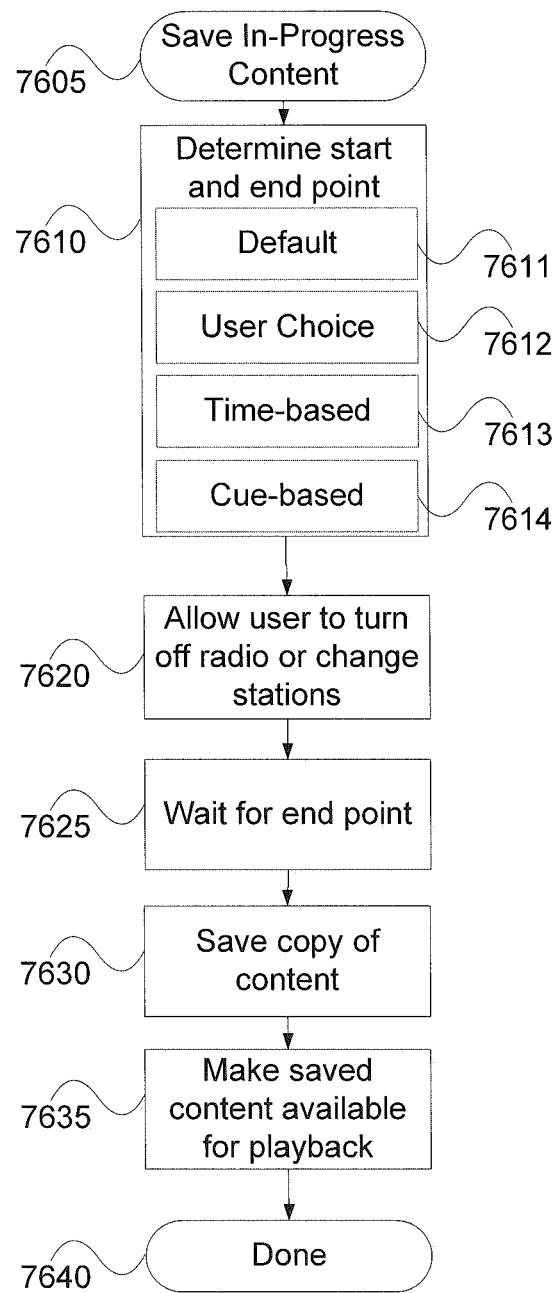
FIG. 76 is an illustrative flowchart showing steps of a process to save in-progress content in the ERS in accordance with one embodiment of the present invention.

FIG. 76 shows a flowchart of illustrative process 7605 of allowing a user to record in-progress content in an ERS. The steps shown in this flowchart are illustrative. Steps may be omitted or executed in an alternate order, and additional steps may be added.

This process may be initiated, for example, by a user who needs to turn off the ERS but who is listening to an item of content that is of particular interest. The user may speak a "Save" command or press a "save" button, to indicate that the current content is to be saved and made available for playback at a later time.

In step 7610, the ERS may determine the start and the end points of the content to save, on the station currently being played. In sub-step 7611, these may be default, predetermined points relative to the current playback point. For example, the ERS may always save the content starting one minute prior to the current playback point and ending ten minutes after the current playback point. In sub-step 7612, the user may be allowed to specify the start and/or the end point. For example, the user may press an "Extend" key to add one minute to the desired end point, and the range of time (e.g., −1 minute to +8 minutes) may be displayed on a display device for confirmation. In sub-step 7613, the start and/or end time may be time based. For example, the content saved may be on a half hour boundary. In sub-step 7614, the start and/or end point may be determined automatically based on cues in the broadcast audio, such as change from music to talk, change in power level, etc. Any other suitable method for determining the start and end point may be used. If desired, different methods may be used to determine the start point and the end point.

In step 7620, the user may be allowed to turn off the ERS, change stations, change to an alternate audio source, or otherwise deselect the current radio station. The ERS continues to monitor and record the content from the selected station. If desired, the priority of the station may be temporarily increased, so that the memory used to record the requested content is not deallocated until the copy has been saved. In step 7625, the ERS may wait for the determined end point of the content to be saved. If the entire content is available at the time the user makes the save selection, this step may be skipped. For example, the user may have rewound the playback of the station so that the request may be satisfied immediately. In step 7630, the content may be saved, for example as shown in FIG. 58. If desired, rather than waiting for the requested end point, the ERS may save each block of audio as it becomes available. In step 7635, the saved content may be made available for playback. For example, it may be assigned a name or number to allow the user to select it. As another alternative, it may begin playback immediately when the user next turns on the ERS. If desired, the saved content may be deleted automatically after the user listens to it, for example, when the user tunes to another station, or jumps to the currently broadcast content on the same station. This process ends in step 7640.

Although this present invention has been described in considerable detail with reference to certain preferred versions thereof, other embodiments are possible. Therefore, the spirit and scope of the invention should not be limited to the description of the preferred embodiments contained herein.

What is claimed is:

1. A portable, radio reception and playback device comprising: a communication device that allows a plurality of individual digital audio content items to be received using the Internet, a digital-to-analog conversion subsystem for converting the received digital audio content items to analog, and a speaker for outputting the converted audio content items, said device configured to receive a sequence of audio content items using the communication device and play back the sequence using the digital-to-analog converter and the speaker as if it were a radio station, to determine a listener's preference for a first audio content item in the sequence while the first audio content item is being played by the device, to determine, based on the determined preference, a next audio content item to be played immediately following the first audio content item during which the listener's preference is determined, to prevent unauthorized copying of at least one of the received audio content items, and to include a global positioning system (GPS) unit to determine the listener's current location.

2. The device of claim 1 in which the listener's preference comprises a preference for a song, a musical artist, a musical genre, or a radio station of the first audio content item.

3. The device of claim 1 in which the listener's preference comprises an indication that the listener a song, a musical artist, a musical genre, or a radio station of the first audio content item.

4. The device of claim 1 in which the listener's preference comprises an indication that the listener dislikes a song, a musical artist, a musical genre, or a radio station of the first audio content item.

5. The device of claim 1 in which the determining the listener's preference comprises allowing the listener to indicate a preference for the first audio content item.

6. The device of claim 1 in which the determining the listener's preference comprises automatically determining a dislike preference for the first audio content item when the listener chooses to not listen to.

7. The device of claim 1 in which the determining the listener's preference comprises automatically determining a like preference for the first audio content item when the listener chooses to listen to.

8. The device of claim 1 in which the determining the listener's preference comprises allowing the listener to specify one or more criteria.

9. The device of claim 1 in which the determining a next audio content item to be played further comprises automatically skipping over a disliked audio content item.

10. The device of claim 1 in which the determining a next audio content item to be played further comprises automatically selecting for playback a liked audio content item.

11. The device of claim 1 further configured to copy a preference from a different radio reception and playback device.

12. The device of claim 1 further comprising a radio reception subsystem, configured to allow the listener to choose a radio station to listen to.

13. The device of claim 1 further comprising a mobile telephone.

14. The device of claim 13 further configured to automatically pause or mute the playback of an audio content item in the sequence during a telephone call that uses the mobile telephone.

15. The device of claim 1 further comprising a message sending subsystem.

16. The device of claim 15 in which the message sending subsystem comprises a mobile telephone network.

17. The device of claim 15 in which the message sending subsystem comprises the Internet.

18. The device of claim 15, further configured to allow the listener to send an electronic message in response to received content.

19. The device of claim 18 in which the electronic message comprises a response to an advertisement.

20. The device of claim 18 in which the electronic message comprises request to make a purchase.

21. The device of claim 20 in which the purchase comprises a purchase of music related to the first audio content item while the first audio content is being played.

22. The device of claim 1 further configured to notify the listener of an event.

23. The device of claim 1 further configured to allow the listener to make a first indication that playback of an audio content item in the sequence is to be paused, to stop playback of the audio content item in response to the first indication, to allow the listener to make a second indication that playback is to be resumed, and to resume playback of the audio content item from the point within the audio content item at which it was paused in response to the second indication.

24. The device of claim 1 further configured to allow the listener to make an indication that an audio content item in the sequence is be skipped, and to stop playback of an audio content item in the sequence and start playback of a next audio content item in the sequence in response to the indication.

25. The device of claim 1 further configured to allow the listener to make an indication that an audio content item in the sequence is be restarted, and to stop playback of an audio content item in the sequence and start playback of the audio content item being stopped from playing from its beginning in response to the indication.

26. The device of claim 1 further configured to save a copy of the first audio content item on a first indication from the listener.

27. The device of claim 26 further configured to play back the saved copy of the first audio content item on a second indication from the listener.

28. The device of claim 1 further configured to allow the listener to download an individual selected audio content item and to play back that downloaded individual content item.

29. The device of claim 1 further comprising an associated Internet site.

30. The device of claim 29 in which the Internet site is configured to download information to the device.

31. The device of claim 1 further configured to determine subsequent audio content items to be played in the sequence based on the determined preference.

32. The device of claim 1 further configured to compare information about the listener's like and dislike with information about a radio station to create a recommendation to the listener.

33. The device of claim 1 wherein the portable radio reception and playback device further includes a global positioning system unit configured to determine the user's current location and the communication device receives content items from the Internet based on the user's current location from global positioning system unit.

34. The device of claim 1 wherein the device provides the sequence as a selectable displayed option for a preprogrammed radio station among a plurality of options for preprogrammed radio stations that include terrestrial radio stations.

* * * * *